(12) United States Patent
Kim et al.

(10) Patent No.: US 12,492,246 B2
(45) Date of Patent: *Dec. 9, 2025

(54) ANTI-FAM19A5 ANTIBODIES AND USES THEREOF

(71) Applicant: Neuracle Science Co., Ltd., Seoul (KR)

(72) Inventors: Bongcheol Kim, Seongnam-si (KR); Jae-Keun Lee, Seoul (KR); Dong Sik Kim, Seoul (KR); Junho Chung, Seongnam-si (KR); Junyeong Jin, Gwachun-si (KR)

(73) Assignee: Neuracle Science Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,334

(22) Filed: Mar. 2, 2023

(65) Prior Publication Data
US 2023/0287096 A1    Sep. 14, 2023

Related U.S. Application Data

(62) Division of application No. 16/626,624, filed as application No. PCT/IB2018/054785 on Jun. 27, 2018, now Pat. No. 11,618,783.

(60) Provisional application No. 62/582,887, filed on Nov. 7, 2017, provisional application No. 62/525,635, filed on Jun. 27, 2017.

(51) Int. Cl.
| *A61K 48/00* | (2006.01) |
| *A61K 39/00* | (2006.01) |
| *A61K 39/395* | (2006.01) |
| *A61P 35/00* | (2006.01) |
| *C07K 16/24* | (2006.01) |
| *G01N 33/50* | (2006.01) |
| *G01N 33/574* | (2006.01) |

(52) U.S. Cl.
CPC .............. *C07K 16/24* (2013.01); *A61K 39/00* (2013.01); *A61P 35/00* (2018.01); *G01N 33/5058* (2013.01); *G01N 33/57407* (2013.01); *A61K 2039/505* (2013.01); *C07K 2317/24* (2013.01); *C07K 2317/34* (2013.01); *C07K 2317/565* (2013.01); *C07K 2317/73* (2013.01); *C07K 2317/92* (2013.01); *G01N 2333/7158* (2013.01)

(58) Field of Classification Search
CPC ............................ G01N 33/5058; A61P 25/00
See application file for complete search history.

(56) References Cited

U.S. PATENT DOCUMENTS

| 4,044,126 A | 8/1977 | Cook et al. |
| 4,364,923 A | 12/1982 | Cook et al. |
| 4,414,209 A | 11/1983 | Cook et al. |
| 5,693,780 A | 12/1997 | Newman et al. |
| 5,709,874 A | 1/1998 | Hanson et al. |
| 5,759,542 A | 6/1998 | Gurewich |
| 5,840,674 A | 11/1998 | Yatvin et al. |
| 5,860,957 A | 1/1999 | Jacobsen et al. |
| 5,900,252 A | 5/1999 | Calanchi et al. |
| 5,948,433 A | 9/1999 | Burton et al. |
| 5,972,366 A | 10/1999 | Haynes et al. |
| 5,983,134 A | 11/1999 | Ostrow |
| 5,985,307 A | 11/1999 | Hanson et al. |
| 5,985,317 A | 11/1999 | Venkateshwaran et al. |
| 6,004,534 A | 12/1999 | Langer et al. |
| 6,010,715 A | 1/2000 | Wick et al. |
| 6,024,975 A | 2/2000 | D'Angelo et al. |
| 6,039,975 A | 3/2000 | Shah et al. |
| 6,048,736 A | 4/2000 | Kosak |
| 6,060,082 A | 5/2000 | Chen et al. |
| 6,071,495 A | 6/2000 | Unger et al. |
| 6,120,751 A | 9/2000 | Unger |
| 6,131,570 A | 10/2000 | Schuster et al. |
| 6,139,865 A | 10/2000 | Friend et al. |
| 6,167,301 A | 12/2000 | Flower et al. |
| 6,253,872 B1 | 7/2001 | Neumann |
| 6,256,533 B1 | 7/2001 | Yuzhakov et al. |
| 6,261,595 B1 | 7/2001 | Stanley et al. |
| 6,267,983 B1 | 7/2001 | Fujii et al. |
| 6,271,359 B1 | 8/2001 | Norris et al. |
| 6,274,552 B1 | 8/2001 | Tamarkin et al. |
| 6,316,652 B1 | 11/2001 | Steliou |
| 9,579,398 B2 | 2/2017 | Seong et al. |
| 10,227,407 B2 | 3/2019 | Kato et al. |
| 10,640,557 B2 | 5/2020 | Seong et al. |
| 10,806,787 B2 | 10/2020 | Kudo et al. |
| 11,155,613 B2 | 10/2021 | Kim et al. |
| 11,332,521 B2 | 5/2022 | Kim et al. |

(Continued)

FOREIGN PATENT DOCUMENTS

| CN | 102775490 A | 11/2012 |
| JP | 2007527203 A | 9/2007 |

(Continued)

OTHER PUBLICATIONS

Rugnath et al, Biomedicines 12: 1-12, 2024.*

(Continued)

*Primary Examiner* — Mark Halvorson

(74) *Attorney, Agent, or Firm* — Sterne, Kessler, Goldstein & Fox P.L.L.C.

(57) ABSTRACT

The present disclosure provides antibodies that specifically bind to human FAM19A5 and compositions comprising such antibodies. Also provided herein are methods for treating fibrosis or cancer using the anti-FAM19A5 antibodies.

9 Claims, 26 Drawing Sheets

Specification includes a Sequence Listing.

(56) References Cited

U.S. PATENT DOCUMENTS

| | | | |
|---|---|---|---|
| 11,560,425 | B2 | 1/2023 | Kim et al. |
| 11,618,783 | B2 | 4/2023 | Kim et al. |
| 11,634,484 | B2 | 4/2023 | Kim et al. |
| 11,739,141 | B2 | 8/2023 | Seong et al. |
| 11,746,149 | B2 | 9/2023 | Kim et al. |
| 11,970,532 | B2 | 4/2024 | Kim et al. |
| 12,072,339 | B2 | 8/2024 | Seong et al. |
| 12,077,579 | B2 | 9/2024 | Kim et al. |
| 2004/0014194 | A1 | 1/2004 | Beyer et al. |
| 2009/0221670 | A1 | 9/2009 | Borglum et al. |
| 2012/0100140 | A1 | 4/2012 | Reyes et al. |
| 2012/0261568 | A1 | 10/2012 | Coon et al. |
| 2015/0118230 | A1 | 4/2015 | Seong et al. |
| 2016/0060705 | A1 | 3/2016 | O'Donnel et al. |
| 2016/0222459 | A1 | 8/2016 | Keating et al. |
| 2017/0356049 | A1 | 12/2017 | Bukhalid et al. |
| 2020/0010563 | A1 | 1/2020 | Liu |

FOREIGN PATENT DOCUMENTS

| | | |
|---|---|---|
| JP | 2014522850 A | 9/2014 |
| KR | 20160101786 A | 8/2016 |
| WO | WO-9712622 A1 | 4/1997 |
| WO | WO-9817815 A1 | 4/1998 |
| WO | WO-9817816 A1 | 4/1998 |
| WO | WO-9818934 A1 | 5/1998 |
| WO | WO-9931251 A1 | 6/1999 |
| WO | WO-2004085469 A2 | 10/2004 |
| WO | WO-2006007854 A1 | 1/2006 |
| WO | WO-2015015000 A1 | 9/2009 |
| WO | WO-2015053381 A1 | 4/2015 |
| WO | WO-2015136469 A1 | 9/2015 |
| WO | WO-2016133059 A1 | 8/2016 |
| WO | WO-2017013436 A1 | 1/2017 |
| WO | WO-2019003165 A1 | 1/2019 |

OTHER PUBLICATIONS

Hatch, J Neurolog Sci 384:75-83, 2018.*
Paul, Fundamental Immunology, 3rd Edition, 1993, pp. 292-295.*
Rudikoff et al, Proc. Natl. Acad. Sci. USA, 79(6): 1979-1983, Mar. 1982.*
Colman P. M., Research in Immunology, 145:33-36, 1994.*
Casset et al, Biochemical and Biophysical Research Communications, 2003, vol. 307, pp. 198-205.*
Holm et al, Molecular Immunology, 2007, vol. 44, pp. 1075-1084.*
Altschul, S.F., et al., "Gapped Blast and PSI-Blast: A New Generation of Protein Database Search Programs," Nucleic Acids Research 25(17):3389-3402, Oxford University Press, England (Sep. 1997).
An, Z., et al., "IgG2m4, an Engineered Antibody Isotype with Reduced Fc function," Mabs 1(6):572-579, Philadelphia, PA : Taylor & Francis, United States (Nov.-Dec. 2009).
Bataller R. et al., "Liver fibrosis", The Journal of Clinical Investigation 115(2): 209-218, BMC, England (Feb. 2005).
Bird, R.E., et al., "Single-chain Antigen-binding Proteins," Science 242(4877):423-426, Association for the Advancement of Science, United States (Oct. 1988).
Bricogne, G., "Bayesian Statistical Viewpoint on Structure Determination: Basic Concepts and Examples," Methods in Enzymology 276:361-423, Academic Press, United States (1997).
Bricogne, G., "Direct Phase Determination by Entropy Maximization and Likelihood Ranking: Status Report and Perspectives," Acta Crystallographica. Section D, Biological Crystallography 49(Pt1):37-60, Wiley-Blackwell, United States (Jan. 1993).
Brummell, D.A., et al., "Probing the Combining Site of an Anti-Carbohydrate Antibody by Saturation-Mutagenesis: Role of the Heavy-Chain CDR3 Residues," Biochemistry 32(4):1180-1187, American Chemical Society, United States (Feb. 1993).
Burks, E.A., et al., "In vitro Scanning Saturation Mutagenesis of an Antibody Binding Pocket," Proceedings of the National Academy of Sciences USA 94(2):412-417, Plenum Publishing Corporation , United States (Jan. 1997).
Champe, M., et al., "Monoclonal Antibodies that Block the Activity of Leukocyte Function-Associated Antigen 1 Recognize Three Discrete Epitopes in the Inserted Domain of CD11a," The Journal of Biological Chemistry 270 (3):1388-1394, American Society for Biochemistry and Molecular Biology, United States (Jan. 1995).
Chayen, N.E., et al., "The Role of Oil in Macromolecular Crystallization," Structure 5(10):1269-1274, Cell Press, United States (Oct. 1997).
Cheung, R.C., et al., "Epitope-specific Antibody Response to the Surface Antigen of Duck Hepatitis B Virus in Infected Ducks," Virology 176(2):546-552, Academic Press, United States (Jun. 1990).
Chothia, C. and Lesk, A.M., "Canonical Structures for the Hypervariable Regions of Immunoglobulins," Journal of Molecular Biology 196(4):901-917, Elsevier Science, United States (Aug. 1987).
Corinna Lau, et al., "Chimeric Anti-CD14 IGG2/4 Hybrid Antibodies for Therapeutic Intervention in Pig and Human Models of Inflammation", Journal of Immunology, vol. 191 (9), pp. 4769-4777 (Nov. 2013).
Cunningham, B.C. and Wells, J.A., "High-resolution Epitope Mapping of hGH-receptor Interactions by Alanine-scanning Mutagenesis," Science 244(4908):1081-1085, American Association for the Advancement of Science, United States (Jun. 1989).
Diegelmann, R.F and Evans, M.C., "Wound Healing: An Overview of Acute, Fibrotic and Delayed Healing," Frontiers in Bioscience 9:283-289, Frontiers in Bioscience, United States (Jan. 2004).
Edelman, G.M. et al., "The Covalent Structure of an Entire gammaG Immunoglobulin Molecule," Proceedings of the National Academy of Sciences USA 63(1):78-85, National Academy of Sciences, United States (May 1969).
Firth, B.G and Dunnmon, P.M., "Left Ventricular Dilatation and Failure Post-Myocardial Infarction: Pathophysiology and Possible Pharmacologic Interventions," Cardiovascular Drugs and Therapy 4(5):1363-1374, Kluwer Academic for The International Society for Cardiovascular Pharmacotherapy, United States (Oct. 1990).
GenBank: AAF32220.1: scFV antibody V region, partial [synthetic construct] (Jul. 26, 2016).
GenBank: AJQ23617.1: immunoglobulin light chain variable region, partial [Gallus gallus] (Dec. 31, 2016).
Giannini, E., et al., "Validity and Clinical Utility of the Aspartate Aminotransferase-alanine Aminotransferase Ratio in Assessing Disease Severity and Prognosis in Patients With Hepatitis C Virus-related Chronic Liver Disease," 163(2):218-224, American Medical Association, United States (Jan. 2003).
Gieger, R., et al., "Crystallogenesis of Biological Macromolecules: Facts and Perspectives," Acta Crystallographica. Section D, Biological Crystallography 50(Pt4):339-350, Wiley-Blackwell, United States (Jul. 1994).
Goodman, Z.D., "Grading and Staging Systems for Inflammation and Fibrosis in Chronic Liver Diseases," Journal of Hepatology 47(4):598-607, Elsevier, Netherlands (Oct. 2007).
Gowda, S., et al., "A Review on Laboratory Liver Function Tests," The Pan African Medical Journal 3:17, African Field Epidemiology Network, Uganda (Nov. 2009).
Harmsen, M.M., et al., "Properties, Production, and Applications of Camelid Single-Domain Antibody Fragments," Applied Microbiology and Biotechnology 77(1), 13-22, Springer International, Germany (Nov. 2007).
Huston, J.S., et al., "Protein Engineering of Antibody Binding Sites: Recovery of Specific Activity in an Anti-digoxin Single-chain Fv Analogue Produced in *Escherichia coli*," Proceedings of the National Academy of Sciences USA 85(16):5879-5883, National Academy of Sciences, United States (Aug. 1988).
International Search Report and Written Opinion mailed Jan. 3, 2019 in Application No. PCT/IB2018/054785, ISA, Republic of Korea, 12 pages.
Jefferis, R., et al., "Human Immunoglobulin Allotypes: Possible Implications for Immunogenicity," Mabs 1(4):332-338, Taylor & Francis, United States (Jul.-Aug. 2009).
Kabat, E.A. and Wu, T.T., "Attempts to Locate Complementarity-Determining Residues in the Variable Positions of Light and Heavy Chains," Annals of the New York Academy of Sciences 190:382-393, Blackwell, United States (Dec. 1971).

(56) References Cited

OTHER PUBLICATIONS

Kabat, E.A., et al., "Sequences of Proteins of Immunological Interest," 5th Edition, U.S. Department of Public Health and Human Services, Public Health Service, NIH publication No. 91-3242, National Institutes of Health, Bethesda (1991).
Kirkland, T.N., et al., "Analysis of the Fine Specificity and Cross-reactivity of Monoclonal Anti-lipid A Antibodies," Journal of Microbiology 137(11):3614-3619, Microbiological Society of Korea, Korea (Dec. 1986).
Kobayashi, H., et al., "Tryptophan H33 Plays an Important Role in Pyrimidine (6-4) Pyrimidone Photoproduct Binding by a High-Affinity Antibody," Protein Engineering Design and Selection 12(10):879-884, Oxford University Press, United States (Oct. 1999).
Kostelny, S.A., et al., "Formation of a Bispecific Antibody by the Use of Leucine Zippers," The Journal of Immunology 148(5):1547-1553, American Association of Immunologists, United States (Mar. 1992).
Kountouras J. et al., "Prolonged bile duct obstruction: a new experimental model for cirrhosis in the rat", Journal of Experimental Pathology 65(3):305-311, Blackwell, England (Jun. 1984).
Lefranc, M.P., et al., "IMGT Unique Numbering for Immunoglobulin and T Cell Receptor Variable Domains and Ig Superfamily V-like Domains," Developmental and Comparative Immunology 27(1):55-77, Elsevier Science, United States (Jan. 2003).
Lonberg N, et al., "Human antibodies from transgenic animals," Nature biotechnology, vol. 23 (9), pp. 1117-1125, (Sep. 2005).
McCafferty, J., et al., "Phage Antibodies: Filamentous Phage Displaying Antibody Variable Domains," Nature 348(6301):552-554, Nature Publishing Group, London (Dec. 1990).
McPherson, A., "Crystallization of Proteins From Polyethylene Glycol," The Journal of Biological Chemistry 251(20):6300-6303, American Society for Biochemistry and Molecular Biology, United States (Oct. 1976).
McPherson A, et al., "Current approaches to macromolecular crystallization", European journal of biochemistry, vol. 189 (1), pp. 1-23, (Apr. 1990).
Moldenhauer G, et al., "Identity of HML-1 antigen on intestinal intraepithelial T cells and of B-ly7 antigen on hairy cell leukaemia", Scand J Immunol, vol. 32 (2), pp. 77-82, (Aug. 1990).
Morel, G.A., et al., "Monoclonal Antibodies to Bovine Serum Albumin: Affinity and Specificity Determinations," Molecular Immunology 25(1):7-15, Pergamon Press, England (Jan. 1988).
Needleman, S.B., et al., "A general method applicable to the search for similarities in the amino acid sequence of two proteins," J. Mol Biol 48 (3): 443-53, Elsevier, Netherlands (Mar. 1970).
Roux, K.H., et al., "Comparisons of the Ability of Human IgG3 Hinge Mutants, IgM, IgE, and IgA2, to form Small Immune Complexes: A Role for Flexibility and Geometry," The Journal of Immunology 161(8):4083-4090, American Association of Immunologists, United States (Oct. 1998).
Roversi, P., et al., "Modelling Prior Distributions of Atoms for Macromolecular Refinement and Completion," Acta Crystallographica. Section D, Biological Crystallography 56(Pt10):1316-1323, International Union of Crystallography by Munksgaard, United States (Oct. 2000).
Songsivilai, S. and Lachmann, P.J., "Bispecific Antibody: A Tool for Diagnosis and Treatment of Disease," Clinical and Experimental Immunology 79(3):315-321, Blackwell Scientific Publications, England (Mar. 1990).
Stahli, C., et al., "Distinction of Epitopes by Monoclonal Antibodies.," Methods in Enzymology 92:242-253, Academic Press, United States (1983).
Talman V, et al., "Cardiac fibrosis in myocardial infarction-from repair and remodeling to regeneration", Cell and tissue research, vol. 365 (3), pp. 563-581 (Sep. 2016).
Tang, T.Y., et al., "TAFA: A Novel Secreted Family With Conserved Cysteine Residues and Restricted Expression in the Brain," Genomics 83(4):727-734, Academic Press, United States (Apr. 2004).
Tsukada , S., et al., "Mechanisms of Liver Fibrosis," Clinica Chimica Acta, 364(1-2):33-60, Elsevier, Netherlands (Feb. 2006).
Vidarsson G, et al., "Igg Subclasses and Allotypes: From Structure to Effector Functions," Front Immunology 5:520, Frontiers Research Foundation, Switzerland (Oct. 2014).
Ward, E.S., et al., "Binding Activities of a Repertoire of Single Immunoglobulin Variable Domains Secreted from *Escherichia coli*," Nature 341(6242):544-546, Nature Publishing Group, England (Oct. 1989).
Wynn, T.A. and Ramalingam, T.R., "Mechanisms of Fibrosis: Therapeutic Translation for Fibrotic Disease," Nature Medicine 18(7):1028-1040, Nature Publishing Company, United States (Jul. 2012).
Novusbio, "Product Datasheet: TAFA5/FAM19A5 Antibody NBP2-31879" retrieved from https://www.novusbio.com/PDFs2/NBP2-31879.pdf, retrieved on Jan. 12, 2017, 4 pages.
Paulsen, S.J. et al., "The putative neuropeptide TAFA5 is expressed in the hypothalamic paraventricular nucleus and is regulated by dehydration," Brain Research 1199:1-9, Elsevier, Netherlands (Mar. 2008).
Diaz De Stahl, T., et al., "Chromosome 22 tiling-path array-CGH analysis identifies germ-line- and tumor-specific aberrations in patients with glioblastoma multiforme," Genes, Chromosomes & Cancer 44(2): 161-169, Wiley-Liss, United States (Oct. 2005).
Janvilisri, T., et al., "Novel Serum Biomarkers to Differentiate Cholangiocarcinoma from Benign Biliary Tract Diseases Using a Proteomic Approach," Disease Markers 2015:105358, Hindawi Publishing Corporation, United States (Apr. 2015).
Vaughan, T.J., et al., "Human antibodies with sub-nanomolar affinities isolated from a large non-immunized phage display library," Nature Biotechnology 14(3):309-314, Nature Publishing Group, United States (Mar. 1996).
Co-pending U.S. Appl. No. 19/028,113, inventors Kim, B., et al., filed Jan. 17, 2025 (Not yet Published).
Balasingam, V., et al., "Reactive Astrogliosis in the Neonatal Mouse Brain and Its Modulation by Cytokines," The Journal of Neuroscience 14(2):846-856, Society for Neuroscience, United States (Feb. 1994).
Herrmann, J.E., et al., "STAT3 is a Critical Regulator of Astrogliosis and Scar Formation after Spinal Cord Injury," The Journal of Neuroscience 28(28):7231-7243, Society for Neuroscience, United States (Jul. 2008).
McGraw, J., et al., "Modulating Astrogliosis After Neurotrauma," Journal of Neuroscience Research 63(2):109-115, Wiley-Liss, Inc., United States (Jan. 2001).
Moon, Y., et al., "Induction of Ezrin-radixin-moesin Molecules After Cryogenic Traumatic Brain Injury of the Mouse Cortex," Neuroreport 22(6):304-308, Lippincott Williams & Wilkins, United Kingdom (Apr. 2011).
Sofroniew, M.V., et al., "Reactive Astrocytes in Neural Repair and Protection," The Neuroscientist 11(5):400-407, Sage Publications, United States (Oct. 2005).
Sofroniew, M.V., "Molecular Dissection of Reactive Astrogliosis and Glial Scar Formation," Trends in Neurosciences 32(12):638-647, Elsevier, United Kingdom (Dec. 2009).
Xu, J.L., and Davis, M.M., "Diversity in the CDR3 region of VH is sufficient for most antibody specificities," Immunity 13(1):37-45, Cell Press, United States (Jul. 2000).

* cited by examiner

QFLKEGQLAAGTCEIVTLDRDSSQPRRTIARQTARCACRKGQIAGTTRARPACVDARIIKTKQWCDMLPCLEGEGCDLLINRSGWTCTQPGGRIKTTTVS

QFLKEGQLAAGTSEIVTLDRDSSQPRRTIARQTARSASRKGQIAGTTRARPASVDARIIKTKQWSDMLPSLEGEGSDLLINRSGWTSTQPGGRIKTTTVS

F1  F2  F3  F4  F5  F6

F1 : QFLKEGQLAAGTSEIVTLDRGGGSC-BSA (2.54 kDa)
F2 : TLDRDSSQPRRTIARQTARSGGGSC-BSA (2.68 kDa)
F3 : TARSASRKGQIAGTTRARPAGGGSC-BSA (2.42 kDa)
F4 : ARPASVDARIIKTKQWSDMLGGGSC-BSA (2.65 kDa)
F5 : SDMLPSLEGEGSDLLINRSGGGSC-BSA (2.45 kDa)
F6 : NRSGWTSTQPGGRIKTTTVSGGGSC-BSA (2.50 kDa)

| Capture antibody | 1-65 | | | | P2-A03 | | | | P2-F11 | | | | 13B4 | | | | 2-13 | | | | 3-2 | | | |
|---|---|---|---|---|---|---|---|---|---|---|---|---|---|---|---|---|---|---|---|---|---|---|---|---|
| Detection antibody | 100 | 10 | 0 | S/N | 100 | 10 | 0 | S/N | 100 | 10 | 0 | S/N | 100 | 10 | 0 | S/N | 100 | 10 | 0 | S/N | 100 | 10 | 0 | S/N |
| 1-65 | | | | | 0.16 | 0.11 | 0.1 | 1.1 | 1.61 | 0.33 | 0.19 | 1.7 | 0.19 | 0.15 | 0.15 | 1.0 | 1.73 | 1.81 | 0.55 | 3.3 | 1.98 | 1.83 | 0.28 | 6.5 |
| P2-A03 | 0.16 | 0.15 | 0.15 | 1.0 | | | | | 0.15 | 0.15 | 0.14 | 1.1 | 0.27 | 0.22 | 0.22 | 1.0 | 1.88 | 1.72 | 0.22 | 7.8 | 1.91 | 1.66 | 0.16 | 10 |
| P2-F11 | 1.25 | 0.2 | 0.12 | 1.7 | 0.09 | 0.09 | 0.09 | 1.0 | | | | | 0.2 | 0.18 | 0.18 | 1.0 | 1.83 | 2.04 | 0.29 | 7.0 | 2.02 | 1.81 | 0.13 | 13.9 |
| 13B4 | 0.12 | 0.12 | 0.12 | 1.0 | 0.15 | 0.16 | 0.14 | 1.1 | 0.14 | 0.16 | 0.15 | 1.1 | | | | | 1.92 | 0.65 | 0.21 | 3.1 | 1.7 | 0.3 | 0.13 | 2.3 |
| 2-13 | 2.02 | 1.8 | 0.44 | 4.1 | 1.88 | 1.07 | 0.39 | 2.7 | 1.94 | 1.91 | 0.4 | 4.8 | 1.48 | 0.45 | 0.45 | 1.1 | | | | | 2.01 | 1.97 | 0.38 | 5.1 |
| 3-2 | 1.96 | 1.68 | 0.1 | 16.8 | 1.83 | 1.08 | 0.05 | 21.6 | 2.11 | 1.93 | 0.09 | 21.4 | 1.88 | 0.42 | 0.42 | 4.7 | 2.04 | 2.02 | 0.26 | 7.8 | | | | |

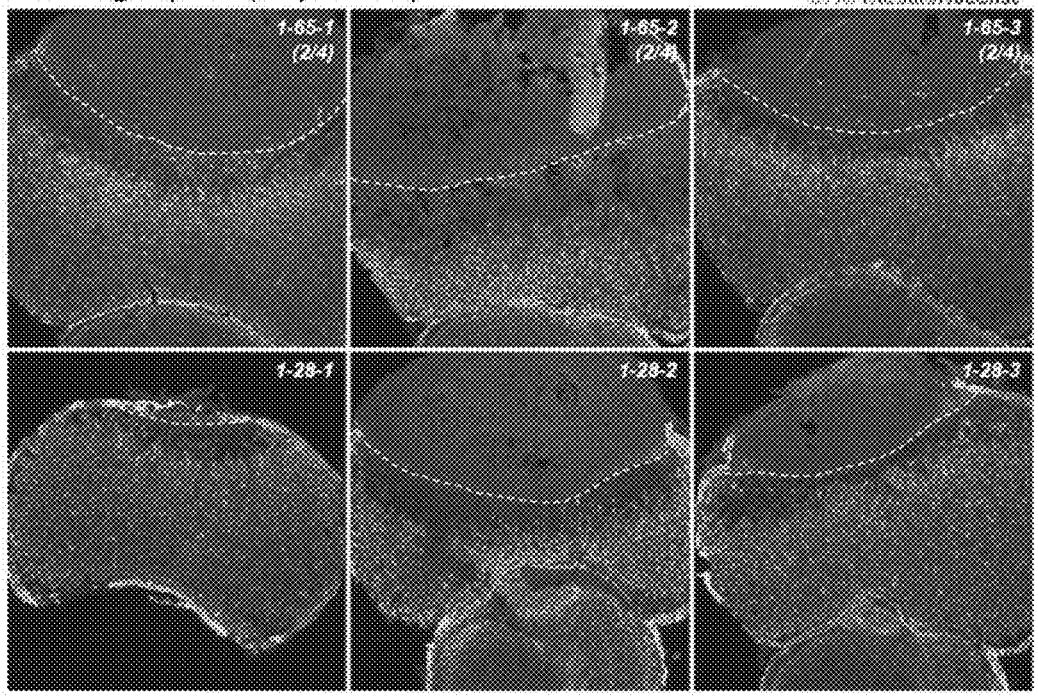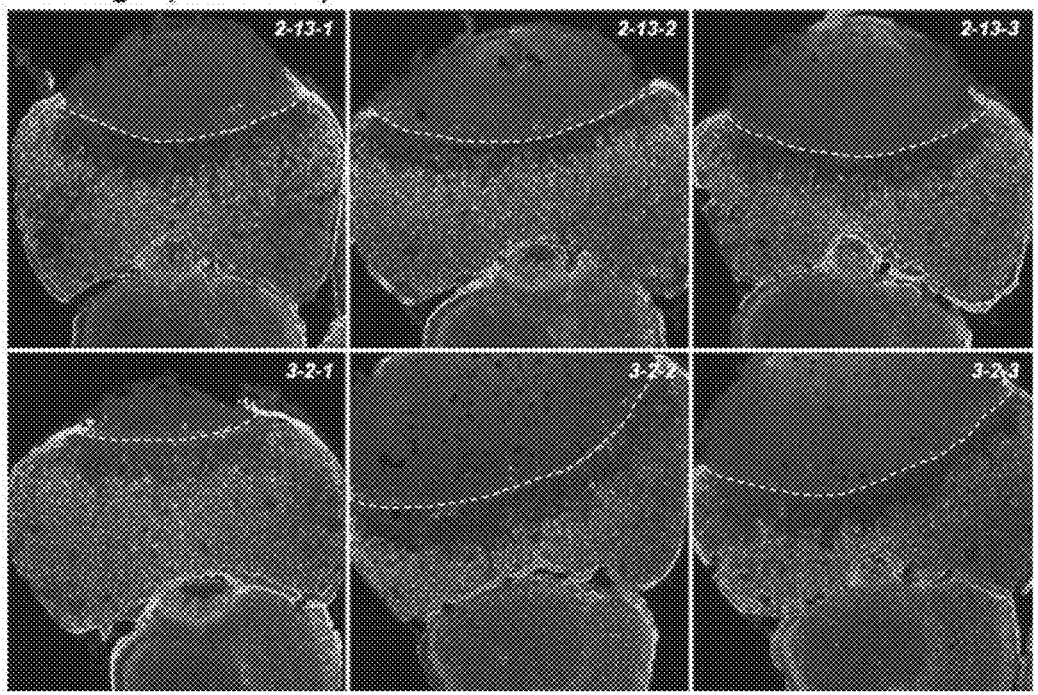
FIG. 15A

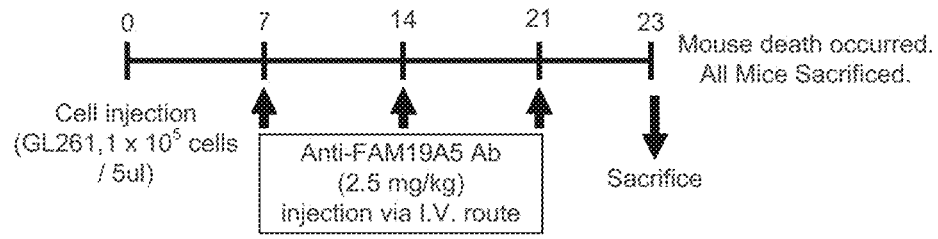
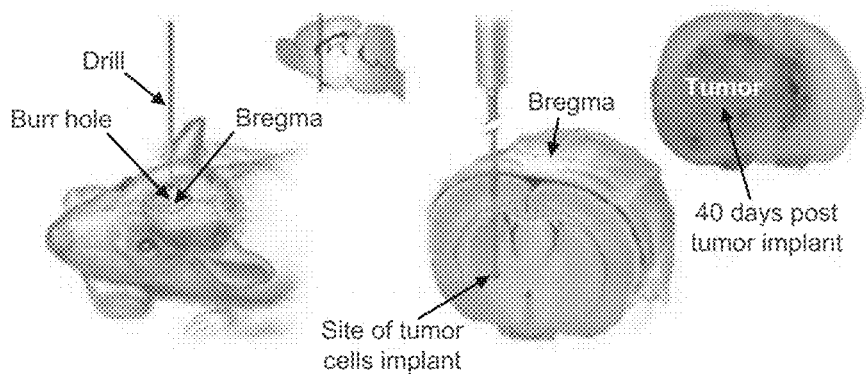
FIG. 16A
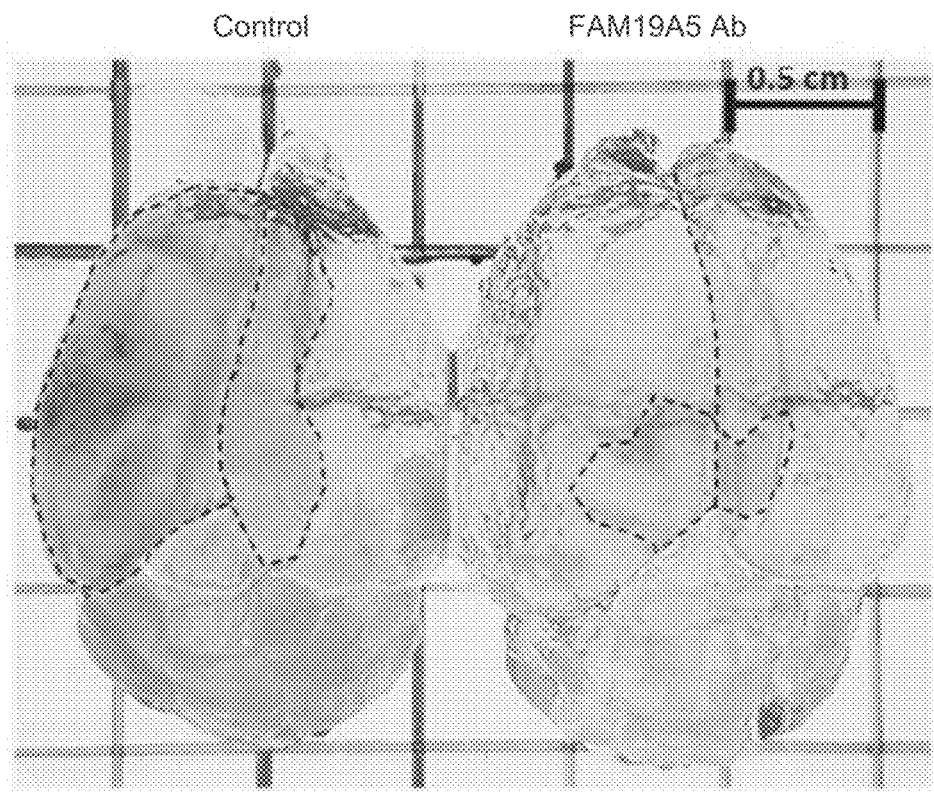
FIG. 16B

Scale bar = 500 μm.

| Slice #1 | Control | A5AB | | % of Control |
|---|---|---|---|---|
| Num. spots | 132166 | 76532.5 | | 57.90635 |
| Vol (μm^3) | 268000000 | 166100000 | | 61.97761 |
| | | | | |
| Slice #2 | Control | A5AB | | % of Control |
| Num. spots | 277528 | 151384.2 | | 54.54736 |
| Vol (μm^3) | 443000000 | 292600000 | | 66.04966 |
| | | | | |
| Slice #3 | Control | A5AB | | % of Control |
| Num. spots | 373561 | 223788.4 | | 59.90679 |
| Vol (μm^3) | 581000000 | 397100000 | | 68.34768 |
| | | | | |
| Slice #4 | Control | A5AB | | % of Control |
| Num. spots | 358046 | 328058.5 | | 91.62468 |
| Vol (μm^3) | 615000000 | 492800000 | | 80.13008 |

SEQUENCE LISTING

```
Sequence total quantity: 213
SEQ ID NO: 1            moltype = AA  length = 132
FEATURE                 Location/Qualifiers
source                  1..132
                        mol_type = protein
                        organism = Homo sapiens
SEQUENCE: 1
MAPSPRTGSR QDATALPSMS STFWAFMILA SLLIAYCSQL AAGTCEIVTL DRDSSQPRRT  60
IARQTARCAC RKGQIAGTTR ARPACVDARI IKTKQWCDML PCLEGEGCDL LINRSGWTCT 120
QPGGRIKTTT VS                                                    132

SEQ ID NO: 2            moltype = AA  length = 125
FEATURE                 Location/Qualifiers
source                  1..125
                        mol_type = protein
                        organism = Homo sapiens
SEQUENCE: 2
MQLLKALWAL AGAALCCFLV LVIHAQFLKE GQLAAGTCEI VTLDRDSSQP RRTIARQTAR  60
CACRKGQIAG TTRARPACVD ARIIKTKQWC DMLPCLEGEG CDLLINRSGW TCTQPGGRIK 120
TTTVS                                                            125

SEQ ID NO: 3            moltype = AA  length = 53
FEATURE                 Location/Qualifiers
source                  1..53
                        mol_type = protein
                        organism = Homo sapiens
SEQUENCE: 3
MYHHREWPAR IIKTKQWCDM LPCLEGEGCD LLINRSGWTC TQPGGRIKTT TVS          53

SEQ ID NO: 4            moltype = DNA  length = 1501
FEATURE                 Location/Qualifiers
```

```
source                      1..1501
                            mol_type = genomic DNA
                            organism = Homo sapiens
SEQUENCE: 4
ggcggcggag gatggcgcgc gcggggcccg cacgtggagg ccggcgcggg ggcgcgggca    60
gggccggctg ctgagacgcg ctgctgcccc ccgcgcgggc gccgcggctt caatggcgcc   120
atcgcccagg accggcagcc ggcaagatgc gaccgccctg cccagcatgt cctcaacttt   180
ctgggcgttc atgatcctgg ccagcctgct catcgcctac tgcagtcagc tggccgccgg   240
cacctgtgag attgtgacct tggaccggga cagcagccag cctcggagga cgatcgcccg   300
gcagaccgcc cgctgtgcgt gtagaaaggg gcagatcgcc ggcaccacga gagcccggcc   360
cgcctgtgtg gacgcaagaa tcatcaagac caagcagtgg tgtgacatgc ttccgtgtct   420
ggagggggaa ggctgcgact tgttaatcaa ccggtcaggc tggacgtgca cgcagcccgg   480
cgggaggata aagaccacca cggtctcctg acaaacacag ccctgaggg ggcccgggga    540
gtggccttgg ctccctggag agcccacgtc tcagccacag ttctccactc gcctcggact   600
tcacccgttc tctgccgccc gcccactccg tttcccgtgt gtccgtgaag gacgcctca    660
ggccttggca tcctgagctt cggtctgtcc agccgacccg aggaggccgg actcagacac   720
ataggcgggg ggcggcacct ggcatcagca atacgcagtc tgtgggagcc cggccgcgcc   780
cagccccgc cgaccgtggc gttggcccct ctgtcctcag aggagggcaa ggaggaggca   840
gctccggcag ccacagaagg ctgcagccca gcccgcctga gacacgacgc ctgcccagg    900
ggactgtcag gcacagaagc ggcctcctcc cgtgccccag actgtccgaa ttgctttat    960
tttcttatac tttcagtata ctccatagac caaagagcaa aatctatctg aacctggacg  1020
caccctcact gtcagggtcc ctgggtcgc ttgtgcgggc ggagagggcaa tggtggcaga  1080
gacatgctgg tggccccggc ggagcggaga gggcggccgt ggtggaggcc tccaccccag  1140
gagcaccccg cacaccctcg gaggacgggc ttcggctgcg cggaggccgt ggcacacctg  1200
cgggaggcag cgacggcccc cacgcagacg ccggaacgc aggccgcttt attcctctgt  1260
acttagatca acttgaccgt actaaaatcc cttcttgttt taaccagtta aacatgcctc  1320
ttctacagct ccatttttga tagttggata atccagtatc tgccaagagc atgtttggtc  1380
tcccgtgact gctgcctcat cgatacccca tttagctcca gaaagcaaag aaaactcgag  1440
taacacttgt ttgaaagaga tcattaaatg tatttttgcaa agcccaaaaa aaaaaaaaaa  1500
a                                                                 1501

SEQ ID NO: 5              moltype = AA  length = 14
FEATURE                   Location/Qualifiers
REGION                    1..14
                          note = Epitope F1
source                    1..14
                          mol_type = protein
                          organism = synthetic construct
SEQUENCE: 5
QLAAGTCEIV TLDR                                                      14

SEQ ID NO: 6              moltype = AA  length = 20
FEATURE                   Location/Qualifiers
REGION                    1..20
                          note = Epitope F2
source                    1..20
                          mol_type = protein
                          organism = synthetic construct
SEQUENCE: 6
TLDRDSSQPR RTIARQTARC                                                20

SEQ ID NO: 7              moltype = AA  length = 20
FEATURE                   Location/Qualifiers
REGION                    1..20
                          note = Epitope F3
source                    1..20
                          mol_type = protein
                          organism = synthetic construct
SEQUENCE: 7
TARCACRKGQ IAGTTRARPA                                                20

SEQ ID NO: 8              moltype = AA  length = 20
FEATURE                   Location/Qualifiers
REGION                    1..20
                          note = Epitope F4
source                    1..20
                          mol_type = protein
                          organism = synthetic construct
SEQUENCE: 8
ARPACVDARI IKTKQWCDML                                                20

SEQ ID NO: 9              moltype = AA  length = 20
FEATURE                   Location/Qualifiers
REGION                    1..20
                          note = Epitope F5
source                    1..20
                          mol_type = protein
                          organism = synthetic construct
SEQUENCE: 9
```

```
CDMLPCLEGE GCDLLINRSG                                                    20

SEQ ID NO: 10           moltype = AA  length = 20
FEATURE                 Location/Qualifiers
REGION                  1..20
                        note = Epitope F6
source                  1..20
                        mol_type = protein
                        organism = synthetic construct
SEQUENCE: 10
NRSGWTCTQP GGRIKTTTVS                                                    20

SEQ ID NO: 11           moltype = AA  length = 5
FEATURE                 Location/Qualifiers
REGION                  1..5
                        note = 2-13 Antibody VH-CDR1
source                  1..5
                        mol_type = protein
                        organism = synthetic construct
SEQUENCE: 11
SHGMF                                                                     5

SEQ ID NO: 12           moltype = AA  length = 17
FEATURE                 Location/Qualifiers
REGION                  1..17
                        note = 2-13 Antibody VH-CDR2
source                  1..17
                        mol_type = protein
                        organism = synthetic construct
SEQUENCE: 12
EITNDGSGTN YGSAVKG                                                       17

SEQ ID NO: 13           moltype = AA  length = 20
FEATURE                 Location/Qualifiers
REGION                  1..20
                        note = 2-13 Antibody VH-CDR3
source                  1..20
                        mol_type = protein
                        organism = synthetic construct
SEQUENCE: 13
STYECPGGFS CWGDTGQIDA                                                    20

SEQ ID NO: 14           moltype = AA  length = 5
FEATURE                 Location/Qualifiers
REGION                  1..5
                        note = 3-2 Antibody VH-CDR1
source                  1..5
                        mol_type = protein
                        organism = synthetic construct
SEQUENCE: 14
SFNMF                                                                     5

SEQ ID NO: 15           moltype = AA  length = 17
FEATURE                 Location/Qualifiers
REGION                  1..17
                        note = 3-2 Antibody VH-CDR2
source                  1..17
                        mol_type = protein
                        organism = synthetic construct
SEQUENCE: 15
QISSSGSSTN YAPAVRG                                                       17

SEQ ID NO: 16           moltype = AA  length = 22
FEATURE                 Location/Qualifiers
REGION                  1..22
                        note = 3-2 Antibody VH-CDR3
source                  1..22
                        mol_type = protein
                        organism = synthetic construct
SEQUENCE: 16
SSYDCPYGHC SSGVDSAGEI DA                                                 22

SEQ ID NO: 17           moltype = AA  length = 5
FEATURE                 Location/Qualifiers
REGION                  1..5
                        note = 1-65 Antibody VH-CDR1
source                  1..5
                        mol_type = protein
                        organism = synthetic construct
```

```
SEQUENCE: 17
SYQMG                                                                    5

SEQ ID NO: 18              moltype = AA  length = 10
FEATURE                    Location/Qualifiers
REGION                     1..10
                           note = 1-65 Antibody VH-CDR2
source                     1..10
                           mol_type = protein
                           organism = synthetic construct
SEQUENCE: 18
VINKSGSDTS                                                              10

SEQ ID NO: 19              moltype = AA  length = 13
FEATURE                    Location/Qualifiers
REGION                     1..13
                           note = 1-65 Antibody VH-CDR3
source                     1..13
                           mol_type = protein
                           organism = synthetic construct
SEQUENCE: 19
GSASYITAAT IDA                                                          13

SEQ ID NO: 20              moltype = AA  length = 8
FEATURE                    Location/Qualifiers
REGION                     1..8
                           note = 1-28 Antibody VH-CDR1
source                     1..8
                           mol_type = protein
                           organism = synthetic construct
SEQUENCE: 20
GFDFSDYG                                                                 8

SEQ ID NO: 21              moltype = AA  length = 8
FEATURE                    Location/Qualifiers
REGION                     1..8
                           note = 1-28 Antibody VH-CDR2
source                     1..8
                           mol_type = protein
                           organism = synthetic construct
SEQUENCE: 21
IRSDGSNP                                                                 8

SEQ ID NO: 22              moltype = AA  length = 29
FEATURE                    Location/Qualifiers
REGION                     1..29
                           note = 1-28 Antibody VH-CDR3
source                     1..29
                           mol_type = protein
                           organism = synthetic construct
SEQUENCE: 22
AKDGNGYCAL DAYRSGGYSC GVYPGSIDA                                         29

SEQ ID NO: 23              moltype = AA  length = 8
FEATURE                    Location/Qualifiers
REGION                     1..8
                           note = 2-13 Antibody VL-CDR1
source                     1..8
                           mol_type = protein
                           organism = synthetic construct
SEQUENCE: 23
SGGSYSYG                                                                 8

SEQ ID NO: 24              moltype = AA  length = 7
FEATURE                    Location/Qualifiers
REGION                     1..7
                           note = 2-13 Antibody VL-CDR2
source                     1..7
                           mol_type = protein
                           organism = synthetic construct
SEQUENCE: 24
WDDERPS                                                                  7

SEQ ID NO: 25              moltype = AA  length = 11
FEATURE                    Location/Qualifiers
REGION                     1..11
                           note = 2-13 Antibody VL-CDR3
source                     1..11
                           mol_type = protein
```

```
                               organism = synthetic construct
SEQUENCE: 25
GTEDISGTAG V                                                                              11

SEQ ID NO: 26          moltype = AA   length = 13
FEATURE                Location/Qualifiers
REGION                 1..13
                       note = 3-2 Antibody VL-CDR1
source                 1..13
                       mol_type = protein
                       organism = synthetic construct
SEQUENCE: 26
SGGGSYAGSY YYG                                                                            13

SEQ ID NO: 27          moltype = AA   length = 7
FEATURE                Location/Qualifiers
REGION                 1..7
                       note = 3-2 Antibody VL-CDR2
source                 1..7
                       mol_type = protein
                       organism = synthetic construct
SEQUENCE: 27
ESNKRPS                                                                                    7

SEQ ID NO: 28          moltype = AA   length = 10
FEATURE                Location/Qualifiers
REGION                 1..10
                       note = 3-2 Antibody VL-CDR3
source                 1..10
                       mol_type = protein
                       organism = synthetic construct
SEQUENCE: 28
GSWDSSNGGI                                                                                10

SEQ ID NO: 29          moltype = AA   length = 11
FEATURE                Location/Qualifiers
REGION                 1..11
                       note = 1-65 Antibody VL-CDR1
source                 1..11
                       mol_type = protein
                       organism = synthetic construct
SEQUENCE: 29
SGGGSSGYGY G                                                                              11

SEQ ID NO: 30          moltype = AA   length = 7
FEATURE                Location/Qualifiers
REGION                 1..7
                       note = 1-65 Antibody VL-CDR2
source                 1..7
                       mol_type = protein
                       organism = synthetic construct
SEQUENCE: 30
WNDKRPS                                                                                    7

SEQ ID NO: 31          moltype = AA   length = 14
FEATURE                Location/Qualifiers
REGION                 1..14
                       note = 1-65 Antibody VL-CDR3
source                 1..14
                       mol_type = protein
                       organism = synthetic construct
SEQUENCE: 31
GNDDYSSDSG YVGV                                                                           14

SEQ ID NO: 32          moltype = AA   length = 5
FEATURE                Location/Qualifiers
REGION                 1..5
                       note = 1-28 Antibody VL-CDR1
source                 1..5
                       mol_type = protein
                       organism = synthetic construct
SEQUENCE: 32
GYGYG                                                                                      5

SEQ ID NO: 33          moltype =      length =
SEQUENCE: 33
000

SEQ ID NO: 34          moltype = AA   length = 11
```

```
FEATURE                 Location/Qualifiers
REGION                  1..11
                        note = 1-28 Antibody VL-CDR3
source                  1..11
                        mol_type = protein
                        organism = synthetic construct
SEQUENCE: 34
GSEDSSTLAG I                                                              11

SEQ ID NO: 35           moltype = AA   length = 129
FEATURE                 Location/Qualifiers
REGION                  1..129
                        note = 2-13 Antibody VH
source                  1..129
                        mol_type = protein
                        organism = synthetic construct
SEQUENCE: 35
AVTLDESGGG LQTPGGALSL VCKASGFTFS SHGMFWVRQT PGKGLEYVAE ITNDGSGTNY          60
GSAVKGRATI SRDNGQSTVR LQLNNLRAED TGTYFCARST YECPGGFSCW GDTGQIDAWG         120
HGTEVIVSS                                                                129

SEQ ID NO: 36           moltype = AA   length = 131
FEATURE                 Location/Qualifiers
REGION                  1..131
                        note = 3-2 Antibody VH
source                  1..131
                        mol_type = protein
                        organism = synthetic construct
SEQUENCE: 36
AVTLDESGGG LQTPGGALSL VCKASGFTFS SFNMFWVRQA PGKGLEYVAQ ISSSGSSTNY          60
APAVRGRATI SRDNGQSTVR LQLNNPGAED TGTYYCAKSS YDCPYGHCSS GVDSAGEIDA         120
WGHGTEVIVS S                                                             131

SEQ ID NO: 37           moltype = AA   length = 122
FEATURE                 Location/Qualifiers
REGION                  1..122
                        note = 1-65 Antibody VH
source                  1..122
                        mol_type = protein
                        organism = synthetic construct
SEQUENCE: 37
AVTLDESGGG LQTPGGALSL VCKASGFTFS SYQMGWVRQA PGKGLEWVGV INKSGSDTSY          60
GSAVKGRATI SRDNGQSTVR LQLNNLRAED TGTYFCAKGS ASYITAATID AWGHGTEVIV         120
SS                                                                       122

SEQ ID NO: 38           moltype = AA   length = 136
FEATURE                 Location/Qualifiers
REGION                  1..136
                        note = 1-28 Antibody VH
source                  1..136
                        mol_type = protein
                        organism = synthetic construct
SEQUENCE: 38
AVTLDESGGG LQTPGGALSL VCKASGFDFS DYGMGWVRQA PGKGLEWVAA IRSDGSNPSY          60
GSAVKGRATI SKDNGRSTVR LQLNNLRAED TATYYCAKDG NGYCALDAYR SGGYSCGVYP         120
GSIDAWGHGT EVIVSS                                                        136

SEQ ID NO: 39           moltype = AA   length = 104
FEATURE                 Location/Qualifiers
REGION                  1..104
                        note = 2-13 Antibody VL
source                  1..104
                        mol_type = protein
                        organism = synthetic construct
SEQUENCE: 39
ALTQPSSVSA NPGETVKITC SGGSYSYGWF QQKSPGSALV TVIYWDDERP SDIPSRFSGA          60
LSGSTNTLTI TGVQADDEAV YFCGTEDISG TAGVFGAGTT LTVL                         104

SEQ ID NO: 40           moltype = AA   length = 108
FEATURE                 Location/Qualifiers
REGION                  1..108
                        note = 3-2 Antibody VL
source                  1..108
                        mol_type = protein
                        organism = synthetic construct
SEQUENCE: 40
ALTQPSSVSA NPGETVKITC SGGGSYAGSY YYGWYQQKAP GSAPVTLIYE SNKRPSDIPS          60
RFSGSTSGST ATLTITGVQA DDEAIYYCGS WDSSNGGIFG AGTTLTVL                     108
```

```
SEQ ID NO: 41            moltype = AA   length = 110
FEATURE                  Location/Qualifiers
REGION                   1..110
                         note = 1-65 Antibody VL
source                   1..110
                         mol_type = protein
                         organism = synthetic construct
SEQUENCE: 41
ALTQPSSVSA NPGETVKITC SGGGSSGYGY GWYQQKSPSS APLTVIYWND KRPSDIPSRF   60
SGSKSGSTHT LTITGVQAED EAVYFCGNDD YSSDSGYVGV FGAGTTLTVL             110

SEQ ID NO: 42            moltype = AA   length = 104
FEATURE                  Location/Qualifiers
REGION                   1..104
                         note = 1-28 Antibody VL
source                   1..104
                         mol_type = protein
                         organism = synthetic construct
SEQUENCE: 42
ALTQPSSVSA NLEGTVEITC SGSGYGYGWY QQKSPGSAPV TVIYQNDKRP SDIPSRFSGS   60
KSGSTGTLTI TGVQVEDEAV YYCGSEDSST LAGIFGAGTT LTVL                   104

SEQ ID NO: 43            moltype = DNA   length = 388
FEATURE                  Location/Qualifiers
misc_feature             1..388
                         note = 2-13 Antibody VH
source                   1..388
                         mol_type = other DNA
                         organism = synthetic construct
SEQUENCE: 43
gccgtgacgt tggacgagtc cgggggcggc ctccagacgc cggaggagc gctcagcctc    60
gtctgcaagg cctccgggtt caccttcagc agccatggca tgttctgggt gcgacagacg  120
cccggcaagg ggttggaata tgtcgctgaa attaccaatg atggtagtgg cacaaactac  180
gggtcggcgg tgaagggccg tgccaccatc tcgaggaca acgggcagag cacagtgagg   240
ctgcagctga acaacctcag ggctgcagct accggcacct acttctgcgc cagatctact  300
tatgaatgtc ctggtggttt tagttgttgg ggtgatactg gtcaaataga cgcatgggc   360
cacgggaccg aagtcatcgt ctcctcca                                     388

SEQ ID NO: 44            moltype = DNA   length = 394
FEATURE                  Location/Qualifiers
misc_feature             1..394
                         note = 3-2 Antibody VH
source                   1..394
                         mol_type = other DNA
                         organism = synthetic construct
SEQUENCE: 44
gccgtgacgt tggacgagtc cgggggcggc ctccagacgc cggaggagc gctcagcctc    60
gtctgcaagg cctccgggtt caccttcagc agcttcaaca tgttctgggt gcgacaggcg  120
cccggcaagg ggctgaata cgtcgctcaa attagcagca gtggtagtag cacaaactac   180
gcacccgcgt tgaggggccg tgccaccatc tcgaggaca acgggcagag cacagtgagg   240
ctgcagctga acaaccccgg ggctgaagac accggcacct actactgcgc caaaagtagt  300
tatgactgtc cttacggtca ttgtagtagt ggtgttgata gtgctggtga gatcgacgca  360
tggggccacg ggaccgaagt catcgtctcc tcca                              394

SEQ ID NO: 45            moltype = DNA   length = 366
FEATURE                  Location/Qualifiers
misc_feature             1..366
                         note = 1-65 Antibody VH
source                   1..366
                         mol_type = other DNA
                         organism = synthetic construct
SEQUENCE: 45
gccgtgacgt tggacgagtc cgggggcggc ctccagacgc cggaggagc gctcagcctc    60
gtctgcaagg cctccgggtt caccttcagc agctatcaga tggggctgggt gcgacaggcg 120
cccggcaagg ggctggaatg ggtcggtgtt attaacaaga gtggtagtga cacatcatac  180
gggtcggcgg tgaagggccg tgccaccatc tcgaggaca acgggcagag cacagtgagg   240
ctgcagctga acaacctcag ggctgaggac accggcacct acttctgcgc caaaggttct  300
gctagttata taactgctgc taccatcgac gcatggggcc acgggaccga agtcatcgtc  360
tcctcc                                                             366

SEQ ID NO: 46            moltype = DNA   length = 408
FEATURE                  Location/Qualifiers
misc_feature             1..408
                         note = 1-28 Antibody VH
source                   1..408
                         mol_type = other DNA
                         organism = synthetic construct
SEQUENCE: 46
gccgtgacgt tggacgagtc cgggggcggc ctccagacgc cggaggagc gctcagcctc    60
```

```
gtctgcaagg cctccgggtt cgacttcagc gattatggca tgggttgggt gcgacaggct   120
ccaggcaagg ggctggagtg ggttgctgct attagaagtg atggtagtaa cccatcatac   180
gggtcggcgg tgaagggccg tgccaccatc tcgaaggaca acgggcgaag cacagtgagg   240
ctgcagctga acaacctcag ggctgaggac accgccacct actactgcgc caaggatggt   300
aatggttact gtgctctcga tgcttatcgt agtggtggt  atagttgtgg tgtttatcct   360
ggtagcatcg acgcatgggg ccacgggacc gaagtcatcg tctcctcc               408
```

```
SEQ ID NO: 47           moltype = DNA   length = 315
FEATURE                 Location/Qualifiers
misc_feature            1..315
                        note = 2-13 Antibody VL
source                  1..315
                        mol_type = other DNA
                        organism = synthetic construct
SEQUENCE: 47
ggccctgact cagccgtcct cggtgtcagc aaacccagga gaaaccgtca agataacctg    60
ctccgggggt agctatagct atggctggtt ccagcagaag tctcctggca gtgcccttgt   120
cactgtgatc tactgggatg atgagagacc ctcggacatc ccttcacgat tctccggtgc   180
cctatccggc tccacaaaca cattaaccat cactggggtc caagccgacg acgaggctgt   240
ctatttctgt gggactgaag acatcagcgg cactgctggt gtatttgggg ccgggacaac   300
cctgaccgtc ctggg                                                    315
```

```
SEQ ID NO: 48           moltype = DNA   length = 327
FEATURE                 Location/Qualifiers
misc_feature            1..327
                        note = 3-2 Antibody VL
source                  1..327
                        mol_type = other DNA
                        organism = synthetic construct
SEQUENCE: 48
ggccctgact cagccgtcct cggtgtcagc aaacccagga gaaaccgtca agatcacctg    60
ctccgggggt ggcagctatg ctggaagtta ctattatggc tggtaccagc agaaggcacc   120
tggcagtgcc cctgtcactc tgatctatga agcaacaag  agaccctcgg catcccttcc   180
acgattctcc ggttccacat ctggctccac agccacacta accatcactg ggtccaagc   240
cgatgacgag gctatctatt actgtgggag ctgggacagt agcaatggtg gtatatttgg   300
ggccgggaca accctgaccg tcctagg                                      327
```

```
SEQ ID NO: 49           moltype = DNA   length = 331
FEATURE                 Location/Qualifiers
misc_feature            1..331
                        note = 1-65 Antibody VL
source                  1..331
                        mol_type = other DNA
                        organism = synthetic construct
SEQUENCE: 49
ggccctgact cagccgtcct cggtgtcagc aaaccctggg gaaactgtca agatcacctg    60
ctccgggggt ggtagcagtg gctatggtta tggctggtat cagcagaagt cacctagcag   120
tgcccctctc actgtgatct actgggaacga caagagaccc tcggacatcc cttcacgatt   180
ctccggttcc aaatccggct ccacacacac attaaccatc actggggtcc aagccgagga   240
cgaggctgta tatttctgtg gaatgatga ctacagcagt gatagtggat atgtcggtgt   300
atttggggcc gggacaaccc tgaccgtcct a                                 331
```

```
SEQ ID NO: 50           moltype = DNA   length = 312
FEATURE                 Location/Qualifiers
misc_feature            1..312
                        note = 1-28 Antibody VL
source                  1..312
                        mol_type = other DNA
                        organism = synthetic construct
SEQUENCE: 50
gccctgactc agccgtcctc ggtgtcagca aacctggaag gaaccgtcga gatcacctgc    60
tccggggagtg gctatggtta tggctggtat cagcagaagt ctcctggcag tgcccctgtc   120
actgtgatct atcagaacga caagagaccc tcggacatcc cttcacgatt ctccggttcc   180
aaatccggct ccacgggcac attaaccatc actggggtcc aagtcgagga cgaggctgtc   240
tattactgtg ggagtgaaga cagcagcact cttgctggta tatttggggc cgggacaacc   300
ctgaccgtcc ta                                                      312
```

```
SEQ ID NO: 51           moltype = AA    length = 100
FEATURE                 Location/Qualifiers
REGION                  1..100
                        note = M3 mutant
source                  1..100
                        mol_type = protein
                        organism = synthetic construct
SEQUENCE: 51
QFLKEGQLAA GTCEIVTLDR DSSQPRIEER SQTARCACRK GQIAGTTRAR PACVDARIIK    60
TKQWCDMLPC LEGEGCDLLI NRSGWTCTQP GGRIKTTTVS                         100
```

```
SEQ ID NO: 52           moltype = AA    length = 100
```

```
FEATURE                 Location/Qualifiers
REGION                  1..100
                        note = M4 mutant
source                  1..100
                        mol_type = protein
                        organism = synthetic construct
SEQUENCE: 52
QFLKEGQLAA GTCEIVTLDR DSSQPRRTIA RQTVKCSCFP GQIAGTTRAR PACVDARIIK    60
TKQWCDMLPC LEGEGCDLLI NRSGWTCTQP GGRIKTTTVS                         100

SEQ ID NO: 53           moltype = AA  length = 100
FEATURE                 Location/Qualifiers
REGION                  1..100
                        note = M5 mutant
source                  1..100
                        mol_type = protein
                        organism = synthetic construct
SEQUENCE: 53
QFLKEGQLAA GTCEIVTLDR DSSQPRRTIA RQTARCACRK GQIAGTTRNK PSCVDARIIK    60
TKQWCDMLPC LEGEGCDLLI NRSGWTCTQP GGRIKTTTVS                         100

SEQ ID NO: 54           moltype = AA  length = 100
FEATURE                 Location/Qualifiers
REGION                  1..100
                        note = M6 mutant
source                  1..100
                        mol_type = protein
                        organism = synthetic construct
SEQUENCE: 54
QFLKEGQLAA GTCEIVTLDR DSSQPRRTIA RQTARCACRK GQIAGTTRAR PACVDARIIL    60
QRWWCQMELC LEGEGCDLLI NRSGWTCTQP GGRIKTTTVS                         100

SEQ ID NO: 55           moltype = AA  length = 100
FEATURE                 Location/Qualifiers
REGION                  1..100
                        note = M7 mutant
source                  1..100
                        mol_type = protein
                        organism = synthetic construct
SEQUENCE: 55
QFLKEGQLAA GTCEIVTLDR DSSQPRRTIA RQTARCACRK GQIAGTTRAR PACVDARIIK    60
TKQWCDMLPC LEGEECKTLP DNSGWTCTQP GGRIKTTTVS                         100

SEQ ID NO: 56           moltype = AA  length = 101
FEATURE                 Location/Qualifiers
REGION                  1..101
                        note = M8 mutant
source                  1..101
                        mol_type = protein
                        organism = synthetic construct
SEQUENCE: 56
QFLKEGQLAA GTCEIVTLDR DSSQPRRTIA RQTARCACRK GQIAGTTRAR PACVDARIIK    60
TKQWCDMLPC LEGEGCDLLI NRSGWTCSCS SGNKIKTTTV S                       101

SEQ ID NO: 57           moltype = AA  length = 459
FEATURE                 Location/Qualifiers
REGION                  1..459
                        note = 2-13 Antibody HC
source                  1..459
                        mol_type = protein
                        organism = synthetic construct
SEQUENCE: 57
AVTLDESGGG LQTPGGALSL VCKASGFTFS SHGMFWVRQT PGKGLEYVAE ITNDGSGTNY    60
GSAVKGRATI SRDNGQSTVR LQLNNLRAED TGTYFCARST YECPGGFSCW GDTGQIDAWG   120
HGTEVIVSSA STKGPSVFPL APSSKSTSGG TAALGCLVKD YFPEPVTVSW NSGALTSGVH   180
TFPAVLQSSG LYSLSSVVTV PSSSLGTQTY ICNVNHKPSN TKVDKKVEPK SCDKTHTCPP   240
CPAPELLGGP SVFLFPPKPK DTLMISRTPE VTCVVVDVSH EDPEVKFNWY VDGVEVHNAK   300
TKPREEQYNS TYRVVSVLTV LHQDWLNGKE YKCKVSNKAL PAPIEKTISK AKGQPREPQV   360
YTLPPSREEM TKNQVSLTCL VKGFYPSDIA VEWESNGQPE NNYKTTPPVL DSDGSFFLYS   420
KLTVDKSRWQ QGNVFSCSVM HEALHNHYTQ KSLSLSPGK                         459

SEQ ID NO: 58           moltype = AA  length = 461
FEATURE                 Location/Qualifiers
REGION                  1..461
                        note = 3-2 Antibody HC
source                  1..461
                        mol_type = protein
                        organism = synthetic construct
SEQUENCE: 58
```

```
AVTLDESGGG LQTPGGALSL VCKASGFTFS SFNMFWVRQA PGKGLEYVAQ ISSSGSSTNY    60
APAVRGRATI SRDNGQSTVR LQLNNPGAED TGTYYCAKSS YDCPYGHCSS GVDSAGEIDA   120
WGHGTEVIVS SASTKGPSVF PLAPSSKSTS GGTAALGCLV KDYFPEPVTV SWNSGALTSG   180
VHTFPAVLQS SGLYSLSSVV TVPSSSLGTQ TYICNVNHKP SNTKVDKKVE PKSCDKTHTC   240
PPCPAPELLG GPSVFLFPPK PKDTLMISRT PEVTCVVVDV SHEDPEVKFN WYVDGVEVHN   300
AKTKPREEQY NSTYRVVSVL TVLHQDWLNG KEYKCKVSNK ALPAPIEKTI SKAKGQPREP   360
QVYTLPPSRE EMTKNQVSLT CLVKGFYPSD IAVEWESNGQ PENNYKTTPP VLDSDGSFFL   420
YSKLTVDKSR WQQGNVFSCS VMHEALHNHY TQKSLSLSPG K                      461

SEQ ID NO: 59           moltype = AA  length = 452
FEATURE                 Location/Qualifiers
REGION                  1..452
                        note = 1-65 Antibody HC
source                  1..452
                        mol_type = protein
                        organism = synthetic construct
SEQUENCE: 59
AVTLDESGGG LQTPGGALSL VCKASGFTFS SYQMGWVRQA PGKGLEWVGV INKSGSDTSY    60
GSAVKGRATI SRDNGQSTVR LQLNNLRAED TGTYFCAKGS ASYITAATID AWGHGTEVIV   120
SSSASTKGPSV FPLAPSSKST SGGTAALGCL VKDYFPEPVT VSWNSGALTS GVHTFPAVLQ   180
SSGLYSLSSV VTVPSSSLGT QTYICNVNHK PSNTKVDKKV EPKSCDKTHT CPPCPAPELL   240
GGPSVFLFPP KPKDTLMISR TPEVTCVVVD VSHEDPEVKF NWYVDGVEVH NAKTKPREEQ   300
YNSTYRVVSV LTVLHQDWLN GKEYKCKVSN KALPAPIEKT ISKAKGQPRE PQVYTLPPSR   360
EEMTKNQVSL TCLVKGFYPS DIAVEWESNG QPENNYKTTP PVLDSDGSFF LYSKLTVDKS   420
RWQQGNVFSC SVMHEALHNH YTQKSLSLSP GK                                452

SEQ ID NO: 60           moltype = AA  length = 466
FEATURE                 Location/Qualifiers
REGION                  1..466
                        note = 1-28 Antibody HC
source                  1..466
                        mol_type = protein
                        organism = synthetic construct
SEQUENCE: 60
AVTLDESGGG LQTPGGALSL VCKASGFDFS DYGMGWVRQA PGKGLEWVAA IRSDGSNPSY    60
GSAVKGRATI SKDNGRSTVR LQLNNLRAED TATYYCAKDG NGYCALDAYR SGGYSCGVYP   120
GSIDAWGHGT EVIVSSASTK GPSVFPLAPS SKSTSGGTAA LGCLVKDYFP EPVTVSWNSG   180
ALTSGVHTFP AVLQSSGLYS LSSVVTVPSS SLGTQTYICN VNHKPSNTKV DKKVEPKSCD   240
KTHTCPPCPA PELLGGPSVF LFPPKPKDTL MISRTPEVTC VVVDVSHEDP EVKFNWYVDG   300
VEVHNAKTKP REEQYNSTYR VVSVLTVLHQ DWLNGKEYKC KVSNKALPAP IEKTISKAKG   360
QPREPQVYTL PPSREEMTKN QVSLTCLVKG FYPSDIAVEW ESNGQPENNY KTTPPVLDSD   420
GSFFLYSKLT VDKSRWQQGN VFSCSVMHEA LHNHYTQKSL SLSPGK                  466

SEQ ID NO: 61           moltype = AA  length = 211
FEATURE                 Location/Qualifiers
REGION                  1..211
                        note = 2-13 Antibody LC
source                  1..211
                        mol_type = protein
                        organism = synthetic construct
SEQUENCE: 61
ALTQPSSVSA NPGETVKITC SGGSYSYGWF QQKSPGSALV TVIYWDDERP SDIPSRFSGA    60
LSGSTNTLTI TGVQADDEAV YFCGTEDISG TAGVFGAGTT LTVLRSVAAP SVFIFPPSDE   120
QLKSGTASVV CLLNNFYPRE AKVQWKVDNA LQSGNSQESV TEQDSKDSTY SLSSTLTLSK   180
ADYEKHKVYA CEVTHQGLSS PVTKSFNRGE C                                 211

SEQ ID NO: 62           moltype = AA  length = 215
FEATURE                 Location/Qualifiers
REGION                  1..215
                        note = 3-2 Antibody LC
source                  1..215
                        mol_type = protein
                        organism = synthetic construct
SEQUENCE: 62
ALTQPSSVSA NPGETVKITC SGGGSYAGSY YYGWYQQKAP GSAPVTLIYE SNKRPSDIPS    60
RFSGSTSGST ATLTITGVQA DDEAIYYCGS WDSSNGGIFG AGTTLTVLRS VAAPSVFIFP   120
PSDEQLKSGT ASVVCLLNNF YPREAKVQWK VDNALQSGNS QESVTEQDSK DSTYSLSSTL   180
TLSKADYEKH KVYACEVTHQ GLSSPVTKSF NRGEC                             215

SEQ ID NO: 63           moltype = AA  length = 217
FEATURE                 Location/Qualifiers
REGION                  1..217
                        note = 1-65 Antibody LC
source                  1..217
                        mol_type = protein
                        organism = synthetic construct
SEQUENCE: 63
ALTQPSSVSA NPGETVKITC SGGGSSGYGY GWYQQKSPSS APLTVIYWND KRPSDIPSRF    60
SGSKSGSTHT LTITGVQAED EAVYFCGNDD YSSDSGYVGV FGAGTTLTVL RSVAAPSVFI   120
```

```
FPPSDEQLKS GTASVVCLLN NFYPREAKVQ WKVDNALQSG NSQESVTEQD SKDSTYSLSS    180
TLTLSKADYE KHKVYACEVT HQGLSSPVTK SFNRGEC                            217

SEQ ID NO: 64         moltype = AA  length = 211
FEATURE               Location/Qualifiers
REGION                1..211
                      note = 1-28 Antibody LC
source                1..211
                      mol_type = protein
                      organism = synthetic construct
SEQUENCE: 64
ALTQPSSVSA NLEGTVEITC SGSGYGYGWY QQKSPGSAPV TVIYQNDKRP SDIPSRFSGS    60
KSGSTGTLTI TGVQVEDEAV YYCGSEDSST LAGIFGAGTT LTVLRSVAAP SVFIFPPSDE    120
QLKSGTASVV CLLNNFYPRE AKVQWKVDNA LQSGNSQESV TEQDSKDSTY SLSSTLTLSK    180
ADYEKHKVYA CEVTHQGLSS PVTKSFNRGE C                                  211

SEQ ID NO: 65         moltype = AA  length = 5
FEATURE               Location/Qualifiers
REGION                1..5
                      note = EP1 Epitope
source                1..5
                      mol_type = protein
                      organism = synthetic construct
SEQUENCE: 65
IVTLD                                                               5

SEQ ID NO: 66         moltype = AA  length = 5
FEATURE               Location/Qualifiers
REGION                1..5
                      note = EP2 Epitope
source                1..5
                      mol_type = protein
                      organism = synthetic construct
SEQUENCE: 66
DSSQP                                                               5

SEQ ID NO: 67         moltype = AA  length = 5
FEATURE               Location/Qualifiers
REGION                1..5
                      note = EP3 Epitope
source                1..5
                      mol_type = protein
                      organism = synthetic construct
SEQUENCE: 67
RTIAR                                                               5

SEQ ID NO: 68         moltype = AA  length = 7
FEATURE               Location/Qualifiers
REGION                1..7
                      note = EP4 Epitope
source                1..7
                      mol_type = protein
                      organism = synthetic construct
SEQUENCE: 68
ARCACRK                                                             7

SEQ ID NO: 69         moltype = AA  length = 4
FEATURE               Location/Qualifiers
REGION                1..4
                      note = EP5 Epitope
source                1..4
                      mol_type = protein
                      organism = synthetic construct
SEQUENCE: 69
ARPA                                                                4

SEQ ID NO: 70         moltype = AA  length = 9
FEATURE               Location/Qualifiers
REGION                1..9
                      note = EP6 Epitope
source                1..9
                      mol_type = protein
                      organism = synthetic construct
SEQUENCE: 70
KTKQWCDML                                                           9

SEQ ID NO: 71         moltype = AA  length = 8
FEATURE               Location/Qualifiers
REGION                1..8
```

```
                        note = EP7 Epitope
source                  1..8
                        mol_type = protein
                        organism = synthetic construct
SEQUENCE: 71
GCDLLINR                                                                    8

SEQ ID NO: 72           moltype = AA  length = 8
FEATURE                 Location/Qualifiers
REGION                  1..8
                        note = EP8 Epitope
source                  1..8
                        mol_type = protein
                        organism = synthetic construct
SEQUENCE: 72
TCTQPGGR                                                                    8

SEQ ID NO: 73           moltype = AA  length = 20
FEATURE                 Location/Qualifiers
REGION                  1..20
                        note = F2-01-BSA (#1)
source                  1..20
                        mol_type = protein
                        organism = synthetic construct
SEQUENCE: 73
TADRDSSQPR RTIARQTARC                                                      20

SEQ ID NO: 74           moltype = AA  length = 20
FEATURE                 Location/Qualifiers
REGION                  1..20
                        note = F2-02-BSA (#2)
source                  1..20
                        mol_type = protein
                        organism = synthetic construct
SEQUENCE: 74
TLARDSSQPR RTIARQTARC                                                      20

SEQ ID NO: 75           moltype = AA  length = 20
FEATURE                 Location/Qualifiers
REGION                  1..20
                        note = F2-03-BSA (#3)
source                  1..20
                        mol_type = protein
                        organism = synthetic construct
SEQUENCE: 75
TLDRASSQPR RTIARQTARC                                                      20

SEQ ID NO: 76           moltype = AA  length = 20
FEATURE                 Location/Qualifiers
REGION                  1..20
                        note = F2-04-BSA (#4)
source                  1..20
                        mol_type = protein
                        organism = synthetic construct
SEQUENCE: 76
TLDRDASQPR RTIARQTARC                                                      20

SEQ ID NO: 77           moltype = AA  length = 20
FEATURE                 Location/Qualifiers
REGION                  1..20
                        note = F2-05-BSA (#5)
source                  1..20
                        mol_type = protein
                        organism = synthetic construct
SEQUENCE: 77
TLDRDSAQPR RTIARQTARC                                                      20

SEQ ID NO: 78           moltype = AA  length = 20
FEATURE                 Location/Qualifiers
REGION                  1..20
                        note = F2-06-BSA (#6)
source                  1..20
                        mol_type = protein
                        organism = synthetic construct
SEQUENCE: 78
TLDRDSSAPR RTIARQTARC                                                      20

SEQ ID NO: 79           moltype = AA  length = 20
FEATURE                 Location/Qualifiers
```

```
REGION                      1..20
                            note = F2-07-BSA (#7)
source                      1..20
                            mol_type = protein
                            organism = synthetic construct
SEQUENCE: 79
TLDRDSSQAR RTIARQTARC                                             20

SEQ ID NO: 80               moltype = AA   length = 20
FEATURE                     Location/Qualifiers
REGION                      1..20
                            note = F2-08-BSA (#8)
source                      1..20
                            mol_type = protein
                            organism = synthetic construct
SEQUENCE: 80
TLDRDSSQPR ATIARQTARC                                             20

SEQ ID NO: 81               moltype = AA   length = 20
FEATURE                     Location/Qualifiers
REGION                      1..20
                            note = F2-09-BSA (#9)
source                      1..20
                            mol_type = protein
                            organism = synthetic construct
SEQUENCE: 81
TLDRDSSQPR RAIARQTARC                                             20

SEQ ID NO: 82               moltype = AA   length = 20
FEATURE                     Location/Qualifiers
REGION                      1..20
                            note = F2-10-BSA (#10)
source                      1..20
                            mol_type = protein
                            organism = synthetic construct
SEQUENCE: 82
TLDRDSSQPR RTAARQTARC                                             20

SEQ ID NO: 83               moltype = AA   length = 20
FEATURE                     Location/Qualifiers
REGION                      1..20
                            note = F2-11-BSA (#11)
source                      1..20
                            mol_type = protein
                            organism = synthetic construct
SEQUENCE: 83
TLDRDSSQPR RTIRRQTARC                                             20

SEQ ID NO: 84               moltype = AA   length = 20
FEATURE                     Location/Qualifiers
REGION                      1..20
                            note = F2-12-BSA (#12)
source                      1..20
                            mol_type = protein
                            organism = synthetic construct
SEQUENCE: 84
TLDRDSSQPR RTIAAQTARC                                             20

SEQ ID NO: 85               moltype = AA   length = 20
FEATURE                     Location/Qualifiers
REGION                      1..20
                            note = F2-12-BSA (#13)
source                      1..20
                            mol_type = protein
                            organism = synthetic construct
SEQUENCE: 85
TLDRDSSQPR RTIARQTVRC                                             20

SEQ ID NO: 86               moltype = AA   length = 100
FEATURE                     Location/Qualifiers
REGION                      1..100
                            note = Wild-type FAM19A5 Isoform 2 (without signal peptide)
source                      1..100
                            mol_type = protein
                            organism = synthetic construct
SEQUENCE: 86
QFLKEGQLAA GTCEIVTLDR DSSQPRRTIA RQTARCACRK GQIAGTTRAR PACVDARIIK  60
TKQWCDMLPC LEGEGCDLLI NRSGWTCTQP GGRIKTTTVS                       100
```

| | |
|---|---|
| SEQ ID NO: 87 | moltype = AA length = 100 |
| FEATURE | Location/Qualifiers |
| REGION | 1..100 |
| | note = M1 mutant |
| source | 1..100 |
| | mol_type = protein |
| | organism = synthetic construct |

SEQUENCE: 87
QFLKEGQLAA GTCEVIAAHR DSSQPRRTIA RQTARCACRK GQIAGTTRAR PACVDARIIK    60
TKQWCDMLPC LEGEGCDLLI NRSGWTCTQP GGRIKTTTVS                        100

| | |
|---|---|
| SEQ ID NO: 88 | moltype = AA length = 100 |
| FEATURE | Location/Qualifiers |
| REGION | 1..100 |
| | note = M2 mutant |
| source | 1..100 |
| | mol_type = protein |
| | organism = synthetic construct |

SEQUENCE: 88
QFLKEGQLAA GTCEIVTLDR CCNKNRRTIA RQTARCACRK GQIAGTTRAR PACVDARIIK    60
TKQWCDMLPC LEGEGCDLLI NRSGWTCTQP GGRIKTTTVS                        100

| | |
|---|---|
| SEQ ID NO: 89 | moltype = AA length = 5 |
| FEATURE | Location/Qualifiers |
| REGION | 1..5 |
| | note = P2-C12 antibodyVH CDR1 |
| source | 1..5 |
| | mol_type = protein |
| | organism = synthetic construct |

SEQUENCE: 89
TYAVT                                                                5

| | |
|---|---|
| SEQ ID NO: 90 | moltype = AA length = 16 |
| FEATURE | Location/Qualifiers |
| REGION | 1..16 |
| | note = P2-C12antibodyVH CDR2 |
| source | 1..16 |
| | mol_type = protein |
| | organism = synthetic construct |

SEQUENCE: 90
YINWRGGTSY ANWAKG                                                   16

| | |
|---|---|
| SEQ ID NO: 91 | moltype = AA length = 15 |
| FEATURE | Location/Qualifiers |
| REGION | 1..15 |
| | note = P2-C12antibodyVH CDR3 |
| source | 1..15 |
| | mol_type = protein |
| | organism = synthetic construct |

SEQUENCE: 91
DASSGAAFGS YGMDP                                                    15

| | |
|---|---|
| SEQ ID NO: 92 | moltype = AA length = 11 |
| FEATURE | Location/Qualifiers |
| REGION | 1..11 |
| | note = P2-C12 antibodyVL CDR1 |
| source | 1..11 |
| | mol_type = protein |
| | organism = synthetic construct |

SEQUENCE: 92
QASQSISSYL S                                                        11

| | |
|---|---|
| SEQ ID NO: 93 | moltype = AA length = 7 |
| FEATURE | Location/Qualifiers |
| REGION | 1..7 |
| | note = P2-C12antibodyVL CDR2 |
| source | 1..7 |
| | mol_type = protein |
| | organism = synthetic construct |

SEQUENCE: 93
EASKLAS                                                              7

| | |
|---|---|
| SEQ ID NO: 94 | moltype = AA length = 12 |
| FEATURE | Location/Qualifiers |
| REGION | 1..12 |
| | note = P2-C12antibodyVL CDR3 |
| source | 1..12 |
| | mol_type = protein |
| | organism = synthetic construct |

```
SEQUENCE: 94
QQGYSSTNVW NA                                                                    12

SEQ ID NO: 95           moltype = AA  length = 6
FEATURE                 Location/Qualifiers
REGION                  1..6
                        note = 13B4antibodyVH CDR1
source                  1..6
                        mol_type = protein
                        organism = synthetic construct
SEQUENCE: 95
SSNWWS                                                                            6

SEQ ID NO: 96           moltype = AA  length = 16
FEATURE                 Location/Qualifiers
REGION                  1..16
                        note = 13B4antibodyVH CDR2
source                  1..16
                        mol_type = protein
                        organism = synthetic construct
SEQUENCE: 96
EIYHGGTTNY NPSLKG                                                                16

SEQ ID NO: 97           moltype = AA  length = 9
FEATURE                 Location/Qualifiers
REGION                  1..9
                        note = 13B4antibodyVH CDR3
source                  1..9
                        mol_type = protein
                        organism = synthetic construct
SEQUENCE: 97
WQLVGGLDV                                                                         9

SEQ ID NO: 98           moltype = AA  length = 11
FEATURE                 Location/Qualifiers
REGION                  1..11
                        note = 13B4antibodyVL CDR1
source                  1..11
                        mol_type = protein
                        organism = synthetic construct
SEQUENCE: 98
SGDKLGNVYA S                                                                     11

SEQ ID NO: 99           moltype = AA  length = 7
FEATURE                 Location/Qualifiers
REGION                  1..7
                        note = 13B4antibodyVL CDR2
source                  1..7
                        mol_type = protein
                        organism = synthetic construct
SEQUENCE: 99
QDNKRPS                                                                           7

SEQ ID NO: 100          moltype = AA  length = 9
FEATURE                 Location/Qualifiers
REGION                  1..9
                        note = 13B4antibodyVL CDR3
source                  1..9
                        mol_type = protein
                        organism = synthetic construct
SEQUENCE: 100
QAWDSSTAV                                                                         9

SEQ ID NO: 101          moltype = AA  length = 5
FEATURE                 Location/Qualifiers
REGION                  1..5
                        note = 13F7antibodyVH CDR1
source                  1..5
                        mol_type = protein
                        organism = synthetic construct
SEQUENCE: 101
GYSWT                                                                             5

SEQ ID NO: 102          moltype = AA  length = 16
FEATURE                 Location/Qualifiers
REGION                  1..16
                        note = 13F7antibodyVH CDR2
source                  1..16
                        mol_type = protein
```

```
                                  -continued
                    organism = synthetic construct
SEQUENCE: 102
EISHFGSANY NPSLKS                                                    16

SEQ ID NO: 103          moltype = AA   length = 15
FEATURE                 Location/Qualifiers
REGION                  1..15
                        note = 13F7antibodyVH CDR3
source                  1..15
                        mol_type = protein
                        organism = synthetic construct
SEQUENCE: 103
ALRGTYSRFY YGMDV                                                     15

SEQ ID NO: 104          moltype = AA   length = 16
FEATURE                 Location/Qualifiers
REGION                  1..16
                        note = 13F7antibodyVL CDR1
source                  1..16
                        mol_type = protein
                        organism = synthetic construct
SEQUENCE: 104
RSSQSLLHSN GYNYLD                                                    16

SEQ ID NO: 105          moltype = AA   length = 7
FEATURE                 Location/Qualifiers
REGION                  1..7
                        note = 13F7antibodyVL CDR2
source                  1..7
                        mol_type = protein
                        organism = synthetic construct
SEQUENCE: 105
LGSNRAS                                                               7

SEQ ID NO: 106          moltype = AA   length = 9
FEATURE                 Location/Qualifiers
REGION                  1..9
                        note = 13F7antibodyVL CDR3
source                  1..9
                        mol_type = protein
                        organism = synthetic construct
SEQUENCE: 106
MQARQTPLT                                                             9

SEQ ID NO: 107          moltype = AA   length = 5
FEATURE                 Location/Qualifiers
REGION                  1..5
                        note = 15A9antibodyVH CDR1
source                  1..5
                        mol_type = protein
                        organism = synthetic construct
SEQUENCE: 107
SYYWS                                                                 5

SEQ ID NO: 108          moltype = AA   length = 16
FEATURE                 Location/Qualifiers
REGION                  1..16
                        note = 15A9antibodyVH CDR2
source                  1..16
                        mol_type = protein
                        organism = synthetic construct
SEQUENCE: 108
YIYPSGSTNY NPSLKS                                                    16

SEQ ID NO: 109          moltype = AA   length = 12
FEATURE                 Location/Qualifiers
REGION                  1..12
                        note = 15A9antibodyVH CDR3
source                  1..12
                        mol_type = protein
                        organism = synthetic construct
SEQUENCE: 109
VNPFGYYYAM DV                                                        12

SEQ ID NO: 110          moltype = AA   length = 11
FEATURE                 Location/Qualifiers
REGION                  1..11
                        note = 15A9antibodyVL CDR1
source                  1..11
```

```
                                        mol_type = protein
                                        organism = synthetic construct
SEQUENCE: 110
RASQSISTSL N                                                                    11

SEQ ID NO: 111          moltype = AA   length = 7
FEATURE                 Location/Qualifiers
REGION                  1..7
                        note = 15A9antibodyVL CDR2
source                  1..7
                        mol_type = protein
                        organism = synthetic construct
SEQUENCE: 111
GASTLQS                                                                          7

SEQ ID NO: 112          moltype = AA   length = 9
FEATURE                 Location/Qualifiers
REGION                  1..9
                        note = 15A9antibodyVL CDR3
source                  1..9
                        mol_type = protein
                        organism = synthetic construct
SEQUENCE: 112
QESASIPRT                                                                        9

SEQ ID NO: 113          moltype = AA   length = 5
FEATURE                 Location/Qualifiers
REGION                  1..5
                        note = P1-A03antibodyVH CDR1
source                  1..5
                        mol_type = protein
                        organism = synthetic construct
SEQUENCE: 113
SDYMS                                                                            5

SEQ ID NO: 114          moltype = AA   length = 16
FEATURE                 Location/Qualifiers
REGION                  1..16
                        note = P1-A03antibodyVH CDR2
source                  1..16
                        mol_type = protein
                        organism = synthetic construct
SEQUENCE: 114
IIYPSTTTYY ASWAKG                                                               16

SEQ ID NO: 115          moltype = AA   length = 10
FEATURE                 Location/Qualifiers
REGION                  1..10
                        note = P1-A03antibodyVH CDR3
source                  1..10
                        mol_type = protein
                        organism = synthetic construct
SEQUENCE: 115
GSNWSSGMNL                                                                      10

SEQ ID NO: 116          moltype = AA   length = 11
FEATURE                 Location/Qualifiers
REGION                  1..11
                        note = P1-A03antibodyVL CDR1
source                  1..11
                        mol_type = protein
                        organism = synthetic construct
SEQUENCE: 116
LASEDIYSGI S                                                                    11

SEQ ID NO: 117          moltype = AA   length = 7
FEATURE                 Location/Qualifiers
REGION                  1..7
                        note = P1-A03antibodyVL CDR2
source                  1..7
                        mol_type = protein
                        organism = synthetic construct
SEQUENCE: 117
GASNLES                                                                          7

SEQ ID NO: 118          moltype = AA   length = 12
FEATURE                 Location/Qualifiers
REGION                  1..12
                        note = P1-A03antibodyVL CDR3
```

```
source                  1..12
                        mol_type = protein
                        organism = synthetic construct
SEQUENCE: 118
LGGYSYSSTG LT                                                              12

SEQ ID NO: 119          moltype = AA  length = 5
FEATURE                 Location/Qualifiers
REGION                  1..5
                        note = P1-A08antibodyVH CDR1
source                  1..5
                        mol_type = protein
                        organism = synthetic construct
SEQUENCE: 119
TYYMS                                                                       5

SEQ ID NO: 120          moltype = AA  length = 16
FEATURE                 Location/Qualifiers
REGION                  1..16
                        note = P1-A08antibodyVH CDR2
source                  1..16
                        mol_type = protein
                        organism = synthetic construct
SEQUENCE: 120
IVYPSGTTYY ANWAKG                                                          16

SEQ ID NO: 121          moltype = AA  length = 8
FEATURE                 Location/Qualifiers
REGION                  1..8
                        note = P1-A08antibodyVH CDR3
source                  1..8
                        mol_type = protein
                        organism = synthetic construct
SEQUENCE: 121
GDSFGYGL                                                                    8

SEQ ID NO: 122          moltype = AA  length = 11
FEATURE                 Location/Qualifiers
REGION                  1..11
                        note = P1-A08antibodyVL CDR1
source                  1..11
                        mol_type = protein
                        organism = synthetic construct
SEQUENCE: 122
TADTLSRSYA S                                                               11

SEQ ID NO: 123          moltype = AA  length = 7
FEATURE                 Location/Qualifiers
REGION                  1..7
                        note = P1-A08antibodyVL CDR2
source                  1..7
                        mol_type = protein
                        organism = synthetic construct
SEQUENCE: 123
RDTSRPS                                                                     7

SEQ ID NO: 124          moltype = AA  length = 13
FEATURE                 Location/Qualifiers
REGION                  1..13
                        note = P1-A08antibodyVL CDR3
source                  1..13
                        mol_type = protein
                        organism = synthetic construct
SEQUENCE: 124
ATSDGSGSNY QYV                                                             13

SEQ ID NO: 125          moltype = AA  length = 5
FEATURE                 Location/Qualifiers
REGION                  1..5
                        note = P1-F02antibodyVH CDR1
source                  1..5
                        mol_type = protein
                        organism = synthetic construct
SEQUENCE: 125
NYYMG                                                                       5

SEQ ID NO: 126          moltype = AA  length = 16
FEATURE                 Location/Qualifiers
REGION                  1..16
```

```
                        note = P1-F02antibodyVH CDR2
source                  1..16
                        mol_type = protein
                        organism = synthetic construct
SEQUENCE: 126
IIYASGSTYY ASWAKG                                                16

SEQ ID NO: 127          moltype = AA  length = 17
FEATURE                 Location/Qualifiers
REGION                  1..17
                        note = P1-F02antibodyVH CDR3
source                  1..17
                        mol_type = protein
                        organism = synthetic construct
SEQUENCE: 127
IDIGVGDYGW AYDRLDL                                               17

SEQ ID NO: 128          moltype = AA  length = 11
FEATURE                 Location/Qualifiers
REGION                  1..11
                        note = P1-F02antibodyVL CDR1
source                  1..11
                        mol_type = protein
                        organism = synthetic construct
SEQUENCE: 128
LASEDIYSGI S                                                     11

SEQ ID NO: 129          moltype = AA  length = 7
FEATURE                 Location/Qualifiers
REGION                  1..7
                        note = P1-F02antibodyVL CDR2
source                  1..7
                        mol_type = protein
                        organism = synthetic construct
SEQUENCE: 129
GASNLES                                                          7

SEQ ID NO: 130          moltype = AA  length = 10
FEATURE                 Location/Qualifiers
REGION                  1..10
                        note = P1-F02antibodyVL CDR3
source                  1..10
                        mol_type = protein
                        organism = synthetic construct
SEQUENCE: 130
LGGYSYSSIT                                                       10

SEQ ID NO: 131          moltype = AA  length = 5
FEATURE                 Location/Qualifiers
REGION                  1..5
                        note = P2-A01antibodyVH CDR1
source                  1..5
                        mol_type = protein
                        organism = synthetic construct
SEQUENCE: 131
GYYMS                                                            5

SEQ ID NO: 132          moltype = AA  length = 16
FEATURE                 Location/Qualifiers
REGION                  1..16
                        note = P2-A01antibodyVH CDR2
source                  1..16
                        mol_type = protein
                        organism = synthetic construct
SEQUENCE: 132
IIYPSGSTDY ASWAKG                                                16

SEQ ID NO: 133          moltype = AA  length = 15
FEATURE                 Location/Qualifiers
REGION                  1..15
                        note = P2-A01antibodyVH CDR3
source                  1..15
                        mol_type = protein
                        organism = synthetic construct
SEQUENCE: 133
VAGYVGYGYE TFFDI                                                 15

SEQ ID NO: 134          moltype = AA  length = 11
FEATURE                 Location/Qualifiers
```

```
REGION                  1..11
                        note = P2-A01antibodyVL CDR1
source                  1..11
                        mol_type = protein
                        organism = synthetic construct
SEQUENCE: 134
LASEDIYSGI S                                                                    11

SEQ ID NO: 135          moltype = AA  length = 7
FEATURE                 Location/Qualifiers
REGION                  1..7
                        note = P2-A01antibodyVL CDR2
source                  1..7
                        mol_type = protein
                        organism = synthetic construct
SEQUENCE: 135
GASNLES                                                                          7

SEQ ID NO: 136          moltype = AA  length = 14
FEATURE                 Location/Qualifiers
REGION                  1..14
                        note = P2-A01antibodyVL CDR3
source                  1..14
                        mol_type = protein
                        organism = synthetic construct
SEQUENCE: 136
LGGVTYSSTG THLT                                                                 14

SEQ ID NO: 137          moltype = AA  length = 5
FEATURE                 Location/Qualifiers
REGION                  1..5
                        note = P2-A03antibodyVH CDR1
source                  1..5
                        mol_type = protein
                        organism = synthetic construct
SEQUENCE: 137
NYDMS                                                                            5

SEQ ID NO: 138          moltype = AA  length = 16
FEATURE                 Location/Qualifiers
REGION                  1..16
                        note = P2-A03antibodyVH CDR2
source                  1..16
                        mol_type = protein
                        organism = synthetic construct
SEQUENCE: 138
FMDTDGSAYY ATWAKG                                                               16

SEQ ID NO: 139          moltype = AA  length = 11
FEATURE                 Location/Qualifiers
REGION                  1..11
                        note = P2-A03antibodyVH CDR3
source                  1..11
                        mol_type = protein
                        organism = synthetic construct
SEQUENCE: 139
RGSSYYGGID I                                                                    11

SEQ ID NO: 140          moltype = AA  length = 11
FEATURE                 Location/Qualifiers
REGION                  1..11
                        note = P2-A03antibodyVL CDR1
source                  1..11
                        mol_type = protein
                        organism = synthetic construct
SEQUENCE: 140
QASQSIGGNL A                                                                    11

SEQ ID NO: 141          moltype = AA  length = 7
FEATURE                 Location/Qualifiers
REGION                  1..7
                        note = P2-A03antibodyVL CDR2
source                  1..7
                        mol_type = protein
                        organism = synthetic construct
SEQUENCE: 141
RASTLAS                                                                          7

SEQ ID NO: 142          moltype = AA  length = 14
```

```
FEATURE              Location/Qualifiers
REGION               1..14
                     note = P2-A03antibodyVL CDR3
source               1..14
                     mol_type = protein
                     organism = synthetic construct
SEQUENCE: 142
QSPAYDPAAY VGNA                                                          14

SEQ ID NO: 143       moltype = AA  length = 5
FEATURE              Location/Qualifiers
REGION               1..5
                     note = P2-F07antibodyVH CDR1
source               1..5
                     mol_type = protein
                     organism = synthetic construct
SEQUENCE: 143
SYYMN                                                                    5

SEQ ID NO: 144       moltype = AA  length = 16
FEATURE              Location/Qualifiers
REGION               1..16
                     note = P2-F07antibodyVH CDR2
source               1..16
                     mol_type = protein
                     organism = synthetic construct
SEQUENCE: 144
IIYPSGTTYY AGWAKG                                                        16

SEQ ID NO: 145       moltype = AA  length = 8
FEATURE              Location/Qualifiers
REGION               1..8
                     note = P2-F07antibodyVH CDR3
source               1..8
                     mol_type = protein
                     organism = synthetic construct
SEQUENCE: 145
TVSGYFDI                                                                 8

SEQ ID NO: 146       moltype = AA  length = 11
FEATURE              Location/Qualifiers
REGION               1..11
                     note = P2-F07antibodyVL CDR1
source               1..11
                     mol_type = protein
                     organism = synthetic construct
SEQUENCE: 146
LASEDIYSAL A                                                             11

SEQ ID NO: 147       moltype = AA  length = 7
FEATURE              Location/Qualifiers
REGION               1..7
                     note = P2-F07antibodyVL CDR2
source               1..7
                     mol_type = protein
                     organism = synthetic construct
SEQUENCE: 147
GTSNLES                                                                  7

SEQ ID NO: 148       moltype = AA  length = 9
FEATURE              Location/Qualifiers
REGION               1..9
                     note = P2-F07antibodyVL CDR3
source               1..9
                     mol_type = protein
                     organism = synthetic construct
SEQUENCE: 148
QGYSSYPLT                                                                9

SEQ ID NO: 149       moltype = AA  length = 5
FEATURE              Location/Qualifiers
REGION               1..5
                     note = P2-F11antibodyVH CDR1
source               1..5
                     mol_type = protein
                     organism = synthetic construct
SEQUENCE: 149
SYGVS                                                                    5
```

```
SEQ ID NO: 150            moltype = AA  length = 16
FEATURE                   Location/Qualifiers
REGION                    1..16
                          note = P2-F11antibodyVH CDR2
source                    1..16
                          mol_type = protein
                          organism = synthetic construct
SEQUENCE: 150
YIANNYNPHY ASWAKG                                                             16

SEQ ID NO: 151            moltype = AA  length = 7
FEATURE                   Location/Qualifiers
REGION                    1..7
                          note = P2-F11antibodyVH CDR3
source                    1..7
                          mol_type = protein
                          organism = synthetic construct
SEQUENCE: 151
DNYGMDP                                                                        7

SEQ ID NO: 152            moltype = AA  length = 13
FEATURE                   Location/Qualifiers
REGION                    1..13
                          note = P2-F11antibodyVL CDR1
source                    1..13
                          mol_type = protein
                          organism = synthetic construct
SEQUENCE: 152
QASQSVYNNK NLA                                                                13

SEQ ID NO: 153            moltype = AA  length = 7
FEATURE                   Location/Qualifiers
REGION                    1..7
                          note = P2-F11antibodyVL CDR2
source                    1..7
                          mol_type = protein
                          organism = synthetic construct
SEQUENCE: 153
AASTLAS                                                                        7

SEQ ID NO: 154            moltype = AA  length = 13
FEATURE                   Location/Qualifiers
REGION                    1..13
                          note = P2-F11antibodyVL CDR3
source                    1..13
                          mol_type = protein
                          organism = synthetic construct
SEQUENCE: 154
QGEFSCSSAD CNA                                                                13

SEQ ID NO: 155            moltype = AA  length = 121
FEATURE                   Location/Qualifiers
REGION                    1..121
                          note = P2-C12antibodyVH
source                    1..121
                          mol_type = protein
                          organism = synthetic construct
SEQUENCE: 155
QSLEESGGRL VTPGTPLTLT CTVSGFSLST YAVTWVRQAP GKGLEWIGYI NWRGGTSYAN             60
WAKGRFTISK TSSTTVDLKM TSPTTEDTAT YFCARDASSG AAFGSYGMDP WGPGTLVTVS            120
S                                                                            121

SEQ ID NO: 156            moltype = AA  length = 118
FEATURE                   Location/Qualifiers
REGION                    1..118
                          note = 13B4antibodyVH
source                    1..118
                          mol_type = protein
                          organism = synthetic construct
SEQUENCE: 156
QVQLQESGPG LVKPSGTLSL NCAVSGGSIS SSNWWSWVRQ PPGKGLEWIG EIYHGGTTNY             60
NPSLKGRVTM SVDKTKNQFS LRLSSVTAVD TAVYYCARWQ LVGGLDVWGQ GTTVTVSS              118

SEQ ID NO: 157            moltype = AA  length = 123
FEATURE                   Location/Qualifiers
REGION                    1..123
                          note = 13F7antibodyVH
source                    1..123
                          mol_type = protein
```

```
                        organism = synthetic construct
SEQUENCE: 157
QVQLQEWGAG LLKPSETLSL TCAINAESFN GYSWTWIRQT PGKGLEWIGE ISHFGSANYN    60
PSLKSRATIS ADKSKNQFSL KLTSVTAVDT AVYYCARALR GTYSRFYYGM DVWGQGTTVT   120
VSS                                                                 123

SEQ ID NO: 158          moltype = AA  length = 120
FEATURE                 Location/Qualifiers
REGION                  1..120
                        note = 15A9antibodyVH
source                  1..120
                        mol_type = protein
                        organism = synthetic construct
SEQUENCE: 158
QVQLQESGPG LVKPSETLSL TCTVSGGSIS SYYWSWIRQP PGKGLEWIGY IYPSGSTNYN    60
PSLKSRVTIS VDTSKNQFSL NLKSVTAVDT AVYYCARVNP FGYYYAMDVW GQGTTVTVSS   120

SEQ ID NO: 159          moltype = AA  length = 116
FEATURE                 Location/Qualifiers
REGION                  1..116
                        note = P1-A03antibodyVH
source                  1..116
                        mol_type = protein
                        organism = synthetic construct
SEQUENCE: 159
QSVEESGGRL VTPGTPLTLT CTVSGFSLSS DYMSWVRQAP GEGLEWIGII YPSTTTYYAS    60
WAKGRFTISK TSSTTVELKM TSLTTEDTAT YFCARGSNWS SGMNLWGPGT LVTVSS       116

SEQ ID NO: 160          moltype = AA  length = 113
FEATURE                 Location/Qualifiers
REGION                  1..113
                        note = P1-A08antibodyVH
source                  1..113
                        mol_type = protein
                        organism = synthetic construct
SEQUENCE: 160
QSLEESGGRL VTPGTPLTLT CTASGFSLST YYMSWVRQAP GKGLEWIGIV YPSGTTYYAN    60
WAKGRFTIST ASTTVDLMIT SPTTEDTATY FCARGDSFGY GLWGPGTLVT VSS          113

SEQ ID NO: 161          moltype = AA  length = 122
FEATURE                 Location/Qualifiers
REGION                  1..122
                        note = P1-F02antibodyVH
source                  1..122
                        mol_type = protein
                        organism = synthetic construct
SEQUENCE: 161
QSLEESGGRL VTPGTPLTLT CTASGFSLSN YYMGWVRQAP GEGLEWIGII YASGSTYYAS    60
WAKGRFTISK TSTTVDLKMT SLTTEDTATY FCARIDIGVG DYGWAYDRLD LWGQGTLVTV   120
SS                                                                  122

SEQ ID NO: 162          moltype = AA  length = 121
FEATURE                 Location/Qualifiers
REGION                  1..121
                        note = P2-A01antibodyVH
source                  1..121
                        mol_type = protein
                        organism = synthetic construct
SEQUENCE: 162
QEQLVESGGR LVTPGTPLTL SCTASGFFLS GYYMSWVRQA PGKGLEWIGI IYPSGSTDYA    60
SWAKGRFTIS KTSTTVDLKI TTPTTEDTAT YFCARVAGYV GYGYETFFDI WGPGTLVTVS   120
L                                                                   121

SEQ ID NO: 163          moltype = AA  length = 116
FEATURE                 Location/Qualifiers
REGION                  1..116
                        note = P2-A03antibodyVH
source                  1..116
                        mol_type = protein
                        organism = synthetic construct
SEQUENCE: 163
QSVEESGGRL VTPGTPLTLT CTVSGFSLNN YDMSWVRQAP GKGLEYIGFM DTDGSAYYAT    60
WAKGRFTISR TSTTVDLKMT SPTTEDTATY FCARRGSSYY GGIDIWGPGT PVTVSL       116

SEQ ID NO: 164          moltype = AA  length = 113
FEATURE                 Location/Qualifiers
REGION                  1..113
                        note = P2-F07antibodyVH
source                  1..113
```

```
                        mol_type = protein
                        organism = synthetic construct
SEQUENCE: 164
QSLEESGGRL VTPGTPLTLT CTASGFSLSS YYMNWVRQAP GKGLEWIGII YPSGTTYYAG    60
WAKGRFTISK TSTTVDLKIT SPTSEDTATY FCARTVSGYF DIWGPGTLVT VSL          113

SEQ ID NO: 165          moltype = AA   length = 114
FEATURE                 Location/Qualifiers
REGION                  1..114
                        note = P2-F11antibodyVH
source                  1..114
                        mol_type = protein
                        organism = synthetic construct
SEQUENCE: 165
QEQLVESGGR LVTPGTTLTL TCTVSGFSLS SYGVSWVRQA PGKGLEWIGY IANNYNPHYA    60
SWAKGRFTIS KTSSTTVDLK MTSLTTEDTA TYFCARDNYG MDPWGPGTLV TVSS         114

SEQ ID NO: 166          moltype = AA   length = 110
FEATURE                 Location/Qualifiers
REGION                  1..110
                        note = P2-C12antibodyVL
source                  1..110
                        mol_type = protein
                        organism = synthetic construct
SEQUENCE: 166
ELDMTQTPSS VSAAVGGTVT IKCQASQSIS SYLSWYQQKP GQPPKLLIYE ASKLASGVPS    60
RFSGSGYGTE FTLTISDLEC ADAATYYCQQ GYSSTNVWNA FGGGTNVEIK              110

SEQ ID NO: 167          moltype = AA   length = 106
FEATURE                 Location/Qualifiers
REGION                  1..106
                        note = 13B4antibodyVL
source                  1..106
                        mol_type = protein
                        organism = synthetic construct
SEQUENCE: 167
SYELTQPLSV SVSPGQTASI TCSGDKLGNV YASWYQQKPG QSPTLVIYQD NKRPSGIPER    60
FSGSNSGKTA TLTISGTQAL DEADYYCQAW DSSTAVFGGG TKLTVL                  106

SEQ ID NO: 168          moltype = AA   length = 112
FEATURE                 Location/Qualifiers
REGION                  1..112
                        note = 13F7antibodyVL
source                  1..112
                        mol_type = protein
                        organism = synthetic construct
SEQUENCE: 168
DIVMTQTPLS LPVAPGEPAS ISCRSSQSLL HSNGYNYLDW YVQKPGQPPQ LLIYLGSNRA    60
SGVPDRFSGS GSGTDFTLKI SRVEAEDVGV YYCMQARQTP LTFGGGTKVE IK           112

SEQ ID NO: 169          moltype = AA   length = 107
FEATURE                 Location/Qualifiers
REGION                  1..107
                        note = 15A9antibodyVL
source                  1..107
                        mol_type = protein
                        organism = synthetic construct
SEQUENCE: 169
DIQMTQSPSS LSASVGDRIT ISCRASQSIS TSLNWYQQTP GKAPRLLIYG ASTLQSGVPS    60
RFSGGGSGTD FSLTITSLQP EDFATYYCQE SASIPRTFGQ GTKLDIK                 107

SEQ ID NO: 170          moltype = AA   length = 110
FEATURE                 Location/Qualifiers
REGION                  1..110
                        note = P1-A03antibodyVL
source                  1..110
                        mol_type = protein
                        organism = synthetic construct
SEQUENCE: 170
ELVMTQTPPS LSASVGETVR IRCLASEDIY SGISWYQQKP EKPPTLLISG ASNLESGVPP    60
RFSGSGSGTD YTLTIGGVQA EDAATYYCLG GYSYSSTGLT FGAGTNVEIK              110

SEQ ID NO: 171          moltype = AA   length = 110
FEATURE                 Location/Qualifiers
REGION                  1..110
                        note = P1-A08antibodyVL
source                  1..110
                        mol_type = protein
                        organism = synthetic construct
```

```
SEQUENCE: 171
ELVLTQSPSV QVNLGQTVSL TCTADTLSRS YASWYQQKPG QAPVLLIYRD TSRPSGVPDR    60
FSGSSSGNTA TLTISGAQAG DEADYYCATS DGSGSNYQYV FGGGTQLTVT             110

SEQ ID NO: 172          moltype = AA   length = 108
FEATURE                 Location/Qualifiers
REGION                  1..108
                        note = P1-F02antibodyVL
source                  1..108
                        mol_type = protein
                        organism = synthetic construct
SEQUENCE: 172
ELDMTQTPPS LSASVGETVR IRCLASEDIY SGISWYQQKP GKPPTLLIYG ASNLESGVPP    60
RFSGSGSGTD YTLTIGGVQA EDAATYYCLG GYSYSSITFG AGTNVEIK               108

SEQ ID NO: 173          moltype = AA   length = 112
FEATURE                 Location/Qualifiers
REGION                  1..112
                        note = P2-A01antibodyVL
source                  1..112
                        mol_type = protein
                        organism = synthetic construct
SEQUENCE: 173
ELVMTQTPPS LSASVGETVR IRCLASEDIY SGISWYQQKP GKPPTLLIYG ASNLESGVPP    60
RFSGSGSGSD YTLTIGGVQA EDAATYYCLG GVTYSSTGTH LTFGAGTNVE IK          112

SEQ ID NO: 174          moltype = AA   length = 112
FEATURE                 Location/Qualifiers
REGION                  1..112
                        note = P2-A03antibodyVL
source                  1..112
                        mol_type = protein
                        organism = synthetic construct
SEQUENCE: 174
ELDLTQTPAS VSEPVGGTVT IKCQASQSIG GNLAWYQQKP GQPPKLLIYR ASTLASGVPS    60
RFKGSGSGTD FTLTISDLEC ADAATYYCQS PAYDPAAYVG NAFGGGTELE IL          112

SEQ ID NO: 175          moltype = AA   length = 107
FEATURE                 Location/Qualifiers
REGION                  1..107
                        note = P2-F07antibodyVL
source                  1..107
                        mol_type = protein
                        organism = synthetic construct
SEQUENCE: 175
ELDLTQTPPS LSASVGGTVT INCLASEDIY SALAWYQQKP GKPPTLLISG TSNLESGVPP    60
RFSGSGSGTD YTLTIGGVQA EDAATYFCQG YSSYPLTFGA GTNVEIK                107

SEQ ID NO: 176          moltype = AA   length = 113
FEATURE                 Location/Qualifiers
REGION                  1..113
                        note = P2-F11antibodyVL
source                  1..113
                        mol_type = protein
                        organism = synthetic construct
SEQUENCE: 176
ELDLTQTPSS VSAAVGGTVT INCQASQSVY NNKNLAWYQQ KPGQPPKLLI YAASTLASGV    60
SSRFKGSGSG TQFTLTISDV QCDDAATYYC QGEFSCSSAD CNAFGGGTEL EIL         113

SEQ ID NO: 177          moltype = DNA   length = 363
FEATURE                 Location/Qualifiers
misc_feature            1..363
                        note = P2-C12antibodyVH
source                  1..363
                        mol_type = other DNA
                        organism = synthetic construct
SEQUENCE: 177
cagtcgctgg aggagtccgg gggtcgcctg gtcacgcctg ggacacccct gacactcacc    60
tgcaccgtct ctggattctc cctcagtacc tatgcagtga cctgggtccg ccaggctcca   120
gggaaggggc tggaatggat cggatacatt aattggcgtg gtgggacatc ctacgcgaac   180
tgggcgaaag gccgattcac catctccaaa acctcgtcga ccacggtgga tctgaaaatg   240
accagtccga aaccgaggac acggccacc tatttctgtg ccagagatgc tagtagtggt   300
gctgcttttg ggtcttacgg catggacccc tgggccccag ggaccctcgt caccgtctct   360
tca                                                                363

SEQ ID NO: 178          moltype = DNA   length = 330
FEATURE                 Location/Qualifiers
misc_feature            1..330
                        note = P2-C12antibodyVL
```

```
source                    1..330
                          mol_type = other DNA
                          organism = synthetic construct
SEQUENCE: 178
gagctcgata tgacccagac tccatcctcc gtgtctgcag ctgtgggagg cacagtcacc    60
atcaagtgcc aggccagtca gagcattagt agctacttat cctggtatca gcagaaacca   120
gggcagcctc ccaagctcct gatctatgaa gcatccaaac tggcctctgg ggtcccatcg   180
cggttcagcg gcagtggata tgggacagag ttcactctca ccatcagcga cctggagtgt   240
gccgatgctg ccacttacta ctgtcaacag ggttatagta gtactaatgt ttggaatgct   300
ttcggcggag gcaccaatgt ggaaatcaaa                                     330

SEQ ID NO: 179            moltype = AA  length = 451
FEATURE                   Location/Qualifiers
REGION                    1..451
                          note = P2-C12HC
source                    1..451
                          mol_type = protein
                          organism = synthetic construct
SEQUENCE: 179
QSLEESGGRL VTPGTPLTLT CTVSGFSLST YAVTWVRQAP GKGLEWIGYI NWRGGTSYAN    60
WAKGRFTISK TSSTTVDLKM TSPTTEDTAT YFCARDASSG AAFGSYGMDP WGPGTLVTVS   120
SASTKGPSVF PLAPSSKSTS GGTAALGCLV KDYFPEPVTV SWNSGALTSG VHTFPAVLQS   180
SGLYSLSSVV TVPSSSLGTQ TYICNVNHKP SNTKVDKKVE PKSCDKTHTC PPCPAPELLG   240
GPSVFLFPPK PKDTLMISRT PEVTCVVVDV SHEDPEVKFN WYVDGVEVHN AKTKPREEQY   300
NSTYRVVSVL TVLHQDWLNG KEYKCKVSNK ALPAPIEKTI SKAKGQPREP QVYTLPPSRE   360
EMTKNQVSLT CLVKGFYPSD IAVEWESNGQ PENNYKTTPP VLDSDGSFFL YSKLTVDKSR   420
WQQGNVFSCS VMHEALHNHY TQKSLSLSPG K                                   451

SEQ ID NO: 180            moltype = AA  length = 448
FEATURE                   Location/Qualifiers
REGION                    1..448
                          note = 13B4HC
source                    1..448
                          mol_type = protein
                          organism = synthetic construct
SEQUENCE: 180
QVQLQESGPG LVKPSGTLSL NCAVSGGSIS SSNWWSWVRQ PPGKGLEWIG EIYHGGTTNY    60
NPSLKGRVTM SVDKTKNQFS LRLSSVTAVD TAVYYCARWQ LVGGLDVWGQ GTTVTVSSAS   120
TKGPSVFPLA PSSKSTSGGT AALGCLVKDY FPEPVTVSWN SGALTSGVHT FPAVLQSSGL   180
YSLSSVVTVP SSSLGTQTYI CNVNHKPSNT KVDKKVEPKS CDKTHTCPPC PAPELLGGPS   240
VFLFPPKPKD TLMISRTPEV TCVVVDVSHE DPEVKFNWYV DGVEVHNAKT KPREEQYNST   300
YRVVSVLTVL HQDWLNGKEY KCKVSNKALP APIEKTISKA KGQPREPQVY TLPPSREEMT   360
KNQVSLTCLV KGFYPSDIAV EWESNGQPEN NYKTTPPVLD SDGSFFLYSK LTVDKSRWQQ   420
GNVFSCSVMH EALHNHYTQK SLSLSPGK                                       448

SEQ ID NO: 181            moltype = AA  length = 453
FEATURE                   Location/Qualifiers
REGION                    1..453
                          note = 13F7HC
source                    1..453
                          mol_type = protein
                          organism = synthetic construct
SEQUENCE: 181
QVQLQEWGAG LLKPSETLSL TCAINAESFN GYSWTWIRQT PGKGLEWIGE ISHFGSANYN    60
PSLKSRATIS ADKSKNQFSL KLTSVTAVDT AVYYCARALR GTYSRFYYGM DVWGQGTTVT   120
VSSASTKGPS VFPLAPSSKS TSGGTAALGC LVKDYFPEPV TVSWNSGALT SGVHTFPAVL   180
QSSGLYSLSS VVTVPSSSLG TQTYICNVNH KPSNTKVDKK VEPKSCDKTH TCPPCPAPEL   240
LGGPSVFLFP PKPKDTLMIS RTPEVTCVVV DVSHEDPEVK FNWYVDGVEV HNAKTKPREE   300
QYNSTYRVVS VLTVLHQDWL NGKEYKCKVS NKALPAPIEK TISKAKGQPR EPQVYTLPPS   360
REEMTKNQVS LTCLVKGFYP SDIAVEWESN GQPENNYKTT PPVLDSDGSF FLYSKLTVDK   420
SRWQQGNVFS CSVMHEALHN HYTQKSLSLS PGK                                 453

SEQ ID NO: 182            moltype = AA  length = 450
FEATURE                   Location/Qualifiers
REGION                    1..450
                          note = 15A9HC
source                    1..450
                          mol_type = protein
                          organism = synthetic construct
SEQUENCE: 182
QVQLQESGPG LVKPSETLSL TCTVSGGSIS SYYWSWIRQP PGKGLEWIGY IYPSGSTNYN    60
PSLKSRVTIS VDTSKNQFSL NLKSVTAVDT AVYYCARVNP FGYYYAMDVW GQGTTVTVSS   120
ASTKGPSVFP LAPSSKSTSG GTAALGCLVK DYFPEPVTVS WNSGALTSGV HTFPAVLQSS   180
GLYSLSSVVT VPSSSLGTQT YICNVNHKPS NTKVDKKVEP KSCDKTHTCP PCPAPELLGG   240
PSVFLFPPKP KDTLMISRTP EVTCVVVDVS HEDPEVKFNW YVDGVEVHNA KTKPREEQYN   300
STYRVVSVLT VLHQDWLNGK EYKCKVSNKA LPAPIEKTIS KAKGQPREPQ VYTLPPSREE   360
MTKNQVSLTC LVKGFYPSDI AVEWESNGQP ENNYKTTPPV LDSDGSFFLY SKLTVDKSRW   420
QQGNVFSCSV MHEALHNHYT QKSLSLSPGK                                     450
```

```
SEQ ID NO: 183            moltype = AA  length = 446
FEATURE                   Location/Qualifiers
REGION                    1..446
                          note = P1-A03HC
source                    1..446
                          mol_type = protein
                          organism = synthetic construct
SEQUENCE: 183
QSVEESGGRL VTPGTPLTLT CTVSGFSLSS DYMSWVRQAP GEGLEWIGII YPSTTTYYAS   60
WAKGRFTISK TSSTTVELKM TSLTTEDTAT YFCARGSNWS SGMNLWGPGT LVTVSSASTK  120
GPSVFPLAPS SKSTSGGTAA LGCLVKDYFP EPVTVSWNSG ALTSGVHTFP AVLQSSGLYS  180
LSSVVTVPSS SLGTQTYICN VNHKPSNTKV DKKVEPKSCD KTHTCPPCPA PELLGGPSVF  240
LFPPKPKDTL MISRTPEVTC VVVDVSHEDP EVKFNWYVDG VEVHNAKTKP REEQYNSTYR  300
VVSVLTVLHQ DWLNGKEYKC KVSNKALPAP IEKTISKAKG QPREPQVYTL PPSREEMTKN  360
QVSLTCLVKG FYPSDIAVEW ESNGQPENNY KTTPPVLDSD GSFFLYSKLT VDKSRWQQGN  420
VFSCSVMHEA LHNHYTQKSL SLSPGK                                      446

SEQ ID NO: 184            moltype = AA  length = 443
FEATURE                   Location/Qualifiers
REGION                    1..443
                          note = P1-A08HC
source                    1..443
                          mol_type = protein
                          organism = synthetic construct
SEQUENCE: 184
QSLEESGGRL VTPGTPLTLT CTASGFSLST YYMSWVRQAP GKGLEWIGIV YPSGTTYYAN   60
WAKGRFTIST ASTTVDLMIT SPTTEDTATY FCARGDSFGY GLWGPGTLVT VSSASTKGPS  120
VFPPLAPSSKS TSGGTAALGC LVKDYFPEPV TVSWNSGALT SGVHTFPAVL QSSGLYSLSS  180
VVTVPSSSLG TQTYICNVNH KPSNTKVDKK VEPKSCDKTH TCPPCPAPEL LGGPSVFLFP  240
PKPKDTLMIS RTPEVTCVVV DVSHEDPEVK FNWYVDGVEV HNAKTKPREE QYNSTYRVVS  300
VLTVLHQDWL NGKEYKCKVS NKALPAPIEK TISKAKGQPR EPQVYTLPPS REEMTKNQVS  360
LTCLVKGFYP SDIAVEWESN GQPENNYKTT PPVLDSDGSF FLYSKLTVDK SRWQQGNVFS  420
CSVMHEALHN HYTQKSLSLS PGK                                         443

SEQ ID NO: 185            moltype = AA  length = 452
FEATURE                   Location/Qualifiers
REGION                    1..452
                          note = P1-F02HC
source                    1..452
                          mol_type = protein
                          organism = synthetic construct
SEQUENCE: 185
QSLEESGGRL VTPGTPLTLT CTASGFSLSN YYMGWVRQAP GEGLEWIGII YASGSTYYAS   60
WAKGRFTISK TSTTVDLKMT SLTTEDTATY FCARIDIGVG DYGWAYDRLD LWGQGTLVTV  120
SSASTKGPSV FPLAPSSKST SGGTAALGCL VKDYFPEPVT VSWNSGALTS GVHTFPAVLQ  180
SSGLYSLSSV VTVPSSSLGT QTYICNVNHK PSNTKVDKKV EPKSCDKTHT CPPCPAPELL  240
GGPSVFLFPP KPKDTLMISR TPEVTCVVVD VSHEDPEVKF NWYVDGVEVH NAKTKPREEQ  300
YNSTYRVVSV LTVLHQDWLN GKEYKCKVSN KALPAPIEKT ISKAKGQPRE PQVYTLPPSR  360
EEMTKNQVSL TCLVKGFYPS DIAVEWESNG QPENNYKTTP PVLDSDGSFF LYSKLTVDKS  420
RWQQGNVFSC SVMHEALHNH YTQKSLSLSP GK                               452

SEQ ID NO: 186            moltype = AA  length = 451
FEATURE                   Location/Qualifiers
REGION                    1..451
                          note = P2-A01HC
source                    1..451
                          mol_type = protein
                          organism = synthetic construct
SEQUENCE: 186
QEQLVESGGR LVTPGTPLTL SCTASGFFLS GYYMSWVRQA PGKGLEWIGI IYPSGSTDYA   60
SWAKGRFTIS KTSTTVDLKI TTPTTEDTAT YFCARVAGYV GYGYETFFDI WGPGTLVTVS  120
LASTKGPSVF PLAPSSKSTS GGTAALGCLV KDYFPEPVTV SWNSGALTSG VHTFPAVLQS  180
SGLYSLSSVV TVPSSSLGTQ TYICNVNHKP SNTKVDKKVE PKSCDKTHTC PPCPAPELLG  240
GPSVFLFPPK PKDTLMISRT PEVTCVVVDV SHEDPEVKFN WYVDGVEVHN AKTKPREEQY  300
NSTYRVVSVL TVLHQDWLNG KEYKCKVSNK ALPAPIEKTI SKAKGQPREP QVYTLPPSRE  360
EMTKNQVSLT CLVKGFYPSD IAVEWESNGQ PENNYKTTPP VLDSDGSFFL YSKLTVDKSR  420
WQQGNVFSCS VMHEALHNHY TQKSLSLSPG K                                451

SEQ ID NO: 187            moltype = AA  length = 446
FEATURE                   Location/Qualifiers
REGION                    1..446
                          note = P2-A03HC
source                    1..446
                          mol_type = protein
                          organism = synthetic construct
SEQUENCE: 187
QSVEESGGRL VTPGTPLTLT CTVSGFSLNN YDMSWVRQAP GKGLEYIGFM DTDGSAYYAT   60
WAKGRFTISR TSTTVDLKMT SPTTEDTATY FCARRGSSYY GGIDIWGPGT PVTVSLASTK  120
GPSVFPLAPS SKSTSGGTAA LGCLVKDYFP EPVTVSWNSG ALTSGVHTFP AVLQSSGLYS  180
```

```
LSSVVTVPSS SLGTQTYICN VNHKPSNTKV DKKVEPKSCD KTHTCPPCPA PELLGGPSVF    240
LFPPKPKDTL MISRTPEVTC VVVDVSHEDP EVKFNWYVDG VEVHNAKTKP REEQYNSTYR    300
VVSVLTVLHQ DWLNGKEYKC KVSNKALPAP IEKTISKAKG QPREPQVYTL PPSREEMTKN    360
QVSLTCLVKG FYPSDIAVEW ESNGQPENNY KTTPPVLDSD GSFFLYSKLT VDKSRWQQGN    420
VFSCSVMHEA LHNHYTQKSL SLSPGK                                        446

SEQ ID NO: 188            moltype = AA  length = 443
FEATURE                   Location/Qualifiers
REGION                    1..443
                          note = P2-F07HC
source                    1..443
                          mol_type = protein
                          organism = synthetic construct
SEQUENCE: 188
QSLEESGGRL VTPGTPLTLT CTASGFSLSS YYMNWVRQAP GKGLEWIGII YPSGTTYYAG     60
WAKGRFTISK TSTTVDLKIT SPTSEDTATY FCARTVSGYF DIWGPGTLVT VSLASTKGPS    120
VFPLAPSSKS TSGGTAALGC LVKDYFPEPV TVSWNSGALT SGVHTFPAVL QSSGLYSLSS    180
VVTVPSSLG  TQTYICNVNH KPSNTKVDKK VEPKSCDKTH TCPPCPAPEL LGGPSVFLFP    240
PKPKDTLMIS RTPEVTCVVV DVSHEDPEVK FNWYVDGVEV HNAKTKPREE QYNSTYRVVS    300
VLTVLHQDWL NGKEYKCKVS NKALPAPIEK TISKAKGQPR EPQVYTLPPS REEMTKNQVS    360
LTCLVKGFYP SDIAVEWESN GQPENNYKTT PPVLDSDGSF FLYSKLTVDK SRWQQGNVFS    420
CSVMHEALHN HYTQKSLSLS PGK                                           443

SEQ ID NO: 189            moltype = AA  length = 444
FEATURE                   Location/Qualifiers
REGION                    1..444
                          note = P2-F11HC
source                    1..444
                          mol_type = protein
                          organism = synthetic construct
SEQUENCE: 189
QEQLVESGGR LVTPGTTLTL TCTVSGFSLS SYGVSWVRQA PGKGLEWIGY IANNYNPHYA     60
SWAKGRFTIS KTSSTTVDLK MTSLTTEDTA TYFCARDNYG MDPWGPGTLV TVSSASTKGP    120
SVFPLAPSSK STSGGTAALG CLVKDYFPEP VTVSWNSGAL TSGVHTFPAV LQSSGLYSLS    180
SVVTVPSSSL GTQTYICNVN HKPSNTKVDK KVEPKSCDKT HTCPPCPAPE LLGGPSVFLF    240
PPKPKDTLMI SRTPEVTCVV VDVSHEDPEV KFNWYVDGVE VHNAKTKPRE EQYNSTYRVV    300
SVLTVLHQDW LNGKEYKCKV SNKALPAPIE KTISKAKGQP REPQVYTLPP SREEMTKNQV    360
SLTCLVKGFY PSDIAVEWES NGQPENNYKT TPPVLDSDGS FFLYSKLTVD KSRWQQGNVF    420
SCSVMHEALH NHYTQKSLSL SPGK                                          444

SEQ ID NO: 190            moltype = AA  length = 217
FEATURE                   Location/Qualifiers
REGION                    1..217
                          note = P2-C12LC
source                    1..217
                          mol_type = protein
                          organism = synthetic construct
SEQUENCE: 190
ELDMTQTPSS VSAAVGGTVT IKCQASQSIS SYLSWYQQKP GQPPKLLIYE ASKLASGVPS     60
RFSGSGYGTE FTLTISDLEC ADAATYYCQQ GYSSTNVWNA FGGGTNVEIK RSVAAPSVFI    120
FPPSDEQLKS GTASVVCLLN NFYPREAKVQ WKVDNALQSG NSQESVTEQD SKDSTYSLSS    180
TLTLSKADYE KHKVYACEVT HQGLSSPVTK SFNRGEC                            217

SEQ ID NO: 191            moltype = AA  length = 213
FEATURE                   Location/Qualifiers
REGION                    1..213
                          note = 13B4LC
source                    1..213
                          mol_type = protein
                          organism = synthetic construct
SEQUENCE: 191
SYELTQPLSV SVSPGQTASI TCSGDKLGNV YASWYQQKPG QSPTLVIYQD NKRPSGIPER     60
FSGSNSGKTA TLTISGTQAL DEADYYCQAW DSSTAVFGGG TKLTVLRSVA APSVFIFPPS    120
DEQLKSGTAS VVCLLNNFYP REAKVQWKVD NALQSGNSQE SVTEQDSKDS TYSLSSTLTL    180
SKADYEKHKV YACEVTHQGL SSPVTKSFNR GEC                                213

SEQ ID NO: 192            moltype = AA  length = 219
FEATURE                   Location/Qualifiers
REGION                    1..219
                          note = 13F7LC
source                    1..219
                          mol_type = protein
                          organism = synthetic construct
SEQUENCE: 192
DIVMTQTPLS LPVAPGEPAS ISCRSSQSLL HSNGYNYLDW YVQKPGQPPQ LLIYLGSNRA     60
SGVPDRFSGS GSGTDFTLKI SRVEAEDVGV YYCMQARQTP LTGGGTKVE  IKRSVAAPSV    120
FIFPPSDEQL KSGTASVVCL LNNFYPREAK VQWKVDNALQ SGNSQESVTE QDSKDSTYSL    180
SSTLTLSKAD YEKHKVYACE VTHQGLSSPV TKSFNRGEC                          219
```

```
SEQ ID NO: 193          moltype = AA  length = 214
FEATURE                 Location/Qualifiers
REGION                  1..214
                        note = 15A9LC
source                  1..214
                        mol_type = protein
                        organism = synthetic construct
SEQUENCE: 193
DIQMTQSPSS LSASVGDRIT ISCRASQSIS TSLNWYQQTP GKAPRLLIYG ASTLQSGVPS       60
RFSGGGSGTD FSLTITSLQP EDFATYYCQE SASIPRTFGQ GTKLDIKRSV AAPSVFIFPP      120
SDEQLKSGTA SVVCLLNNFY PREAKVQWKV DNALQSGNSQ ESVTEQDSKD STYSLSSTLT      180
LSKADYEKHK VYACEVTHQG LSSPVTKSFN RGEC                                  214

SEQ ID NO: 194          moltype = AA  length = 217
FEATURE                 Location/Qualifiers
REGION                  1..217
                        note = P1-A03LC
source                  1..217
                        mol_type = protein
                        organism = synthetic construct
SEQUENCE: 194
ELVMTQTPPS LSASVGETVR IRCLASEDIY SGISWYQQKP EKPPTLLISG ASNLESGVPP       60
RFSGSGSGTD YTLTIGGVQA EDAATYYCLG GYSYSSTGLT FGAGTNVEIK RSVAAPSVFI      120
FPPSDEQLKS GTASVVCLLN NFYPREAKVQ WKVDNALQSG NSQESVTEQD SKDSTYSLSS      180
TLTLSKADYE KHKVYACEVT HQGLSSPVTK SFNRGEC                               217

SEQ ID NO: 195          moltype = AA  length = 217
FEATURE                 Location/Qualifiers
REGION                  1..217
                        note = P1-A08LC
source                  1..217
                        mol_type = protein
                        organism = synthetic construct
SEQUENCE: 195
ELVLTQSPSV QVNLGQTVSL TCTADTLSRS YASWYQQKPG QAPVLLIYRD TSRPSGVPDR       60
FSGSSSGNTA TLTISGAQAG DEADYYCATS DGSGSNYQYV FGGGTQLTVT RSVAAPSVFI      120
FPPSDEQLKS GTASVVCLLN NFYPREAKVQ WKVDNALQSG NSQESVTEQD SKDSTYSLSS      180
TLTLSKADYE KHKVYACEVT HQGLSSPVTK SFNRGEC                               217

SEQ ID NO: 196          moltype = AA  length = 215
FEATURE                 Location/Qualifiers
REGION                  1..215
                        note = P1-F02LC
source                  1..215
                        mol_type = protein
                        organism = synthetic construct
SEQUENCE: 196
ELDMTQTPPS LSASVGETVR IRCLASEDIY SGISWYQQKP GKPPTLLIYG ASNLESGVPP       60
RFSGSGSGTD YTLTIGGVQA EDAATYYCLG GYSYSSITFG AGTNVEIKRS VAAPSVFIFP      120
PSDEQLKSGT ASVVCLLNNF YPREAKVQWK VDNALQSGNS QESVTEQDSK DSTYSLSSTL      180
TLSKADYEKH KVYACEVTHQ GLSSPVTKSF NRGEC                                 215

SEQ ID NO: 197          moltype = AA  length = 219
FEATURE                 Location/Qualifiers
REGION                  1..219
                        note = P2-A01LC
source                  1..219
                        mol_type = protein
                        organism = synthetic construct
SEQUENCE: 197
ELVMTQTPPS LSASVGETVR IRCLASEDIY SGISWYQQKP GKPPTLLIYG ASNLESGVPP       60
RFSGSGSGSD YTLTIGGVQA EDAATYYCLG GVTYSSTGTH LTFGAGTNVE IKRSVAAPSV      120
FIFPPSDEQL KSGTASVVCL LNNFYPREAK VQWKVDNALQ SGNSQESVTE QDSKDSTYSL      180
SSTLTLSKAD YEKHKVYACE VTHQGLSSPV TKSFNRGEC                             219

SEQ ID NO: 198          moltype = AA  length = 219
FEATURE                 Location/Qualifiers
REGION                  1..219
                        note = P2-A03LC
source                  1..219
                        mol_type = protein
                        organism = synthetic construct
SEQUENCE: 198
ELDLTQTPAS VSEPVGGTVT IKCQASQSIG GNLAWYQQKP GQPPKLLIYR ASTLASGVPS       60
RFKGSGSGTD FTLTISDLEC ADAATYYCQS PAYDPAAYVG NAFGGGTELE ILRSVAAPSV      120
FIFPPSDEQL KSGTASVVCL LNNFYPREAK VQWKVDNALQ SGNSQESVTE QDSKDSTYSL      180
SSTLTLSKAD YEKHKVYACE VTHQGLSSPV TKSFNRGEC                             219

SEQ ID NO: 199          moltype = AA  length = 214
```

```
FEATURE                     Location/Qualifiers
REGION                      1..214
                            note = P2-F07LC
source                      1..214
                            mol_type = protein
                            organism = synthetic construct
SEQUENCE: 199
ELDLTQTPPS LSASVGGTVT INCLASEDIY SALAWYQQKP GKPPTLLISG TSNLESGVPP    60
RFSGSGSGTD YTLTIGGVQA EDAATYFCQG YSSYPLTFGA GTNVEIKRSV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                               214

SEQ ID NO: 200              moltype = AA   length = 220
FEATURE                     Location/Qualifiers
REGION                      1..220
                            note = P2-F11LC
source                      1..220
                            mol_type = protein
                            organism = synthetic construct
SEQUENCE: 200
ELDLTQTPSS VSAAVGGTVT INCQASQSVY NNKNLAWYQQ KPGQPPKLLI YAASTLASGV    60
SSRFKGSGSG TQFTLTISDV QCDDAATYYC QGEFSCSSAD CNAFGGGTEL EILRSVAAPS   120
VFIFPPSDEQ LKSGTASVVC LLNNFYPREA KVQWKVDNAL QSGNSQESVT EQDSKDSTYS   180
LSSTLTLSKA DYEKHKVYAC EVTHQGLSSP VTKSFNRGEC                         220

SEQ ID NO: 201              moltype = AA   length = 132
FEATURE                     Location/Qualifiers
REGION                      1..132
                            note = Mouse/Rat FAM19A5 Protein
source                      1..132
                            mol_type = protein
                            organism = synthetic construct
SEQUENCE: 201
MAPSPRTSSR QDATALPSMS STFWAFMILA SLLIAYCSQL AAGTCEIVTL DRDSSQPRRT    60
IARQTARCAC RKGQIAGTTR ARPACVDARI IKTKQWCDML PCLEGEGCDL LINRSGWTCT   120
QPGGRIKTTT VS                                                       132

SEQ ID NO: 202              moltype = AA   length = 111
FEATURE                     Location/Qualifiers
REGION                      1..111
                            note = Chicken FAM19A5 Protein
source                      1..111
                            mol_type = protein
                            organism = synthetic construct
SEQUENCE: 202
MSSQFCYIHQ LAAIYCGQLA AGTCEIVTLD RDSSQPRRTI ARQTARCACK KGQIAGTTRA    60
RPACVDGKFM PIQEWCQLVA CLEGEGCDLL INKSGWTCTQ PGGRIKTTTV N            111

SEQ ID NO: 203              moltype = AA   length = 100
FEATURE                     Location/Qualifiers
REGION                      1..100
                            note = FAM19A5 Protein Mutant
source                      1..100
                            mol_type = protein
                            organism = synthetic construct
SEQUENCE: 203
QFLKEGQLAA GTSEIVTLDR DSSQPRRTIA RQTARSASRK GQIAGTTRAR PASVDARIIK    60
TKQWSDMLPS LEGEGSDLLI NRSGWTSTQP GGRIKTTTVS                         100

SEQ ID NO: 204              moltype = AA   length = 25
FEATURE                     Location/Qualifiers
REGION                      1..25
                            note = F1 Fragment
source                      1..25
                            mol_type = protein
                            organism = synthetic construct
SEQUENCE: 204
QFLKEGQLAA GTSEIVTLDR GGGSC                                         25

SEQ ID NO: 205              moltype = AA   length = 25
FEATURE                     Location/Qualifiers
REGION                      1..25
                            note = F2 Fragment
source                      1..25
                            mol_type = protein
                            organism = synthetic construct
SEQUENCE: 205
TLDRDSSQPR RTIARQTARS GGGSC                                         25
```

| | | |
|---|---|---|
| SEQ ID NO: 206 | moltype = AA length = 25 | |
| FEATURE | Location/Qualifiers | |
| REGION | 1..25 | |
| | note = F3 Fragment | |
| source | 1..25 | |
| | mol_type = protein | |
| | organism = synthetic construct | |
| SEQUENCE: 206 | | |
| TARSASRKGQ IAGTTRARPA GGGSC | | 25 |

| | | |
|---|---|---|
| SEQ ID NO: 207 | moltype = AA length = 25 | |
| FEATURE | Location/Qualifiers | |
| REGION | 1..25 | |
| | note = F4 Fragment | |
| source | 1..25 | |
| | mol_type = protein | |
| | organism = synthetic construct | |
| SEQUENCE: 207 | | |
| ARPASVDARI IKTKQWSDML GGGSC | | 25 |

| | | |
|---|---|---|
| SEQ ID NO: 208 | moltype = AA length = 25 | |
| FEATURE | Location/Qualifiers | |
| REGION | 1..25 | |
| | note = F5 Fragment | |
| source | 1..25 | |
| | mol_type = protein | |
| | organism = synthetic construct | |
| SEQUENCE: 208 | | |
| SDMLPSLEGE GSDLLINRSG GGGSC | | 25 |

| | | |
|---|---|---|
| SEQ ID NO: 209 | moltype = AA length = 25 | |
| FEATURE | Location/Qualifiers | |
| REGION | 1..25 | |
| | note = F6 Fragment | |
| source | 1..25 | |
| | mol_type = protein | |
| | organism = synthetic construct | |
| SEQUENCE: 209 | | |
| NRSGWTSTQP GGRIKTTTVS GGGSC | | 25 |

| | | |
|---|---|---|
| SEQ ID NO: 210 | moltype = AA length = 133 | |
| FEATURE | Location/Qualifiers | |
| REGION | 1..133 | |
| | note = human FAM19A1 | |
| source | 1..133 | |
| | mol_type = protein | |
| | organism = synthetic construct | |
| SEQUENCE: 210 | | |
| MAMVSAMSWV LYLWISACAM LLCHGSLQHT FQQHHLHRPE GGTCEVIAAH RCCNKNRIEE | | 60 |
| RSQTVKCSCL PGKVAGTTRN RPSCVDASIV IGKWWCEMEP CLEGEECKTL PDNSGWMCAT | | 120 |
| GNKIKTTRIH PRT | | 133 |

| | | |
|---|---|---|
| SEQ ID NO: 211 | moltype = AA length = 131 | |
| FEATURE | Location/Qualifiers | |
| REGION | 1..131 | |
| | note = human FAM19A2 | |
| source | 1..131 | |
| | mol_type = protein | |
| | organism = synthetic construct | |
| SEQUENCE: 211 | | |
| MSKRYLQKAT KGKLLIIIFI VTLWGKVVSS ANHHKAHHVK TGTCEVVALH RCCNKNKIEE | | 60 |
| RSQTVKCSCF PGQVAGTTRA APSCVDASIV EQKWWCHMQP CLEGEECKVL PDRKGWSCSS | | 120 |
| GNKVKTTRVT H | | 131 |

| | | |
|---|---|---|
| SEQ ID NO: 212 | moltype = AA length = 133 | |
| FEATURE | Location/Qualifiers | |
| REGION | 1..133 | |
| | note = human FAM19A3 | |
| source | 1..133 | |
| | mol_type = protein | |
| | organism = synthetic construct | |
| SEQUENCE: 212 | | |
| MSERVERNWS TGGWLLALCL AWLWTHLTLA ALQPPTATVL VQQGTCEVIA AHRCCNRNRI | | 60 |
| EERSQTVKCS CFSGQVAGTT RAKPSCVDAS IVLQRWWCQM EPCLPGEECK VLPDLSGWSC | | 120 |
| SSGHKVKTTK VTR | | 133 |

| | |
|---|---|
| SEQ ID NO: 213 | moltype = AA length = 140 |
| FEATURE | Location/Qualifiers |
| REGION | 1..140 |

```
                        note = human FAM19A4
source                  1..140
                        mol_type = protein
                        organism = synthetic construct
SEQUENCE: 213
MRSPRMRVCA KSVLLSHWLF LAYVLMVCCK LMSASSQHLR GHAGHHQIKQ GTCEVVAVHR    60
CCNKNRIEER SQTVKCSCFP GQVAGTTRAQ PSCVEASIVI QKWWCHMNPC LEGEDCKVLP   120
DYSGWSCSSG NKVKTTKVTR                                               140
```

ANTI-FAM19A5 ANTIBODIES AND USES THEREOF

CROSS-REFERENCE TO RELATED APPLICATIONS

This application is a divisional application of U.S. application Ser. No. 16/626,624 (now issued as U.S. Pat. No. 11,618,783), which is a 35 U.S.C. § 371 national stage of International Appl. No. PCT/IB2018/054785, filed Jun. 27, 2018, which claims provisional benefit of U.S. Appl. No. 62/582,887, filed Nov. 7, 2017; and U.S. Appl. No. 62/525,635, filed Jun. 27, 2017, the contents of all of which are hereby incorporated by reference in their entireties.

REFERENCE TO SEQUENCE LISTING SUBMITTED ELECTRONICALLY

The content of the electronically submitted sequence listing in ASCII text file (Name: 3763.005PC02_SeqListing_ST25.txt; Size: 166,889 bytes; and Date of Creation: Jun. 26, 2018) filed with the application is incorporated herein by reference in its entirety.

FIELD OF THE DISCLOSURE

The present disclosure provides antibodies that specifically bind to family with sequence similarity 19, member A5 (FAM19A5), compositions comprising such antibodies, and method of using such antibodies for preventing or treating disorders or diseases such as a fibrosis and/or cancer (e.g., brain tumor, e.g., glioblastoma) in a subject.

BACKGROUND OF THE DISCLOSURE

FAM19A5 is a member of the TAFA subfamily of proteins which is composed of five highly homologous small proteins. Tang T. Y. et al., *Genomics* 83(4):727-34 (2004). These proteins contain conserved cysteine residues at fixed positions, and are distantly related to macrophage inflammatory protein 1-alpha (MIP-1-alpha), a member of the CC-chemokine family. The TAFA proteins are predominantly expressed in specific regions of the brain and the spinal cord. These proteins are believed to be generated and secreted by adult neural stem cells in neurogenesis processes.

FAM19A5 is predominantly expressed in the brain of vertebrates and it is believed that FAM19A5 is important in the development, differentiation, formation of a complete central nervous system, and can be used in the prevention or treatment of central nervous system injuries and/or diseases. U.S. Patent Publication No. 2015/0118230.

In addition to regulation of the nervous system, FAM19A5 may also play a role in regulating immune cells. Fibrosis is a common health problem, often occurring in various pathological processes, and is characterized by infiltrating mononuclear immune cells which release cytokines that stimulate fibroblasts to alter connective tissue. Accordingly, there is a need to develop antibodies that specifically bind to FAM19A5 and that are capable of modulating FAM19A5 activity.

BRIEF SUMMARY OF THE DISCLOSURE

Provided herein is an isolated antibody, or antigen-binding portion thereof, which specifically binds to human family with sequence similarity 19, member A5 ("FAM19A5") protein ("anti-FAM19A5 antibody") and which cross-competes for binding to a human FAM19A5 epitope with a reference antibody comprising a heavy chain CDR1, CDR2, and CDR3 and a light chain CDR1, CDR2, and CDR3, wherein: (i) the heavy chain CDR1 comprises the amino acid sequence of SEQ ID NO: 11, the heavy chain CDR2 comprises the amino acid sequence of SEQ ID NO: 12, the heavy chain CDR3 comprises the amino acid sequence of SEQ ID NO: 13, the light chain CDR1 comprises the amino acid sequence of SEQ ID NO: 23, the light chain CDR2 comprises the amino acid sequence of SEQ ID NO: 24, and the light chain CDR3 comprises the amino acid sequence of SEQ ID NO: 25; (ii) the heavy chain CDR1 comprises the amino acid sequence of SEQ ID NO: 14, the heavy chain CDR2 comprises the amino acid sequence of SEQ ID NO: 15, the heavy chain CDR3 comprises the amino acid sequence of SEQ ID NO: 16, the light chain CDR1 comprises the amino acid sequence of SEQ ID NO: 26, the light chain CDR2 comprises the amino acid sequence of SEQ ID NO: 27, and the light chain CDR3 comprises the amino acid sequence of SEQ ID NO: 28; or (iii) the heavy chain CDR1 comprises the amino acid sequence of SEQ ID NO: 20, the heavy chain CDR2 comprises the amino acid sequence of SEQ ID NO: 21, the heavy chain CDR3 comprises the amino acid sequence of SEQ ID NO: 22, the light chain CDR1 comprises the amino acid sequence of SEQ ID NO: 32, the light chain CDR2 comprises the amino acid sequence of SEQ ID NO: 33, and the light chain CDR3 comprises the amino acid sequence of SEQ ID NO: 34.

Also provided herein is an isolated antibody, or antigen-binding portion thereof, which specifically binds to human family with sequence similarity 19, member A5 ("FAM19A5") protein ("anti-FAM19A5 antibody") and which binds to the same FAM19A5 epitope as a reference antibody comprising a heavy chain CDR1, CDR2, and CDR3 and a light chain CDR1, CDR2, and CDR3, wherein: (i) the heavy chain CDR1 comprises the amino acid sequence of SEQ ID NO: 11, the heavy chain CDR2 comprises the amino acid sequence of SEQ ID NO: 12, the heavy chain CDR3 comprises the amino acid sequence of SEQ ID NO: 13, the light chain CDR1 comprises the amino acid sequence of SEQ ID NO: 23, the light chain CDR2 comprises the amino acid sequence of SEQ ID NO: 24, and the light chain CDR3 comprises the amino acid sequence of SEQ ID NO: 25; (ii) the heavy chain CDR1 comprises the amino acid sequence of SEQ ID NO: 14, the heavy chain CDR2 comprises the amino acid sequence of SEQ ID NO: 15, the heavy chain CDR3 comprises the amino acid sequence of SEQ ID NO: 16, the light chain CDR1 comprises the amino acid sequence of SEQ ID NO: 26, the light chain CDR2 comprises the amino acid sequence of SEQ ID NO: 27, and the light chain CDR3 comprises the amino acid sequence of SEQ ID NO: 28; or (iii) the heavy chain CDR1 comprises the amino acid sequence of SEQ ID NO: 20, the heavy chain CDR2 comprises the amino acid sequence of SEQ ID NO: 21, the heavy chain CDR3 comprises the amino acid sequence of SEQ ID NO: 22, the light chain CDR1 comprises the amino acid sequence of SEQ ID NO: 32, the light chain CDR2 comprises the amino acid sequence of SEQ ID NO: 33, and the light chain CDR3 comprises the amino acid sequence of SEQ ID NO: 34.

In some embodiments, the anti-FAM19A5 antibody of the present disclosure binds to at least one FAM19A5 epitope, which is SEQ ID NO: 6. In certain embodiments, the anti-FAM19A5 antibody binds to the FAM19A5 epitope, which is SEQ ID NO: 6, at one or more amino acids corresponding to amino acid residues (i) 46 to 51 (i.e., DSSQPR), (ii) 46, 50, and 52 (i.e., D- - -P-R), or (iii) 46, 47, 48, and 50 (i.e., DSS-P). In some embodiments, the anti-FAM19A5 antibody binds to at least one FAM19A5 epitope, which is SEQ ID NO: 9. In certain embodiments, the anti-FAM19A5 antibody binds to at least one FAM19A5 epitope identified as EP2, EP4, and/or EP8, wherein EP2 comprises the amino acids DSSQP (SEQ ID NO: 66), wherein EP4 comprises the amino acids ARCACRK (SEQ ID NO: 68), and wherein EP8 comprises the amino acids TCTQPGGR (SEQ ID NO: 72).

In some embodiments, the anti-FAM19A5 antibody disclosed herein comprises a heavy chain CDR1, CDR2, and CDR3 and a light chain CDR1, CDR2, and CDR3, wherein (i) the heavy chain CDR1 comprises SEQ ID NO: 11, SEQ ID NO: 14, or SEQ ID NO: 20; (ii) the heavy chain CDR2 comprises SEQ ID NO: 12, SEQ ID NO: 15, or SEQ ID NO: 21; (iii) the heavy chain CDR3 comprises SEQ ID NO: 13, SEQ ID NO: 16, or SEQ ID NO: 22; (iv) the light chain CDR1 comprises SEQ ID NO: 23, SEQ ID NO: 26, or SEQ ID NO: 32; (v) the light chain CDR2 comprises SEQ ID NO: 24, SEQ ID NO: 27, or SEQ ID NO: 33; and/or (vi) the light chain CDR3 comprises SEQ ID NO: 25, SEQ ID NO: 28, or SEQ ID NO: 34.

In some embodiments, the anti-FAM19A5 antibody comprises (i) a heavy chain variable domain comprising SEQ ID NO: 35 and a light chain variable domain comprising SEQ ID NO: 39; (ii) a heavy chain variable domain comprising SEQ ID NO: 36 and a light chain variable domain comprising SEQ ID NO: 40; or (iii) a heavy chain variable domain comprising SEQ ID NO: 38 and a light chain variable domain comprising SEQ ID NO: 42.

In some embodiments, the anti-FAM19A5 antibody comprises a heavy chain variable region and a light chain variable region, wherein the heavy chain variable region comprises an amino acid sequence which is at least about 80%, at least about 85%, at least about 90%, at least about 95%, at least about 96%, at least about 97%, at least about 98%, at least about 99%, or about 100% identical to the amino acid sequence set forth as SEQ ID NO: 35, SEQ ID NO: 36, or SEQ ID NO: 38, and/or wherein the light chain variable region comprises an amino acid sequence which is at least about 80%, at least about 85%, at least about 90%, at least about 95%, at least about 96%, at least about 97%, at least about 98%, at least about 99%, or about 100% identical to the amino acid sequence set forth as SEQ ID NO: 39, SEQ ID NO: 40, or SEQ ID NO: 42.

In some embodiments, the anti-FAM19A5 antibody comprises (i) a heavy chain comprising SEQ ID NO: 57, SEQ ID NO: 58, or SEQ ID NO: 60; and (ii) a light chain comprising SEQ ID NO: 61, SEQ ID NO: 62, or SEQ ID NO: 64.

In some embodiments, the anti-FAM19A5 antibody of the present disclosure is a chimeric antibody, a human antibody, or a humanized antibody. In some embodiments, the anti-FAM19A5 antibody comprises one or more of the following properties: (a) reduces, reverses, delays and/or prevents fibrosis; (b) reduces formation of excessive extracellular matrix (ECM); (c) delays tumor growth or progression; (d) binds to soluble human FAM19A5 with a KD of 10 nM or less as measured by enzyme-linked immunosorbent assay (ELISA); (e) binds to membrane bound human FAM19A5 with a KD of 10 nM or less as measured by ELISA; (f) reduces, reverses, delays, and/or prevents an onset of reactive gliosis; (g) suppresses an excessive proliferation of reactive astrocytes; (h) decreases expression of chondroitin sulfate proteoglycans including neurocan and neuron-glial antigen 2 (NG2); (i) increases expression of c-fos and pERK in the nucleus of neurons; (j) promotes survival of neurons;
(k) increases expression of GAP43 in neurons; and (1) promotes regrowth of an axon.

The present disclosure further provides a human family with sequence similarity 19, member A5 (FAM19A5) epitope consisting essentially of or consisting of an amino acid sequence at least 90%, at least about 95%, at least about 96%, at least about 97%, at least about 98%, at least about 99%, or about 100% identical to SEQ ID NO: 5, 6, 9, or 10, wherein the epitope is capable of being specifically bound to a reference antibody comprising (i) a heavy chain variable domain comprising SEQ ID NO: 35, SEQ ID NO: 36, or SEQ ID NO: 38, and (ii) a light chain variable domain comprising SEQ ID NO: 39, SEQ ID NO: 40, or SEQ ID NO: 42.

Also disclosed herein is a nucleic acid encoding an anti-FAM19A5 antibody or an FAM19A5 epitope described herein. Also provided is a composition comprising an anti-FAM19A5 antibody or an FAM19A5 epitope of the present disclosure.

In some aspects, the present application also provides an anti-FAM19A5 antibody for treating a brain cancer.

In other aspects, the present disclosure provides a method of diagnosing a subject in need thereof comprising contacting a biological sample of the subject with an anti-FAM19A5 antibody disclosed herein.

EMBODIMENTS

Embodiment 1. An isolated monoclonal antibody or antigen binding portion thereof that specifically binds to human family with sequence similarity 19, member A5 (FAM19A5) and exhibits one or more of the following properties:
  (a) reduces, reverses, delays and/or prevents fibrosis;
  (b) reduces formation of excessive extracellular matrix (ECM); and
  (c) delays tumor growth or progression.

Embodiment 2. The monoclonal antibody or antigen binding portion thereof of Embodiment 1, which further comprises one or more of the following properties:
  (d) binds to soluble human FAM19A5 with a KD of 10 nM or less as measured by enzyme-linked immunosorbent assay (ELISA);
  (e) binds to membrane bound human FAM19A5 with a KD of 10 nM or less as measured by ELISA;
  (f) reduces, reverses, delays, and/or prevents an onset of reactive gliosis;
  (g) suppresses an excessive proliferation of reactive astrocytes;
  (h) decreases expression of chondroitin sulfate proteoglycans including neurocan and neuron-glial antigen 2 (NG2);
  (i) increases expression of c-fos and pERK in the nucleus of neurons;
  (j) promotes survival of neurons;
  (k) increases expression of GAP43 in neurons; and
  (l) promotes regrowth of an axon.

Embodiment 3. The monoclonal antibody or antigen binding portion thereof of Embodiment 1 or 2, which cross-competes for binding to a human FAM19A5 epitope with (i) a reference antibody comprising heavy chain CDR1, CDR2, and CDR3 and light chain CDR1, CDR2, and CDR3, wherein the heavy chain CDR1 comprises the amino acid sequence of SEQ ID NO: 11, the heavy chain CDR2 comprises the amino acid sequence of SEQ ID NO: 12, the heavy chain CDR3 comprises the amino acid sequence of SEQ ID NO: 13, the light chain CDR1 comprises the amino acid sequence of SEQ ID NO: 23, the light chain CDR2 comprises the amino acid sequence of SEQ ID NO: 24, and the light chain CDR3 comprises the amino acid sequence of SEQ ID NO: 25; (ii) a reference antibody comprising heavy chain CDR1, CDR2, and CDR3 and light chain CDR1, CDR2, and CDR3, wherein the heavy chain CDR1 comprises the amino acid sequence of SEQ ID NO: 14, the heavy chain CDR2 comprises the amino acid sequence of SEQ ID NO: 15, the heavy chain CDR3 comprises the amino acid sequence of SEQ ID NO: 16, the light chain CDR1 comprises the amino acid sequence of SEQ ID NO: 26, the light chain CDR2 comprises the amino acid sequence of SEQ ID NO: 27, and the light chain CDR3 comprises the amino acid sequence of SEQ ID NO: 28; or (iii) a reference antibody comprising heavy chain CDR1, CDR2, and CDR3 and light chain CDR1, CDR2, and CDR3, wherein the heavy chain CDR1 comprises the amino acid sequence of SEQ ID NO: 20, the heavy chain CDR2 comprises the amino acid sequence of SEQ ID NO: 21, the heavy chain CDR3 comprises the amino acid sequence of SEQ ID NO: 22, the light chain CDR1 comprises the amino acid sequence of SEQ ID NO: 32, the light chain CDR2 comprises the amino acid sequence of SEQ ID NO: 33, and the light chain CDR3 comprises the amino acid sequence of SEQ ID NO: 34.

Embodiment 4. The monoclonal antibody or antigen binding portion thereof of Embodiment 1 or 2, which binds to the same FAM19A5 epitope as (i) a reference antibody comprising heavy chain CDR1, CDR2, and CDR3 and light chain CDR1, CDR2, and CDR3, wherein the heavy chain CDR1 comprises the amino acid sequence of SEQ ID NO: 11, the heavy chain CDR2 comprises the amino acid sequence of SEQ ID NO: 12, the heavy chain CDR3 comprises the amino acid sequence of SEQ ID NO: 13, the light chain CDR1 comprises the amino acid sequence of SEQ ID NO: 23, the light chain CDR2 comprises the amino acid sequence of SEQ ID NO: 24, and the light chain CDR3 comprises the amino acid sequence of SEQ ID NO: 25; (ii) a reference antibody comprising heavy chain CDR1, CDR2, and CDR3 and light chain CDR1, CDR2, and CDR3, wherein the heavy chain CDR1 comprises the amino acid sequence of SEQ ID NO: 14, the heavy chain CDR2 comprises the amino acid sequence of SEQ ID NO: 15, the heavy chain CDR3 comprises the amino acid sequence of SEQ ID NO: 16, the light chain CDR1 comprises the amino acid sequence of SEQ ID NO: 26, the light chain CDR2 comprises the amino acid sequence of SEQ ID NO: 27, and the light chain CDR3 comprises the amino acid sequence of SEQ ID NO: 28; or (iii) a reference antibody comprising heavy chain CDR1, CDR2, and CDR3 and light chain CDR1, CDR2, and CDR3, wherein the heavy chain CDR1 comprises the amino acid sequence of SEQ ID NO: 20, the heavy chain CDR2 comprises the amino acid sequence of SEQ ID NO: 21, the heavy chain CDR3 comprises the amino acid sequence of SEQ ID NO: 22, the light chain CDR1 comprises the amino acid sequence of SEQ ID NO: 32, the light chain CDR2 comprises the amino acid sequence of SEQ ID NO: 33, and the light chain CDR3 comprises the amino acid sequence of SEQ ID NO: 34.

Embodiment 5. The monoclonal antibody or antigen binding portion thereof of Embodiment 3 or 4, which binds to at least one FAM19A5 epitope, which is SEQ ID NO: 6.

Embodiment 6. The monoclonal antibody or antigen binding portion thereof of any one of Embodiments 2 to 5, wherein monoclonal the antibody, or antigen binding portion thereof, binds only to an FAM19A5, which is SEQ ID NO: 6.

Embodiment 7. The monoclonal antibody or antigen binding portion thereof of any one of Embodiments 2 to 5, wherein the monoclonal antibody or antigen binding portion thereof further binds to an additional FAM19A5 epitope.

Embodiment 8. The monoclonal antibody or antigen binding portion thereof of Embodiment 7, wherein the additional FAM19A5 epitope is selected from the group consisting of SEQ ID NO: 5, SEQ ID NO: 6, SEQ ID NO: 7, SEQ ID NO: 8, SEQ ID NO: 9, SEQ ID NO: 10, and any combination thereof.

Embodiment 9. The monoclonal antibody or antigen binding portion thereof of any one of Embodiments 1 to 8, which comprises heavy chain CDR1, CDR2, and CDR3 and light chain CDR1, CDR2, and CDR3.

Embodiment 10. The monoclonal antibody or antigen binding portion thereof of Embodiment 9, wherein the heavy chain CDR1 comprises SEQ ID NO: 11, SEQ ID NO: 14, or SEQ ID NO: 20.

Embodiment 11. The monoclonal antibody or antigen binding portion thereof of Embodiment 9 or 10, wherein the heavy chain CDR2 comprises SEQ ID NO: 12, SEQ ID NO: 15, or SEQ ID NO: 21.

Embodiment 12. The monoclonal antibody or antigen binding portion thereof of any one of Embodiments 9 to 11, wherein the heavy chain CDR3 comprises SEQ ID NO: 13, SEQ ID NO: 16, or SEQ ID NO: 22.

Embodiment 13. The monoclonal antibody or antigen binding portion thereof of any one of Embodiments 9 to 12, wherein the light chain CDR1 comprises SEQ ID NO: 23, SEQ ID NO: 26, or SEQ ID NO: 32.

Embodiment 14. The monoclonal antibody or antigen binding portion thereof of any one of Embodiments 9 to 13, wherein the light chain CDR2 comprises SEQ ID NO: 24, SEQ ID NO: 27, or SEQ ID NO: 33.

Embodiment 15. The monoclonal antibody or antigen binding portion thereof of any one of Embodiments 9 to 14, wherein the light chain CDR3 comprises SEQ ID NO: 25, SEQ ID NO: 28, or SEQ ID NO: 34.

Embodiment 16. The monoclonal antibody or antigen binding portion thereof of any one of Embodiments 1 to 15, which comprises (i) a heavy chain variable domain comprising SEQ ID NO: 35, SEQ ID NO: 36, or SEQ ID NO: 38, and (ii) a light chain variable domain comprising SEQ ID NO: 39, SEQ ID NO: 40, or SEQ ID NO: 42.

Embodiment 17. The monoclonal antibody or antigen binding portion thereof of any one of Embodiments 1 to 16, which comprises a heavy chain variable region and a light chain variable region, wherein the heavy chain variable region comprises an amino acid sequence which is at least about 80%, at least about 85%, at least about 90%, at least about 95%, at least about 96%, at least about 97%, at least about 98%, at least about 99%, or about 100% identical to the amino acid sequence set forth as SEQ ID NO: 35, SEQ ID NO: 36, or SEQ ID NO: 38.

Embodiment 18. The monoclonal antibody or antigen binding portion thereof of any one of Embodiments 1 to 17, which comprises a heavy chain variable region and a light chain variable region, wherein the light chain variable region comprises an amino acid sequence which is at least about 80%, at least about 85%, at least about 90%, at least about 95%, at least about 96%, at least about 97%, at least about 98%, at least about 99%, or about 100% identical to the amino acid sequence set forth as SEQ ID NO: 39, SEQ ID NO: 40, or SEQ ID NO: 42.

Embodiment 19. The monoclonal antibody of any one of Embodiments 1 to 18, wherein the monoclonal antibody is a single domain antibody.

Embodiment 20. The monoclonal antibody or antigen binding portion thereof of any one of Embodiments 1 to 19, wherein the monoclonal antibody is selected from the group consisting of an IgG1, an IgG2, an IgG3, an IgG4, a variant thereof, or a combination thereof.

Embodiment 21. The monoclonal antibody or antigen binding portion thereof of Embodiment 20, wherein the monoclonal antibody is a human IgG1 antibody.

Embodiment 22. The monoclonal antibody or antigen binding portion thereof of Embodiment 20, wherein the monoclonal antibody comprises a human IgG2 or human IgG4 isotype antibody.

Embodiment 23. The monoclonal antibody or antigen binding portion thereof of any one of Embodiments 1 to 22, further comprising a constant region without the Fc function.

Embodiment 24. The monoclonal antibody or antigen binding portion thereof of any one of Embodiments 1 to 23, which is a chimeric antibody, a human antibody, or a humanized antibody.

Embodiment 25. The monoclonal antibody of any one of Embodiments 1 to 24, wherein the monoclonal antibody comprises (i) a heavy chain comprising SEQ ID NO: 57, SEQ ID NO: 58, or SEQ ID NO: 60; and (ii) a light chain comprising SEQ ID NO: 61, SEQ ID NO: 62, or SEQ ID NO: 64.

Embodiment 26. The antigen binding portion thereof of any one of Embodiments 1 to 25, wherein the antigen binding portion thereof is an Fab, an Fab', an F(ab')2, an Fv, or a single chain Fv (scFv).

Embodiment 27. A bispecific molecule comprising the monoclonal antibody or antigen binding portion thereof of any one of Embodiments 1 to 26 that is linked to a molecule having a second binding moiety.

Embodiment 28. A human family with sequence similarity 19, member A5 (FAM19A5) epitope consisting essentially of or consisting of an amino acid sequence at least 90%, at least about 95%, at least about 96%, at least about 97%, at least about 98%, at least about 99%, or about 100% identical to SEQ ID NO: 5, 6, 9, or 10, wherein the epitope is capable of being specifically bound to a reference antibody comprising (i) a heavy chain variable domain comprising SEQ ID NO: 35, SEQ ID NO: 36, or SEQ ID NO: 38, and (ii) a light chain variable domain comprising SEQ ID NO: 39, SEQ ID NO: 40, or SEQ ID NO: 42.

Embodiment 29. A nucleic acid encoding the monoclonal antibody or antigen binding portion thereof of any one of Embodiments 1 to 26, the bispecific molecule of Embodiment 27, or the epitope of Embodiment 28.

Embodiment 30. A vector comprising the nucleic acid of Embodiment 29.

Embodiment 31. The vector of Embodiment 30, for use in gene therapy.

Embodiment 32. A cell transformed with an expression vector of Embodiment 30.

Embodiment 33. An immunoconjugate comprising the monoclonal antibody or antigen binding portion thereof of any one of Embodiments 1 to 26 or the bispecific molecule of Embodiment 27, linked to an agent.

Embodiment 34. A composition comprising (i) the monoclonal antibody, or antigen binding portion thereof, of any one of Embodiments 1 to 26, the bispecific molecule of Embodiment 27, or the immunoconjugate of Embodiment 33, and (ii) a carrier.

Embodiment 35. A kit comprising (i) the monoclonal antibody, or antigen binding portion thereof, of any one of Embodiments 1 to 26, the bispecific molecule of Embodiment 27, or the immunoconjugate of Embodiment 33, and (ii) instructions for use.

Embodiment 36. A method of preparing an anti-FAM19A5 antibody or antigen binding portion thereof comprising immunizing a non-human animal with the epitope of Embodiment 28 and producing an antibody, or antigen binding portion thereof.

Embodiment 37. A method of producing an anti-FAM19A5 antibody or antigen binding portion thereof comprising culturing the cell of Embodiment 32 under suitable condition and isolating the antibody or antigen binding portion thereof.

Embodiment 38. A method of reducing, reversing, and/or preventing fibrosis in a subject in need thereof comprising administering the monoclonal antibody or antigen binding portion thereof of any one of Embodiments 1 to 26, the bispecific molecule of Embodiment 27, or the immunoconjugate of Embodiment 33 such that the onset of fibrosis is delayed.

Embodiment 39. A method of reducing formation of excessive extracellular matrix (ECM) in a subject in need thereof comprising administering to the subject the monoclonal antibody or antigen binding portion thereof of any one of Embodiments 1 to 26, the bispecific molecule of Embodiment 27, or the immunoconjugate of Embodiment 33, wherein the formation of excess ECM is reduced.

Embodiment 40. A method of preventing, ameliorating, or treating a liver cancer, a lung cancer, a renal cancer, a breast cancer, and/or a pancreatic cancer in a subject in need thereof comprising administering to the subject the monoclonal antibody or antigen binding portion thereof of any one of Embodiments 1 to 26, the bispecific molecule of Embodiment 27, or the immunoconjugate of Embodiment 33.

Embodiment 41. The method of Embodiment 40, wherein the liver cancer is hepatocellular carcinoma.

Embodiment 42. A method of preventing, ameliorating, or treating a liver cancer, a lung cancer, a renal cancer, a breast cancer, and/or a pancreatic cancer associated with a fibrosis in a subject in need thereof comprising administering to the subject the monoclonal antibody or antigen binding portion thereof of any one of Embodiments 1 to 26, the bispecific molecule of Embodiment 27, or the immunoconjugate of Embodiment 33.

Embodiment 43. The method of Embodiment 38 or 42, wherein the fibrosis comprises a hepatic fibrosis, pulmonary fibrosis, renal fibrosis, myelofibrosis, pancreatic fibrosis, skin fibrosis, cardiac fibrosis, arterial fibrosis, arthrofibrosis, breast fibrosis, muscle fibrosis, retroperitoneal Fibrosis, thyroid fibrosis, lymph node fibrosis, bladder fibrosis, and/or pleural fibrosis.

Embodiment 44. The method of any one of Embodiments 38 to 43, wherein the monoclonal antibody or antigen binding portion thereof is administered intravenously, orally, parenterally, intrathecally, intra-cerebroventricularly, pulmonarily, subcutaneously, or intraventricularly.

Embodiment 45. The method of any one of Embodiments 38 to 44, wherein the subject is a human.

Embodiment 46. A method of measuring the level of FAM19A5 in a sample from a subject in need thereof comprising contacting the monoclonal antibody or antigen binding portion thereof of any one of Embodiments 1 to 26, the bispecific molecule of Embodiment 27, or the immunoconjugate of Embodiment 33 with a sample obtained from the subject.

Embodiment 47. The method of Embodiment 46, wherein the level of FAM19A5 is increased in the sample of the subject compared to a reference sample.

Embodiment 48. A method of diagnosing a fibrosis in a subject in need thereof comprising contacting the monoclonal antibody or antigen binding portion thereof of any one of Embodiments 1 to 26, the bispecific molecule of Embodiment 27, or the immunoconjugate of Embodiment 33 with a sample obtained from the subject.

Embodiment 49. The method of Embodiment 48, wherein the fibrosis is in lung or liver.

Embodiment 50. The method of Embodiment 48 or 49, wherein the level of FAM19A5 is increased in the sample of the subject compared to the level of FAM19A5 in a reference sample of a subject without the fibrosis.

Embodiment 51. A method of diagnosing a tumor with fibrosis in a subject in need thereof comprising contacting the monoclonal antibody or antigen binding portion thereof of any one of Embodiments 1 to 26, the bispecific molecule of Embodiment 27, or the immunoconjugate of Embodiment 33 with a sample obtained from the subject.

Embodiment 52. The method of Embodiment 51, wherein the level of FAM19A5 is increased in the sample of the subject compared to the level of FAM19A5 in a reference sample of a subject without the tumor.

Embodiment 53. The method of any one of Embodiments 46 to 52, wherein the sample is blood, sera, plasma, cerebro spinal fluid, tissue biopsy, organ biopsy, or their combination.

Embodiment 54. The method of any one of Embodiments 46 to 52, wherein the sample is a fresh tumor sample, a frozen tumor sample, or a formalin-fixed paraffin-embedded sample.

Embodiment 55. The method of any one of Embodiments 46 to 52, wherein the contacting comprises conducting an assay.

Embodiment 56. The method of Embodiment 54, wherein the assay comprises Western blot assay, slot blot assay, enzyme-linked immunosorbent assay (ELISA), radioimmunoassay (RIA), flow cytometry-based immunofluorescence (FACS), mass spectrometry, surface plasmon resonance (SPR), or a combination thereof.

BRIEF DESCRIPTION OF THE DRAWINGS

FIG. 1 shows the amino acid sequences of epitopes F1-F6 (conjugated to BSA) and their location on the human FAM19A5 polypeptide. The top amino acid sequence shown is the wild-type FAM19A5 isoform 2 (without the signal peptide) (i.e., SEQ ID NO: 86). The second amino acid sequence shown is the same sequence but the cysteine residues were mutated to serine (i.e., SEQ ID NO: 203). The size of the different epitope fragments are indicated in parentheses. The different epitope fragments shown include: F1 (SEQ ID NO: 204), F2 (SEQ ID NO: 205), F3 (SEQ ID NO: 206), F4 (SEQ ID NO: 207), F5 (SEQ ID NO: 208), and F6 (SEQ ID NO: 209).

FIG. 3A shows the results for the 3-2 antibody with human IgG1 isotype. FIG. 3B shows the results for the 3-2 antibody with mouse IgG1 isotype. FIG. 3C shows the results for the 1-28 antibody. The exact O.D. values are indicated at the top of each bar.

FIG. 4 shows an amino acid sequence alignment of the different members of the FAM19A family (i.e., FAM19A1-5; corresponding to SEQ ID NOs: 210, 211, 212, 213, and 2, respectively)). The regions with the greatest amino acid diversity among the members are boxed and shown as EP1 to EP8. IgG antibody ("IgG only") is shown as a control. The y-axis provides the O.D. value.

FIG. 7A shows the results as bar graphs for varying concentrations of the anti-FAM19A5 antibodies. FIG. 7B shows the Kd (nM) for the different anti-FAM19A5 antibodies.

FIG. 12A shows the collagen accumulation using the Masson's trichrome staining. FIG. 12B shows the collagen accumulation (i.e., fibrous area) as a ratio of fibrous area to the entire left ventricular area. Data are expressed as mean±S.D (n=5 to 8 per group). "*/" above the bars indicates a statistically significant difference (p<0.001, p<0.05, respectively) compared to the "Naïve" group (healthy animals). "#" above the bars indicate a statistically significant difference (p<0.05) compared to the "NHI" group (myocardial infarction induction+control antibody).

In FIG. 14C, (i) the top left shows the tumors from the "Hep3B+NHI" group (n=2); (ii) the top right shows the tumors from the "Hep3B+HHSteC+NHI" group (n=2); (iii) the bottom left shows the tumors from the "Hep3B+FAM19A5 Ab" group (n=3); and (iv) the bottom right shows the tumors from the "Hep3B+HHSteC+FAM19A5 Ab" group (n=3). FIG. 14D shows the average weight (g) of the tumors isolated from the different groups.

FIGS. 15A and 15B show the effect of the anti-FAM19A5 antibodies on reactive gliosis after traumatic brain injury. FIG. 15A provides representative immunohistochemistry images of the damaged area of the brain tissues from animals treated with the different anti-FAM19A5 antibodies: (i) 1-65 (2/4) ($1^{st}$ row); (ii) 1-28 ($2^{nd}$ row); (iii) 2-13 ($3^{rd}$ row); and (iv) 3-2 ($4^{th}$ row). The brain tissue sections were stained for GFAP (glial fibrillary acidic protein, green) and nestin (red), which are known to be induced in reactive astrocytes after brain injury. The dashed line (white) denotes lesion border following exposure to TBI. FIG. 15B provides the average distance of the GFAP- and/or nestin-positive astrocytes from the center of the TBI lesions in animals treated with 1-65, 1-28, 2-13, and 3-2 anti-FAM19A5 antibodies.

FIG. 16A provides both the antibody administration schedule and a schematic diagram demonstrating intracranial injection of glioblastoma cancer cells into mice.

FIG. 16B shows the anticancer effect of anti-FAM19A5 antibody in the glioblastoma animal models using CLARITY, which assesses the transparency of a tissue sample. The tumor regions, which appear opaque, are denoted using dashed lines in the brains harvested animals treated with either human IgG control antibody (left) or anti-FAM19A5 antibody (right).

FIG. 17A provides four representative H&E staining images of brain tissue sections from animals treated with either the control human IgG antibody (top row) or the anti-FAM19A5 antibody (bottom row). The glioblastoma correspond to the darkened areas in the images. FIG. 17B quantifies the data shown in FIG. 17A by providing the data as percent of control. The black bars correspond to the control group (treated with human IgG antibody). The gray bars correspond to the anti-FAM19A5 treated group. The numbers along the x-axis correspond to the representative image shown in FIG. 17A.

FIG. 18A shows the image of four representative brain tissue sections from animals treated with the control human IgG antibody (top row) or the anti-FAM19A5 antibody (bottom row). The area shown in light gray correspond to the tumor in each of the images. FIG. 18B provides a table showing the numerical values for the number of cells within the tumor (Hoeschst-positive staining) ("Num. spots") and tumor volume ("Vol") measured in the four representative brain tissue sections from FIG. 18A.

FIGS. 18C (number of cells) and 18D (tumor volume) are graphical depictions of the data shown in FIG. 18B. In both FIGS. 18C and 18D, the data are shown as % of the corresponding value observed in the control animals. The numbers along the x-axis correspond to the representative brain tissue section from FIG. 18A. The black bars correspond to animals treated with the control human IgG antibody. The gray bars correspond to animals treated with anti-FAM19A5 antibody.

FIG. 19A provides the immunohistochemistry analysis of CD31 expression (blood vessel marker) within comparable regions of brains isolated from animals treated with the control human IgG antibody (left image) or the anti-FAM19A5 antibody (right image). The dotted white lines in FIG. 19A represent the outer boundary of the glioblastoma. FIG. 19B provides a magnified view of a representative region from FIG. 19A.

FIG. 20A provides an immunohistochemical image of Iba1 expression (marker for macrophages) in the glioblastoma of mice treated with the control IgG antibody (top image) or the anti-FAM19A5 antibody (bottom image). FIG. 20B compares the volume of the macrophages observed within the images shown in FIG. 20A.

DETAILED DESCRIPTION OF THE DISCLOSURE

Figure 2:
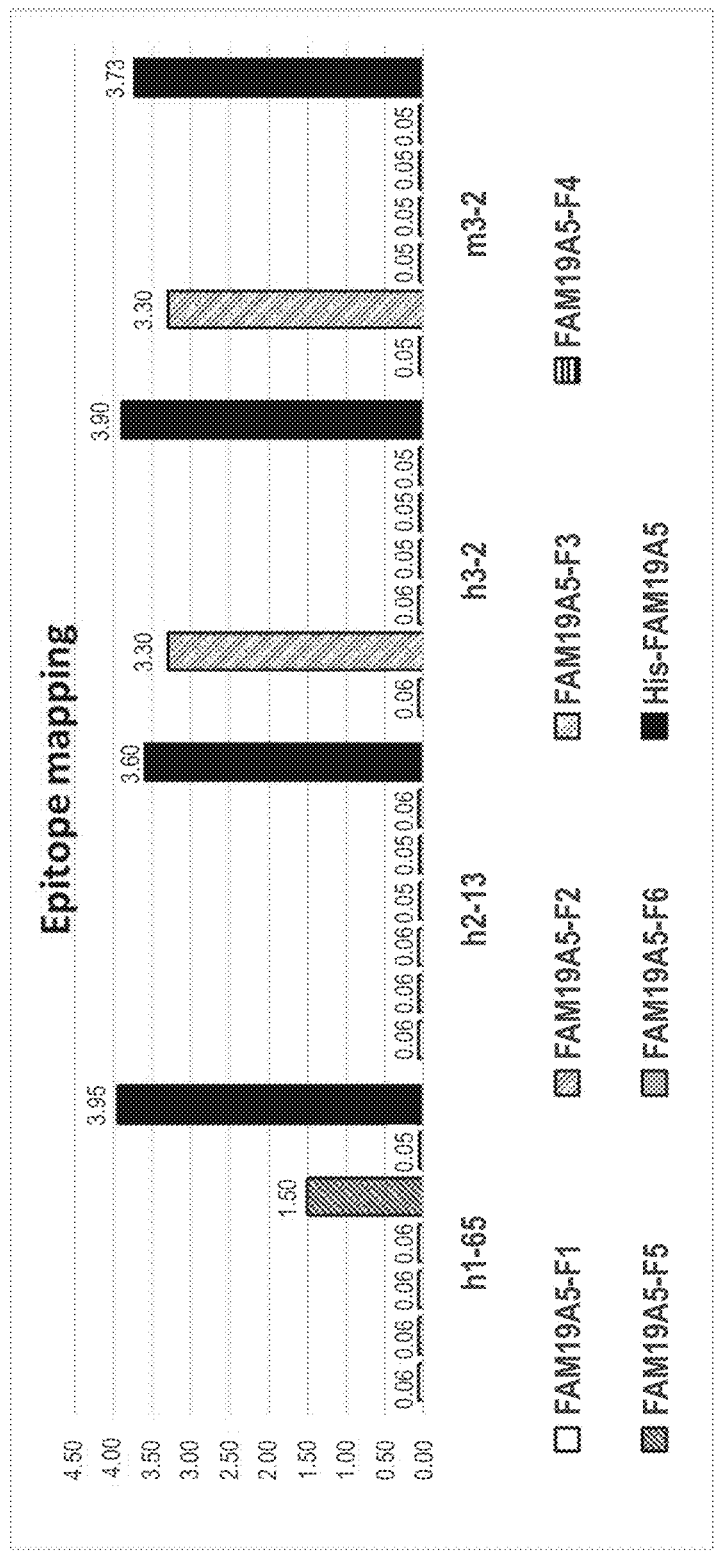
FIG. 2 shows ELISA results for the binding of anti-FAM19A5 antibodies 1-65, 2-13, and 3-2. For the 3-2 antibody, two different isotypes are shown: human IgG1 ("h3-2") and mouse IgG1 ("m3-2"). For each of the antibodies, the $1^{st}$, $2^{nd}$, $3^{rd}$ $4^{th}$, $5^{th}$, and $6^{th}$ bars (starting from the left) represent binding to epitope fragments F1, F2, F3, F4, F5, and F6, respectively. The bar farthest to the right represent the positive control (i.e., His tagged FAM19A5 protein). The exact O.D. value are indicated at the top of each bar.

Disclosed herein is an isolated monoclonal antibody or antigen-binding portion thereof that specifically binds to human family with sequence similarity 19, member A5 (FAM19A5) and exhibits one or more of the properties disclosed herein, e.g., reduces, reverses, and/or prevents fibrosis; reduces formation of excessive extracellular matrix (ECM); delays tumor growth or progression; binds to soluble human FAM19A5 with a $K_D$ of 10 nM or less as measured by enzyme-linked immunosorbent assay (ELISA); binds to membrane bound human FAM19A5 with a $K_D$ of 10 nM or less as measured by ELISA; reduces, reverses, delays, and/or prevents an onset of reactive gliosis; suppresses an excessive proliferation of reactive astrocytes; decreases expression of chondroitin sulfate proteoglycans including neurocan and neuron-glial antigen 2 (NG2); increases expression of c-fos and pERK in the nucleus of neurons; promotes survival of neurons; increases expression of GAP43 in neurons; and/or promotes regrowth of an axon.

To facilitate an understanding of the disclosure disclosed herein, a number of terms and phrases are defined. Additional definitions are set forth throughout the detailed description.

I. Definitions

Throughout this disclosure, the term "a" or "an" entity refers to one or more of that entity; for example, "an antibody," is understood to represent one or more antibodies. As such, the terms "a" (or "an"), "one or more," and "at least one" can be used interchangeably herein.

Furthermore, "and/or" where used herein is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

It is understood that wherever aspects are described herein with the language "comprising," otherwise analogous aspects described in terms of "consisting of" and/or "consisting essentially of" are also provided.

Unless defined otherwise, all technical and scientific terms used herein have the same meaning as commonly understood by one of ordinary skill in the art to which this disclosure is related. For example, the Concise Dictionary of Biomedicine and Molecular Biology, Juo, Pei-Show, 2nd ed., 2002, CRC Press; The Dictionary of Cell and Molecular Biology, 3rd ed., 1999, Academic Press; and the Oxford Dictionary Of Biochemistry And Molecular Biology, Revised, 2000, Oxford University Press, provide one of skill with a general dictionary of many of the terms used in this disclosure.

Units, prefixes, and symbols are denoted in their Système International de Unites (SI) accepted form. Numeric ranges are inclusive of the numbers defining the range. Unless otherwise indicated, amino acid sequences are written left to right in amino to carboxy orientation. The headings provided herein are not limitations of the various aspects of the disclosure, which can be had by reference to the specification as a whole. Accordingly, the terms defined immediately below are more fully defined by reference to the specification in its entirety.

The term "about" is used herein to mean approximately, roughly, around, or in the regions of. When the term "about" is used in conjunction with a numerical range, it modifies that range by extending the boundaries above and below the numerical values set forth. In general, the term "about" can modify a numerical value above and below the stated value by a variance of, e.g., 10 percent, up or down (higher or lower).

The term "family with sequence similarity 19, member A5" or "FAM19A5" refers to a protein that belongs to the TAFA family (also known as FAM19 family) of five highly homologous proteins and is predominantly expressed in brain and the spinal cord. FAM19A5 is also known as TAFA5 or Chemokine-like protein TAFA-5.

In humans, the gene encoding FAM19A5 is located on chromosome 22. There are three human FAM19A5 (UniProt: Q7Z5A7) isoforms, which are believed to be produced by alternative splicing: isoform 1 (UniProt: Q7Z5A7-1), which consists of 132 amino acids; isoform 2 (UniProt: Q7Z5A7-2), which consists of 125 amino acids; and isoform 3 (UniProt: Q7Z5A7-3), which consists of 53 amino acids. Human FAM19A5 protein is believed to exist as both membrane bound and soluble (secreted) forms. Isoform 1 is believed to be a membrane protein with one transmembrane region. Isoform 2, which was reported in Tang T. Y. et al., *Genomics* 83(4):727-34 (2004) as a secreted protein (soluble), contains a signal peptide at amino acid positions 1-25. Isoform 3 is predicted based on EST data. Below are the amino acid sequences of the three known human FAM19A5 isoforms.

(I) Isoform 1 (UniProt: Q7Z5A7-1, transmembrane protein): this isoform has been chosen as the canonical sequence.

```
                                           (SEQ ID NO: 1)
MAPSPRTGSR QDATALPSMS STFWAFMILA SLLIAYCSQL

AAGTCEIVTL DRDSSQPRRT IARQTARCAC RKGQIAGTTR

ARPACVDARI IKTKQWCDML PCLEGEGCDL LINRSGWTCT

QPGGRIKTTT VS
```

(II) Isoform 2 (UniProt: Q7Z5A7-2, soluble protein):

(SEQ ID NO: 2)
MQLLKALWAL AGAALCCFLV LVIHAQFLKE GQLAAGTCEI

VTLDRDSSQP RRTIARQTAR CACRKGQIAG TTRARPACVD

ARIIKTKQWC DMLPCLEGEG CDLLINRSGW TCTQPGGRIK

TTTVS (III) Isoform 3 (UniProt: Q7Z5A7-3):

(SEQ ID NO: 3)
MYHHREWPAR IIKTKQWCDM LPCLEGEGCD LLINRSGWTC

TQPGGRIKTT TVS

The term "FAM19A5" includes any variants or isoforms of FAM19A5 which are naturally expressed by cells. Accordingly, antibodies described herein can cross-react with different isoforms in the same species (e.g., different isoforms of human FAM19A5), or cross-react with FAM19A5 from species other than human (e.g., mouse FAM19A5). Alternatively, the antibodies can be specific for human FAM19A5 and cannot exhibit any cross-reactivity with other species. FAM19A5, or any variants and isoforms thereof, can either be isolated from cells or tissues which naturally express them or be recombinantly produced. The polynucleotide encoding human FAM19A5 has the GenBank Accession No. BC039396 and the following sequence:

TABLE 1A

Polynucleotide sequence of human FAM19A5

Polynucleotide sequence (SEQ ID NO: 4)

| | | | | | |
|---|---|---|---|---|---|
| FAM19A5 | ggcggcggag | gatggcgcgc | gcggggcccg | cacgtggagg | ccggcgcggg |
| (GenBank | ggcgcgggca | gggccggctg | ctgagacgcg | ctgctgcccc | ccgcgcgggc |
| Accession | gccgcggctt | caatggcgcc | atcgcccagg | accggcagcc | ggcaagatgc |
| No. | gaccgccctg | cccagcatgt | cctcaacttt | ctgggcgttc | atgatcctgg |
| BC039396) | ccagcctgct | catcgcctac | tgcagtcagc | tggccgccgg | cacctgtgag |
| | attgtgacct | tggaccggga | cagcagccag | cctcggagga | cgatcgcccg |
| | gcagaccgcc | cgctgtgcgt | gtagaaaggg | gcagatcgcc | ggcaccacga |
| | gagcccggcc | cgcctgtgtg | gacgcaagaa | tcatcaagac | caagcagtgg |
| | tgtgacatgc | ttccgtgtct | ggagggggaa | ggctgcgact | tgttaatcaa |
| | ccggtcaggc | tggacgtgca | cgcagcccgg | cgggaggata | aagaccacca |
| | cggtctcctg | acaaacacag | ccctgaggg | ggccccggga | gtggccttgg |
| | ctccctggag | agcccacgtc | tcagccacag | ttctccactc | gcctcggact |
| | tcacccgttc | tctgccgccc | gcccactccg | tttccctgtg | gtccgtgaag |
| | gacggcctca | ggccttggca | tcctgagctt | cggtctgtcc | agccgacccg |
| | aggaggccgg | actcagacac | ataggcgggg | ggcggcacct | ggcatcagca |
| | atacgcagtc | tgtgggagcc | cggccgcgcc | cagccccgc | cgaccgtggc |
| | gttggccctg | ctgtcctcag | aggaggagga | ggaggaggca | gctccggcag |
| | ccacagaagg | ctgcagccca | gcccgcctga | gacacgacgc | ctgccccagg |
| | ggactgtcag | gcacagaagc | ggcctcctcc | cgtgccccag | actgtccgaa |
| | ttgcttttat | tttcttatac | tttcagtata | ctccatagac | caaagagcaa |
| | aatctatctg | aacctggacg | caccctcact | gtcagggtcc | ctggggtcgc |
| | ttgtgcgggc | gggagggcaa | tggtggcaga | gacatgctgg | tggccccggc |
| | ggagcggaga | gggcggccgt | ggtggaggcc | tccaccccag | gagcaccccg |
| | cacacctcg | gaggacgggc | ttcggctgcg | cggaggccgt | ggcacacctg |
| | cgggaggcag | cgacggcccc | cacgcagacg | ccgggaacgc | aggccgcttt |
| | attcctctgt | acttagatca | acttgaccgt | actaaaatcc | ctttctgttt |
| | taaccagtta | aacatgcctc | ttctacagct | ccatttttga | tagttggata |
| | atccagtatc | tgccaagagc | atgttgggtc | tcccgtgact | gctgcctcat |
| | cgataccca | tttagctcca | gaaagcaaag | aaaactcgag | taacacttgt |
| | ttgaaagaga | tcattaaatg | tattttgcaa | agcccaaaaa | aaaaaaaaaa |
| | a | | | | |

The terms "antibody" and "antibodies" are terms of art and can be used interchangeably herein and refer to a molecule with an antigen binding site that specifically binds an antigen. The terms as used to herein include whole antibodies and any antigen binding fragments (i.e., "antigen-binding portions") or single chains thereof. An "antibody" refers, in one embodiment, to a glycoprotein comprising at least two heavy (H) chains and two light (L) chains interconnected by disulfide bonds, or an antigen-binding portion thereof. In another embodiment, an "antibody" refers to a single chain antibody comprising a single variable domain, e.g., VHH domain. Each heavy chain is comprised of a heavy chain variable region (abbreviated herein as VH) and a heavy chain constant region. In certain naturally-occurring antibodies, the heavy chain constant region is comprised of three domains, CH1, CH2 and CH3. In certain naturally-occurring antibodies, each light chain is comprised of a light chain variable region (abbreviated herein as VL) and a light chain constant region. The light chain constant region is comprised of one domain, CL.

The VH and VL regions can be further subdivided into regions of hypervariability, termed complementarity determining regions (CDR), interspersed with regions that are more conserved, termed framework regions (FR). Each VH and VL is composed of three CDRs and four FRs, arranged from amino-terminus to carboxy-terminus in the following order: FR1, CDR1, FR2, CDR2, FR3, CDR3, and FR4. The variable regions of the heavy and light chains contain a binding domain that interacts with an antigen. The constant regions of the antibodies can mediate the binding of the immunoglobulin to host tissues or factors, including various cells of the immune system (e.g., effector cells) and the first component (C1q) of the classical complement system.

The term "Kabat numbering" and like terms are recognized in the art and refer to a system of numbering amino acid residues in the heavy and light chain variable regions of an antibody, or an antigen-binding portion thereof. In certain aspects, the CDRs of an antibody can be determined according to the Kabat numbering system (see, e.g., Kabat E A & Wu T T (1971) Ann NY Acad Sci 190: 382-391 and Kabat E A et al., (1991) Sequences of Proteins of Immunological Interest, Fifth Edition, U.S. Department of Health and Human Services, NIH Publication No. 91-3242). Using the Kabat numbering system, CDRs within an antibody heavy chain molecule are typically present at amino acid positions 31 to 35, which optionally can include one or two additional amino acids, following 35 (referred to in the Kabat numbering scheme as 35A and 35B) (CDR1), amino acid positions 50 to 65 (CDR2), and amino acid positions 95 to 102 (CDR3). Using the Kabat numbering system, CDRs within an antibody light chain molecule are typically present at amino acid positions 24 to 34 (CDR1), amino acid positions 50 to 56 (CDR2), and amino acid positions 89 to 97 (CDR3). In a specific embodiment, the CDRs of the antibodies described herein have been determined according to the Kabat numbering scheme.

The phrases "amino acid position numbering as in Kabat," "Kabat position," and grammatical variants thereof refer to the numbering system used for heavy chain variable domains or light chain variable domains of the compilation of antibodies in Kabat et al., Sequences of Proteins of Immunological Interest, 5th Ed. Public Health Service, National Institutes of Health, Bethesda, Md. (1991). Using this numbering system, the actual linear amino acid sequence can contain fewer or additional amino acids corresponding to a shortening of, or insertion into, a FW or CDR of the variable domain. For example, a heavy chain variable domain can include a single amino acid insert (residue 52a according to Kabat) after residue 52 of H2 and inserted residues (e.g., residues 82a, 82b, and 82c, etc. according to Kabat) after heavy chain FW residue 82. See TABLE 1B.

TABLE 1B

| Loop | Kabat | AbM | Chothia |
|------|-------|-----|---------|
| L1 | L24-L34 | L24-L34 | L24-L34 |
| L2 | L50-L56 | L50-L56 | L50-L56 |
| L3 | L89-L97 | L89-L97 | L89-L97 |
| H1 | H31-H35B | H26-H35B | H26-H32 . . . 34 |
|    |          |          | (Kabat Numbering) |
| H1 | H31-H35 | H26-H35 | H26-H32 |
|    |          |          | (Chothia Numbering) |
| H2 | H50-H65 | H50-H58 | H52-H56 |
| H3 | H95-H102 | H95-H102 | H95-H102 |

The Kabat numbering of residues can be determined for a given antibody by alignment at regions of homology of the sequence of the antibody with a "standard" Kabat numbered sequence. Chothia refers instead to the location of the structural loops (Chothia and Lesk, J. Mol. Biol. 196:901-917 (1987)). The end of the Chothia CDR-H1 loop when numbered using the Kabat numbering convention varies between H32 and H34 depending on the length of the loop (this is because the Kabat numbering scheme places the insertions at H35A and H35B; if neither 35A nor 35B is present, the loop ends at 32; if only 35A is present, the loop ends at 33; if both 35A and 35B are present, the loop ends at 34). The AbM hypervariable regions represent a compromise between the Kabat CDRs and Chothia structural loops, and are used by Oxford Molecular's AbM antibody modeling software.

IMGT (ImMunoGeneTics) also provides a numbering system for the immunoglobulin variable regions, including the CDRs. See, e.g., Lefranc, M. P. et al., Dev. Comp. Immunol. 27: 55-77(2003), which is herein incorporated by reference. The IMGT numbering system was based on an alignment of more than 5,000 sequences, structural data, and characterization of hypervariable loops and allows for easy comparison of the variable and CDR regions for all species. According to the IMGT numbering schema VH-CDR1 is at positions 26 to 35, VH-CDR2 is at positions 51 to 57, VH-CDR3 is at positions 93 to 102, VL-CDR1 is at positions 27 to 32, VL-CDR2 is at positions 50 to 52, and VL-CDR3 is at positions 89 to 97.

For all heavy chain constant region amino acid positions discussed in the present disclosure, numbering is according to the EU index first described in Edelman et al., 1969, Proc. Natl. Acad. Sci. USA 63(1):78-85, describing the amino acid sequence of myeloma protein EU, which is the first human 1gG1 sequenced. The EU index of Edelman et al. is also set forth in Kabat et al., 1991, Sequences of Proteins of Immunological Interest, 5$^{th}$ Ed., United States Public Health Service, National Institutes of Health, Bethesda. Thus, the phrases "EU index as set forth in Kabat" or "EU index of Kabat" and "position . . . according to the EU index as set forth in Kabat," and grammatical variants thereof refer to the residue numbering system based on the human 1gG1 EU antibody of Edelman et al. as set forth in Kabat 1991.

The numbering system used for the variable domains (both heavy chain and light chain) and light chain constant region amino acid sequence is that set forth in Kabat 1991.

Antibodies can be of any type (e.g., IgG, IgE, IgM, IgD, IgA, or IgY), any class (e.g., IgD, IgG2, IgG3, IgG4, IgA1, or IgA2), or any subclass (e.g., IgG1, IgG2, IgG3, and IgG4 in humans; and IgG1, IgG2a, IgG2b, and IgG3 in mice) of immunoglobulin molecule. Immunoglobulins, e.g., IgG1, exist in several allotypes, which differ from each other in at most a few amino acids. An antibody disclosed herein can be from any of the commonly known isotypes, classes, subclasses, or allotypes. In certain embodiments, the antibodies described herein are of the IgG1, IgG2, IgG3, or IgG4 subclass or any hybrid thereof. In certain embodiments, the antibodies are of the human IgG1 subclass or the human IgG2 or human IgG4 subclass.

"Antibody" includes, by way of example, both naturally-occurring and non-naturally-occurring antibodies; monoclonal and polyclonal antibodies; chimeric and humanized antibodies; human and non-human antibodies; wholly synthetic antibodies; single chain antibodies; monospecific antibodies; multispecific antibodies (including bispecific antibodies); tetrameric antibodies comprising two heavy chain and two light chain molecules; an antibody light chain monomer; an antibody heavy chain monomer; an antibody light chain dimer, an antibody heavy chain dimer; an antibody light chain-antibody heavy chain pair; intrabodies; heteroconjugate antibodies; monovalent antibodies; camelized antibodies; affybodies; anti-idiotypic (anti-Id) antibodies (including, e.g., anti-anti-Id antibodies), and single-domain antibodies (sdAbs), which include binding molecules consisting of a single monomeric variable antibody domain that are fully capable of antigen binding (e.g., a VH domain or a VL domain). Harmen M. M. and Haard H. J. Appl Microbiol Biotechnol. 77(1): 13-22 (2007)).

The term "antigen-binding portion" of an antibody, as used herein, refers to one or more fragments of an antibody that retain the ability to specifically bind to an antigen (e.g., human FAM19A5). Such "fragments" are, for example between about 8 and about 1500 amino acids in length, suitably between about 8 and about 745 amino acids in length, suitably about 8 to about 300, for example about 8 to about 200 amino acids, or about 10 to about 50 or 100 amino acids in length. It has been shown that the antigen-binding function of an antibody can be performed by fragments of a full-length antibody. Examples of binding fragments encompassed within the term "antigen-binding portion" of an antibody, e.g., an anti-FAM19A5 antibody described herein, include (i) a Fab fragment, a monovalent fragment consisting of the VL, VH, CL, and CH1 domains; (ii) a F(ab')2 fragment, a bivalent fragment comprising two Fab fragments linked by a disulfide bridge at the hinge region; (iii) a Fd fragment consisting of the VH and CH1 domains; (iv) a Fv fragment consisting of the VL and VH domains of a single arm of an antibody, and disulfide-linked Fvs (sdFv); (v) a dAb fragment (Ward et al., (1989) *Nature* 341:544-546), which consists of a VH domain; and (vi) an isolated complementarity determining region (CDR) or (vii) a combination of two or more isolated CDRs which can optionally be joined by a synthetic linker. Furthermore, although the two domains of the Fv fragment, VL and VH, are coded for by separate genes, they can be joined, using recombinant methods, by a synthetic linker that enables them to be made as a single protein chain in which the VL and VH regions pair to form monovalent molecules (known as single chain Fv (scFv)); see, e.g., Bird et al., (1988) *Science* 242:423-426; and Huston et al., (1988) *Proc. Natl. Acad. Sci. USA* 85:5879-5883). Such single chain antibodies are also intended to be encompassed within the term "antigen-binding portion" of an antibody. These antibody fragments are obtained using conventional techniques known to those with skill in the art, and the fragments are screened for utility in the same manner as are intact antibodies. Antigen-binding portions can be produced by recombinant DNA techniques, or by enzymatic or chemical cleavage of intact immunoglobulins.

As used herein, the terms "variable region" or "variable domain" are used interchangeably and are common in the art. The variable region typically refers to a portion of an antibody, generally, a portion of a light or heavy chain, typically about the amino-terminal 110 to 120 amino acids in the mature heavy chain and about 90 to 115 amino acids in the mature light chain, which differ extensively in sequence among antibodies and are used in the binding and specificity of a particular antibody for its particular antigen. The variability in sequence is concentrated in those regions called complementarity determining regions (CDRs) while the more highly conserved regions in the variable domain are called framework regions (FR).

Without wishing to be bound by any particular mechanism or theory, it is believed that the CDRs of the light and heavy chains are primarily responsible for the interaction and specificity of the antibody with antigen. In certain embodiments, the variable region is a human variable region. In certain embodiments, the variable region comprises rodent or murine CDRs and human framework regions (FRs). In particular embodiments, the variable region is a primate (e.g., non-human primate) variable region. In certain embodiments, the variable region comprises rodent or murine CDRs and primate (e.g., non-human primate) framework regions (FRs).

As used herein, the term "heavy chain" when used in reference to an antibody can refer to any distinct type, e.g., alpha (α), delta (δ), epsilon (ε), gamma (γ) and mu (μ), based on the amino acid sequence of the constant domain, which give rise to IgA, IgD, IgE, IgG and IgM classes of antibodies, respectively, including subclasses of IgG, e.g., IgG1, IgG2, IgG3 and IgG4.

As used herein, the term "light chain" when used in reference to an antibody can refer to any distinct type, e.g., kappa (κ) or lambda (λ) based on the amino acid sequence of the constant domains. Light chain amino acid sequences are well known in the art. In specific embodiments, the light chain is a human light chain.

The terms "VL" and "VL domain" are used interchangeably to refer to the light chain variable region of an antibody.

The terms "VH" and "VH domain" are used interchangeably to refer to the heavy chain variable region of an antibody.

As used herein, the term "constant region" or "constant domain" are interchangeable and have its meaning common in the art. The constant region is an antibody portion, e.g., a carboxyl terminal portion of a light and/or heavy chain which is not directly involved in binding of an antibody to antigen but which can exhibit various effector functions, such as interaction with the Fc receptor. The constant region of an immunoglobulin molecule generally has a more conserved amino acid sequence relative to an immunoglobulin variable domain.

An "Fc region" (fragment crystallizable region) or "Fc domain" or "Fc" refers to the C-terminal region of the heavy chain of an antibody that mediates the binding of the immunoglobulin to host tissues or factors, including binding to Fc receptors located on various cells of the immune system (e.g., effector cells) or to the first component (C1q) of the classical complement system. Thus, an Fc region comprises the constant region of an antibody excluding the first constant region immunoglobulin domain (e.g., CH1 or CL). In IgG, IgA and IgD antibody isotypes, the Fc region comprises two identical protein fragments, derived from the second (CH2) and third (CH3) constant domains of the antibody's two heavy chains; IgM and IgE Fc regions comprise three heavy chain constant domains (CH domains 2-4) in each polypeptide chain. For IgG, the Fc region comprises immunoglobulin domains Cγ2 and Cγ3 and the hinge between Cγ1 and Cγ2. Although the boundaries of the Fc region of an immunoglobulin heavy chain might vary, the human IgG heavy chain Fc region is usually defined to stretch from an amino acid residue at position C226 or P230 (or amino acid between these two amino acids) to the carboxy-terminus of the heavy chain, wherein the numbering is according to the EU index as in Kabat. The CH2 domain of a human IgG Fc region extends from about amino acid 231 to about amino acid 340, whereas the CH3 domain is positioned on C-terminal side of a Cm domain in an Fc region, i.e., it extends from about amino acid 341 to about amino acid 447 of an IgG. As used herein, the Fc region can be a native sequence Fc, including any allotypic variant, or a variant Fc (e.g., a non-naturally-occurring Fc). Fc can also refer to this region in isolation or in the context of an Fc-comprising protein polypeptide such as a "binding protein comprising an Fc region," also referred to as an "Fc fusion protein" (e.g., an antibody or immunoadhesion).

A "native sequence Fc region" or "native sequence Fc" comprises an amino acid sequence that is identical to the amino acid sequence of an Fc region found in nature. Native sequence human Fc regions include a native sequence human IgG1 Fc region; native sequence human IgG2 Fc region; native sequence human IgG3 Fc region; and native sequence human IgG4 Fc region as well as naturally-occurring variants thereof. Native sequence Fc includes the various allotypes of Fcs (see, e.g., Jefferis et al., (2009)

mAbs 1:1; Vidarsson G. et al. *Front Immunol.* 5:520 (published online Oct. 20, 2014)).

An "Fc receptor" or "FcR" is a receptor that binds to the Fc region of an immunoglobulin. FcRs that bind to an IgG antibody comprise receptors of the FcγR family, including allelic variants and alternatively spliced forms of these receptors. The FcγR family consists of three activating (FcγRI, FcγRIII, and FcγRIV in mice; FcγRIA, FcγRIIA, and FcγRIIIA in humans) and one inhibitory (FcγRIIB) receptor. Human IgG1 binds to most human Fc receptors and elicits the strongest Fc effector functions. It is considered equivalent to murine IgG2a with respect to the types of activating Fc receptors that it binds to. Conversely, human IgG4 elicits the least Fc effector functions. Vidarsson G. et al. *Front Immunol.* 5:520 (published online Oct. 20, 2014).

The constant region can be manipulated, e.g., by recombinant technology, to eliminate one or more effector functions. An "effector function" refers to the interaction of an antibody Fc region with an Fc receptor or ligand, or a biochemical event that results therefrom. Exemplary "effector functions" include C1q binding, complement dependent cytotoxicity (CDC), Fc receptor binding, FcγR-mediated effector functions such as ADCC and antibody dependent cell-mediated phagocytosis (ADCP), and down regulation of a cell surface receptor (e.g., the B cell receptor; BCR). Such effector functions generally require the Fc region to be combined with a binding domain (e.g., an antibody variable domain). Accordingly, the term "a constant region without the Fc function" include constant regions with reduced or without one or more effector functions mediated by Fc region.

Effector functions of an antibody can be reduced or avoided by different approaches. Effector functions of an antibody can be reduced or avoided by using antibody fragments lacking the Fc region (e.g., such as a Fab, F(ab')$_2$, single chain Fv (scFv), or a sdAb consisting of a monomeric VH or VL domain). Alternatively, the so-called aglycosylated antibodies can be generated by removing sugars that are linked to particular residues in the Fc region to reduce the effector functions of an antibody while retaining other valuable attributes of the Fc region (e.g., prolonged half-life and heterodimerization). Aglycosylated antibodies can be generated by, for example, deleting or altering the residue the sugar is attached to, removing the sugars enzymatically, producing the antibody in cells cultured in the presence of a glycosylation inhibitor, or by expressing the antibody in cells unable to glycosylate proteins (e.g., bacterial host cells). See, e.g., U.S. Pub. No. 20120100140. Another approach is to employ Fc regions from an IgG subclass that have reduced effector function, for example, IgG2 and IgG4 antibodies are characterized by having lower levels of Fc effector functions than IgG1 and IgG3. The residues most proximal to the hinge region in the CH2 domain of the Fc part are responsible for effector functions of antibodies as it contains a largely overlapping binding site for C1q (complement) and IgG-Fc receptors (FcγR) on effector cells of the innate immune system. Vidarsson G. et al. *Front Immunol.* 5:520 (published online Oct. 20, 2014). Accordingly, antibodies with reduced or without Fc effector functions can be prepared by generating, e.g., a chimeric Fc region which comprises a CH2 domain from an IgG antibody of the IgG4 isotype and a CH3 domain from an IgG antibody of the IgG1 isotype, or a chimeric Fc region which comprises hinge region from IgG2 and CH2 region from IgG4 (see, e.g., Lau C. et al. *J. Immunol.* 191:4769-4777 (2013)), or an Fc region with mutations that result in altered Fc effector functions, e.g., reduced or no Fc functions. Such Fc regions with mutations are known in the art. See, e.g., U.S. Pub. No. 20120100140 and U.S. and PCT applications cited therein and An et al., *mAbs* 1:6, 572-579 (2009); the disclosures of which are incorporated by reference to their entirety.

A "hinge", "hinge domain", "hinge region", or "antibody hinge region" are used interchangeably and refer to the domain of a heavy chain constant region that joins the CH1 domain to the CH2 domain and includes the upper, middle, and lower portions of the hinge (Roux et al., *J. Immunol.* 1998 161:4083). The hinge provides varying levels of flexibility between the binding and effector regions of an antibody and also provides sites for intermolecular disulfide bonding between the two heavy chain constant regions. As used herein, a hinge starts at Glu216 and ends at Gly237 for all IgG isotypes (Roux et al., 1998 *J Immunol* 161:4083). The sequences of wild-type IgG1, IgG2, IgG3 and IgG4 hinges are known in the art. See, e.g., Kabat E A et al., (1991) Sequences of Proteins of Immunological Interest, Fifth Edition, U.S. Department of Health and Human Services, NIH Publication No. 91-3242; Vidarsson G. et al. *Front Immunol.* 5:520 (published online Oct. 20, 2014).

The term "CH1 domain" refers to the heavy chain constant region linking the variable domain to the hinge in a heavy chain constant domain. As used herein, a CH1 domain starts at A118 and ends at V215. The term "CH1 domain" includes wildtype CH1 domains, as well as naturally existing variants thereof (e.g., allotypes). CH1 domain sequences of IgG1, IgG2, IgG3, and IgG4 (including wildtype and allotypes) are known in the art. See, e.g., Kabat E A et al., (1991) supra and Vidarsson G. et al. *Front Immunol.* 5:520 (published online Oct. 20, 2014). Exemplary CH1 domains include CH1 domains with mutations that modify a biological activity of an antibody, e.g., half-life, e.g., described in U.S. Pub. No. 20120100140 and U.S. patents and publications and PCT publications cited therein.

The term "CH2 domain" refers to the heavy chain constant region linking the hinge to the CH3 domain in a heavy chain constant domain. As used herein, a CH2 domain starts at P238 and ends at K340. The term "CH2 domain" includes wildtype CH2 domains, as well as naturally existing variants thereof (e.g., allotypes). CH2 domain sequences of IgG1, IgG2, IgG3, and IgG4 (including wildtype and allotypes) are known in the art. See, e.g., Kabat E A et al., (1991) supra and Vidarsson G. et al. *Front Immunol.* 5:520 (published online Oct. 20, 2014). Exemplary CH2 domains include CH2 domains with mutations that modify a biological activity of an antibody, e.g., half-life and/or reduced Fc effector function, e.g., described in U.S. Pub. No. 20120100140 and U.S. patents and publications and PCT publications cited therein.

The term "CH3 domain" refers to the heavy chain constant region that is C-terminal to the CH2 domain in a heavy chain constant domain. As used herein, a CH3 domain starts at G341 and ends at K447. The term "CH3 domain" includes wildtype CH3 domains, as well as naturally existing variants thereof (e.g., allotypes). CH3 domain sequences of IgG1, IgG2, IgG3, and IgG4 (including wildtype and allotypes) are known in the art. See, e.g., Kabat E A et al., (1991) supra and Vidarsson G. et al. *Front Immunol.* 5:520 (published online Oct. 20, 2014). Exemplary CH3 domains include CH3 domains with mutations that modify a biological activity of an antibody, e.g., half-life, e.g., described in U.S. Pub. No. 20120100140 and U.S. patents and publications and PCT publications cited therein.

As used herein, "isotype" refers to the antibody class (e.g., IgG1, IgG2, IgG3, IgG4, IgM, IgA1, IgA2, IgD, and IgE antibody) that is encoded by the heavy chain constant region genes.

"Allotype" refers to naturally-occurring variants within a specific isotype group, which variants differ in a few amino acids (see, e.g., Jefferis et al., (2009) *mAbs* 1:1). Antibodies described herein can be of any allotype. Allotypes of IgG1, IgG2, IgG3, and IgG4 are known in the art. See, e.g., Kabat E A et al., (1991) supra; Vidarsson G. et al. *Front Immunol.* 5:520 (published online Oct. 20, 2014); and Lefranc M P, *mAbs* 1:4, 1-7(2009).

The phrases "an antibody recognizing an antigen" and "an antibody specific for an antigen" are used interchangeably herein with the term "an antibody which binds specifically to an antigen."

An "isolated antibody," as used herein, is intended to refer to an antibody which is substantially free of other antibodies having different antigenic specificities (e.g., an isolated antibody that specifically binds to FAM19A5 is substantially free of antibodies that specifically bind antigens other than FAM19A5). An isolated antibody that specifically binds to an epitope of FAM19A5 can, however, have cross-reactivity to other FAM19A5 proteins from different species.

"Binding affinity" generally refers to the strength of the sum total of non-covalent interactions between a single binding site of a molecule (e.g., an antibody) and its binding partner (e.g., an antigen). Unless indicated otherwise, as used herein, "binding affinity" refers to intrinsic binding affinity which reflects a 1:1 interaction between members of a binding pair (e.g., antibody and antigen). The affinity of a molecule X for its partner Y can generally be represented by the dissociation constant ($K_D$). Affinity can be measured and/or expressed in a number of ways known in the art, including, but not limited to, equilibrium dissociation constant ($K_D$), and equilibrium association constant ($K_A$). The $K_D$ is calculated from the quotient of $k_{off}/k_{on}$ and is expressed as a molar concentration (M), whereas $K_A$ is calculated from the quotient of $k_{on}/k_{off}$. $k_{on}$ refers to the association rate constant of, e.g., an antibody to an antigen, and $k_{off}$ refers to the dissociation of, e.g., an antibody to an antigen. The $k_{on}$ and $k_{off}$ can be determined by techniques known to one of ordinary skill in the art, such as immunoassays (e.g., enzyme-linked immunosorbent assay (ELISA)), BIACORE® or kinetic exclusion assay) (KINEXA®).

As used herein, the terms "specifically binds," "specifically recognizes," "specific binding," "selective binding," and "selectively binds," are analogous terms in the context of antibodies and refer to molecules (e.g., antibodies) that bind to an antigen (e.g., epitope or immune complex) as such binding is understood by one skilled in the art. For example, a molecule that specifically binds to an antigen can bind to other peptides or polypeptides, generally with lower affinity as determined by, e.g., immunoassays, BIACORE®, KINEXA® 3000 instrument (Sapidyne Instruments, Boise, ID), or other assays known in the art. In a specific embodiment, molecules that specifically bind to an antigen bind to the antigen with a $K_A$ that is at least 2 logs, 2.5 logs, 3 logs, 4 logs or greater than the $K_A$ when the molecules bind to another antigen.

Antibodies typically bind specifically to their cognate antigen with high affinity, reflected by a dissociation constant ($K_D$) of $10^{-5}$ to $10^{-11}$ M or less. Any $K_D$ greater than about $10^{-4}$ M is generally considered to indicate nonspecific binding. As used herein, an antibody that "binds specifically" to an antigen refers to an antibody that binds to the antigen and substantially identical antigens with high affinity, which means having a $K_D$ of $10^{-7}$ M or less, preferably $10^{-8}$ M or less, even more preferably $10^{-9}$ M or less, and most preferably between $10^{-8}$ M and $10^{-10}$ M or less, when determined by, e.g., immunoassays (e.g., ELISA) or surface plasmon resonance (SPR) technology in a BIACORE™ 2000 instrument using the predetermined antigen, but does not bind with high affinity to unrelated antigens.

As used herein, the term "antigen" refers to any natural or synthetic immunogenic substance, such as a protein, peptide, or hapten. An antigen can be FAM19A5 or a fragment thereof.

As used herein, an "epitope" is a term in the art and refers to a localized region of an antigen to which an antibody can specifically bind. An epitope can be, for example, contiguous amino acids of a polypeptide (linear or contiguous epitope) or an epitope can, for example, come together from two or more non-contiguous regions of a polypeptide or polypeptides (conformational, non-linear, discontinuous, or non-contiguous epitope). Epitopes formed from contiguous amino acids are typically, but not always, retained on exposure to denaturing solvents, whereas epitopes formed by tertiary folding are typically lost on treatment with denaturing solvents. An epitope typically includes at least 1, 2, 3, 4, 5, 6, 7, 8, 9, 10, 11, 12, 13, 14, 15, or 20 amino acids in a unique spatial conformation. Methods for determining what epitopes are bound by a given antibody (i.e., epitope mapping) are well known in the art and include, for example, immunoblotting and immunoprecipitation assays, wherein overlapping or contiguous peptides from (e.g., from FAM19A5) are tested for reactivity with a given antibody (e.g., anti-FAM19A5 antibody). Methods of determining spatial conformation of epitopes include techniques in the art and those described herein, for example, x-ray crystallography, 2-dimensional nuclear magnetic resonance and HDX-MS (see, e.g., Epitope Mapping Protocols in Methods in Molecular Biology, Vol. 66, G. E. Morris, Ed. (1996)).

In certain embodiments, the epitope to which an antibody binds can be determined by, e.g., NMR spectroscopy, X-ray diffraction crystallography studies, ELISA assays, hydrogen/deuterium exchange coupled with mass spectrometry (e.g., liquid chromatography electrospray mass spectrometry), array-based oligo-peptide scanning assays, and/or mutagenesis mapping (e.g., site-directed mutagenesis mapping). For X-ray crystallography, crystallization can be accomplished using any of the known methods in the art (e.g., Giege R et al., (1994) *Acta Crystallogr D Biol Crystallogr* 50(Pt 4): 339-350; McPherson A (1990) *Eur J Biochem* 189: 1-23; Chayen N E (1997) *Structure* 5: 1269-1274; McPherson A (1976) *J Biol Chem* 251: 6300-6303). Antibody:antigen crystals can be studied using well known X-ray diffraction techniques and can be refined using computer software such as X-PLOR (Yale University, 1992, distributed by Molecular Simulations, Inc.; see, e.g., Meth Enzymol (1985) volumes 114 & 115, eds Wyckoff H W et al., U.S. 2004/0014194), and BUSTER (Bricogne G (1993) *Acta Crystallogr D Biol Crystallogr* 49(Pt 1): 37-60; Bricogne G (1997) *Meth Enzymol* 276A: 361-423, ed Carter C W; Roversi P et al., (2000) *Acta Crystallogr D Biol Crystallogr* 56(Pt 10): 1316-1323). Mutagenesis mapping studies can be accomplished using any method known to one of skill in the art. See, e.g., Champe M et al., (1995) J Biol Chem 270: 1388-1394 and Cunningham B C & Wells J A (1989) *Science* 244: 1081-1085 for a description of mutagenesis techniques, including alanine scanning mutagenesis techniques.

The term "epitope mapping" refers to the process of identification of the molecular determinants for antibody-antigen recognition.

The term "binds to the same epitope" with reference to two or more antibodies means that the antibodies bind to the same segment of amino acid residues, as determined by a given method. Techniques for determining whether antibodies bind to the "same epitope on FAM19A5" with the antibodies described herein include, for example, epitope mapping methods, such as, x-ray analyses of crystals of antigen:antibody complexes which provides atomic resolution of the epitope and hydrogen/deuterium exchange mass spectrometry (HDX-MS). Other methods monitor the binding of the antibody to antigen fragments or mutated variations of the antigen where loss of binding due to a modification of an amino acid residue within the antigen sequence is often considered an indication of an epitope component. In addition, computational combinatorial methods for epitope mapping can also be used. These methods rely on the ability of the antibody of interest to affinity isolate specific short peptides from combinatorial phage display peptide libraries. Antibodies having the same VH and VL or the same CDR1, 2 and 3 sequences are expected to bind to the same epitope.

Antibodies that "compete with another antibody for binding to a target" refer to antibodies that inhibit (partially or completely) the binding of the other antibody to the target. Whether two antibodies compete with each other for binding to a target, i.e., whether and to what extent one antibody inhibits the binding of the other antibody to a target, can be determined using known competition experiments. In certain embodiments, an antibody competes with, and inhibits binding of another antibody to a target by at least 10%, 20%, 30%, 40%, 50%, 60%, 70%, 80%, 90% or 100%. The level of inhibition or competition can be different depending on which antibody is the "blocking antibody" (i.e., the cold antibody that is incubated first with the target). Competition assays can be conducted as described, for example, in Ed Harlow and David Lane, Cold Spring Harb Protoc; 2006; doi: 10.1101/pdb.prot4277 or in Chapter 11 of "Using Antibodies" by Ed Harlow and David Lane, Cold Spring Harbor Laboratory Press, Cold Spring Harbor, NY, USA 1999. Competing antibodies bind to the same epitope, an overlapping epitope or to adjacent epitopes (e.g., as evidenced by steric hindrance).

Other competitive binding assays include: solid phase direct or indirect radioimmunoassay (RIA), solid phase direct or indirect enzyme immunoassay (EIA), sandwich competition assay (see Stahli et al., *Methods in Enzymology* 9:242 (1983)); solid phase direct biotin-avidin EIA (see Kirkland et al., *J. Immunol.* 137:3614 (1986)); solid phase direct labeled assay, solid phase direct labeled sandwich assay (see Harlow and Lane, Antibodies: A Laboratory Manual, Cold Spring Harbor Press (1988)); solid phase direct label MA using 1-125 label (see Morel et al., *Mol. Immunol.* 25(1):7 (1988)); solid phase direct biotin-avidin EIA (Cheung et al., *Virology* 176:546 (1990)); and direct labeled MA. (Moldenhauer et al., *Scand. J. Immunol.* 32:77 (1990)).

A "bispecific" or "bifunctional antibody" is an artificial hybrid antibody having two different heavy/light chain pairs and two different binding sites. Bispecific antibodies can be produced by a variety of methods including fusion of hybridomas or linking of Fab' fragments. See, e.g., Songsivilai & Lachmann, *Clin. Exp. Immunol.* 79:315-321 (1990); Kostelny et al., *J. Immunol.* 148, 1547-1553 (1992).

The term "monoclonal antibody," as used herein, refers to an antibody that displays a single binding specificity and affinity for a particular epitope or a composition of antibodies in which all antibodies display a single binding specificity and affinity for a particular epitope. Accordingly, the term "human monoclonal antibody" refers to an antibody or antibody composition that display(s) a single binding specificity and which has variable and optional constant regions derived from human germline immunoglobulin sequences. In one embodiment, human monoclonal antibodies are produced by a hybridoma which includes a B cell obtained from a transgenic non-human animal, e.g., a transgenic mouse, having a genome comprising a human heavy chain transgene and a light chain transgene fused to an immortalized cell.

The term "recombinant human antibody," as used herein, includes all human antibodies that are prepared, expressed, created or isolated by recombinant means, such as (a) antibodies isolated from an animal (e.g., a mouse) that is transgenic or transchromosomal for human immunoglobulin genes or a hybridoma prepared therefrom, (b) antibodies isolated from a host cell transformed to express the antibody, e.g., from a transfectoma, (c) antibodies isolated from a recombinant, combinatorial human antibody library, and (d) antibodies prepared, expressed, created or isolated by any other means that involve splicing of human immunoglobulin gene sequences to other DNA sequences. Such recombinant human antibodies comprise variable and constant regions that utilize particular human germline immunoglobulin sequences are encoded by the germline genes, but include subsequent rearrangements and mutations which occur, for example, during antibody maturation. As known in the art (see, e.g., Lonberg (2005) *Nature Biotech.* 23(9): 1117-1125), the variable region contains the antigen binding domain, which is encoded by various genes that rearrange to form an antibody specific for a foreign antigen. In addition to rearrangement, the variable region can be further modified by multiple single amino acid changes (referred to as somatic mutation or hypermutation) to increase the affinity of the antibody to the foreign antigen. The constant region will change in further response to an antigen (i.e., isotype switch). Therefore, the rearranged and somatically mutated nucleic acid molecules that encode the light chain and heavy chain immunoglobulin polypeptides in response to an antigen cannot have sequence identity with the original nucleic acid molecules, but instead will be substantially identical or similar (i.e., have at least 80% identity).

A "human antibody" (HuMAb) refers to an antibody having variable regions in which both the framework and CDR regions are derived from human germline immunoglobulin sequences. Furthermore, if the antibody contains a constant region, the constant region also is derived from human germline immunoglobulin sequences. The antibodies described herein can include amino acid residues not encoded by human germline immunoglobulin sequences (e.g., mutations introduced by random or site-specific mutagenesis in vitro or by somatic mutation in vivo). However, the term "human antibody", as used herein, is not intended to include antibodies in which CDR sequences derived from the germline of another mammalian species, such as a mouse, have been grafted onto human framework sequences. The terms "human" antibodies and "fully human" antibodies are used synonymously.

A "humanized antibody" refers to an antibody in which some, most or all of the amino acids outside the CDR domains of a non-human antibody are replaced with corresponding amino acids derived from human immunoglobulins. In one embodiment of a humanized form of an antibody, some, most or all of the amino acids outside the CDR domains have been replaced with amino acids from human immunoglobulins, whereas some, most or all amino acids within one or more CDR regions are unchanged. Small additions, deletions, insertions, substitutions or modifications of amino acids are permissible as long as they do not abrogate the ability of the antibody to bind to a particular antigen. A "humanized" antibody retains an antigenic specificity similar to that of the original antibody.

A "chimeric antibody" refers to an antibody in which the variable regions are derived from one species and the constant regions are derived from another species, such as an antibody in which the variable regions are derived from a mouse antibody and the constant regions are derived from a human antibody.

The term "cross-reacts," as used herein, refers to the ability of an antibody described herein to bind to FAM19A5 from a different species. For example, an antibody described herein that binds human FAM19A5 can also bind another species of FAM19A5 (e.g., mouse FAM19A5). As used herein, cross-reactivity can be measured by detecting a specific reactivity with purified antigen in binding assays (e.g., SPR, ELISA) or binding to, or otherwise functionally interacting with, cells physiologically expressing FAM19A5. Methods for determining cross-reactivity include standard binding assays as described herein, for example, by BIACORE® surface plasmon resonance (SPR) analysis using a BIACORE® 2000 SPR instrument (Biacore AB, Uppsala, Sweden), or flow cytometric techniques.

The term "naturally-occurring" as applied to an object herein refers to the fact that an object can be found in nature. For example, a polypeptide or polynucleotide sequence that is present in an organism (including viruses) that can be isolated from a source in nature and which has not been intentionally modified by man in the laboratory is naturally-occurring.

A "polypeptide" refers to a chain comprising at least two consecutively linked amino acid residues, with no upper limit on the length of the chain. One or more amino acid residues in the protein can contain a modification such as, but not limited to, glycosylation, phosphorylation or disulfide bond formation. A "protein" can comprise one or more polypeptides.

The term "nucleic acid molecule," as used herein, is intended to include DNA molecules and RNA molecules. A nucleic acid molecule can be single-stranded or double-stranded, and can be cDNA.

The term "vector," as used herein, is intended to refer to a nucleic acid molecule capable of transporting another nucleic acid to which it has been linked. One type of vector is a "plasmid," which refers to a circular double stranded DNA loop into which additional DNA segments can be ligated. Another type of vector is a viral vector, wherein additional DNA segments can be ligated into the viral genome. Certain vectors are capable of autonomous replication in a host cell into which they are introduced (e.g., bacterial vectors having a bacterial origin of replication and episomal mammalian vectors). Other vectors (e.g., non-episomal mammalian vectors) can be integrated into the genome of a host cell upon introduction into the host cell, and thereby are replicated along with the host genome. Moreover, certain vectors are capable of directing the expression of genes to which they are operatively linked. Such vectors are referred to herein as "recombinant expression vectors" (or simply, "expression vectors"). In general, expression vectors of utility in recombinant DNA techniques are often in the form of plasmids. In the present specification, "plasmid" and "vector" can be used interchangeably as the plasmid is the most commonly used form of vector. However, also included are other forms of expression vectors, such as viral vectors (e.g., replication defective retroviruses, adenoviruses and adeno-associated viruses), which serve equivalent functions.

The term "recombinant host cell" (or simply "host cell"), as used herein, is intended to refer to a cell that comprises a nucleic acid that is not naturally present in the cell, and can be a cell into which a recombinant expression vector has been introduced. It should be understood that such terms are intended to refer not only to the particular subject cell but to the progeny of such a cell. Because certain modifications can occur in succeeding generations due to either mutation or environmental influences, such progeny cannot, in fact, be identical to the parent cell, but are still included within the scope of the term "host cell" as used herein.

As used herein, the term "linked" refers to the association of two or more molecules. The linkage can be covalent or non-covalent. The linkage also can be genetic (i.e., recombinantly fused). Such linkages can be achieved using a wide variety of art recognized techniques, such as chemical conjugation and recombinant protein production.

As used herein, "administering" refers to the physical introduction of a therapeutic agent or a composition comprising a therapeutic agent to a subject, using any of the various methods and delivery systems known to those skilled in the art. Preferred routes of administration for antibodies described herein include intravenous, intraperitoneal, intramuscular, subcutaneous, spinal or other parenteral routes of administration, for example by injection or infusion. The phrase "parenteral administration" as used herein means modes of administration other than enteral and topical administration, usually by injection, and includes, without limitation, intravenous, intraperitoneal, intramuscular, intraarterial, intrathecal, intralymphatic, intralesional, intracapsular, intraorbital, intracardiac, intradermal, transtracheal, subcutaneous, subcuticular, intraarticular, subcapsular, subarachnoid, intraventricle, intravitreal, epidural and intrasternal injection and infusion, as well as in vivo electroporation. Alternatively, an antibody described herein can be administered via a non-parenteral route, such as a topical, epidermal or mucosal route of administration, for example, intranasally, orally, vaginally, rectally, sublingually or topically. Administering can also be performed, for example, once, a plurality of times, and/or over one or more extended periods.

The terms "treat," "treating," and "treatment," as used herein, refer to any type of intervention or process performed on, or administering an active agent to, the subject with the objective of reversing, alleviating, ameliorating, inhibiting, or slowing down or preventing the progression, development, severity or recurrence of a symptom, complication, condition or biochemical indicia associated with a disease. Treatment can be of a subject having a disease or a subject who does not have a disease (e.g., for prophylaxis).

As used herein, the term "subject" includes any human or non-human animal. The term "non-human animal" includes all vertebrates, e.g., mammals and non-mammals, such as non-human primates, sheep, dog, cow, chickens, amphibians, reptiles, etc.

As used herein, the term "onset of gliosis" or "onset of reactive gliosis" includes the beginning or initiation of gliosis. Gliosis is a nonspecific reactive change of glial cells in the central nervous system (CNS, e.g., brain and/or the spinal cord) in response to injury or damage from e.g., trauma, cerebrospinal damage, brain tumor, infection, ischemia, stroke, autoimmune responses, and/or neurodegenerative diseases, and includes the proliferation or hypertrophy of several different types of glial cells, including astrocytes, microglia, and oligodendrocytes. Onset of gliosis can lead to scar formation, which inhibits axonal regeneration in the part of the CNS that has been traumatized or injured.

Detrimental effects of an onset of gliosis include irreversible or permanent damage to the neurons and/or prevention of the surrounding neurons from recovering. Accordingly, the terms "delay an onset of gliosis" and "delay an onset of reactive gliosis" include inhibit, slow down, suppress, or prevent the beginning or initiation of gliosis and its associated detrimental effects of the CNS.

As used herein, the term "excessive proliferation of reactive astrocytes" includes an abnormal increase in the number of astrocytes due to the destruction of nearby neurons from e.g., CNS damage, trauma, injury, cerebrospinal damage, brain tumor, infection, ischemia, stroke, autoimmune responses, and/or neurodegenerative disease. Excessive proliferation of reactive astrocytes can lead to detrimental effects in the CNS including scar formation, which inhibits axonal regeneration in the part of the CNS that has been traumatized or injured, exacerbation of inflammation, production and release of neurotoxic levels of reactive oxygen species, release of potentially excitotoxic glutamate, the potential contribution to seizure genesis, compromise of blood-brain barrier function, cytotoxic edema during trauma and stroke, potential for chronic cytokine activation of astrocytes to contribute to chronic pain, and secondary degeneration after CNS injury. Sofroniew, Michael V. (2009) *Trends in Neurosciences*, 32(12):638-47; McGraw, J. et al. (2001) *Journal of Neuroscience Research* 63(2):109-15; and Sofroniew, M. V. (2005) *The Neuroscientist* 11(5): 400-7. Accordingly, the terms "suppress excessive proliferation of reactive astrocytes" includes inhibit, slowing down, suppress, curb, or prevent excessive or abnormal proliferation of reactive astrocytes and its associated detrimental effects of the CNS.

As used herein, the term "chondroitin sulfate proteoglycans" includes proteoglycans composed of a protein core and a chondroitin sulfate. Chondroitin sulfate proteoglycans, also known as CSPGs, are extracellular matrix molecules widely expressed throughout the developing and adult CNS. CSGPs play key roles in neural development and glial scar formation, and they inhibit axon regeneration after injury in the CNS. Known CSPGs include aggrecan (CSPG1), versican (CSPG2), neurocan (CSPG3), CSPG4 (or neuron-glial antigen 2 (NG2)), CSPG5, SMC3 (CSPG6, structural maintenance of chromosomes 3), brevican (CSPG7), and CD44 (CSPG8, cluster of differentiation 44), phosphacanneurocan (CSPG3). Rhodes, K. E. and Fawcett, J. W. (2004) *Journal of Anatom.* 204(1):33-48. Thus, the term "decrease expression of chondroitin sulfate proteoglycans" includes decrease, inhibit, reduce the level of one or more CSGPs, or reduce the activity of or render inactive one or more CSGPs. In certain embodiments, the term includes decrease, inhibit, reduce the level of neurocan, NG2, or both, or reduce the activity of or render inactive neurocan, NG2, or both.

As used herein, the term "neuron" includes electrically excitable cells that process and transmit information through electrical and chemical signals. Neurons are the major components of the brain and spinal cord of the CNS, and of the ganglia of the peripheral nervous system (PNS), and can connect to each other to form neural networks. A typical neuron is composed of a cell body (soma), dendrites, and an axon. The soma (the cell body) of a neuron contains the nucleus. The dendrites of a neuron are cellular extensions with many branches, where the majority of input to the neuron occurs. The axon is a finer, cable-like projection extending from the soma and carries nerve signals away from the soma and certain types of information back to the soma. The term "promote regrowth of neuron" includes stimulating, promoting, increasing, or activating growth of neurons, preferably after injury or damage.

As used herein, the term "c-fos" includes the protooncogene c-fos, which is rapidly induced by stimulation of a neurotransmitter. c-fos exists in many species including mouse and human. The c-fos gene and protein are known and characterized. See Curran, T, The c-fos protooncogene, pp 307-327 (The Oncogene Handbook, Reddy E P et al., (eds.) Elsevier)(1988). The expression of c-fos can be determined by methods known in the art, e.g., Northern blot, quantitative PCR, or immunohistochemistry. The term "increases expression of c-fos" includes increase the level of c-fos mRNA, c-fos protein, or c-fos protein activity.

As used herein, the term "pERK" includes phosphorylated extracellular signal-regulated kinase. Extracellular signal-regulated kinase or ERK, includes ERK1 and ERK2, is a member of mitogen-activated protein kinase (MAPK) family. ERK is activated via phosphorylation by its upstream kinase to form pERK, which then activates down-stream targets. ERK is involved in neural and synaptic plasticity underlying learning, and memory and pain hypersensitivity. Ji R. R. et al., *Nat Neurosci* (1999) 2:1114-1119. The ERK gene, protein, phosphorylation, and activation are known and characterized, and the expression of ERK and pERK can be determined by methods known in the art (e.g., Northern blot, quantitative PCR, or immunohistochemistry). See Gao Y. J. and Ji R. R., Open Pain J. (2009) 2:11-17. The term "increase expression of pERK" includes increase the level of ERK mRNA, ERK protein, or pERK activity.

As used herein, the term "GAP43," also known as "growth Associated Protein 43," is a nervous tissue-specific protein that promotes neurite formation, regeneration, and plasticity. Benowitz L. I. and Routtenberg A. (1997) *Trends in Neurosciences* 20 (2): 84-91; Aarts L. H. et al., (1998) *Advances in Experimental Medicine and Biology* 446: 85-106. The human GAP43 is encoded by the GAP43 gene. Human GAP43 polypeptide sequence (UniProt: KB—P17677) and the cDNA sequence encoding the polypeptide are known in the art. Kosik K. S. et al., (1988) *Neuron* 1(2):127-32; Ng S. C. et al., (1988) *Neuron* 1(2): 133-9. The expression of GAP43 can be determined by methods known in the art (e.g., Northern blot, quantitative PCR, or immunohistochemistry). The term "increase GAP43 in neurons" includes enhancing or increasing the level of GAP43 mRNA, GAP43 protein, or increasing the activity of GAP43 protein.

The term "therapeutically effective amount" as used herein refers to an amount of a drug, alone or in combination with another therapeutic agent, effective to "treat" a disease or disorder in a subject or reduce the risk, potential, possibility or occurrence of a disease or disorder (e.g., a central nervous system damage). A "therapeutically effective amount" includes an amount of a drug or a therapeutic agent that provides some improvement or benefit to a subject having or at risk of having a disease or disorder (e.g., a central nervous system damage such as a traumatic brain injury or other disease disclosed herein). Thus, a "therapeutically effective" amount is an amount that reduces the risk, potential, possibility or occurrence of a disease or provides disorder or some alleviation, mitigation, and/or reduces at least one indicator (e.g., an onset of gliosis), and/or decrease in at least one clinical symptom of a disease or disorder.

II. Anti-FAM19A5 Antibodies

Disclosed herein are antibodies, e.g., monoclonal antibodies, which are characterized by particular functional features or properties. For example, the antibodies specifically bind human FAM19A5, including soluble FAM19A5 and membrane bound FAM19A5. In addition to binding specifically to soluble and/or membrane bound human FAM19A5, the antibodies described herein exhibit one or more of the following functional properties:

(a) reduces, reverses, and/or prevents fibrosis;
(b) reduces formation of excessive extracellular matrix (ECM);
(c) delays tumor growth or progression;
(d) binds to soluble human FAM19A5 with a $K_D$ of 10 nM or less as measured by enzyme-linked immunosorbent assay (ELISA);
(e) binds to membrane bound human FAM19A5 with a $K_D$ of 10 nM or less as measured by ELISA;
(f) reduces, reverses, delays, and/or prevents an onset of reactive gliosis;
(g) suppresses an excessive proliferation of reactive astrocytes;
(h) decreases expression of chondroitin sulfate proteoglycans including neurocan and neuron-glial antigen 2 (NG2);
(i) increases expression of c-fos and pERK in the nucleus of neurons;
(j) promotes survival of neurons;
(k) increases expression of GAP43 in neurons; and
(l) promotes regrowth of an axon.

In some embodiments, the anti-FAM19A5 antibody or antigen-binding portion thereof specifically binds to soluble human FAM19A5 or membrane-bound human with high affinity, for example, with a $K_D$ of $10^{-7}$ M or less, $10^{-8}$ M or less, $10^{-9}$ M (1 nM) or less, $10^{-10}$ M (0.1 nM) or less, $10^{-11}$ M or less, or $10^{-12}$ M (1 pM) or less, e.g., 1012 M to $10^{-7}$ M, $10^{-11}$ M to $10^{-7}$ M, $10^{-10}$ M to $10^{-7}$ M, or $10^{-9}$ M to $10^{-7}$ M, e.g., $10^{-12}$ M, $5\times10^{-12}$ M, $10^{-11}$ M, $5\times10^{-11}$ M, $10^{-10}$ M, $5\times10^{-10}$ M, $10^{-9}$ M, $5\times10^{-9}$ M, $10^{-8}$ M, $5\times10^{-8}$ M, $10^{-7}$ M, or $5\times10^{-7}$ M. Standard assays to evaluate the binding ability of the antibody toward human FAM19A5 of various species are known in the art, including for example, ELISAs, Western blots, and RIAs. Suitable assays are described in detail in the Examples. The binding kinetics (e.g., binding affinity) of the antibodies also can be assessed by standard assays known in the art, such as by ELISA, BIACORE® analysis, or KINEXA®. Assays to evaluate the effects of the antibodies on functional properties of FAM19A5 (e.g., ligand binding) are described in further detail infra and in the Examples.

In some embodiments, the anti-FAM19A5 antibody or antigen-binding portion thereof binds to soluble human FAM19A5 with a $K_D$, e.g., as determined by ELISA, of $10^{-7}$ M or less, $10^{-8}$ M (10 nM) or less, $10^{-9}$ M (1 nM) or less, $10^{-10}$ M or less, $10^{-12}$ M to $10^{-7}$ M, $10^{-11}$ M to $10^{-7}$ M, $10^{-10}$ M to $10^{-7}$ M, $10^{-9}$ M to $10^{-7}$ M, or $10^{-8}$ M to $10^{-7}$ M. In some embodiments, the anti-FAM19A5 antibody or antigen-binding portion thereof binds to soluble FAM19A5 with a $K_D$ of 10 nM or less, e.g., between 0.1 and 10 nM, between 0.1 and 5 nM, between 0.1 and 1 nM, between 0.5 and 10 nM, between 0.5 and 5 nM, between 0.5 and 1 nM, between 1 and 10 nM, between 1 and 5 nM, or between 5 and 10 nM. In some embodiments, the anti-FAM19A5 antibody or antigen-binding portion thereof specifically binds to soluble human FAM19A5 with a $K_D$ of about 1 pM, 2 pM, 3 pM, 4 pM, 5 pM, 6 pM, 7 pM, 8 pM, 9 pM, 10 pM, 20 pM, 30 pM, 40 pM, 50 pM, 60 pM, 70 pM, 80 pM, 90 pM, 100 pM, 200 pM, 300 pM, 400 pM, 500 pM, 600 pM, 700 pM, 800 pM, or 900 pM, or about 1 nM, 2 nM, 3 nM, 4 nM, 5 nM, 6 nM, 7 nM, 8 nM, or 9 nM, or about 10 nM, 20 nM, 30 nM, 40 nM, 50 nM, 60 nM, 70 nM, 80 nM, or 90 nM, as determined by as determined by ELISA.

In some embodiments, the anti-FAM19A5 antibody or antigen-binding portion thereof binds to membrane-bound human with a $K_D$, e.g., as determined by ELISA, of $10^{-7}$ M or less, $10^{-8}$ M (10 nM) or less, $10^{-9}$ M (1 nM) or less, $10^{-10}$ M or less, $10^{-12}$ M to $10^{-7}$ M, $10^{-11}$ M to $10^{-7}$ M, $10^{-10}$ M to $10^{-7}$ M, $10^{-9}$ M to $10^{-7}$ M, or $10^{-8}$ M to $10^{-7}$ M. In certain embodiments, the anti-FAM19A5 antibody or antigen-binding portion thereof specifically binds to membrane-bound human FAM19A5 with a $K_D$ of 10 nM or less as determined by ELISA, e.g., between 0.1 and 10 nM, between 0.1 and 5 nM, between 0.1 and 1 nM, between 0.5 and 10 nM, between 0.5 and 5 nM, between 0.5 and 1 nM, between 1 and 10 nM, between 1 and 5 nM, or between 5 and 10 nM. In some embodiments, the anti-FAM19A5 antibody or antigen-binding portion thereof binds to membrane-bound human FAM19A5 with a $K_D$ of about 1 pM, 2 pM, 3 pM, 4 pM, 5 pM, 6 pM, 7 pM, 8 pM, 9 pM, 10 pM, 20 pM, 30 pM, 40 pM, 50 pM, 60 pM, 70 pM, 80 pM, 90 pM, 100 pM, 200 pM, 300 pM, 400 pM, 500 pM, 600 pM, 700 pM, 800 pM, or 900 pM, or about 1 nM, 2 nM, 3 nM, 4 nM, 5 nM, 6 nM, 7 nM, 8 nM, or 9 nM, or about 10 nM, 20 nM, 30 nM, 40 nM, 50 nM, 60 nM, 70 nM, 80 nM, or 90 nM, as determined by as determined by ELISA.

An anti-FAM19A5 antibody or antigen-binding portion thereof of the present disclosure can reduce, prevent, reverse, delay, or inhibit onset of reactive gliosis, e.g., delay, slow down, or suppress a nonspecific reactive change of glial cells in the central nervous system (CNS, e.g., brain and/or the spinal cord) in response to injury or damage from, e.g., trauma, cerebrospinal damage, brain tumor, infection, ischemia, stroke, autoimmune responses, and/or neurodegenerative disease.

An anti-FAM19A5 antibody or antigen-binding portion thereof of the present disclosure can delay, inhibit, slowing down, suppress, curb, or prevent excessive or abnormal proliferation of reactive astrocytes and its associated detrimental effects of the CNS. For example, an anti-FAM19A5 antibody or antigen-binding portion thereof of the present disclosure can inhibit or prevent abnormal increase in the number of astrocytes due to the destruction of neurons from e.g., CNS damage, trauma, injury, cerebrospinal damage, brain tumor, infection, ischemia, stroke, autoimmune responses, and/or neurodegenerative disease, inhibit or prevent scar formation in the CNS, inhibit or reduce the release of neurotoxic levels of reactive oxygen species or release of potentially excitotoxic glutamate, reduce or inhibit seizure, pain, and/or secondary degeneration after CNS injury. An anti-FAM19A5 antibody or antigen-binding portion thereof of the present disclosure can promote, stimulate, increase, or activate regrowth of neurons and/or axon, preferably after CNS injury or damage.

An anti-FAM19A5 antibody or antigen-binding portion thereof of the present disclosure can inhibit expression of chondroitin sulfate proteoglycans including proteoglycans composed of a protein core and a chondroitin sulfate (CSGPs), such as aggrecan (CSPG1), versican (CSPG2), neurocan (CSPG3), CSPG4 (or neuron-glial antigen 2 (NG2)), CSPG5, SMC3 (CSPG6, structural maintenance of chromosomes 3), brevican (CSPG7), CD44 (CSPG8, cluster of differentiation 44), phosphacanneurocan (CSPG3) or any combination thereof. In some embodiments, the anti-FAM19A5 antibody or antigen-binding portion thereof of the present disclosure inhibits, decreases, or reduces the level of neurocan and/or NG2, or the activities of neurocan and/or NG2.

An anti-FAM19A5 antibody or antigen-binding portion thereof of the present disclosure can increase expression of c-fos and pERK in the nucleus of neurons, e.g., increase the mRNA, protein, and/or protein activity of c-fos and pERK. An anti-FAM19A5 antibody or antigen-binding portion thereof of the present disclosure can also increase or enhance the level of expression of GAP43 mRNA, GAP43 protein or increase or enhance the GAP43 protein activities.

In certain embodiments, the anti-FAM19A5 antibody or antigen-binding portion thereof of the present disclosure thereof cross-competes for binding to (or inhibits binding of) a human FAM19A5 epitope with an anti-FAM19A5 antibody comprising CDRs or variable regions disclosed herein (e.g., 2-13, 3-2, or 1-28).

In certain embodiments, anti-FAM19A5 antibodies or antigen binding portions thereof inhibit binding of a reference antibody comprising heavy chain CDR1, CDR2, and CDR3, and light chain CDR1, CDR2, and CDR3, (i) wherein the heavy chain CDR1, CDR2, and CDR3 of the reference antibody comprise the amino acid sequence of SEQ ID NO: 11, SEQ ID NO: 12, and SEQ ID NO: 13, respectively, and light chain CDR1, CDR2, and CDR3 of the reference antibody comprise the amino acid sequence of SEQ ID NO: 23, SEQ ID NO: 24, and SEQ ID NO: 25, respectively; (ii) wherein the heavy chain CDR1 comprises the amino acid sequence of SEQ ID NO: 14, the heavy chain CDR2 comprises the amino acid sequence of SEQ ID NO: 15, and the heavy chain CDR3 comprises the amino acid sequence of SEQ ID NO: 16, the light chain CDR1 comprises the amino acid sequence of SEQ ID NO: 26, the light chain CDR2 comprises the amino acid sequence of SEQ ID NO: 27, and the light chain CDR3 comprises the amino acid sequence of SEQ ID NO: 28; or (iii) wherein the heavy chain CDR1 comprises the amino acid sequence of SEQ ID NO: 20, the heavy chain CDR2 comprises the amino acid sequence of SEQ ID NO: 21, the heavy chain CDR3 comprises the amino acid sequence of SEQ ID NO: 22, the light chain CDR1 comprises the amino acid sequence of SEQ ID NO: 32, the light chain CDR2 comprises the amino acid sequence of SEQ ID NO: 33, and the light chain CDR3 comprises the amino acid sequence of SEQ ID NO: 34. In some embodiments, the reference antibody comprises: (i) a heavy chain variable domain comprising SEQ ID NO: 35, SEQ ID NO: 36, or SEQ ID NO: 38, and (ii) a light chain variable domain comprising SEQ ID NO: 39, SEQ ID NO: 40, or SEQ ID NO: 42.

In certain embodiments, the anti-FAM19A5 antibody or antigen-binding portion thereof inhibits binding of such a reference antibody to human FAM19A5 by at least 10%, 20%, 30%, 40%, 50%, 60%, 70%, 80%, 90%, or by 100%. Competing antibodies bind to the same epitope, an overlapping epitope, or to adjacent epitopes (e.g., as evidenced by steric hindrance). Whether two antibodies compete with each other for binding to a target can be determined using competition experiments known in the art such as RIA and EIA.

In certain embodiments, the anti-FAM19A5 antibody or antigen binding portions thereof bind to the same FAM19A5 epitope as a reference antibody disclosed herein comprising heavy chain CDR1, CDR2, and CDR3 and light chain CDR1, CDR2, and CDR3, (i) wherein the heavy chain CDR1 comprises the amino acid sequence of SEQ ID NO: 11, the heavy chain CDR2 comprises the amino acid sequence of SEQ ID NO: 12, and the heavy chain CDR3 comprises the amino acid sequence of SEQ ID NO: 13, the light chain CDR1 comprises the amino acid sequence of SEQ ID NO: 23, the light chain CDR2 comprises the amino acid sequence of SEQ ID NO: 24, and the light chain CDR3 comprises the amino acid sequence of SEQ ID NO: 25; (ii) wherein the heavy chain CDR1 comprises the amino acid sequence of SEQ ID NO: 14, the heavy chain CDR2 comprises the amino acid sequence of SEQ ID NO: 15, and the heavy chain CDR3 comprises the amino acid sequence of SEQ ID NO: 16, the light chain CDR1 comprises the amino acid sequence of SEQ ID NO: 26, the light chain CDR2 comprises the amino acid sequence of SEQ ID NO: 27, and the light chain CDR3 comprises the amino acid sequence of SEQ ID NO: 28; or (iii) wherein the heavy chain CDR1 comprises the amino acid sequence of SEQ ID NO: 20, the heavy chain CDR2 comprises the amino acid sequence of SEQ ID NO: 21, the heavy chain CDR3 comprises the amino acid sequence of SEQ ID NO: 22, the light chain CDR1 comprises the amino acid sequence of SEQ ID NO: 32, the light chain CDR2 comprises the amino acid sequence of SEQ ID NO: 33, and the light chain CDR3 comprises the amino acid sequence of SEQ ID NO: 34. In some embodiments, the reference antibody comprises: (i) a heavy chain variable domain comprising SEQ ID NO: 35, SEQ ID NO: 36, or SEQ ID NO: 38, and (ii) a light chain variable domain comprising SEQ ID NO: 39, SEQ ID NO: 40, or SEQ ID NO: 42.

Techniques for determining whether two antibodies bind to the same epitope include, e.g., epitope mapping methods, such as, x-ray analyses of crystals of antigen:antibody complexes which provides atomic resolution of the epitope and hydrogen/deuterium exchange mass spectrometry (HDX-MS), methods monitoring the binding of the antibody to antigen fragments or mutated variations of the antigen, where loss of binding due to a modification of an amino acid residue within the antigen sequence is often considered an indication of an epitope component, computational combinatorial methods for epitope mapping.

An anti-FAM19A5 antibody or antigen-binding portion thereof of the present disclosure can bind to at least one epitope of mature human FAM19A5, as determined, e.g., by binding of the antibodies to fragments of human FAM19A5. In some embodiments, anti-FAM19A5 antibodies or antigen-binding portions thereof bind to at least one epitope, which has the amino acid sequence of TLDRDSSQPRR-TIARQTARC (SEQ ID NO: 6 or amino acid residues 42 to 61 of SEQ ID NO: 2), or bind to a fragment located within the amino acid sequence of SEQ ID NO: 6, e.g., an epitope having at least 1, 2, 3, 4, 5, 6, 7, 8, 9, 10, 11, 12, 13, 14, 15, 16, 17, 18, 19, or 20 amino acids of SEQ ID NO: 6. In some embodiments, anti-FAM19A5 antibodies or antigen binding portion thereof bind to at one or more amino acids corresponding to amino acid residues 46 to 51 (i.e., DSSQPR), e.g., amino acid residues 46, 50, and 52 (i.e., D- - -P-R), e.g., amino acid residues 46, 47, 48, and 50 (i.e., DSS-P) of SEQ ID NO: 2. In some embodiments, anti-FAM19A5 antibodies or antigen binding portions thereof bind to a fragment located within the amino acid sequence of SEQ ID NO: 9, e.g., an epitope having at least 1, 2, 3, 4, 5, 6, 7, 8, 9, 10, 11, 12, 13, 14, 15, 16, 17, 18, 19, or 20 amino acids of SEQ ID NO: 9.

In some embodiments, the at least one epitope has the amino acid sequence that is at least 90%, at least about 95%, at least about 96%, at least about 97%, at least about 98%, at least about 99%, or about 100% identical to SEQ ID NO: 6. In some embodiments, the at least one epitope has the amino acid sequence that is at least 90%, at least about 95%, at least about 96%, at least about 97%, at least about 98%, at least about 99%, or about 100% identical to SEQ ID NO: 9.

In some embodiments, the anti-FAM19A5 antibody or antigen-binding portion thereof binds to a human FAM19A5 epitope only, which is SEQ ID NO: 5, 6, 7, 8, 9, or 10, or a fragment located within the amino acid sequence of SEQ ID NO: 5, 6, 7, 8, 9, or 10, e.g., an epitope having 1, 2, 3, 4, 5, 6, 7, 8, 9, 10, 11, 12, 13, 14, 15, 16, 17, 18, 19, or 20 amino acids of SEQ ID NO: 5, 6, 7, 8, 9, or 10.

In some embodiments, the anti-FAM19A5 antibody or antigen-binding portion thereof of the present disclosure binds to SEQ ID NO: 6 or a fragment thereof in its native conformation (i.e., un-denatured). In some embodiments, the anti-FAM19A5 antibody or antigen binding portion thereof of the present disclosure binds to SEQ ID NO: 9 or a fragment thereof in its native conformation (i.e., un-denatured). In some embodiments, the anti-FAM19A5 antibody or antigen-binding portion thereof binds to both glycosylated and unglycosylated human FAM19A5.

In some embodiments, the anti-FAM19A5 antibody or antigen-binding portion thereof further binds to one or more additional FAM19A5 epitopes. Therefore, certain anti-FAM19A5 antibodies or antigen-binding portions thereof bind to an epitope of SEQ ID NO: 6 and an additional epitope or an epitope of SEQ ID NO: 9 and an additional epitope. Other anti-FAM19A5 antibodies or antigen binding portions thereof can bind to an epitope of SEQ ID NO: 5, SEQ ID NO: 9, and an additional epitope. In some embodiments, anti-FAM19A5 antibodies or antigen binding portions thereof bind to an epitope of SEQ ID NO: 6, an epitope of SEQ ID NO: 10, and an additional epitope.

In some embodiments, the one or more additional FAM19A5 epitopes are selected from QLAAGT-CEIVTLDR (SEQ ID NO: 5, epitope F1), TLDRDSSQPRRTIARQTARC (SEQ ID NO: 6, epitope F2), TARCACRKGQIAGTTRARPA (SEQ ID NO: 7, epitope F3), ARPACVDARIIKTKQWCDML (SEQ ID NO: 8, epitope F4), CDMLPCLEGEGCDLLINRSG (SEQ ID NO: 9, epitope F5), or NRSGWTCTQPGGRIKTTTVS (SEQ ID NO: 10, epitope F6), or a fragment located within the amino acid sequence of SEQ ID NO: 5, SEQ ID NO: 6, SEQ ID NO: 7, SEQ ID NO: 8, SEQ ID NO: 9, or SEQ ID NO: 10, or any combination thereof. A fragment located within the amino acid sequence of SEQ ID NO: 5, SEQ ID NO: 6, SEQ ID NO: 7, SEQ ID NO: 8, SEQ ID NO: 9, or SEQ ID NO: 10, includes a fragment having 1, 2, 3, 4, 5, 6, 7, 8, 9, 10, 11, 12, 13, 14, 15, 16, 17, 18, 19, or 20 amino acids of any of SEQ ID NO: 5, SEQ ID NO: 6, SEQ ID NO: 7, SEQ ID NO: 8, SEQ ID NO: 9, or SEQ ID NO: 10. In some embodiments, the one or more additional FAM19A5 epitopes are selected from SEQ ID NO: 5, 6, 7, 8, 9, or 10, or a fragment located within the amino acid sequence of SEQ ID NO: 5, 6, 7, 8, 9, or 10, e.g., a fragment having 1, 2, 3, 4, 5, 6, 7, 8, 9, 10, 11, 12, 13, 14, 15, 16, 17, 18, 19, or 20 amino acids of SEQ ID NO: 5, 6, 7, 8, 9, or 10, or any combination thereof. In some embodiments, the anti-FAM19A5 antibody or antigen-binding portion thereof of the disclosure binds to any of the one or more additional epitopes in their native conformation (i.e., un-denatured). In some embodiments, the anti-FAM19A5 antibody or antigen-binding portion thereof binds to both glycosylated and unglycosylated of the one or more additional FAM19A5 epitopes.

In some embodiments, anti-FAM19A5 antibodies or antigen binding portions thereof bind to at least one FAM19A5 epitope identified as EP2, EP4, and/or EP8, wherein EP2 comprises, consists essentially of, or consists of the amino acids DSSQP (SEQ ID NO: 66), wherein EP4 comprises, consists essentially of, or consists of the amino acids ARCACRK (SEQ ID NO: 68), and wherein EP8 comprises, consists essentially of, or consists of the amino acids TCTQPGGR (SEQ ID NO: 72). In some embodiments, the at least one epitope has the amino acid sequence that is at least 90%, at least about 95%, at least about 96%, at least about 97%, at least about 98%, at least about 99%, or about 100% identical to EP2, EP4, or EP8. In some embodiments, anti-FAM19A5 antibodies or antigen binding portion thereof only bind to EP2. In some embodiments, anti-FAM19A5 antibodies or antigen binding portion thereof bind to EP4 and EP8. In some embodiments, anti-FAM19A5 antibodies or antigen binding portion thereof bind to one or more FAM19A5 epitopes selected from the group consisting of SEQ ID NO: 65 [[EP1-IVTLD]], SEQ ID NO: 67 [[EP3-RTIAR]], SEQ ID NO: 69 [[EP5-ARPA]], SEQ ID NO: 70 [[EP6-KTKQWCDML]], and SEQ ID NO: 71 [[EP7-GCDLLINR]], and any combinations thereof.

In certain embodiments, provided herein is an antibody or antigen-binding portion thereof that binds to FAM19A5 (e.g., human FAM19A5) with a 20%, 25%, 30%, 35%, 40%, 45%, 50%, 55%, 60%, 65%, 70%, 75%, 80%, 85%, 90%, 95% or higher affinity than to another protein in the FAM19A family as measured by, e.g., a immunoassay (e.g., ELISA), surface plasmon resonance, or kinetic exclusion assay. In a specific embodiment, provided herein is an antibody or antigen-binding portion thereof that binds to FAM19A5 (e.g., human FAM19A5) with no cross reactivity with another protein in the FAM19A family as measured by, e.g., a immunoassay.

In certain embodiments, the anti-FAM19A5 antibodies are not native antibodies or are not naturally-occurring antibodies. For example, the anti-FAM19A5 antibodies have post-translational modifications that are different from those of antibodies that are naturally-occurring, such as by having more, less or a different type of post-translational modification.

III. Exemplary Anti-FAM19A5 Antibodies

Particular antibodies that can be used in the methods disclosed herein are antibodies, e.g., monoclonal antibodies, having the CDR and/or variable region sequences of antibody 2-13, 3-2, 1-65, and 1-28 isolated in Example 1, as well as antibodies having at least 80% identity (e.g., at least 85%, at least 90%, at least 95%, or at least 99% identity) to their variable region or CDR sequences. The VH amino acid sequences of 2-13, 3-2, 1-65, and 1-28 are set forth in SEQ ID NOs: 35 to 38. The VL amino acid sequences of 2-13, 3-2, 1-65, and 1-28 are set forth in SEQ ID NOs: 39 to 42.

TABLE 2

Variable heavy chain CDR amino acid sequences (according to Kabat system)

| Antibody | VH-CDR1 | VH-CDR2 | VH-CDR3 |
|---|---|---|---|
| Anti-FAM19A5 ("2-13") | SHGMF (SEQ ID NO: 11) | EITNDGSGT NYGSAVKG (SEQ ID NO: 12) | STYECPGGFSCWGDT GQIDA (SEQ ID NO: 13) |
| Anti-FAM19A5 ("3-2") | SFNMF (SEQ ID NO: 14) | QISSSGSST NYAPAVRG (SEQ ID NO: 15) | SSYDCPYGHCSSGVD SAGEIDA (SEQ ID NO: 16) |

TABLE 2-continued

Variable heavy chain CDR amino acid sequences
(according to Kabat system)

| Antibody | VH-CDR1 | VH-CDR2 | VH-CDR3 |
|---|---|---|---|
| Anti-FAM19A5 ("1-28") | GFDFSDYG (SEQ ID NO: 20) | IRSDGSNP (SEQ ID NO: 21) | AKDGNGYCALDAYRS GGYSCGVYPGSIDA (SEQ ID NO: 22) |

TABLE 3

Variable light chain CDR amino acid sequences
(according to Kabat system)

| Antibody | VL-CDR1 | VL-CDR2 | VL-CDR3 |
|---|---|---|---|
| Anti-FAM19A5 ("2-13") | SGGSYSYG (SEQ ID NO: 23) | WDDERPS (SEQ ID NO: 24) | GTEDISGTAGV (SEQ ID NO: 25) |
| Anti-FAM19A5 ("3-2") | SGGGSYAGSYYYG (SEQ ID NO: 26) | ESNKRPS (SEQ ID NO: 27) | GSWDSSNGGI (SEQ ID NO: 28) |
| Anti-FAM19A5 ("1-28") | GYGYG (SEQ ID NO: 32) | QND (SEQ ID NO: 33) | GSEDSSTLAGI (SEQ ID NO: 34) |

TABLE 4

Variable heavy chain amino acid sequence

| Antibody | VH Amino Acid Sequence (SEQ ID NO) |
|---|---|
| Anti-FAM19A5 ("2-13") | AVTLDESGGGLQTPGGALSLVCKASGFTFS SHGMFWVRQTPGKGLEYVAEITNDGSGTNY GSAVKGRATISRDNGQSTVRLQLNNLRAED TGTYFCARSTYECPGGFSCWGDTGQIDAWG HGTEVIVSS (SEQ ID NO: 35) |
| Anti-FAM19A5 ("3-2") | AVTLDESGGGLQTPGGALSLVCKASGFTFS SFNMFWVRQAPGKGLEYVAQISSSGSSTNY APAVRGRATISRDNGQSTVRLQLNNPGAED TGTYYCAKSSYDCPYGHCSSGVDSAGEIDA WGHGTEVIVSS (SEQ ID NO: 36) |
| Anti-FAM19A5 ("1-28") | AVTLDESGGGLQTPGGALSLVCKASGFDFS DYGMGWVRQAPGKGLEWVAAIRSDGSNPSY GSAVKGRATISKDNGRSTVRLQLNNLRAED TATYYCAKDGNGYCALDAYRSGGYSCGVYP GSIDAWGHGTEVIVSS (SEQ ID NO: 38) |

TABLE 5

Variable light chain amino acid sequence

| Antibody | VL Amino Acid Sequence (SEQ ID NO) |
|---|---|
| Anti-FAM19A5 ("2-13") | ALTQPSSVSANPGETVKITCSGGSYSYGWF QQKSPGSALVTIYWDDERPSDIPSRFSGA LSGSTNTLTITGVQADDEAVYFCGTEDISG TAGVFGAGTTLTVL (SEQ ID NO: 39) |
| Anti-FAM19A5 ("3-2") | ALTQPSSVSANPGETVKITCSGGGSYAGSY YYGWYQQKAPGSAPVTLIYESNKRPSDIPS RFSGSTSGSTATLTITGVQADDEAIYYCGS WDSSNGGIFGAGTTLTVL (SEQ ID NO: 40) |

TABLE 5-continued

Variable light chain amino acid sequence

| Antibody | VL Amino Acid Sequence (SEQ ID NO) |
|---|---|
| Anti-FAM19A5 ("1-28") | ALTQPSSVSANLEGTVEITCSGSGYGYGWY QQKSPGSAPVTVIYQNDKRPSDIPSRFSGS KSGSTGTLTITGVQVEDEAVYYCGSEDSST LAGIFGAGTTLTVL (SEQ ID NO: 42) |

Accordingly, provided herein is an isolated anti-FAM19A5 antibody, or an antigen-binding portion thereof, comprising heavy and light chain variable regions, wherein the heavy chain variable region comprises the amino acid sequence of SEQ ID NOs: 35, 36, or 38. In other embodiments, the isolated anti-FAM19A5 antibody, or an antigen binding portion thereof, comprises the CDRs of the heavy chain variable region selected from the group consisting of SEQ ID NOs: 35, 36, or 38.

Also provided is an isolated anti-FAM19A5 antibody, or an antigen-binding portion thereof, comprising heavy and light chain variable regions, wherein the light chain variable region comprises the amino acid sequence of SEQ ID NOs: 39, 40, or 42. In other embodiments, the isolated anti-FAM19A5 antibody, or an antigen binding portion thereof, comprises the CDRs of the light chain variable region selected from the group consisting of SEQ ID NOs: 39, 40, or 42.

In certain embodiments, the isolated anti-FAM19A5 antibody, or an antigen binding portion thereof, comprises the CDRs of the heavy chain variable region selected from the group consisting of SEQ ID NOs: 35, 36, or 38 and the CDRs of the light chain variable region selected from the group consisting of SEQ ID NOs: 39, 40, or 42.

Also provided is an isolated anti-FAM19A5 antibody, or an antigen-binding portion thereof, comprising heavy and light chain variable regions, (i) wherein the heavy chain variable region comprises the amino acid sequence of SEQ ID NO: 35 and wherein the light chain variable region comprises the amino acid sequence of SEQ ID NO: 39; (ii) wherein the heavy chain variable region comprises the amino acid sequence of SEQ ID NO: 36 and wherein the light chain variable region comprises the amino acid sequence of SEQ ID NO: 40; or (iii) wherein the heavy chain variable region comprises the amino acid sequence of SEQ ID NO: 38 and wherein the light chain variable region comprises the amino acid sequence of SEQ ID NO: 42.

Provided herein is an isolated anti-FAM19A5 antibody, or an antigen-binding portion thereof, comprising a heavy chain variable region and a light chain variable region, wherein the heavy chain variable region comprises an amino acid sequence which is at least about 80%, at least about 85%, at least about 90%, at least about 95%, at least about 96%, at least about 97%, at least about 98%, at least about 99%, or about 100% identical to the amino acid sequence set forth as SEQ ID NOs: 35, 36, or 38.

Also provided herein is an isolated anti-FAM19A5 antibody, or an antigen-binding portion thereof, comprising a heavy chain variable region and a light chain variable region, wherein the light chain variable region comprises an amino acid sequence which is at least about 80%, at least about 85%, at least about 90%, at least about 95%, at least about 96%, at least about 97%, at least about 98%, at least about 99%, or about 100% identical to the amino acid sequence set forth as SEQ ID NOs: 39, 40, or 42.

Also provided is an isolated anti-FAM19A5 antibody, or an antigen-binding portion thereof, comprising heavy and light chain variable regions, wherein the heavy chain variable region comprises an amino acid sequence which is at least about 80%, at least about 85%, at least about 90%, at least about 95%, at least about 96%, at least about 97%, at least about 98%, at least about 99%, or about 100% identical to the amino acid sequence set forth as SEQ ID NOs: 35, 36, or 38, and wherein the light chain variable region comprises an amino acid sequence which is at least about 80%, at least about 85%, at least about 90%, at least about 95%, at least about 96%, at least about 97%, at least about 98%, at least about 99%, or about 100% identical to the amino acid sequence set forth as SEQ ID NOs: 39, 40, or 42.

In some embodiments, the disclosure provides an isolated anti-FAM19A5 antibody, or an antigen-binding portion thereof, comprising:
(a) heavy and light chain variable region sequences comprising SEQ ID NOs: 35 and 39, respectively;
(b) heavy and light chain variable region sequences comprising SEQ ID NOs: 36 and 40, respectively; or
(c) heavy and light chain variable region sequences comprising SEQ ID NOs: 38 and 42, respectively.

In certain embodiments, the anti-FAM19A5 antibody or antigen-binding portion thereof of the present disclosure comprises (i) the heavy chain CDR1, CDR2 and CDR3 of 2-13, or combinations thereof, and/or the light chain CDR1, CDR2, and CDR3 of 2-13, or any combinations thereof; (ii) the heavy chain CDR1, CDR2 and CDR3 of 3-2, or combinations thereof, and/or the light chain CDR1, CDR2, and CDR3 of 3-2, or any combinations thereof; or (iii) the heavy chain CDR1, CDR2 and CDR3 of 1-28, or combinations thereof, and/or the light chain CDR1, CDR2, and CDR3 of 1-28, or any combinations thereof.

The amino acid sequences of the VH CDR1, CDR2, and CDR3 for 2-13 are set forth in SEQ ID NOs: 11, 12, and 13, respectively. The amino acid sequences of the VL CDR1, CDR2s and CDR3 for 2-13 are set forth in SEQ ID NOs: 23, 24, and 25, respectively. The amino acid sequences of the VH CDR1, CDR2, and CDR3 for 3-2 are set forth in SEQ ID NOs: 14, 15, and 16, respectively. The amino acid sequences of the VL CDR1, CDR2s and CDR3 for 3-2 are set forth in SEQ ID NOs: 26, 27, and 28, respectively. The amino acid sequences of the VH CDR1, CDR2, and CDR3 for 1-28 are set forth in SEQ ID NOs: 20, 21, and 22, respectively. The amino acid sequences of the VL CDR1, CDR2s and CDR3 for 1-28 are set forth in SEQ ID NOs: 32, 33, and 34, respectively. The amino acid sequences of the VH CDR1, CDR2, and CDR3 for 1-65 are set forth in SEQ ID NOs: 17, 18, and 19, respectively. The amino acid sequences of the VL CDR1, CDR2s and CDR3 for 1-65 are set forth in SEQ ID NOs: 29, 30, and 31, respectively.

In some embodiments, the anti-FAM19A5 antibody or antigen-binding portion thereof of the disclosure, which specifically binds to human FAM19A5, comprises:
(a) a VH CDR1 comprising the amino acid sequence of SEQ ID NO: 11; and/or
(b) a VH CDR2 comprising the amino acid sequence of SEQ ID NO: 12; and/or
(c) a VH CDR3 comprising the amino acid sequence of SEQ ID NO: 13.

In specific embodiments, the antibody or antigen-binding portion thereof comprises one, two, or all three of the VH CDRs above.

In some embodiments, the anti-FAM19A5 antibody or antigen-binding portion thereof, which specifically binds to human FAM19A5, comprises:
(a) a VL CDR1 comprising the amino acid sequence of SEQ ID NO: 23; and/or
(b) a VL CDR2 comprising the amino acid sequence of SEQ ID NO: 24; and/or
(c) a VL CDR3 comprising the amino acid sequence of SEQ ID NO: 25.

In specific embodiments, the antibody or antigen-binding portion thereof comprises one, two, or all three of the VL CDRs above.

In some embodiments, the anti-FAM19A5 antibody or antigen-binding portion thereof, which specifically binds to human FAM19A5, comprise:
(a) a VH CDR1 comprising the amino acid sequence of SEQ ID NO: 11;
(b) a VH CDR2 comprising the amino acid sequence of SEQ ID NO: 12;
(c) a VH CDR3 comprising the amino acid sequence of SEQ ID NO: 13;
(d) a VL CDR1 comprising the amino acid sequence of SEQ ID NO: 23;
(e) a VL CDR2 comprising the amino acid sequence of SEQ ID NO: 24; and/or
(f) a VL CDR3 comprising the amino acid sequence of SEQ ID NO: 25.

In some embodiments, the anti-FAM19A5 antibody or antigen-binding portion thereof of the disclosure, which specifically binds to human FAM19A5, comprises:
(a) a VH CDR1 comprising the amino acid sequence of SEQ ID NO: 14; and/or
(b) a VH CDR2 comprising the amino acid sequence of SEQ ID NO: 15; and/or
(c) a VH CDR3 comprising the amino acid sequence of SEQ ID NO: 16.

In specific embodiments, the antibody or antigen-binding portion thereof comprises one, two, or all three of the VH CDRs above.

In some embodiments, the anti-FAM19A5 antibody or antigen-binding portion thereof, which specifically binds to human FAM19A5, comprises:
(a) a VL CDR1 comprising the amino acid sequence of SEQ ID NO: 26; and/or
(b) a VL CDR2 comprising the amino acid sequence of SEQ ID NO: 27; and/or
(c) a VL CDR3 comprising the amino acid sequence of SEQ ID NO: 28.

In specific embodiments, the antibody or antigen-binding portion thereof comprises one, two, or all three of the VL CDRs above.

In some embodiments, the anti-FAM19A5 antibody or antigen-binding portion thereof, which specifically binds to human FAM19A5, comprise:
(a) a VH CDR1 comprising the amino acid sequence of SEQ ID NO: 14;
(b) a VH CDR2 comprising the amino acid sequence of SEQ ID NO: 15;
(c) a VH CDR3 comprising the amino acid sequence of SEQ ID NO: 16;
(d) a VL CDR1 comprising the amino acid sequence of SEQ ID NO: 26;
(e) a VL CDR2 comprising the amino acid sequence of SEQ ID NO: 27; and/or
(f) a VL CDR3 comprising the amino acid sequence of SEQ ID NO: 28.

In specific embodiments, the antibody or antigen-binding portion thereof comprises one, two, or all three of the VH CDRs above.

In some embodiments, the anti-FAM19A5 antibody or antigen-binding portion thereof, which specifically binds to human FAM19A5, comprises:
 (a) a VL CDR1 comprising the amino acid sequence of SEQ ID NO: 29; and/or
 (b) a VL CDR2 comprising the amino acid sequence of SEQ ID NO: 30; and/or
 (c) a VL CDR3 comprising the amino acid sequence of SEQ ID NO: 31.

In specific embodiments, the antibody or antigen-binding portion thereof comprises one, two, or all three of the VL CDRs above.

In some embodiments, the anti-FAM19A5 antibody or antigen-binding portion thereof of the disclosure, which specifically binds to human FAM19A5, comprises:
 (a) a VH CDR1 comprising the amino acid sequence of SEQ ID NO: 20; and/or
 (b) a VH CDR2 comprising the amino acid sequence of SEQ ID NO: 21; and/or
 (c) a VH CDR3 comprising the amino acid sequence of SEQ ID NO: 22.

In specific embodiments, the antibody or antigen-binding portion thereof comprises one, two, or all three of the VH CDRs above.

In some embodiments, the anti-FAM19A5 antibody or antigen-binding portion thereof, which specifically binds to human FAM19A5, comprises:
 (a) a VL CDR1 comprising the amino acid sequence of SEQ ID NO: 32; and/or
 (b) a VL CDR2 comprising the amino acid sequence of SEQ ID NO: 33; and/or
 (c) a VL CDR3 comprising the amino acid sequence of SEQ ID NO: 34.

In specific embodiments, the antibody or antigen-binding portion thereof comprises one, two, or all three of the VL CDRs above.

In some embodiments, the anti-FAM19A5 antibody or antigen-binding portion thereof, which specifically binds to human FAM19A5, comprise:
 (a) a VH CDR1 comprising the amino acid sequence of SEQ ID NO: 20;
 (b) a VH CDR2 comprising the amino acid sequence of SEQ ID NO: 21;
 (c) a VH CDR3 comprising the amino acid sequence of SEQ ID NO: 22;
 (d) a VL CDR1 comprising the amino acid sequence of SEQ ID NO: 32;
 (e) a VL CDR2 comprising the amino acid sequence of SEQ ID NO: 33; and/or
 (f) a VL CDR3 comprising the amino acid sequence of SEQ ID NO: 34.

In specific embodiments, the anti-FAM19A5 antibody or antigen-binding portion thereof comprises one, two, three, four, five, or six of the CDRs above.

A VH domain, or one or more CDRs thereof, described herein can be linked to a constant domain for forming a heavy chain, e.g., a full length heavy chain. Similarly, a VL domain, or one or more CDRs thereof, described herein can be linked to a constant domain for forming a light chain, e.g., a full length light chain. A full length heavy chain and full length light chain combine to form a full length antibody.

Accordingly, in specific embodiments, provided herein is an antibody comprising an antibody light chain and heavy chain, e.g., a separate light chain and heavy chain. With respect to the light chain, in a specific embodiment, the light chain of an antibody described herein is a kappa light chain. In another specific embodiment, the light chain of an antibody described herein is a lambda light chain. In yet another specific embodiment, the light chain of an antibody described herein is a human kappa light chain or a human lambda light chain. In a particular embodiment, an antibody described herein, which specifically binds to an FAM19A5 polypeptide (e.g., human FAM19A5) comprises a light chain which comprises any VL or VL CDR amino acid sequences described herein, and wherein the constant region of the light chain comprises the amino acid sequence of a human kappa light chain constant region. In a particular embodiment, an antibody described herein, which specifically binds to an FAM19A5 polypeptide (e.g., human FAM19A5) comprises a light chain which comprises a VL or VL CDR amino acid sequences described herein, and wherein the constant region of the light chain comprises the amino acid sequence of a human lambda light chain constant region. Non-limiting examples of human constant region sequences have been described in the art, e.g., see U.S. Pat. No. 5,693,780 and Kabat E A et al, (1991) supra.

With respect to the heavy chain, in some embodiments, the heavy chain of an antibody described herein can be an alpha ($\alpha$), delta ($\delta$), epsilon ($\epsilon$), gamma ($\gamma$) or mu ($\mu$) heavy chain. In another specific embodiment, the heavy chain of an antibody described can comprise a human alpha ($\alpha$), delta ($\delta$), epsilon ($\epsilon$), gamma ($\gamma$) or mu ($\mu$) heavy chain. In one embodiment, an antibody described herein, which specifically binds to FAM19A5 (e.g., human FAM19A5), comprises a heavy chain which comprises a VH or VH CDR amino acid sequence described herein, and wherein the constant region of the heavy chain comprises the amino acid sequence of a human gamma ($\gamma$) heavy chain constant region. In another embodiment, an antibody described herein, which specifically binds to FAM19A5 (e.g., human FAM19A5), comprises a heavy chain which comprises a VH or VH CDR amino acid sequence disclosed herein, and wherein the constant region of the heavy chain comprises the amino acid of a human heavy chain described herein or known in the art. Non-limiting examples of human constant region sequences have been described in the art, e.g., see U.S. Pat. No. 5,693,780 and Kabat E A et al., (1991) supra.

In some embodiments, an antibody described herein, which specifically binds to FAM19A5 (e.g., human FAM19A5) comprises a VL domain and a VH domain comprising the VH or VH CDRs and VL and VL CDRs described herein, and wherein the constant regions comprise the amino acid sequences of the constant regions of an IgG, IgE, IgM, IgD, IgA or IgY immunoglobulin molecule, or a human IgG, IgE, IgM, IgD, IgA or IgY immunoglobulin molecule. In another specific embodiment, an antibody described herein, which specifically binds to FAM19A5 (e.g., human FAM19A5) comprises a VL domain and a VH domain comprising any amino acid sequences described herein, and wherein the constant regions comprise the amino acid sequences of the constant regions of an IgG, IgE, IgM, IgD, IgA or IgY immunoglobulin molecule, any subclass (e.g., IgG1, IgG2, IgG3, IgG4, IgA1 and IgA2) of immunoglobulin molecule. In some embodiments, the constant regions comprise the amino acid sequences of the constant regions of a human IgG, which are naturally-occurring, including subclasses (e.g., IgG1, IgG2, IgG3 or IgG4), and allotypes (e.g., G1m, G2m, G3m, and nG4m) and variants thereof. See, e.g., Vidarsson G. et al. *Front Immunol.* 5:520 (published online Oct. 20, 2014) and Jefferis R. and Lefranc M P, *mAbs* 1:4, 1-7(2009). In some embodiments, the constant regions comprise the amino acid sequences of the constant regions of a human IgG1, IgG2, IgG3, or IgG4, or variants thereof.

In certain embodiments, the anti-FAM19A5 antibody or antigen-binding portion thereof disclosed herein does not have Fc effector functions, e.g., complement-dependent cytotoxicity (CDC) and/or antibody-dependent cellular phagocytosis (ADCP). Effector functions are mediated by the Fc region and the residues most proximal to the hinge region in the CH2 domain of the Fc region are responsible for effector functions of antibodies as it contains a largely overlapping binding site for C1q (complement) and IgG-Fc receptors (FcγR) on effector cells of the innate immune system. Also, IgG2 and IgG4 antibodies have lower levels of Fc effector functions than IgG1 and IgG3 antibodies. Effector functions of an antibody can be reduced or avoided by different approaches known in the art, including (1) using antibody fragments lacking the Fc region (e.g., such as a Fab, F(ab')₂, single chain Fv (scFv), or a sdAb consisting of a monomeric VH or VL domain); (2) generating aglycosylated antibodies, which can be generated by, for example, deleting or altering the residue the sugar is attached to, removing the sugars enzymatically, producing the antibody in cells cultured in the presence of a glycosylation inhibitor, or by expressing the antibody in cells unable to glycosylate proteins (e.g., bacterial host cells, see, e.g., U.S. Pub. No. 20120100140); (3) employing Fc regions from an IgG subclass that have reduced effector function (e.g., an Fc region from IgG2 or IgG4 antibodies or a chimeric Fc region comprising a CH2 domain from IgG2 or IgG4 antibodies, see, e.g., U.S. Pub. No. 20120100140 and Lau C. et al. *J. Immunol.* 191:4769-4777 (2013)); and (4) generating an Fc region with mutations that result in reduced or no Fc functions. See, e.g., U.S. Pub. No. 20120100140 and U.S. and PCT applications cited therein and An et al., *mAbs* 1:6, 572-579 (2009).

Thus, in some embodiments, the anti-FAM19A5 antibody or antigen-binding portion thereof disclosed herein is a Fab, a Fab', a F(ab')2, a Fv, a single chain Fv (scFv), or a sdAb consisting of a monomeric VH or VL domain. Such antibody fragments are well known in the art and are described supra.

In some embodiments, the anti-FAM19A5 antibody or antigen-binding portion thereof disclosed herein comprises an Fc region with reduced or no Fc effector function. In some embodiments, the constant regions comprise the amino acid sequences of the Fc region of a human IgG2 or IgG4, in some embodiments, the anti-FAM19A5 antibody is of an IgG2/IgG4 isotype. In some embodiments, the anti-FAM19A5 antibody comprises a chimeric Fc region which comprises a CH2 domain from an IgG antibody of the IgG4 isotype and a CH3 domain from an IgG antibody of the IgG1 isotype, or a chimeric Fc region which comprises a hinge region from IgG2 and a CH2 region from IgG4, or an Fc region with mutations that result in reduced or no Fc functions. Fc regions with reduced or no Fc effector function include those known in the art. See, e.g., Lau C. et al. *J. Immunol.* 191:4769-4777 (2013); An et al., *mAbs* 1:6, 572-579 (2009); and U.S. Pub. No. 20120100140 and the U.S. patents and publications and PCT publications cited therein. Also Fc regions with reduced or no Fc effector function can be readily made by a person of ordinary skill in the art.

IV. Nucleic Acid Molecules

Another aspect described herein pertains to one or more nucleic acid molecules that encode any one of the antibodies or antigen-binding portions thereof described herein. The nucleic acids can be present in whole cells, in a cell lysate, or in a partially purified or substantially pure form. A nucleic acid is "isolated" or "rendered substantially pure" when purified away from other cellular components or other contaminants, e.g., other cellular nucleic acids (e.g., other chromosomal DNA, e.g., the chromosomal DNA that is linked to the isolated DNA in nature) or proteins, by standard techniques, including alkaline/SDS treatment, CsCl banding, column chromatography, restriction enzymes, agarose gel electrophoresis and others well known in the art. See, F. Ausubel, et al., ed. (1987) Current Protocols in Molecular Biology, Greene Publishing and Wiley Interscience, New York. A nucleic acid described herein can be, for example, DNA or RNA and can or cannot contain intronic sequences. In a certain embodiments, the nucleic acid is a cDNA molecule.

Nucleic acids described herein can be obtained using standard molecular biology techniques. For antibodies expressed by hybridomas (e.g., hybridomas prepared from transgenic mice carrying human immunoglobulin genes as described further below), cDNAs encoding the light and heavy chains of the antibody made by the hybridoma can be obtained by standard PCR amplification or cDNA cloning techniques. For antibodies obtained from an immunoglobulin gene library (e.g., using phage display techniques), nucleic acid encoding the antibody can be recovered from the library.

Certain nucleic acids molecules described herein are those encoding the VH and VL sequences of the 2-13, 3-2, 1-65, and 1-28 monoclonal antibody. Exemplary DNA sequences encoding the VH sequence of 2-13, 3-2, 1-65, and 1-28 are set forth in SEQ ID NOs: 43, 44, 45, and 46, respectively. Exemplary DNA sequences encoding the VL sequences of 2-13, 3-2, 1-65, and 1-28 are set forth in SEQ ID NOs: 47, 48, 49, and 50, respectively.

TABLE 6

Variable heavy chain polynucleotide sequence

| Antibody | Variable Heavy Chain Polynucleotide Sequence (SEQ ID NO) |
| --- | --- |
| Anti-FAM19A5 (2-13) | GCCGTGACGTTGGACGAGTCCGGGGCGGC CTCCAGACGCCCGGAGGAGCGCTCAGCCTC GTCTGCAAGGCCTCCGGGTTCACCTTCAGC AGCCATGGCATGTTCTGGGTGCGACAGACG CCCGGCAAGGGGTTGGAATATGTCGCTGAA ATTACCAATGATGGTAGTGGCACAAACTAC GGGTCGGCGGTGAAGGGCCGTGCCACCATC TCGAGGGACAACGGGCAGAGCACAGTGAGG CTGCAGCTGAACAACCTCAGGGCTGAGGAC ACCGGCACCTACTTCTGCGCCAGATCTACT TATGAATGTCCTGGTGGTTTTAGTTGTTGG GGTGATACTGGTCAAATAGACGCATGGGGC CACGGGACCGAAGTCATCGTCTCCTCCA (SEQ ID NO: 43) |
| Anti-FAM19A5 (3-2) | GCCGTGACGTTGGACGAGTCCGGGGCGGC CTCCAGACGCCCGGAGGAGCGCTCAGCCTC GTCTGCAAGGCCTCCGGGTTCACCTTCAGC AGCTTCAACATGTTCTGGGTGCGACAGGCG CCCGGCAAGGGGCTGGAATACGTCGCTCAA ATTAGCAGCAGTGGTAGTAGCACAAACTAC GCACCCGCGGTGAGGGGCCGTGCCACCATC TCGAGGGACAACGGGCAGAGCACAGTGAGG CTGCAGCTGAACAACCCCGGGGCTGAAGAC ACCGGCACCTACTACTGCGCCAAAAGTAGT TATGACTGTCCTTACGGTCATTGTAGTAGT GGTGTTGATAGTGCTGGTGAGATCGACGCA TGGGGCCACGGGACCGAAGTCATCGTCTCC TCCA (SEQ ID NO: 44) |
| Anti-FAM19A5 (1-28) | GCCGTGACGTTGGACGAGTCCGGGGCGGC CTCCAGACGCCCGGAGGAGCGCTCAGCCTC GTCTGCAAGGCCTCCGGGTTCGACTTCAGC GATTATGGCATGGGTTGGGTGCGACAGGCT |

TABLE 6-continued

Variable heavy chain polynucleotide sequence

| Antibody | Variable Heavy Chain Polynucleotide Sequence (SEQ ID NO) |
|---|---|
| | CCAGGCAAGGGGCTGGAGTGGGTTGCTGCT<br>ATTAGAAGTGATGGTAGTAACCCATCATAC<br>GGGTCGGCGGTGAAGGGCCGTGCCACCATC<br>TCGAAGGACAACGGGCGAAGCACAGTGAGG<br>CTGCAGCTGAACAACCTCAGGGCTGAGGAC<br>ACCGCCACCTACTACTGCGCCAAGGATGGT<br>AATGGTTACTGTGCTCTCGATGCTTATCGT<br>AGTGGTGGTTATAGTTGTGGTGTTTATCCT<br>GGTAGCATCGACGCATGGGGCCACGGGACC<br>GAAGTCATCGTCTCCTCC (SEQ ID NO: 46) |

TABLE 7

Variable light chain polynucleotide sequence

| Antibody | Variable Light Chain Polynucleotide Sequence (SEQ ID NO) |
|---|---|
| Anti-FAM19A5 (2-13) | GGCCCTGACTCAGCCGTCCTCGGTGTCAGC<br>AAACCCAGGAGAAACCGTCAAGATAACCTG<br>CTCCGGGGGTAGCTATAGCTATGGCTGGTT<br>CCAGCAGAAGTCTCCTGGCAGTGCCCCTTGT<br>CACTGTGATCTACTGGGATGATGAGAGACC<br>CTCGGACATCCCTTCACGATTCTCCGGTGC<br>CCTATCCGGCTCCACAAACACATTAACCAT<br>CACTGGGGTCCAAGCCGACGACGAGGCTGT<br>CTATTTCTGTGGGACTGAAGACATCAGCGG<br>CACTGCTGGTGTATTTGGGGCCGGGACAAC<br>CCTGACCGTCCTGGG (SEQ ID NO: 47) |
| Anti-FAM19A5 (3-2) | GGCCCTGACTCAGCCGTCCTCGGTGTCAGC<br>AAACCCAGGAGAAACCGTCAAGATCACCTG<br>CTCCGGGGGTGGCAGCTATGCTGGAAGTTA<br>CTATTATGGCTGGTACCAGCAGAAGGCACC<br>TGGCAGTGCCCCTGTCACTCTGATCTATGA<br>AAGCAACAAGAGACCCTCGGACATCCCTTC<br>ACGATTCTCCGGTTCCACATCTGGCTCCAC<br>AGCCACACTAACCATCACTGGGGTCCAAGC<br>CGATGACGAGGCTATCTATTACTGTGGGAG<br>CTGGGACAGTAGCAATGGTGGTATATTTGG<br>GGCCGGGACAACCCTGACCGTCCTAGG<br>(SEQ ID NO: 48) |
| Anti-FAM19A5 (1-28) | GCCCTGACTCAGCCGTCCTCGGTGTCAGCA<br>AACCTGGAAGGAACCGTCGAGATCACCTGC<br>TCCGGGAGTGGCTATGGTTATGGCTGGTAT<br>CAGCAGAAGTCTCCTGGCAGTGCCCCTGTC<br>ACTGTGATCTATCAGAACGACAAGAGACCC<br>TCGGACATCCCTTCACGATTCTCCGGTTCC<br>AAATCCGGCTCCACGGGCACATTAACCATC<br>ACTGGGGTCCAAGTCGAGGACGAGGCTGTC<br>TATTACTGTGGGAGTGAAGACAGCAGCACT<br>CTTGCTGGTATATTTGGGGCCGGGACAACC<br>CTGACCGTCCTA (SEQ ID NO: 50) |

A method for making an anti-FAM19A5 antibody as disclosed herein can comprise expressing the heavy chain and the light chains in a cell line comprising the nucleotide sequences encoding the heavy and light chains with a signal peptide, e.g., SEQ ID NOs: 43 and 47, SEQ ID NOs: 44 and 48, SEQ ID NOs: 46 and 50, respectively. Host cells comprising these nucleotide sequences are encompassed herein.

Once DNA fragments encoding VH and VL segments are obtained, these DNA fragments can be further manipulated by standard recombinant DNA techniques, for example to convert the variable region genes to full-length antibody chain genes, to Fab fragment genes or to a scFv gene. In these manipulations, a VL- or VH-encoding DNA fragment is operatively linked to another DNA fragment encoding another protein, such as an antibody constant region or a flexible linker. The term "operatively linked", as used in this context, is intended to mean that the two DNA fragments are joined such that the amino acid sequences encoded by the two DNA fragments remain in-frame.

The isolated DNA encoding the VH region can be converted to a full-length heavy chain gene by operatively linking the VH-encoding DNA to another DNA molecule encoding heavy chain constant regions (hinge, CH1, CH2, and/or CH3). The sequences of human heavy chain constant region genes are known in the art (see, e.g., Kabat, E. A., et al., (1991) Sequences of Proteins of Immunological Interest, Fifth Edition, U.S. Department of Health and Human Services, NIH Publication No. 91-3242) and DNA fragments encompassing these regions can be obtained by standard PCR amplification. The heavy chain constant region can be an IgG1, IgG2, IgG3, IgG4, IgA, IgE, IgM, or IgD constant region, for example, an IgG2 and/or IgG4 constant region. For a Fab fragment heavy chain gene, the VH-encoding DNA can be operatively linked to another DNA molecule encoding only the heavy chain CH1 constant region.

The isolated DNA encoding the VL region can be converted to a full-length light chain gene (as well as a Fab light chain gene) by operatively linking the VL-encoding DNA to another DNA molecule encoding the light chain constant region, CL. The sequences of human light chain constant region genes are known in the art (see, e.g., Kabat, E. A., et al., (1991) Sequences of Proteins of Immunological Interest, Fifth Edition, U.S. Department of Health and Human Services, NIH Publication No. 91-3242) and DNA fragments encompassing these regions can be obtained by standard PCR amplification. The light chain constant region can be a kappa or lambda constant region.

To create a scFv gene, the VH- and VL-encoding DNA fragments are operatively linked to another fragment encoding a flexible linker, e.g., encoding the amino acid sequence (Gly4-Ser)3, such that the VH and VL sequences can be expressed as a contiguous single-chain protein, with the VL and VH regions joined by the flexible linker (see, e.g., Bird et al., (1988) *Science* 242:423-426; Huston et al., (1988) *Proc. Natl. Acad. Sci. USA* 85:5879-5883; McCafferty et al., (1990) *Nature* 348:552-554).

In some embodiments, the present disclosure provides a vector comprising an isolated nucleic acid molecule comprising a nucleotide sequence encoding an antibody or antigen-binding portion thereof. In other embodiments, the vectors can be used for gene therapy.

Suitable vectors for the disclosure include expression vectors, viral vectors, and plasmid vectors. In one embodiment, the vector is a viral vector.

As used herein, an expression vector refers to any nucleic acid construct which contains the necessary elements for the transcription and translation of an inserted coding sequence, or in the case of an RNA viral vector, the necessary elements for replication and translation, when introduced into an appropriate host cell. Expression vectors can include plasmids, phagemids, viruses, and derivatives thereof.

Expression vectors of the disclosure can include polynucleotides encoding the antibody or antigen-binding portion thereof described herein. In one embodiment, the coding sequences for the antibody or antigen-binding portion thereof are operably linked to an expression control sequence. As used herein, two nucleic acid sequences are operably linked when they are covalently linked in such a way as to permit each component nucleic acid sequence to retain its functionality. A coding sequence and a gene expression control sequence are said to be operably linked when they are covalently linked in such a way as to place the expression or transcription and/or translation of the coding sequence under the influence or control of the gene expression control sequence. Two DNA sequences are said to be operably linked if induction of a promoter in the 5' gene expression sequence results in the transcription of the coding sequence and if the nature of the linkage between the two DNA sequences does not (1) result in the introduction of a frame-shift mutation, (2) interfere with the ability of the promoter region to direct the transcription of the coding sequence, or (3) interfere with the ability of the corresponding RNA transcript to be translated into a protein. Thus, a gene expression sequence would be operably linked to a coding nucleic acid sequence if the gene expression sequence were capable of effecting transcription of that coding nucleic acid sequence such that the resulting transcript is translated into the desired antibody or antigen-binding portion thereof.

Viral vectors include, but are not limited to, nucleic acid sequences from the following viruses: retrovirus, such as Moloney murine leukemia virus, Harvey murine sarcoma virus, murine mammary tumor virus, and Rous sarcoma virus; lentivirus; adenovirus; adeno-associated virus; SV40-type viruses; polyomaviruses; Epstein-Barr viruses; papilloma viruses; herpes virus; vaccinia virus; polio virus; and RNA virus such as a retrovirus. One can readily employ other vectors well-known in the art. Certain viral vectors are based on non-cytopathic eukaryotic viruses in which non-essential genes have been replaced with the gene of interest. Non-cytopathic viruses include retroviruses, the life cycle of which involves reverse transcription of genomic viral RNA into DNA with subsequent proviral integration into host cellular DNA. Retroviruses have been approved for human gene therapy trials. Most useful are those retroviruses that are replication-deficient (i.e., capable of directing synthesis of the desired proteins, but incapable of manufacturing an infectious particle). Such genetically altered retroviral expression vectors have general utility for the high efficiency transduction of genes in vivo. Standard protocols for producing replication-deficient retroviruses (including the steps of incorporation of exogenous genetic material into a plasmid, transfection of a packaging cell line with plasmid, production of recombinant retroviruses by the packaging cell line, collection of viral particles from tissue culture media, and infection of the target cells with viral particles) are provided in Kriegler, M., Gene Transfer and Expression, A Laboratory Manual, W.H. Freeman Co., New York (1990) and Murry, E. J., Methods in Molecular Biology, Vol. 7, Humana Press, Inc., Cliffton, N.J. (1991).

In one embodiment, the virus is an adeno-associated virus, a double-stranded DNA virus. The adeno-associated virus can be engineered to be replication-deficient and is capable of infecting a wide range of cell types and species. It further has advantages such as heat and lipid solvent stability; high transduction frequencies in cells of diverse lineages, including hematopoietic cells; and lack of superinfection inhibition thus allowing multiple series of transductions. Reportedly, the adeno-associated virus can integrate into human cellular DNA in a site-specific manner, thereby minimizing the possibility of insertional mutagenesis and variability of inserted gene expression characteristic of retroviral infection. In addition, wild-type adeno-associated virus infections have been followed in tissue culture for greater than 100 passages in the absence of selective pressure, implying that the adeno-associated virus genomic integration is a relatively stable event. The adeno-associated virus can also function in an extrachromosomal fashion.

In other embodiments, the vector is derived from lentivirus. In certain embodiments, the vector is a vector of a recombinant lentivirus capable of infecting non-dividing cells.

The lentiviral genome and the proviral DNA typically have the three genes found in retroviruses: gag, pol and env, which are flanked by two long terminal repeat (LTR) sequences. The gag gene encodes the internal structural (matrix, capsid and nucleocapsid) proteins; the pol gene encodes the RNA-directed DNA polymerase (reverse transcriptase), a protease and an integrase; and the env gene encodes viral envelope glycoproteins. The 5' and 3' LTR's serve to promote transcription and polyadenylation of the virion RNA's. The LTR contains all other cis-acting sequences necessary for viral replication. Lentiviruses have additional genes including vif, vpr, tat, rev, vpu, nef and vpx (in HIV-1, HIV-2 and/or SIV).

Adjacent to the 5' LTR are sequences necessary for reverse transcription of the genome (the tRNA primer binding site) and for efficient encapsidation of viral RNA into particles (the Psi site). If the sequences necessary for encapsidation (or packaging of retroviral RNA into infectious virions) are missing from the viral genome, the cis defect prevents encapsidation of genomic RNA.

However, the resulting mutant remains capable of directing the synthesis of all virion proteins. The disclosure provides a method of producing a recombinant lentivirus capable of infecting a non-dividing cell comprising transfecting a suitable host cell with two or more vectors carrying the packaging functions, namely gag, pol and env, as well as rev and tat. As will be disclosed herein below, vectors lacking a functional t at gene are desirable for certain applications. Thus, for example, a first vector can provide a nucleic acid encoding a viral gag and a viral pol and another vector can provide a nucleic acid encoding a viral env to produce a packaging cell. Introducing a vector providing a heterologous gene, herein identified as a transfer vector, into that packaging cell yields a producer cell which releases infectious viral particles carrying the foreign gene of interest.

According to the above-indicated configuration of vectors and foreign genes, the second vector can provide a nucleic acid encoding a viral envelope (env) gene. The env gene can be derived from nearly any suitable virus, including retroviruses. In some embodiments, the env protein is an amphotropic envelope protein which allows transduction of cells of human and other species.

Examples of retroviral-derived env genes include, but are not limited to: Moloney murine leukemia virus (MoMuLV or MMLV), Harvey murine sarcoma virus (HaMuSV or HSV), murine mammary tumor virus (MuMTV or MMTV), gibbon ape leukemia virus (GaLV or GALV), human immunodeficiency virus (HIV) and Rous sarcoma virus (RSV). Other env genes such as Vesicular stomatitis virus (VSV) protein G (VSV G) that of hepatitis viruses and of influenza also can be used.

The vector providing the viral env nucleic acid sequence is associated operably with regulatory sequences described elsewhere herein.

In certain embodiments, the vector includes a lentiviral vector in which the HIV virulence genes env, vif, vpr, vpu and nef were deleted without compromising the ability of the vector to transduce non-dividing cells.

In some embodiments, the vector includes a lentiviral vector which comprises a deletion of the U3 region of the 3' LTR. The deletion of the U3 region can be the complete deletion or a partial deletion.

In some embodiments, the lentiviral vector of the disclosure comprising the FVIII nucleotide sequence described herein can be transfected in a cell with (a) a first nucleotide sequence comprising a gag, a pol, or gag and pol genes and (b) a second nucleotide sequence comprising a heterologous env gene; wherein the lentiviral vector lacks a functional tat gene. In other embodiments, the cell is further transfected with a fourth nucleotide sequence comprising a rev gene. In certain embodiments, the lentiviral vector lacks functional genes selected from vif, vpr, vpu, vpx and nef, or a combination thereof.

In certain embodiments, a lentiviral vector comprises one or more nucleotide sequences encoding a gag protein, a Rev-response element, a central polypurine track (cPPT), or any combination thereof.

Examples of the lentiviral vectors are disclosed in WO9931251, WO9712622, WO9817815, WO9817816, and WO9818934, which are incorporated herein by reference in their entireties.

Other vectors include plasmid vectors. Plasmid vectors have been extensively described in the art and are well-known to those of skill in the art. See, e.g., Sambrook et al., Molecular Cloning: A Laboratory Manual, Second Edition, Cold Spring Harbor Laboratory Press, 1989. In the last few years, plasmid vectors have been found to be particularly advantageous for delivering genes to cells in vivo because of their inability to replicate within and integrate into a host genome. These plasmids, however, having a promoter compatible with the host cell, can express a peptide from a gene operably encoded within the plasmid. Some commonly used plasmids available from commercial suppliers include pBR322, pUC18, pUC19, various pcDNA plasmids, pRC/CMV, various pCMV plasmids, pSV40, and pBlueScript. Additional examples of specific plasmids include pcDNA3.1, catalog number V79020; pcDNA3.1/hygro, catalog number V87020; pcDNA4/myc-His, catalog number V86320; and pBudCE4.1, catalog number V53220, all from Invitrogen (Carlsbad, CA). Other plasmids are well-known to those of ordinary skill in the art. Additionally, plasmids can be custom designed using standard molecular biology techniques to remove and/or add specific fragments of DNA.

V. Antibody Production

Antibodies or fragments thereof that immunospecifically bind to FAM19A5 (e.g., human FAM19A5) can be produced by any method known in the art for the synthesis of antibodies, for example, by chemical synthesis or by recombinant expression techniques. The methods described herein employs, unless otherwise indicated, conventional techniques in molecular biology, microbiology, genetic analysis, recombinant DNA, organic chemistry, biochemistry, PCR, oligonucleotide synthesis and modification, nucleic acid hybridization, and related fields within the skill of the art. These techniques are described, for example, in the references cited herein and are fully explained in the literature. See, e.g., Maniatis T et al., (1982) Molecular Cloning: A Laboratory Manual, Cold Spring Harbor Laboratory Press; Sambrook J et al., (1989), Molecular Cloning: A Laboratory Manual, Second Edition, Cold Spring Harbor Laboratory Press; Sambrook J et al., (2001) Molecular Cloning: A Laboratory Manual, Cold Spring Harbor Laboratory Press, Cold Spring Harbor, NY; Ausubel F M et al., Current Protocols in Molecular Biology, John Wiley & Sons (1987 and annual updates); Current Protocols in Immunology, John Wiley & Sons (1987 and annual updates) Gait (ed.) (1984) Oligonucleotide Synthesis: A Practical Approach, IRL Press; Eckstein (ed.) (1991) Oligonucleotides and Analogues: A Practical Approach, IRL Press; Birren B et al., (eds.) (1999) Genome Analysis: A Laboratory Manual, Cold Spring Harbor Laboratory Press.

In a specific embodiment, an antibody described herein is an antibody (e.g., recombinant antibody) prepared, expressed, created or isolated by any means that involves creation, e.g., via synthesis, genetic engineering of DNA sequences. In certain embodiments, such antibody comprises sequences (e.g., DNA sequences or amino acid sequences) that do not naturally exist within the antibody germline repertoire of an animal or mammal (e.g., human) in vivo.

In a certain aspect, provided herein is a method of making an antibody or an antigen-binding fragment thereof which immunospecifically binds to FAM19A5 (e.g., human FAM19A5) comprising culturing a cell or host cell described herein. In a certain aspect, provided herein is a method of making an antibody or an antigen-binding fragment thereof which immunospecifically binds to FAM19A5 (e.g., human FAM19A5) comprising expressing (e.g., recombinantly expressing) the antibody or antigen-binding fragment thereof using a cell or host cell described herein (e.g., a cell or a host cell comprising polynucleotides encoding an antibody described herein). In a particular embodiment, the cell is an isolated cell. In a particular embodiment, the exogenous polynucleotides have been introduced into the cell. In a particular embodiment, the method further comprises the step of purifying the antibody or antigen-binding fragment thereof obtained from the cell or host cell.

Methods for producing polyclonal antibodies are known in the art (see, for example, Chapter 11 in: Short Protocols in Molecular Biology, (2002) 5th Ed., Ausubel F M et al., eds., John Wiley and Sons, New York).

Monoclonal antibodies can be prepared using a wide variety of techniques known in the art including the use of hybridoma, recombinant, and phage display technologies, or a combination thereof. For example, monoclonal antibodies can be produced using hybridoma techniques including those known in the art and taught, for example, in Harlow E & Lane D, Antibodies: A Laboratory Manual, (Cold Spring Harbor Laboratory Press, 2nd ed. 1988); Hammerling G J et al., in: Monoclonal Antibodies and T-Cell Hybridomas 563 681 (Elsevier, N.Y., 1981). The term "monoclonal antibody" as used herein is not limited to antibodies produced through hybridoma technology. For example, monoclonal antibodies can be produced recombinantly from host cells exogenously expressing an antibody described herein or a fragment thereof, for example, light chain and/or heavy chain of such antibody.

In specific embodiments, a "monoclonal antibody," as used herein, is an antibody produced by a single cell (e.g., hybridoma or host cell producing a recombinant antibody), wherein the antibody immunospecifically binds to FAM19A5 (e.g., human FAM19A5) as determined, e.g., by ELISA or other antigen-binding or competitive binding assay known in the art or in the Examples provided herein. In particular embodiments, a monoclonal antibody can be a chimeric antibody or a humanized antibody. In certain embodiments, a monoclonal antibody is a monovalent antibody or multivalent (e.g., bivalent) antibody. In particular embodiments, a monoclonal antibody is a monospecific or multispecific antibody (e.g., bispecific antibody). Monoclonal antibodies described herein can, for example, be made by the hybridoma method as described in Kohler G & Milstein C (1975) *Nature* 256: 495 or can, e.g., be isolated from phage libraries using the techniques as described herein, for example. Other methods for the preparation of clonal cell lines and of monoclonal antibodies expressed thereby are well known in the art (see, for example, Chapter 11 in: Short Protocols in Molecular Biology, (2002) 5th Ed., Ausubel F M et al., supra).

Methods for producing and screening for specific antibodies using hybridoma technology are routine and well known in the art. For example, in the hybridoma method, a mouse or other appropriate host animal, such as a sheep, goat, rabbit, rat, hamster or macaque monkey, is immunized to elicit lymphocytes that produce or are capable of producing antibodies that will specifically bind to the protein (e.g., human FAM19A5) used for immunization. Alternatively, lymphocytes can be immunized in vitro. Lymphocytes then are fused with myeloma cells using a suitable fusing agent, such as polyethylene glycol, to form a hybridoma cell (Goding J W (Ed), Monoclonal Antibodies: Principles and Practice, pp. 59-103 (Academic Press, 1986)). Additionally, a RIMMS (repetitive immunization multiple sites) technique can be used to immunize an animal (Kilpatrick K E et al., (1997) *Hybridoma* 16:381-9, incorporated by reference in its entirety).

In some embodiments, mice (or other animals, such as chickens, rats, monkeys, donkeys, pigs, sheep, hamster, or dogs) can be immunized with an antigen (e.g., FAM19A5 such as human FAM19A5) and once an immune response is detected, e.g., antibodies specific for the antigen are detected in the mouse serum, the mouse spleen is harvested and splenocytes isolated. The splenocytes are then fused by well-known techniques to any suitable myeloma cells, for example cells from cell line SP20 available from the American Type Culture Collection (ATCC) (Manassas, VA), to form hybridomas. Hybridomas are selected and cloned by limited dilution. In certain embodiments, lymph nodes of the immunized mice are harvested and fused with NSO myeloma cells.

The hybridoma cells thus prepared are seeded and grown in a suitable culture medium that preferably contains one or more substances that inhibit the growth or survival of the unfused, parental myeloma cells. For example, if the parental myeloma cells lack the enzyme hypoxanthine guanine phosphoribosyl transferase (HGPRT or HPRT), the culture medium for the hybridomas typically will include hypoxanthine, aminopterin, and thymidine (HAT medium), which substances prevent the growth of HGPRT-deficient cells.

Specific embodiments employ myeloma cells that fuse efficiently, support stable high-level production of antibody by the selected antibody-producing cells, and are sensitive to a medium such as HAT medium. Among these myeloma cell lines are murine myeloma lines, such as NSO cell line or those derived from MOPC-21 and MPC-11 mouse tumors available from the Salk Institute Cell Distribution Center, San Diego, CA, USA, and SP-2 or X63-Ag8.653 cells available from the American Type Culture Collection, Rockville, MD, USA. Human myeloma and mouse-human heteromyeloma cell lines also have been described for the production of human monoclonal antibodies (Kozbor D (1984) *J Immunol* 133: 3001-5; Brodeur et al., Monoclonal Antibody Production Techniques and Applications, pp. 51-63 (Marcel Dekker, Inc., New York, 1987)).

Culture medium in which hybridoma cells are growing is assayed for production of monoclonal antibodies directed against FAM19A5 (e.g., human FAM19A5). The binding specificity of monoclonal antibodies produced by hybridoma cells is determined by methods known in the art, for example, immunoprecipitation or by an in vitro binding assay, such as radioimmunoassay (RIA) or enzyme-linked immunoabsorbent assay (ELISA).

After hybridoma cells are identified that produce antibodies of the desired specificity, affinity, and/or activity, the clones can be subcloned by limiting dilution procedures and grown by standard methods (Goding J W (Ed), Monoclonal Antibodies: Principles and Practice, supra). Suitable culture media for this purpose include, for example, D-MEM or RPMI 1640 medium. In addition, the hybridoma cells can be grown in vivo as ascites tumors in an animal.

The monoclonal antibodies secreted by the subclones are suitably separated from the culture medium, ascites fluid, or serum by conventional immunoglobulin purification procedures such as, for example, protein A-Sepharose, hydroxylapatite chromatography, gel electrophoresis, dialysis, or affinity chromatography.

Antibodies described herein include antibody fragments which recognize specific FAM19A5 (e.g., human FAM19A5) and can be generated by any technique known to those of skill in the art. For example, Fab and F(ab')2 fragments described herein can be produced by proteolytic cleavage of immunoglobulin molecules, using enzymes such as papain (to produce Fab fragments) or pepsin (to produce F(ab')2 fragments). A Fab fragment corresponds to one of the two identical arms of an antibody molecule and contains the complete light chain paired with the VH and CH1 domains of the heavy chain. A F(ab')2 fragment contains the two antigen-binding arms of an antibody molecule linked by disulfide bonds in the hinge region.

Further, the antibodies described herein or antigen-binding fragments thereof can also be generated using various phage display methods known in the art. In phage display methods, functional antibody domains are displayed on the surface of phage particles which carry the polynucleotide sequences encoding them. In particular, DNA sequences encoding VH and VL domains are amplified from animal cDNA libraries (e.g., human or non-human such as murine or chicken cDNA libraries of affected tissues). The DNAs encoding the VH and VL domains are recombined together with a scFv linker by PCR and cloned into a phagemid vector. The vector is electroporated in *E. coli* and the *E. coli* is infected with helper phage. Phage used in these methods are typically filamentous phage including fd and M13, and the VH and VL domains are usually recombinantly fused to either the phage gene III or gene VIII. Phage expressing an antigen-binding domain that binds to a particular antigen can be selected or identified with antigen, e.g., using labeled antigen or antigen bound or captured to a solid surface or bead. Examples of phage display methods that can be used to make the antibodies described herein include those disclosed in Brinkman U et al., (1995) *J Immunol Methods* 182: 41-50; Ames R S et al., (1995) *J Immunol Methods* 184: 177-186; Kettleborough C A et al., (1994) Eur *J Immunol* 24: 952-958; Persic L et al., (1997) *Gene* 187: 9-18; Burton D R & Barbas C F (1994) *Advan Immunol* 57: 191-280; PCT Application No. PCT/GB91/001134; International Publication Nos. WO 90/02809, WO 91/10737, WO 92/01047, WO 92/18619, WO 93/1 1236, WO 95/15982, WO 95/20401, and WO 97/13844; and U.S. Pat. Nos. 5,698,426, 5,223,409, 5,403,484, 5,580,717, 5,427,908, 5,750,753, 5,821,047, 5,571,698, 5,427,908, 5,516,637, 5,780,225, 5,658,727, 5,733,743 and 5,969,108.

As described in the above references, after phage selection, the antibody coding regions from the phage can be isolated and used to generate whole antibodies, including human antibodies, or any other desired antigen binding fragment, and expressed in any desired host, including mammalian cells, insect cells, plant cells, yeast, and bacteria, e.g., as described below. Techniques to recombinantly produce antibody fragments such as Fab, Fab' and F(ab')2 fragments can also be employed using methods known in the art such as those disclosed in PCT publication No. WO 92/22324; Mullinax R L et al., (1992) *BioTechniques* 12(6): 864-9; Sawai H et al., (1995) *Am J Reprod Immunol* 34: 26-34; and Better M et al., (1988) *Science* 240: 1041-1043.

In one aspect, to generate whole antibodies, PCR primers including VH or VL nucleotide sequences, a restriction site, and a flanking sequence to protect the restriction site can be used to amplify the VH or VL sequences from a template, e.g., scFv clones. Utilizing cloning techniques known to those of skill in the art, the PCR amplified VH domains can be cloned into vectors expressing a VH constant region, and the PCR amplified VL domains can be cloned into vectors expressing a VL constant region, e.g., human kappa or lambda constant regions. The VH and VL domains can also be cloned into one vector expressing the necessary constant regions. The heavy chain conversion vectors and light chain conversion vectors are then co-transfected into cell lines to generate stable or transient cell lines that express full-length antibodies, e.g., IgG, using techniques known to those of skill in the art.

A chimeric antibody is a molecule in which different portions of the antibody are derived from different immunoglobulin molecules. For example, a chimeric antibody can contain a variable region of a non-human animal (e.g., mouse, rat or chicken) monoclonal antibody fused to a constant region of a human antibody. Methods for producing chimeric antibodies are known in the art. See, e.g., Morrison S L (1985) *Science* 229: 1202-7; Oi V T & Morrison S L (1986) *BioTechniques* 4: 214-221; Gillies S D et al., (1989) *J Immunol Methods* 125: 191-202; and U.S. Pat. Nos. 5,807,715, 4,816,567, 4,816,397, and 6,331,415.

A humanized antibody is capable of binding to a predetermined antigen and which comprises a framework region having substantially the amino acid sequence of a human immunoglobulin and CDRs having substantially the amino acid sequence of a non-human immunoglobulin (e.g., a murine or a chicken immunoglobulin). In particular embodiments, a humanized antibody also comprises at least a portion of an immunoglobulin constant region (Fc), typically that of a human immunoglobulin. The antibody also can include the CH1, hinge, CH2, CH3, and CH4 regions of the heavy chain. A humanized antibody can be selected from any class of immunoglobulins, including IgM, IgG, IgD, IgA, and IgE, and any isotype, including IgG1, IgG2, IgG3, and IgG4. Humanized antibodies can be produced using a variety of techniques known in the art, including but not limited to, CDR-grafting (European Patent No. EP 239400; International Publication No. WO 91/09967; and U.S. Pat. Nos. 5,225,539, 5,530,101, and 5,585,089), veneering or resurfacing (European Patent Nos. EP 592106 and EP 519596; Padlan E A (1991) *Mol Immunol* 28(4/5): 489-498; Studnicka G M et al., (1994) *Prot Engineering* 7(6): 805-814; and Roguska M A et al., (1994) *PNAS* 91: 969-973), chain shuffling (U.S. Pat. No. 5,565,332), and techniques disclosed in, e.g., U.S. Pat. Nos. 6,407,213, 5,766,886, International Publication No. WO 93/17105; Tan P et al., (2002) *J Immunol* 169: 1119-25; Caldas C et al., (2000) *Protein Eng.* 13(5): 353-60; Morea V et al., (2000) *Methods* 20(3): 267-79; Baca M et al., (1997) *J Biol Chem* 272(16): 10678-84; Roguska M A et al., (1996) *Protein Eng* 9(10): 895 904; Couto J R et al., (1995) *Cancer Res.* 55 (23 Supp): 5973s-5977s; Couto J R et al., (1995) *Cancer Res* 55(8): 1717-22; Sandhu J S (1994) *Gene* 150(2): 409-10 and Pedersen J T et al., (1994) *J Mol Biol* 235(3): 959-73. See also U.S. Application Publication No. US 2005/0042664 A1 (Feb. 24, 2005), which is incorporated by reference herein in its entirety.

Methods for making multispecific (e.g., bispecific antibodies) have been described. See, for example, U.S. Pat. Nos. 7,951,917; 7,183,076; 8,227,577; 5,837,242; 5,989, 830; 5,869,620; 6,132,992 and 8,586,713.

Single domain antibodies, for example, antibodies lacking the light chains, can be produced by methods well known in the art. See Riechmann L & Muyldermans S (1999) *J Immunol* 231: 25-38; Nuttall S D et al., (2000) *Curr Pharm Biotechnol* 1(3): 253-263; Muyldermans S, (2001) *J Biotechnol* 74(4): 277-302; U.S. Pat. No. 6,005,079; and International Publication Nos. WO 94/04678, WO 94/25591 and WO 01/44301.

Further, antibodies that immunospecifically bind to a FAM19A5 antigen can, in turn, be utilized to generate anti-idiotype antibodies that "mimic" an antigen using techniques well known to those skilled in the art. (See, e.g., Greenspan N S & Bona C A (1989) *FASEB J* 7(5): 437-444; and Nissinoff A (1991) *J Immunol* 147(8): 2429-2438).

In particular embodiments, an antibody described herein, which binds to the same epitope of FAM19A5 (e.g., human FAM19A5) as an anti-FAM19A5 antibody described herein, is a human antibody or an antigen-binding fragment thereof. In particular embodiments, an antibody described herein, which competitively blocks (e.g., in a dose-dependent manner) antibodies described herein, (e.g., 2-13 and 3-2) from binding to FAM19A5 (e.g., human FAM19A5), is a human antibody or an antigen-binding fragment thereof.

Human antibodies can be produced using any method known in the art. For example, transgenic mice which are incapable of expressing functional endogenous immunoglobulins, but which can express human immunoglobulin genes, can be used. In particular, the human heavy and light chain immunoglobulin gene complexes can be introduced randomly or by homologous recombination into mouse embryonic stem cells. Alternatively, the human variable region, constant region, and diversity region can be introduced into mouse embryonic stem cells in addition to the human heavy and light chain genes. The mouse heavy and light chain immunoglobulin genes can be rendered nonfunctional separately or simultaneously with the introduction of human immunoglobulin loci by homologous recombination. In particular, homozygous deletion of the JH region prevents endogenous antibody production. The modified embryonic stem cells are expanded and microinjected into blastocysts to produce chimeric mice. The chimeric mice are then bred to produce homozygous offspring which express human antibodies. The transgenic mice are immunized in the normal fashion with a selected antigen, e.g., all or a portion of an antigen (e.g., FAM19A5). Monoclonal antibodies directed against the antigen can be obtained from the immunized, transgenic mice using conventional hybridoma technology. The human immunoglobulin transgenes harbored by the transgenic mice rearrange during B cell differentiation, and subsequently undergo class switching and somatic mutation. Thus, using such a technique, it is possible to produce therapeutically useful IgG, IgA, IgM and IgE antibodies. For an overview of this technology for producing human antibodies, see Lonberg N & Huszar D (1995) *Int Rev Immunol* 13:65-93. For a detailed discussion of this technology for producing human antibodies and human monoclonal antibodies and protocols for producing such antibodies, see, e.g., International Publication Nos. WO 98/24893, WO 96/34096 and WO 96/33735; and U.S. Pat. Nos. 5,413,923, 5,625,126, 5,633,425, 5,569,825, 5,661, 016, 5,545,806, 5,814,318 and 5,939,598. Examples of mice capable of producing human antibodies include the XENO-MOUSE™ (Abgenix, Inc.; U.S. Pat. Nos. 6,075,181 and 6,150,184), the HUAB-MOUSE™ (Mederex, Inc./Gen Pharm; U.S. Pat. Nos. 5,545,806 and 5,569,825), the TRANS CHROMO MOUSE™ (Kirin) and the KM MOUSE™ (Medarex/Kirin).

Human antibodies which specifically bind to FAM19A5 (e.g., human FAM19A5) can be made by a variety of methods known in the art including phage display methods described above using antibody libraries derived from human immunoglobulin sequences. See also U.S. Pat. Nos. 4,444,887, 4,716,111, and 5,885,793; and International Publication Nos. WO 98/46645, WO 98/50433, WO 98/24893, WO 98/16654, WO 96/34096, WO 96/33735, and WO 91/10741.

In some embodiments, human antibodies can be produced using mouse-human hybridomas. For example, human peripheral blood lymphocytes transformed with Epstein-Barr virus (EBV) can be fused with mouse myeloma cells to produce mouse-human hybridomas secreting human monoclonal antibodies, and these mouse-human hybridomas can be screened to determine ones which secrete human monoclonal antibodies that immunospecifically bind to a target antigen (e.g., FAM19A5 such as human FAM19A5)). Such methods are known and are described in the art, see, e.g., Shinmoto H et al., (2004) *Cytotechnology* 46: 19-23; Naganawa Y et al., (2005) *Human Antibodies* 14: 27-31.

VI. Methods of Engineering Antibodies

As discussed above, the anti-FAM19A5 antibody or antigen-binding portion thereof having VH and VL sequences disclosed herein can be used to create new anti-FAM19A5 antibody or antigen-binding portion thereof by modifying the VH and/or VL sequences, or the constant region(s) attached thereto. Thus, in another aspect described herein, the structural features of an anti-FAM19A5 antibody described herein, e.g., 2-13 and 3-2, is used to create structurally related anti-FAM19A5 antibodies that retain at least one functional property of the antibodies described herein, such as binding to human FAM19A5. For example, the starting material for the engineering method is VH and/or VL sequences provided herein, or one or more CDR regions thereof. To create the engineered antibody, it is not necessary to actually prepare (i.e., express as a protein) an antibody having one or more of the VH and/or VL sequences provided herein, or one or more CDR regions thereof. Rather, the information contained in the sequence(s) is used as the starting material to create a "second generation" sequence(s) derived from the original sequence(s) and then the "second generation" sequence(s) is prepared and expressed as a protein.

Accordingly, provided herein are methods for preparing an anti-FAM19A5 antibody or antigen-binding portion thereof comprising:
(a) providing: (i) a heavy chain variable region sequence comprising a CDR1, CDR2, and/or CDR3 sequence as set forth in Table 2 or a CDR1, CDR2, and/or CDR3 of the heavy chain variable region as set forth in Table 4; and (ii) a light chain variable region sequence comprising a CDR1, CDR2, and/or CDR3 sequence as set forth in Table 3 or a CDR1, CDR2, and/or CDR3 of the light chain variable region as set forth in Table 5;
(b) altering at least one amino acid residue within the heavy chain variable region sequence and/or the light chain variable region sequence to create at least one altered antibody or antigen-binding portion sequence; and
(c) expressing the altered antibody or antigen-binding portion sequence as a protein.

Standard molecular biology techniques can be used to prepare and express the altered antibody or antigen-binding portion sequence.

In some embodiments, the antibody or antigen-binding portion thereof encoded by the altered antibody or antigen-binding portion sequence(s) is one that retains one, some or all of the functional properties of the anti-FAM19A5 antibodies described herein, which include,
(1) binds to soluble human FAM19A5, e.g., with a $K_D$ of 10 nM or less (e.g., 0.01 nM to 10 nM), e.g., as measured by Biacore;
(2) binds to membrane bound human FAM19A5, e.g., with a $K_D$ of 1 nM or less (e.g., 0.01 nM to 1 nM), e.g., as measured by ELISA;
(3) binds to membrane bound human FAM19A5, e.g., with an EC50 of 1 nM or less (e.g., 0.01 nM to 1 nM), e.g., as measured by ELISA;
(4) reduces, reverses, delays, and/or prevents an onset of reactive gliosis;
(5) suppresses an excessive proliferation of reactive astrocytes;
(6) decreases expression of chondroitin sulfate proteoglycans including neurocan and neuron-glial antigen 2 (NG2);
(7) increases expression of c-fos and pERK in the nucleus of neurons;
(8) promotes survival of neurons;
(9) increases expression of GAP43 in neurons;
(10) promotes regrowth of an axon; and
(11) competes in either direction or both directions for binding to human FAM19A5 with 2-13, 3-2, or 1-28.

The altered antibody or antigen-binding portion thereof can exhibit one or more, two or more, three or more, four or more, five or more, six or more, seven or more, eight or more, nine or more, ten or more, or all of the functional properties set forth as (1) through (11) above. The functional properties of the altered antibodies or antigen-binding portions thereof can be assessed using standard assays available in the art and/or described herein, such as those set forth in the Examples (e.g., ELISAs, FACS).

In certain embodiments of the methods of engineering antibodies described herein, mutations can be introduced randomly or selectively along all or part of an anti-FAM19A5 antibody coding sequence and the resulting modified anti-FAM19A5 antibodies can be screened for binding activity and/or other functional properties as described herein. Mutational methods have been described in the art. For example, PCT Publication WO 02/092780 by Short describes methods for creating and screening antibody mutations using saturation mutagenesis, synthetic ligation assembly, or a combination thereof. Alternatively, PCT Publication WO 03/074679 by Lazar et al. describes methods of using computational screening methods to optimize physiochemical properties of antibodies.

VII. Cells and Vectors

In certain aspects, provided herein are cells (e.g., host cells) expressing (e.g., recombinantly) antibodies described herein (or an antigen-binding fragment thereof) which specifically bind to FAM19A5 (e.g., human FAM19A5) and related polynucleotides and expression vectors. Provided herein are vectors (e.g., expression vectors) comprising polynucleotides comprising nucleotide sequences encoding anti-FAM19A5 antibodies or a fragment for recombinant expression in host cells, e.g., in mammalian cells. Also provided herein are host cells comprising such vectors for recombinantly expressing anti-FAM19A5 antibodies described herein (e.g., human or humanized antibody). In a particular aspect, provided herein are methods for producing an antibody described herein, comprising expressing such antibody from a host cell.

Recombinant expression of an antibody described herein (e.g., a full-length antibody, heavy and/or light chain of an antibody, or a single chain antibody described herein) that specifically binds to FAM19A5 (e.g., human FAM19A5) involves construction of an expression vector containing a polynucleotide that encodes the antibody. Once a polynucleotide encoding an antibody molecule, heavy and/or light chain of an antibody, or a fragment thereof (e.g., heavy and/or light chain variable domains) described herein has been obtained, the vector for the production of the antibody molecule can be produced by recombinant DNA technology using techniques well known in the art. Thus, methods for preparing a protein by expressing a polynucleotide containing an antibody or antibody fragment (e.g., light chain or heavy chain) encoding nucleotide sequence are described herein. Methods which are well known to those skilled in the art can be used to construct expression vectors containing antibody or antibody fragment (e.g., light chain or heavy chain) coding sequences and appropriate transcriptional and translational control signals. These methods include, for example, in vitro recombinant DNA techniques, synthetic techniques, and in vivo genetic recombination. Also provided are replicable vectors comprising a nucleotide sequence encoding an antibody molecule described herein, a heavy or light chain of an antibody, a heavy or light chain variable domain of an antibody or a fragment thereof, or a heavy or light chain CDR, operably linked to a promoter. Such vectors can, for example, include the nucleotide sequence encoding the constant region of the antibody molecule (see, e.g., International Publication Nos. WO 86/05807 and WO 89/01036; and U.S. Pat. No. 5,122,464) and variable domains of the antibody can be cloned into such a vector for expression of the entire heavy, the entire light chain, or both the entire heavy and light chains.

An expression vector can be transferred to a cell (e.g., host cell) by conventional techniques and the resulting cells can then be cultured by conventional techniques to produce an antibody described herein (e.g., an antibody comprising the VH and/or VL, or one or more of the VH and/or VL CDRs, of 2-13, 3-2, or 1-28) or a fragment thereof. Thus, provided herein are host cells containing a polynucleotide encoding an antibody described herein or fragments thereof, or a heavy or light chain thereof, or fragment thereof, or a single chain antibody described herein, operably linked to a promoter for expression of such sequences in the host cell. In certain embodiments, for the expression of double-chained antibodies, vectors encoding both the heavy and light chains, individually, can be co-expressed in the host cell for expression of the entire immunoglobulin molecule, as detailed below. In certain embodiments, a host cell contains a vector comprising a polynucleotide encoding both the heavy chain and light chain of an antibody described herein, or a fragment thereof. In specific embodiments, a host cell contains two different vectors, a first vector comprising a polynucleotide encoding a heavy chain or a heavy chain variable region of an antibody described herein, or a fragment thereof, and a second vector comprising a polynucleotide encoding a light chain or a light chain variable region of an antibody described herein, or a fragment thereof. In other embodiments, a first host cell comprises a first vector comprising a polynucleotide encoding a heavy chain or a heavy chain variable region of an antibody described herein, or a fragment thereof, and a second host cell comprises a second vector comprising a polynucleotide encoding a light chain or a light chain variable region of an antibody described herein. In specific embodiments, a heavy chain/heavy chain variable region expressed by a first cell associated with a light chain/light chain variable region of a second cell to form an anti-FAM19A5 antibody described herein or an antigen-binding fragment thereof. In certain embodiments, provided herein is a population of host cells comprising such first host cell and such second host cell.

In a particular embodiment, provided herein is a population of vectors comprising a first vector comprising a polynucleotide encoding a light chain/light chain variable region of an anti-FAM19A5 antibody described herein, and a second vector comprising a polynucleotide encoding a heavy chain/heavy chain variable region of an anti-FAM19A5 antibody described herein.

A variety of host-expression vector systems can be utilized to express antibody molecules described herein. Such host-expression systems represent vehicles by which the coding sequences of interest can be produced and subsequently purified, but also represent cells which can, when transformed or transfected with the appropriate nucleotide coding sequences, express an antibody molecule described herein in situ. These include but are not limited to microorganisms such as bacteria (e.g., *E. coli* and *B. subtilis*) transformed with recombinant bacteriophage DNA, plasmid DNA or cosmid DNA expression vectors containing antibody coding sequences; yeast (e.g., *Saccharomyces Pichia*) transformed with recombinant yeast expression vectors containing antibody coding sequences; insect cell systems infected with recombinant virus expression vectors (e.g., baculovirus) containing antibody coding sequences; plant cell systems (e.g., green algae such as *Chlamydomonas reinhardtii*) infected with recombinant virus expression vectors (e.g., cauliflower mosaic virus, CaMV; tobacco mosaic virus, TMV) or transformed with recombinant plasmid expression vectors (e.g., Ti plasmid) containing antibody coding sequences; or mammalian cell systems (e.g., COS (e.g., COS1 or COS), CHO, BHK, MDCK, HEK 293, NSO, PER.C6, VERO, CRL7030, HsS78Bst, HeLa, and NIH 3T3, HEK-293T, HepG2, SP210, R1.1, B-W, L-M, BSC1, BSC40, YB/20 and BMT10 cells) harboring recombinant expression constructs containing promoters derived from the genome of mammalian cells (e.g., metallothionein promoter) or from mammalian viruses (e.g., the adenovirus late promoter; the vaccinia virus 7.5K promoter). In a specific embodiment, cells for expressing antibodies described herein or an antigen-binding fragment thereof are CHO cells, for example CHO cells from the CHO GS SYSTEM™ (Lonza). In a particular embodiment, cells for expressing antibodies described herein are human cells, e.g., human cell lines. In a specific embodiment, a mammalian expression vector is POPTIVEC™ or pcDNA3.3. In a particular embodiment, bacterial cells such as *Escherichia coli*, or eukaryotic cells (e.g., mammalian cells), especially for the expression of whole recombinant antibody molecule, are used for the expression of a recombinant antibody molecule. For example, mammalian cells such as Chinese hamster ovary (CHO) cells, in conjunction with a vector such as the major intermediate early gene promoter element from human cytomegalovirus is an effective expression system for antibodies (Foecking M K & Hofstetter H (1986) *Gene* 45: 101-5; and Cockett M I et al., (1990) *Biotechnology* 8(7): 662-7). In certain embodiments, antibodies described herein are produced by CHO cells or NSO cells. In a specific embodiment, the expression of nucleotide sequences encoding antibodies described herein which immunospecifically bind FAM19A5 (e.g., human FAM19A5) is regulated by a constitutive promoter, inducible promoter or tissue specific promoter.

In bacterial systems, a number of expression vectors can be advantageously selected depending upon the use intended for the antibody molecule being expressed. For example, when a large quantity of such an antibody is to be produced, for the generation of pharmaceutical compositions of an antibody molecule, vectors which direct the expression of high levels of fusion protein products that are readily purified can be desirable. Such vectors include, but are not limited to, the *E. coli* expression vector pUR278 (Ruether U & Mueller-Hill B (1983) *EMBO J* 2: 1791-1794), in which the antibody coding sequence can be ligated individually into the vector in frame with the lac Z coding region so that a fusion protein is produced; pIN vectors (Inouye S & Inouye M (1985) *Nuc Acids Res* 13: 3101-3109; Van Heeke G & Schuster S M (1989) *J Biol Chem* 24: 5503-5509); and the like. For example, pGEX vectors can also be used to express foreign polypeptides as fusion proteins with glutathione 5-transferase (GST). In general, such fusion proteins are soluble and can easily be purified from lysed cells by adsorption and binding to matrix glutathione agarose beads followed by elution in the presence of free glutathione. The pGEX vectors are designed to include thrombin or factor Xa protease cleavage sites so that the cloned target gene product can be released from the GST moiety.

In an insect system, *Autographa californica* nuclear polyhedrosis virus (AcNPV), for example, can be used as a vector to express foreign genes. The virus grows in *Spodoptera frugiperda* cells. The antibody coding sequence can be cloned individually into non-essential regions (for example the polyhedrin gene) of the virus and placed under control of an AcNPV promoter (for example the polyhedrin promoter).

In mammalian host cells, a number of viral-based expression systems can be utilized. In cases where an adenovirus is used as an expression vector, the antibody coding sequence of interest can be ligated to an adenovirus transcription/translation control complex, e.g., the late promoter and tripartite leader sequence. This chimeric gene can then be inserted in the adenovirus genome by in vitro or in vivo recombination. Insertion in a non-essential region of the viral genome (e.g., region E1 or E3) will result in a recombinant virus that is viable and capable of expressing the antibody molecule in infected hosts (e.g., see Logan J & Shenk T (1984) *PNAS* 81(12): 3655-9). Specific initiation signals can also be required for efficient translation of inserted antibody coding sequences. These signals include the ATG initiation codon and adjacent sequences. Furthermore, the initiation codon must be in phase with the reading frame of the desired coding sequence to ensure translation of the entire insert. These exogenous translational control signals and initiation codons can be of a variety of origins, both natural and synthetic. The efficiency of expression can be enhanced by the inclusion of appropriate transcription enhancer elements, transcription terminators, etc. (see, e.g., Bitter G et al., (1987) *Methods Enzymol.* 153: 516-544).

In addition, a host cell strain can be chosen which modulates the expression of the inserted sequences, or modifies and processes the gene product in the specific fashion desired. Such modifications (e.g., glycosylation) and processing (e.g., cleavage) of protein products can be important for the function of the protein. Different host cells have characteristic and specific mechanisms for the post-translational processing and modification of proteins and gene products. Appropriate cell lines or host systems can be chosen to ensure the correct modification and processing of the foreign protein expressed. To this end, eukaryotic host cells which possess the cellular machinery for proper processing of the primary transcript, glycosylation, and phosphorylation of the gene product can be used. Such mammalian host cells include but are not limited to CHO, VERO, BHK, Hela, MDCK, HEK 293, NIH 3T3, W138, BT483, Hs578T, HTB2, BT20 and T47D, NSO (a murine myeloma cell line that does not endogenously produce any immunoglobulin chains), CRL7030, COS (e.g., COS 1 or COS), PER.C6, VERO, HsS78Bst, HEK-293T, HepG2, SP210, R1.1, B-W, L-M, BSC 1, BSC40, YB/20, BMT10 and HsS78Bst cells. In certain embodiments, anti-FAM19A5 antibodies described herein are produced in mammalian cells, such as CHO cells.

In a specific embodiment, the antibodies described herein or antigen-binding portions thereof have reduced fucose content or no fucose content. Such antibodies can be produced using techniques known one skilled in the art. For example, the antibodies can be expressed in cells deficient or lacking the ability of to fucosylate. In a specific example, cell lines with a knockout of both alleles of 1,6-fucosyltransferase can be used to produce antibodies or antigen-binding portions thereof with reduced fucose content. The POTELLIGENT® system (Lonza) is an example of such a system that can be used to produce antibodies or antigen-binding portions thereof with reduced fucose content.

For long-term, high-yield production of recombinant proteins, stable expression cells can be generated. For example, cell lines which stably express an anti-FAM19A5 antibody described herein an antigen-binding portion thereof can be engineered. In specific embodiments, a cell provided herein stably expresses a light chain/light chain variable domain and a heavy chain/heavy chain variable domain which associate to form an antibody described herein or an antigen-binding portion thereof.

In certain aspects, rather than using expression vectors which contain viral origins of replication, host cells can be transformed with DNA controlled by appropriate expression control elements (e.g., promoter, enhancer, sequences, transcription terminators, polyadenylation sites, etc.), and a selectable marker. Following the introduction of the foreign DNA/polynucleotide, engineered cells can be allowed to grow for 1-2 days in an enriched media, and then are switched to a selective media. The selectable marker in the recombinant plasmid confers resistance to the selection and allows cells to stably integrate the plasmid into their chromosomes and grow to form foci which in turn can be cloned and expanded into cell lines. This method can advantageously be used to engineer cell lines which express an anti-FAM19A5 antibody described herein or an antibody binding portion thereof. Such engineered cell lines can be particularly useful in screening and evaluation of compositions that interact directly or indirectly with the antibody molecule.

A number of selection systems can be used, including but not limited to, the herpes simplex virus thymidine kinase (Wigler M et al., (1977) *Cell* 11(1): 223-32), hypoxanthine-guanine phosphoribosyltransferase (Szybalska E H & Szybalski W (1962) *PNAS* 48(12): 2026-2034) and adenine phosphoribosyltransferase (Lowy I et al., (1980) *Cell* 22(3): 817-23) genes can be employed in tk-, hgprt- or aprt-cells, respectively. Also, antimetabolite resistance can be used as the basis of selection for the following genes: dhfr, which confers resistance to methotrexate (Wigler M et al., (1980) *PNAS* 77(6): 3567-70; O'Hare K et al., (1981) *PNAS* 78: 1527-31); gpt, which confers resistance to mycophenolic acid (Mulligan R C & Berg P (1981) *PNAS* 78(4): 2072-6); neo, which confers resistance to the aminoglycoside G-418 (Wu G Y & Wu C H (1991) *Biotherapy* 3: 87-95; Tolstoshev P (1993) *Ann Rev Pharmacol Toxicol* 32: 573-596; Mulligan R C (1993) *Science* 260: 926-932; and Morgan R A & Anderson W F (1993) *Ann Rev Biochem* 62: 191-217; Nabel G J & Feigner P L (1993) *Trends Biotechnol* 11(5): 211-5); and hygro, which confers resistance to hygromycin (Santerre R F et al., (1984) *Gene* 30(1-3): 147-56). Methods commonly known in the art of recombinant DNA technology can be routinely applied to select the desired recombinant clone and such methods are described, for example, in Ausubel F M et al., (eds.), Current Protocols in Molecular Biology, John Wiley & Sons, N Y (1993); Kriegler M, Gene Transfer and Expression, A Laboratory Manual, Stockton Press, N Y (1990); and in Chapters 12 and 13, Dracopoli N C et al., (eds.), Current Protocols in Human Genetics, John Wiley & Sons, N Y (1994); Colbere-Garapin F et al., (1981) *J Mol Biol* 150: 1-14, which are incorporated by reference herein in their entireties.

The expression levels of an antibody molecule can be increased by vector amplification (for a review, see Bebbington C R & Hentschel C C G, The use of vectors based on gene amplification for the expression of cloned genes in mammalian cells in DNA cloning, Vol. 3 (Academic Press, New York, 1987)). When a marker in the vector system expressing antibody is amplifiable, increase in the level of inhibitor present in culture of host cell will increase the number of copies of the marker gene. Since the amplified region is associated with the antibody gene, production of the antibody will also increase (Crouse G F et ah, (1983) *Mol Cell Biol* 3: 257-66).

The host cell can be co-transfected with two or more expression vectors described herein, the first vector encoding a heavy chain derived polypeptide and the second vector encoding a light chain derived polypeptide. The two vectors can contain identical selectable markers which enable equal expression of heavy and light chain polypeptides. The host cells can be co-transfected with different amounts of the two or more expression vectors. For example, host cells can be transfected with any one of the following ratios of a first expression vector and a second expression vector: 1:1, 1:2, 1:3, 1:4, 1:5, 1:6, 1:7, 1:8, 1:9, 1:10, 1:12, 1:15, 1:20, 1:25, 1:30, 1:35, 1:40, 1:45, or 1:50.

Alternatively, a single vector can be used which encodes, and is capable of expressing, both heavy and light chain polypeptides. In such situations, the light chain should be placed before the heavy chain to avoid an excess of toxic free heavy chain (Proudfoot N J (1986) *Nature* 322: 562-565; and Kohler G (1980) *PNAS* 77: 2197-2199). The coding sequences for the heavy and light chains can comprise cDNA or genomic DNA. The expression vector can be monocistronic or multicistronic. A multicistronic nucleic acid construct can encode 2, 3, 4, 5, 6, 7, 8, 9, 10 or more, or in the range of 2-5, 5-10 or 10-20 genes/nucleotide sequences. For example, a bicistronic nucleic acid construct can comprise in the following order a promoter, a first gene (e.g., heavy chain of an antibody described herein), and a second gene and (e.g., light chain of an antibody described herein). In such an expression vector, the transcription of both genes can be driven by the promoter, whereas the translation of the mRNA from the first gene can be by a cap-dependent scanning mechanism and the translation of the mRNA from the second gene can be by a cap-independent mechanism, e.g., by an IRES.

Once an antibody molecule described herein has been produced by recombinant expression, it can be purified by any method known in the art for purification of an immunoglobulin molecule, for example, by chromatography (e.g., ion exchange, affinity, particularly by affinity for the specific antigen after Protein A, and sizing column chromatography), centrifugation, differential solubility, or by any other standard technique for the purification of proteins. Further, the antibodies described herein can be fused to heterologous polypeptide sequences described herein or otherwise known in the art to facilitate purification.

In specific embodiments, an antibody or an antigen-binding portion thereof described herein is isolated or purified. Generally, an isolated antibody is one that is substantially free of other antibodies with different antigenic specificities than the isolated antibody. For example, in a particular embodiment, a preparation of an antibody described herein is substantially free of cellular material and/or chemical precursors. The language "substantially free of cellular material" includes preparations of an antibody in which the antibody is separated from cellular components of the cells from which it is isolated or recombinantly produced. Thus, an antibody that is substantially free of cellular material includes preparations of antibody having less than about 30%, 20%, 10%, 5%, 2%, 1%, 0.5%, or 0.1% (by dry weight) of heterologous protein (also referred to herein as a "contaminating protein") and/or variants of an antibody, for example, different post-translational modified forms of an antibody or other different versions of an antibody (or antibody binding portions). When the antibody is recombinantly produced, it is also generally substantially free of culture medium, i.e., culture medium represents less than about 20%>, 10%>, 2%, 1%, 0.5%, or 0.1% of the volume of the protein preparation. When the antibody is produced by chemical synthesis, it is generally substantially free of chemical precursors or other chemicals, i.e., it is separated from chemical precursors or other chemicals which are involved in the synthesis of the protein. Accordingly, such preparations of the antibody have less than about 30%, 20%, 10%, or 5% (by dry weight) of chemical precursors or compounds other than the antibody of interest. In a specific embodiment, antibodies described herein are isolated or purified.

VIII. Assays

Antibodies described herein can be tested for binding to FAM19A5 by, for example, standard ELISA. Briefly, microtiter plates are coated with purified FAM19A5 at 1-2 µg/ml in PBS, and then blocked with 5% bovine serum albumin in PBS. Dilutions of antibody (e.g., dilutions of plasma from FAM19A5-immunized mice) are added to each well and incubated for 1-2 hours at 37° C. The plates are washed with PBS/Tween and then incubated with secondary reagent (e.g., for human antibodies, a goat-anti-human IgG Fc-specific polyclonal reagent) conjugated to horseradish peroxidase (HRP) for 1 hour at 37° C. After washing, the plates are developed with ABTS substrate (Moss Inc, product: ABTS-1000) and analyzed by a spectrophotometer at OD 415-495. Sera from immunized mice are then further screened by flow cytometry for binding to a cell line expressing human FAM19A5, but not to a control cell line that does not express FAM19A5. Briefly, the binding of anti-FAM19A5antibodies is assessed by incubating FAM19A5 expressing CHO cells with the anti-FAM19A5antibody at 1:20 dilution. The cells are washed and binding is detected with a PE-labeled anti-human IgG Ab. Flow cytometric analyses are performed using a FACS can flow cytometry (Becton Dickinson, San Jose, CA). Preferably, mice which develop the highest titers will be used for fusions.

An ELISA assay as described above can be used to screen for antibodies and, thus, hybridomas that produce antibodies that show positive reactivity with the FAM19A5 immunogen. Hybridomas that produce antibodies that bind, preferably with high affinity, to FAM19A5 can then be subcloned and further characterized. One clone from each hybridoma, which retains the reactivity of the parent cells (by ELISA), can then be chosen for making a cell bank, and for antibody purification.

To purify anti-FAM19A5 antibodies, selected hybridomas can be grown in two-liter spinner-flasks for monoclonal antibody purification. Supernatants can be filtered and concentrated before affinity chromatography with protein A-sepharose (Pharmacia, Piscataway, NJ). Eluted IgG can be checked by gel electrophoresis and high performance liquid chromatography to ensure purity. The buffer solution can be exchanged into PBS, and the concentration can be determined by OD 280 using 1.43 extinction coefficient. The monoclonal antibodies can be aliquoted and stored at $-80°$ C.

To determine if the selected anti-FAM19A5 monoclonal antibodies bind to unique epitopes, each antibody can be biotinylated using commercially available reagents (Pierce, Rockford, IL). Biotinylated MAb binding can be detected with a streptavidin labeled probe. Competition studies using unlabeled monoclonal antibodies and biotinylated monoclonal antibodies can be performed using FAM19A5 coated-ELISA plates as described above.

To determine the isotype of purified antibodies, isotype ELISAs can be performed using reagents specific for antibodies of a particular isotype. For example, to determine the isotype of a human monoclonal antibody, wells of microtiter plates can be coated with 1 µg/ml of anti-human immunoglobulin overnight at 4° C. After blocking with 1% BSA, the plates are reacted with 1 µg/ml or less of test monoclonal antibodies or purified isotype controls, at ambient temperature for one to two hours. The wells can then be reacted with either human IgG1 or human IgM-specific alkaline phosphatase-conjugated probes. Plates are developed and analyzed as described above.

To test the binding of monoclonal antibodies to live cells expressing FAM19A5, flow cytometry can be used, as described in the Examples. Briefly, cell lines expressing membrane-bound FAM19A5 (grown under standard growth conditions) are mixed with various concentrations of monoclonal antibodies in PBS containing 0.1% BSA at 4° C. for 1 hour. After washing, the cells are reacted with Fluorescein-labeled anti-IgG antibody under the same conditions as the primary antibody staining. The samples can be analyzed by FACScan instrument using light and side scatter properties to gate on single cells and binding of the labeled antibodies is determined. An alternative assay using fluorescence microscopy can be used (in addition to or instead of) the flow cytometry assay. Cells can be stained exactly as described above and examined by fluorescence microscopy. This method allows visualization of individual cells, but can have diminished sensitivity depending on the density of the antigen.

Anti-FAM19A5 antibodies can be further tested for reactivity with the FAM19A5 antigen by Western blotting. Briefly, cell extracts from cells expressing FAM19A5 can be prepared and subjected to sodium dodecyl sulfate polyacrylamide gel electrophoresis. After electrophoresis, the separated antigens will be transferred to nitrocellulose membranes, blocked with 20% mouse serum, and probed with the monoclonal antibodies to be tested. IgG binding can be detected using anti-IgG alkaline phosphatase and developed with BCIP/NBT substrate tablets (Sigma Chem. Co., St. Louis, MO).

Methods for analyzing binding affinity, cross-reactivity, and binding kinetics of various anti-FAM19A5 antibodies include standard assays known in the art, for example, BIACORE™ surface plasmon resonance (SPR) analysis using a BIACORE™ 2000 SPR instrument (Biacore AB, Uppsala, Sweden).

In one embodiment, an antibody specifically binds to the soluble form of human FAM19A5. In one embodiment, an antibody specifically binds to the membrane-bound form of human FAM19A5. An antibody can specifically bind to a particular epitope of FAM19A5 (e.g., a SEQ ID NO: 6 or a fragment within SEQ ID NO: 6). In certain embodiments, the antibody specifically binds human FAM19A5, preferably, with high affinity, and does not cross-react to other members of the FAM19 subfamily of proteins.

IX. Bispecific Molecules

Antibodies described herein can be used for forming bispecific molecules. An anti-FAM19A5 antibody, or antigen-binding portions thereof, can be derivatized or linked to another functional molecule, e.g., another peptide or protein (e.g., another antibody or ligand for a receptor) to generate a bispecific molecule that binds to at least two different binding sites or target molecules. Cytokines such as IL-6, CNTF, LIF, EGF and TGFα, have been implicated as triggers of onset of gliosis and/or reactive astrogliosis (Balasingam et al., J. Neurosci. 14(2):846-56 (1994); Winter et al., *Proc. Natl. Acad. Sci. U.S.A.* 20; 92(13):5865-9 (1995)) by activating the protein signal transducer and activator of transcription 3 (STAT3), which then regulates many aspects of reactive astrogliosis after CNS injury. Herrmann J. E. et al., *J. Neurosci.* 28(28): 7231-7243 (2008). For example, absence or reduced STAT3 leads to attenuated up-regulation of Glial fibrillary acidic protein (GFAP), failure of astrocyte hypertrophy, and increased spread of inflammation, increased lesion volume and partially attenuated motor recovery after CNS injury. Herrmann J. E. et al., *J. Neurosci.* 28(28): 7231-7243 (2008). Thus, for example, an anti-FAM19A5 antibody can be linked to an antibody or scFv that binds specifically to any protein that is involved in inhibiting onset of gliosis and/or excessive proliferation of reactive astrogliosis for combination treatments, e.g., antibodies to IL-6 CNTF, LIF, EGF or TGFα.

Also, an anti-FAM19A5 antibody can be linked to an antibody or scFv that treats a disease or disorder including a central nervous system damage (e.g., a traumatic brain injury, a cerebrospinal damage, a stroke, or a brain tumor), a cerebrospinal system damage, a degenerative brain disorder (e.g., Huntington's disease, Parkinson's disease, Alzheimer's disease, multiple sclerosis, ALS), a degenerative cerebrospinal or nerve disorder, or a neuropathic pain in a subject (see diseases or disorders in Section XIII below).

For example, an anti-FAM19A5 antibody can be linked to an antibody or scFv, e.g., Natalizumab (Tysabri), or Alemtuzumab (Lemtrada), that treats multiple sclerosis.

The antibody described herein can in fact be derivatized or linked to more than one other functional molecule to generate multispecific molecules that bind to more than two different binding sites and/or target molecules; such multispecific molecules are also intended to be encompassed by the term "bispecific molecule" as used herein. To create a bispecific molecule described herein, an antibody described herein can be functionally linked (e.g., by chemical coupling, genetic fusion, noncovalent association or otherwise) to one or more other binding molecules, such as another antibody, antibody binding portion thereof, peptide or binding mimetic, such that a bispecific molecule results. In one embodiment, a bispecific molecule binds to FAM19A5 and VEGF. In another embodiment, a bispecific molecule binds to FAM19A5 and EGF.

Accordingly, provided herein are bispecific molecules comprising at least one first binding specificity for FAM19A5 and a second binding specificity for a second target epitope. In an embodiment described herein in which the bispecific molecule is multispecific, the molecule can further include a third binding specificity.

In one embodiment, the bispecific molecules described herein comprise as a binding specificity at least one antibody, or an antibody binding portion thereof, including, e.g., an Fab, Fab', F(ab')$_2$, Fv, or a single chain Fv (scFv). The antibody can also be a light chain or heavy chain dimer, or any minimal fragment thereof such as a Fv or a single chain construct as described in Ladner et al. U.S. Pat. No. 4,946,778, the contents of which is expressly incorporated by reference.

While human monoclonal antibodies are preferred, other antibodies which can be employed in the bispecific molecules described herein are murine, chimeric and humanized monoclonal antibodies.

The bispecific molecules described herein can be prepared by conjugating the constituent binding specificities using methods known in the art. For example, each binding specificity of the bispecific molecule can be generated separately and then conjugated to one another. When the binding specificities are proteins or peptides, a variety of coupling or cross-linking agents can be used for covalent conjugation. Examples of cross-linking agents include protein A, carbodiimide, N-succinimidyl-S-acetyl-thioacetate (SATA), 5,5'-dithiobis(2-nitrobenzoic acid) (DTNB), o-phenylenedimaleimide (oPDM), N-succinimidyl-3-(2-pyridyldithio)propionate (SPDP), and sulfosuccinimidyl 4-(N-maleimidomethyl) cyclohaxane-1-carboxylate (sulfo-SMCC) (see, e.g., Karpovsky et al., (1984) *J. Exp. Med.* 160: 1686; Liu, M A et al., (1985) *Proc. Natl. Acad. Sci. USA* 82:8648). Other methods include those described in Paulus (1985) *Behring Ins. Mitt. No.* 78, 118-132; Brennan et al., (1985) *Science* 229:81-83), and Glennie et al., (1987) *J. Immunol.* 139: 2367-2375). Preferred conjugating agents are SATA and sulfo-SMCC, both available from Pierce Chemical Co. (Rockford, IL).

When the binding specificities are antibodies, they can be conjugated via sulfhydryl bonding of the C-terminus hinge regions of the two heavy chains. In a particularly preferred embodiment, the hinge region is modified to contain an odd number of sulfhydryl residues, preferably one, prior to conjugation.

Alternatively, both binding specificities can be encoded in the same vector and expressed and assembled in the same host cell. This method is particularly useful where the bispecific molecule is a mAb×mAb, mAb×Fab, mAb×(scFv) 2, Fab×F(ab')2 or ligand ×Fab fusion protein. A bispecific antibody can comprise an antibody comprising a scFv at the C-terminus of each heavy chain. A bispecific molecule described herein can be a single chain molecule comprising one single chain antibody and a binding determinant, or a single chain bispecific molecule comprising two binding determinants. Bispecific molecules can comprise at least two single chain molecules. Methods for preparing bispecific molecules are described for example in U.S. Pat. Nos. 5,260,203; 5,455,030; 4,881,175; 5,132,405; 5,091,513; 5,476,786; 5,013,653; 5,258,498; and 5,482,858.

Binding of the bispecific molecules to their specific targets can be confirmed using art-recognized methods, such as enzyme-linked immunosorbent assay (ELISA), radioimmunoassay (RIA), FACS analysis, bioassay (e.g., growth inhibition), or Western Blot assay. Each of these assays generally detects the presence of protein-antibody complexes of particular interest by employing a labeled reagent (e.g., an antibody) specific for the complex of interest.

X. Diagnosis

In one embodiment the moiety attached to an anti-FAM19A5 antibody is selected from the group consisting of a binding moiety, a labeling moiety, and a biologically active moiety.

Antibodies described herein can be used for diagnostic purposes, including sample testing and in vivo imaging, and for this purpose the antibody (or binding portion thereof) can be conjugated to an appropriate detectable agent, to form an immunoconjugate. For diagnostic purposes, appropriate agents are detectable labels that include radioisotopes, for whole body imaging, and radioisotopes, enzymes, fluorescent labels and other suitable antibody tags for sample testing.

The detectable labels can be any of the various types used currently in the field of in vitro diagnostics, including particulate labels including metal sols such as colloidal gold, isotopes such as $I^{125}$ or $Tc^{99}$ presented for instance with a peptidic chelating agent of the N2S2, N3S or N4 type, chromophores including fluorescent markers, luminescent markers, phosphorescent markers and the like, as well as enzyme labels that convert a given substrate to a detectable marker, and polynucleotide tags that are revealed following amplification such as by polymerase chain reaction. Suitable enzyme labels include horseradish peroxidase, alkaline phosphatase and the like. For instance, the label can be the enzyme alkaline phosphatase, detected by measuring the presence or formation of chemiluminescence following conversion of 1,2 dioxetane substrates such as adamantyl methoxy phosphoryloxy phenyl dioxetane (AMPPD), disodium 3-(4-(methoxyspiro{1,2-dioxetane-3,2'-(5'-chloro)tricyclo{3.3.1.1 3,7}decan}-4-yl) phenyl phosphate (CSPD), as well as CDP and CDP-STAR® or other luminescent substrates well-known to those in the art, for example the chelates of suitable lanthanides such as Terbium(III) and Europium(III). The detection means is determined by the chosen label. Appearance of the label or its reaction products can be achieved using the naked eye, in the case where the label is particulate and accumulates at appropriate levels, or using instruments such as a spectrophotometer, a luminometer, a fluorimeter, and the like, all in accordance with standard practice.

Antibodies described herein can also be conjugated to a therapeutic agent to form an immunoconjugate such as an antibody-drug conjugate (ADC). Suitable therapeutic agents include agents modulate onset of gliosis and/or reactive astrogliosis and/or treating degenerative brain disorders, central nervous system damage, or neuropathic pain. Therapeutic agents for treating degenerative brain disorders include drugs for treating Huntington's disease, Parkinson's disease, Alzheimer's disease, multiple sclerosis, and Amyotrophic Lateral Sclerosis (ALS). This includes drugs commonly used for treating such degenerative brain disorders, e.g., drugs disclosed infra in Section XII.

Immunoconjugates can be prepared by methods known in the art. Preferably, conjugation methods result in linkages which are substantially (or nearly) non-immunogenic, e.g., peptide- (i.e., amide-), sulfide-, (sterically hindered), disulfide-, hydrazone-, and ether linkages. These linkages are nearly non-immunogenic and show reasonable stability within serum (see, e.g., Senter, P. D., *Curr. Opin. Chem. Biol.* 13 (2009) 235-244; WO 2009/059278; WO 95/17886).

Depending on the biochemical nature of the moiety and the antibody, different conjugation strategies can be employed. In case the moiety is naturally-occurring or recombinant of between 50 to 500 amino acids, there are standard procedures in text books describing the chemistry for synthesis of protein conjugates, which can be easily followed by the skilled artisan (see, e.g., Hackenberger, C. P. R., and Schwarzer, D., *Angew. Chem. Int. Ed. Engl.* 47 (2008) 10030-10074). In one embodiment the reaction of a maleinimido moiety with a cysteine residue within the antibody or the moiety is used. This is an especially suited coupling chemistry in case e.g., a Fab or Fab'-fragment of an antibody is used. Alternatively in one embodiment coupling to the C-terminal end of the antibody or moiety is performed. C-terminal modification of a protein, e.g. of a Fab-fragment can e.g. be performed as described (Sunbul, M. and Yin, J., *Org. Biomol. Chem.* 7 (2009) 3361-3371).

In general, site specific reaction and covalent coupling is based on transforming a natural amino acid into an amino acid with a reactivity which is orthogonal to the reactivity of the other functional groups present. For example, a specific cysteine within a rare sequence context can be enzymatically converted in an aldehyde (see Frese, M. A., and Dierks, T., *ChemBioChem.* 10 (2009) 425-427). It is also possible to obtain a desired amino acid modification by utilizing the specific enzymatic reactivity of certain enzymes with a natural amino acid in a given sequence context (see, e.g., Taki, M. et al., *Prot. Eng. Des. Sel.* 17 (2004) 119-126; Gautier, A. et al., *Chem. Biol.* 15 (2008) 128-136; and Protease-catalyzed formation of C—N bonds is used by Bordusa, F., Highlights in Bioorganic Chemistry (2004) 389-403).

Site specific reaction and covalent coupling can also be achieved by the selective reaction of terminal amino acids with appropriate modifying reagents. The reactivity of an N-terminal cysteine with benzonitrils (see Ren, H. et al., *Angew. Chem. Int. Ed. Engl.* 48 (2009) 9658-9662) can be used to achieve a site-specific covalent coupling. Native chemical ligation can also rely on C-terminal cysteine residues (Taylor, E. Vogel; Imperiali, B, *Nucleic Acids and Molecular Biology* (2009), 22 (Protein Engineering), 65-96).

EP 1 074 563 describes a conjugation method which is based on the faster reaction of a cysteine within a stretch of negatively charged amino acids with a cysteine located in a stretch of positively charged amino acids.

The moiety can also be a synthetic peptide or peptide mimic. In case a polypeptide is chemically synthesized, amino acids with orthogonal chemical reactivity can be incorporated during such synthesis (see, e.g., de Graaf, A. J. et al., *Bioconjug. Chem.* 20 (2009) 1281-1295). Since a great variety of orthogonal functional groups is at stake and can be introduced into a synthetic peptide, conjugation of such peptide to a linker is standard chemistry.

In order to obtain a mono-labeled polypeptide, the conjugate with 1:1 stoichiometry can be separated by chromatography from other conjugation side-products. This procedure can be facilitated by using a dye labeled binding pair member and a charged linker. By using this kind of labeled and highly negatively charged binding pair member, mono conjugated polypeptides are easily separated from non-labeled polypeptides and polypeptides which carry more than one linker, since the difference in charge and molecular weight can be used for separation. The fluorescent dye can be useful for purifying the complex from un-bound components, like a labeled monovalent binder.

XI. Pharmaceutical Compositions

Provided herein are compositions comprising an antibody or antigen-binding portion thereof described herein having the desired degree of purity in a physiologically acceptable carrier, excipient or stabilizer (Remington's Pharmaceutical Sciences (1990) Mack Publishing Co., Easton, PA). Acceptable carriers, excipients, or stabilizers are nontoxic to recipients at the dosages and concentrations employed, and include buffers such as phosphate, citrate, and other organic acids; antioxidants including ascorbic acid and methionine; preservatives (such as octadecyldimethylbenzyl ammonium chloride; hexamethonium chloride; benzalkonium chloride, benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g., Zn-protein complexes); and/or non-ionic surfactants such as TWEEN™, PLURONICS™ or polyethylene glycol (PEG).

In a specific embodiment, pharmaceutical compositions comprise an antibody or antigen-binding portion thereof, a bispecific molecule, or a immunoconjugate described herein, and optionally one or more additional prophylactic or therapeutic agents, in a pharmaceutically acceptable carrier. In a specific embodiment, pharmaceutical compositions comprise an effective amount of an antibody or antigen-binding portion thereof described herein, and optionally one or more additional prophylactic of therapeutic agents, in a pharmaceutically acceptable carrier. In some embodiments, the antibody is the only active ingredient included in the pharmaceutical composition. Pharmaceutical compositions described herein can be useful in enhancing, inducing or activating a FAM19A5 activity and treating a condition, such as central nervous system damage, a degenerative brain disorder, or a neuropathic pain.

Pharmaceutically acceptable carriers used in parenteral preparations include aqueous vehicles, nonaqueous vehicles, antimicrobial agents, isotonic agents, buffers, antioxidants, local anesthetics, suspending and dispersing agents, emulsifying agents, sequestering or chelating agents and other pharmaceutically acceptable substances. Examples of aqueous vehicles include Sodium Chloride Injection, Ringers Injection, Isotonic Dextrose Injection, Sterile Water Injection, Dextrose and Lactated Ringers Injection. Nonaqueous parenteral vehicles include fixed oils of vegetable origin, cottonseed oil, corn oil, sesame oil and peanut oil. Antimicrobial agents in bacteriostatic or fungistatic concentrations can be added to parenteral preparations packaged in multiple-dose containers which include phenols or cresols, mercurials, benzyl alcohol, chlorobutanol, methyl and propyl p-hydroxybenzoic acid esters, thimerosal, benzalkonium chloride and benzethonium chloride. Isotonic agents include sodium chloride and dextrose. Buffers include phosphate and citrate. Antioxidants include sodium bisulfate. Local anesthetics include procaine hydrochloride. Suspending and dispersing agents include sodium carboxymethylcelluose, hydroxypropyl methylcellulose and polyvinylpyrrolidone. Emulsifying agents include Polysorbate 80 (TWEEN® 80). A sequestering or chelating agent of metal ions includes EDTA. Pharmaceutical carriers also include ethyl alcohol, polyethylene glycol and propylene glycol for water miscible vehicles; and sodium hydroxide, hydrochloric acid, citric acid or lactic acid for pH adjustment.

A pharmaceutical composition can be formulated for any route of administration to a subject. Specific examples of routes of administration include intranasal, oral, parenterally, intrathecally, intra-cerebroventricularly, pulmonarily, subcutaneously, or intraventricularly. Parenteral administration, characterized by either subcutaneous, intramuscular, or intravenous injection, is also contemplated herein. Injectables can be prepared in conventional forms, either as liquid solutions or suspensions, solid forms suitable for solution or suspension in liquid prior to injection, or as emulsions. The injectables, solutions and emulsions also contain one or more excipients. Suitable excipients are, for example, water, saline, dextrose, glycerol or ethanol. In addition, if desired, the pharmaceutical compositions to be administered can also contain minor amounts of non-toxic auxiliary substances such as wetting or emulsifying agents, pH buffering agents, stabilizers, solubility enhancers, and other such agents, such as for example, sodium acetate, sorbitan monolaurate, triethanolamine oleate and cyclodextrins.

Preparations for parenteral administration of an antibody include sterile solutions ready for injection, sterile dry soluble products, such as lyophilized powders, ready to be combined with a solvent just prior to use, including hypodermic tablets, sterile suspensions ready for injection, sterile dry insoluble products ready to be combined with a vehicle just prior to use and sterile emulsions. The solutions can be either aqueous or nonaqueous.

If administered intravenously, suitable carriers include physiological saline or phosphate buffered saline (PBS), and solutions containing thickening and solubilizing agents, such as glucose, polyethylene glycol, and polypropylene glycol and mixtures thereof.

Topical mixtures comprising an antibody are prepared as described for the local and systemic administration. The resulting mixture can be a solution, suspension, emulsions or the like and can be formulated as creams, gels, ointments, emulsions, solutions, elixirs, lotions, suspensions, tinctures, pastes, foams, aerosols, irrigations, sprays, suppositories, bandages, dermal patches or any other formulations suitable for topical administration.

An antibody or antigen-binding portion thereof described herein can be formulated as an aerosol for topical application, such as by inhalation (see, e.g., U.S. Pat. Nos. 4,044,126, 4,414,209 and 4,364,923, which describe aerosols for delivery of a steroid useful for treatment of inflammatory diseases, particularly asthma). These formulations for administration to the respiratory tract can be in the form of an aerosol or solution for a nebulizer, or as a microtine powder for insufflations, alone or in combination with an inert carrier such as lactose. In such a case, the particles of the formulation will, in one embodiment, have diameters of less than 50 microns, in one embodiment less than 10 microns.

An antibody or antigen-binding portion thereof described herein can be formulated for local or topical application, such as for topical application to the skin and mucous membranes, such as in the eye, in the form of gels, creams, and lotions and for application to the eye or for intracisternal or intraspinal application. Topical administration is contemplated for transdermal delivery and also for administration to the eyes or mucosa, or for inhalation therapies. Nasal solutions of the antibody alone or in combination with other pharmaceutically acceptable excipients can also be administered.

Transdermal patches, including iontophoretic and electrophoretic devices, are well known to those of skill in the art, and can be used to administer an antibody. For example, such patches are disclosed in U.S. Pat. Nos. 6,267,983, 6,261,595, 6,256,533, 6,167,301, 6,024,975, 6,010715, 5,985,317, 5,983,134, 5,948,433, and 5,860,957.

In certain embodiments, a pharmaceutical composition comprising an antibody or antigen-binding portion thereof described herein is a lyophilized powder, which can be reconstituted for administration as solutions, emulsions and other mixtures. It can also be reconstituted and formulated as solids or gels. The lyophilized powder is prepared by dissolving an antibody or antigen-binding portion thereof described herein, or a pharmaceutically acceptable derivative thereof, in a suitable solvent. In some embodiments, the lyophilized powder is sterile. The solvent can contain an excipient which improves the stability or other pharmacological component of the powder or reconstituted solution, prepared from the powder. Excipients that can be used include, but are not limited to, dextrose, sorbitol, fructose, corn syrup, xylitol, glycerin, glucose, sucrose or other suitable agent. The solvent can also contain a buffer, such as citrate, sodium or potassium phosphate or other such buffer known to those of skill in the art at, in one embodiment, about neutral pH. Subsequent sterile filtration of the solution followed by lyophilization under standard conditions known to those of skill in the art provides the desired formulation. In one embodiment, the resulting solution will be apportioned into vials for lyophilization. Each vial will contain a single dosage or multiple dosages of the compound. The lyophilized powder can be stored under appropriate conditions, such as at about 4° C. to room temperature.

Reconstitution of this lyophilized powder with water for injection provides a formulation for use in parenteral administration. For reconstitution, the lyophilized powder is added to sterile water or other suitable carrier. The precise amount depends upon the selected compound. Such amount can be empirically determined.

The antibodies or antigen-binding portions thereof, the bispecific molecule, or the immunoconjugate described herein and other compositions provided herein can also be formulated to be targeted to a particular tissue, receptor, or other area of the body of the subject to be treated. Many such targeting methods are well known to those of skill in the art. All such targeting methods are contemplated herein for use in the instant compositions. For non-limiting examples of targeting methods, see, e.g., U.S. Pat. Nos. 6,316,652, 6,274,552, 6,271,359, 6,253,872, 6,139,865, 6,131,570, 6,120,751, 6,071,495, 6,060,082, 6,048,736, 6,039,975, 6,004,534, 5,985,307, 5,972,366, 5,900,252, 5,840,674, 5,759,542 and 5,709,874. In a specific embodiment, an antibody or antigen-binding portion thereof described herein is targeted to treat central nervous system damage, a degenerative brain disorder, or a neuropathic pain.

The compositions to be used for in vivo administration can be sterile. This is readily accomplished by filtration through, e.g., sterile filtration membranes.

XII. Kits

Provided herein are kits comprising one or more antibodies described herein, or antigen-binding portions thereof, bispecific molecules, or immunoconjugates thereof. In a specific embodiment, provided herein is a pharmaceutical pack or kit comprising one or more containers filled with one or more of the ingredients of the pharmaceutical compositions described herein, such as one or more antibodies provided herein or an antigen-binding portion thereof, optional an instructing for use. In some embodiments, the kits contain a pharmaceutical composition described herein and any prophylactic or therapeutic agent, such as those described herein.

XIII. Therapeutic Uses and Methods

In one aspect, presented herein are methods for mitigating injury or damage to the CNS in a subject, comprising to a subject in need thereof administering an anti-FAM19A5 antibody or antigen-binding portion thereof, a bispecific molecule, or an immunoconjugate described herein, or a composition thereof.

In one embodiment, presented herein are methods for inhibiting, slowing down, suppressing, curbing, reducing, reversing, or preventing the beginning or initiation of gliosis and its associated detrimental effects of the CNS in a subject, comprising administering to the subject an anti-FAM19A5 antibody or antigen-binding portion thereof, a bispecific molecule or an immunoconjugate disclosed herein, or a composition thereof. In one embodiment, presented herein are methods for inhibiting, slowing down, suppressing, curbing, reducing, reversing, or preventing excessive or abnormal proliferation of reactive astrocytes and its associated detrimental effects of the CNS in a subject, comprising administering to the subject an anti-FAM19A5 antibody or antigen-binding portion thereof, a bispecific molecule or an immunoconjugate disclosed herein, or a composition thereof. In one embodiment, presented herein are methods for decreasing, inhibiting, or reducing the expression of chondroitin sulfate proteoglycans (including the level of neurocan, NG2, or both), or reducing the activity of, or rendering inactive neurocan, NG2, or both in a subject comprising administering to the subject an anti-FAM19A5 antibody or antigen-binding portion thereof, a bispecific molecule or an immunoconjugate disclosed herein, or a composition thereof. In one embodiment, presented herein are methods for stimulating, promoting, increasing, or activating the growth of neurons, preferably after injury or damage in a subject comprising administering to the subject an anti-FAM19A5 antibody or antigen-binding portion thereof, a bispecific molecule or an immunoconjugate disclosed herein, or a composition thereof. In one embodiment, presented herein are methods for increasing the level of c-fos mRNA, c-fos protein, or c-fos protein activity, and increasing the level of ERK mRNA, ERK protein, or pERK activity, preferably in the nucleus of neurons, in a subject in need thereof, comprising administering to the subject an anti-FAM19A5 antibody or antigen-binding portion thereof, a bispecific molecule, or an immunoconjugate disclosed herein, or a composition thereof. In one embodiment, presented herein are methods for enhancing or increasing the level of GAP43 mRNA, GAP43 protein, or increasing the activity of GAP43 protein, preferably in the neurons, in a subject in need thereof, comprising administering to the subject an anti-FAM19A5 antibody or antigen-binding portion thereof, a bispecific molecule or an immunoconjugate disclosed herein, or a composition thereof. In one embodiment, presented herein are methods for enhancing or promoting the survival of neurons and/or promoting the regrowth of an axon, in a subject in need thereof comprising administering to the subject an anti-FAM19A5 antibody or antigen-binding portion thereof, a bispecific molecule or an immunoconjugate disclosed herein, or a composition thereof. In one embodiment, the subject is a human, preferably a human having an injury or damage to a neuron from e.g., CNS damage, trauma, injury, cerebrospinal damage, brain tumor, infection, ischemia, stroke, autoimmune responses, and/or neurodegenerative disease.

In some embodiments, presented herein are methods for treating a disease or disorder including a central nervous system damage, a cerebrospinal system damage, a degenerative brain disorder, a degenerative cerebrospinal or nerve disorder, or a neuropathic pain, in a subject in need thereof, comprising administering to the subject an anti-FAM19A5 antibody or antigen-binding portion thereof, a bispecific molecule or an immunoconjugate disclosed herein, or a composition thereof. In one embodiment, the central nervous system damage is a traumatic brain injury, a cerebrospinal damage, a stroke, a brain tumor (e.g., glioma or glioblastoma), or a combination thereof. In one embodiment, the degenerative brain disorder is Huntington's disease, Parkinson's disease, Alzheimer's disease, multiple sclerosis, Amyotrophic Lateral Sclerosis (ALS), or a combination thereof. Thus, in one embodiment, disclosed herein is a method for treating a traumatic brain injury, a cerebrospinal damage, a stroke, a brain tumor (e.g., glioma or glioblastoma), or a combination thereof in a subject in need thereof comprising administering to the subject an anti-FAM19A5 antibody or antigen-binding portion thereof, a bispecific molecule or an immunoconjugate disclosed herein, or a composition thereof. In one embodiment, disclosed herein is a method for treating Huntington's disease, Parkinson's disease, Alzheimer's disease, multiple sclerosis, ALS in a subject in need thereof comprising administering to the subject an anti-FAM19A5 antibody or antigen-binding portion thereof, a bispecific molecule or an immunoconjugate disclosed herein, or a composition thereof. In some embodiments, the subject is a human.

In some embodiments, methods disclosed herein can be used to treat a brain tumor, wherein the methods comprise administering to a subject in need thereof an anti-FAM19A5 antibody (e.g., those disclosed herein). In certain embodiments, the brain tumor is a glioma or glioblastoma.

In some embodiments, the administration of an anti-FAM19A5 antibody reduces the growth of a tumor (e.g., glioblastoma), compared to a reference (e.g., corresponding value in a subject that did not receive the anti-FAM19A5 antibody). In certain embodiments, the tumor growth (e.g., tumor volume or weight) is reduced by at least 5%, at least 10%, at least 20%, at least 30%, at least 40%, at least 50%, at least 60%, at least 70%, at least 80%, at least 90%, or 100%, compared to a reference (e.g., corresponding value in a subject that did not receive the anti-FAM19A5 antibody).

In some embodiments, the administration of an anti-FAM19A5 antibody promotes blood vessel normalization in a tumor (e.g., glioblastoma). In certain embodiments, blood vessel normalization comprises (i) increased number of blood vessels, (ii) improved connectivity of blood vessels, (iii) decreased blood vessel permeability, (iv) increased blood flow rate, or (v) any combinations thereof. In certain embodiments, the methods disclosed herein increase the number of blood vessels (with increased thickness and improved connectivity) that extend into the tumors by at least 5%, 10%, 20%, 30%, 40%, 50%, 60%, 70%, 80%, 90%, or 100% or more.

In some embodiments, the administration of an anti-FAM19A5 antibody increases the infiltration of an immune cell into a tumor (e.g., glioblastoma). In some embodiments, the infiltration of immune cells into a tumor is increased by at least 5%, 10%, 20%, 30%, 40%, 50%, 60%, 70%, 80%, 90%, or 100% or more, compared to a reference (e.g., number of immune cells present in a tumor not exposed to anti-FAM19A5 antibody). In certain embodiments, the immune cells comprise macrophages, dendritic cells, microglia, and T-lymphocytes. In further embodiments, the methods disclosed herein increase the cellular volume of the immune cells present in a tumor. In certain embodiments, the cellular volume of the immune cells is increased by at least 5%, 10%, 20%, 30%, 40%, 50%, 60%, 70%, 80%, 90%, or 100% or more, compared to a reference (e.g., volume of immune cells present in a tumor not exposed to anti-FAM19A5 antibody).

In some embodiments, the administration of an anti-FAM19A5 antibody (e.g., those disclosed herein) increases the survival of a subject having a tumor (e.g., brain tumor). In certain embodiments, the survival is increased by at least 5%, 10%, 20%, 30%, 40%, 50%, 60%, 70%, 80%, 90%, or 100% or more, compared to a reference (e.g., corresponding value in a subject not receiving an anti-FAM19A5 antibody). In some embodiments, survival is increased by at least 1 day, 2 days, 3 days, 4 days, 5 days, 6 days, 7 days, 2 weeks, 3 weeks, 4 weeks, 2 months, 3 months, 4 months, 5 months, 6 months, 7 months, 8 months, 9 months, 10 months, 11 months, 12 months, 2 years, 3 years, 4 years, or 5 years or more.

In some embodiments, a brain tumor (e.g., glioblastoma) that can be treated with the present methods can be metastatic, unresectable, refractory to previous cancer therapy. In certain embodiments, the previous cancer therapy comprises a chemotherapy. In some embodiments, the chemotherapy comprises a platinum-based therapy. In some embodiments, the platinum-based therapy comprises a platinum-based antineoplastic selected from the group consisting of cisplatin, carboplatin, oxaliplatin, nedaplatin, triplatin tetranitrate, phenanthriplatin, picoplatin, satraplatin, and any combination thereof. In certain embodiments, the platinum-based therapy comprises cisplatin. In further embodiments, the platinum-based therapy comprises carboplatin. In some embodiments, the previous cancer therapy comprises an immunotherapy (e.g., an anti-PD-1 antibody).

In some embodiments, anti-FAM19A5 antibodies useful for the present methods (e.g., to treat a brain tumor, e.g., glioblastoma) can be given in combination with other compounds, drugs, and/or agents used for the treatment of cancer. Such compounds, drugs, and/or agents can include, for example, chemotherapy drugs, small molecule drugs, or antibodies that stimulate the immune response to a given cancer. In some embodiments, the methods described herein are used in combination with a standard of care treatment (e.g., surgery, radiation, and chemotherapy). In other embodiments, the methods described herein are used as a maintenance therapy, e.g., a therapy that is intended to prevent the occurrence or recurrence of tumors.

In some embodiments, anti-FAM19A5 antibodies useful for the present disclosure can be combined with more than one immuno-oncology agent, and can be, e.g., combined with a combinatorial approach that targets multiple elements of the immune pathway, such as one or more of the following: a therapy that enhances tumor antigen presentation (e.g., dendritic cell vaccine, GM-CSF secreting cellular vaccines, CpG oligonucleotides, imiquimod); a therapy that inhibits negative immune regulation e.g., by inhibiting CTLA-4 and/or PD1/PD-L1/PD-L2 pathway and/or depleting or blocking Tregs or other immune suppressing cells (e.g., myeloid-derived suppressor cells); a therapy that stimulates positive immune regulation, e.g., with agonists that stimulate the CD-137, OX-40, and/or CD40 or GITR pathway and/or stimulate T cell effector function; a therapy that increases systemically the frequency of anti-tumor T cells; a therapy that depletes or inhibits Tregs, such as Tregs in the tumor, e.g., using an antagonist of CD25 (e.g., daclizumab) or by ex vivo anti-CD25 bead depletion; a therapy that impacts the function of suppressor myeloid cells in the tumor; a therapy that enhances immunogenicity of tumor cells (e.g., anthracyclines); adoptive T cell or NK cell transfer including genetically modified cells, e.g., cells modified by chimeric antigen receptors (CAR-T therapy); a therapy that inhibits a metabolic enzyme such as indoleamine dioxigenase (IDO), dioxigenase, arginase, or nitric oxide synthetase; a therapy that reverses/prevents T cell anergy or exhaustion; a therapy that triggers an innate immune activation and/or inflammation at a tumor site; administration of immune stimulatory cytokines; or blocking of immuno repressive cytokines. In some instances, the additional anti-cancer agent that can be combined with anti-FAM19A5 antibodies useful for the disclosure can include, but are not limited to, one or more of an anti-CTLA-4 antibody, an anti-PD-1 antibody, an anti-PD-L1 antibody, an anti-OX40 (also known as CD134, TNFRSF4, ACT35 and/or TXGP1L) antibody, an anti-CD137 antibody, an anti-LAG-3 antibody, an anti-GITR antibody, or any combination thereof.

In certain embodiments, the anti-FAM19A5 antibodies disclosed herein can treat, reduce, reverse, prevent, ameliorate, control, or inhibit a fibrosis in a subject in need thereof, comprising administering to the subject an anti-FAM19A5 antibody or an antigen binding portion thereof. In one embodiment, the fibrosis is benign (i.e., causes no symptoms). In another embodiment, the fibrosis is associated with a pathological state, which can or cannot be reversible. In some embodiments, the fibrosis is selected from the group consisting of a hepatic fibrosis, pulmonary fibrosis, renal fibrosis, myelofibrosis, pancreatic fibrosis, skin fibrosis, cardiac fibrosis, arterial fibrosis, arthrofibrosis, breast fibrosis, muscle fibrosis, retroperitoneal Fibrosis, thyroid fibrosis, lymph node fibrosis, bladder fibrosis, and pleural fibrosis. In one embodiment, the fibrosis is a liver fibrosis or a pulmonary fibrosis. In another embodiment, the fibrosis is associated with a tumor derived from a cancer, such as a liver cancer, a lung cancer, a renal cancer, a breast cancer, a brain cancer and/or a pancreatic cancer. In one embodiment, the method lessens, reverses, alleviates, ameliorates, inhibits, or slows down or prevents a fibrosis, a symptom associated with the fibrosis, an underlining cause of the fibrosis, or a combination thereof.

In other embodiments, the anti-FAM19A5 antibodies disclosed herein can treat, reduce, reverse, prevent, ameliorate, control, or inhibit a fibrosis associated disease or disorder in a subject in need thereof, comprising administering to the subject an anti-FAM19A5 antibody or an antigen binding portion thereof. The term "a fibrosis associated with a disease or disorder" refers to a fibrosis that accompanies a disease or disorder, or caused by or resulting from a disease or a disorder. The term includes a fibrosis that results from or is caused by the disease or disorder disclosed above, or a fibrosis that accompanies the disease or disorder.

In yet other embodiments, the anti-FAM19A5 antibodies disclosed herein can treat, reduce, reverse, prevent, delay, ameliorate, control, or inhibit a liver cancer, a lung cancer, a renal cancer, a breast cancer, a brain cancer (e.g., glioma or glioblastoma), and/or a pancreatic cancer in a subject in need thereof, comprising administering to the subject an anti-FAM19A5 antibody or an antigen binding portion thereof. In some embodiments, the liver cancer, lung cancer, renal cancer, breast cancer, brain cancer, and/or pancreatic cancer is associated with or caused by fibrosis. In some embodiments, the brain cancer is a glioma or a glioblastoma.

In some embodiments, a therapeutically effective amount of an anti-FAM19A5 antibody or antigen-binding portion thereof, a bispecific molecule or an immunoconjugate disclosed herein is administered. When treating a subject (e.g., a human), a therapeutically effective amount of an anti-FAM19A5 antibody or antigen-binding portion thereof, a bispecific molecule or an immunoconjugate disclosed herein depends on factors such as age, gender, severity of the disease. Typically, the anti-FAM19A5 antibody or antigen-binding portion thereof, a bispecific molecule or an immunoconjugate disclosed herein is administered at a dose of between 0.01 µg to 1000 mg per day.

In some embodiments, an anti-FAM19A5 antibody or antigen-binding portion thereof, a bispecific molecule or an immunoconjugate, or a composition thereof disclosed herein is administered intravenously, orally, parenterally, transthecally, intrathecally, intra-cerebroventricularly, pulmonarily, subcutaneously, or intraventricularly.

In some embodiments, an anti-FAM19A5 antibody or antigen-binding portion thereof, or a composition thereof can be administered in combination with one or more additional agent for treating a fibrosis (e.g., pirfenidone (ESBRIET) or nintedanib (OFEV) for idiopathic pulmonary fibrosis). Dose and administration of the one or more additional therapeutic drugs are known in the art, e.g., as instructed by the product label of the respective drug.

In some embodiments, an anti-FAM19A5 antibody or antigen-binding portion thereof, or a composition thereof can be administered in combination with one or more additional agent for treating a central nervous system damage (e.g., a traumatic brain injury, a cerebrospinal damage, a stroke, or a brain tumor (e.g., glioma or glioblastoma)), a cerebrospinal system damage, a degenerative brain disorder (e.g., Huntington's disease, Parkinson's disease, Alzheimer's disease, multiple sclerosis, ALS), a degenerative cerebrospinal or nerve disorder, or a neuropathic pain. For example, non-limiting exemplary agents for treating Huntington's disease include Tetrabenazine (XENAZINE®), antipsychotic drugs, such as haloperidol (HALDOL®), chlorpromazine, risperidone (RISPERDAL®) and quetiapine (SEROQUEL®).

Non-limiting exemplary agents for treating Parkinson's disease include levodopa (with or without Carbidopa), dopamine agonists such as pramipexole (MIRAPEX®), ropinirole (REQUIP®), and rotigotine (NEUPRO®), and apomorphine (APOKYN®), selegiline (ELDEPRYL® and ZELAPAR®), rasagiline (AZILECT®), Entacapone (COMTAN®), benztropine (COGENTIN®), trihexyphenidyl, and amantadine.

Non-limiting exemplary agents for treating Alzheimer's disease include Donepezil (ARICEPT®), Galantamine (RAZADYNE®), and Rivastigmine (EXELON®).

Non-limiting exemplary agents for treating multiple sclerosis include Glatiramer acetate (COPAXONE®), Dimethyl fumarate (TECFIDERA®), Fingolimod (GILENYA®), Teriflunomide (AUBAGIO®), Natalizumab (TYSABRI®), Alemtuzumab (LEMTRADA®), and Mitoxantrone.

Non-limiting exemplary agents for treating ALS include riluzole (RILUTEK®).

Dose and administration of the one or more additional therapeutic drugs are known in the art, e.g., as instructed by the product label of the respective drug.

The following examples are offered by way of illustration and not by way of limitation.

EXAMPLES

The following experimental methods and details are referenced in the Examples that follow.

Example 1 Expression and Purification of Human FAM19A5 Protein

Recombinant human FAM19A5 protein was produced and purified and the purified protein was used in an antibody screening assay based on binding affinity analysis. First, LPS-hT plasmid containing the FAM19A5 gene was transformed into bacteria and protein overexpression was induced. Once produced, the FAM19A5 protein was purified using an Ni-NTA affinity chromatography (Qiagen, Valencia, CA, USA). Using gradually higher concentration of imidazole, we removed the His-tagged FAM19A5 protein from the Ni-column. The protein expression in the solution is measured using Coomassie Brilliant Blue R-250 Dye. Taking only the FAM19A5 immidazole containing solution, we concentrated the FAM19A5 protein using PBS. When the concentration was complete, both the purity and concentration of the FAM19A5 protein were measured using a Western Blot assay. The concentrated protein was subsequently used to screen for FAM19A5-specific antibodies.

Example 2 Production of Antibody Libraries FAM19A5

Cell wall components of TDW and CWS containing a water-in-oil emulsion adjuvant (RIBI+MPL+TDM+CWS adjuvant, Sigma, St. Louis, Mo, USA) in emulsified, which was then subcutaneously injected into three chickens. The chickens were immunized for a total of three times, approximately 2-3 weeks apart between immunization. The titer of the antibodies obtained from the immunized chickens was measured via immuno blotting using lysates of HEK293T cells which overexpressed the FAM19A5 protein.

Single-chain variable fragment (scFv) library was prepared from immunized chicken Using TRI reagent (Invitrogen, Carlsbad, CA USA), we extracted RNAs from the spleen, bone marrow, and synovial sac of the immunized chickens described above. Oligo-dT primers and SUPERSCRIPT™ III First-Strand Synthesis System (Invitrogen) were used to synthesize the first strand cDNA. For the cDNA obtained from the immune system of chickens, Expand High Fidelity PCR System (Roche Molecular Systems, IN, USA) was used to produce a single chain variable region library. In each reaction, 1 µL of cDNA, 60 pmol of each primer, 10 µL of 10× reaction buffer solution, 8 µL of 2.5 mM dNTP (Promega, Madison, WI, USA), and 0.5 µL of Taq DNA polymerase were mixed with water. The final volume was 100 µL PCR reaction was performed using the following conditions: 30 cycles of (i) 15 seconds at 94° C. (ii) 30 seconds at 56° C., and (iii) 90 seconds at 72° C., followed by a final extension for 10 minutes at 72° C. The PCR products comprising a fragment having a length of about 350 bp were loaded onto a 1.5% agarose gel and after electrophoresis, QIAGEN Gel II Extraction Kit (QIAGEN, Valencia, CA, USA) was used to purify the nucleotide fragment. The purified PCR product was quantified by reading at OD 260 nm. (1 unit OD=50 µg/ml).

Two VH and VL first products from the second PCR were connected randomly by the overlap extension PCR (Overlap extension PCR). Each PCR reaction was mixed with 100 ng of the purified VL and VH products, 60 pmol of each primer, 10 µL 10× reaction buffer, 8 µL of 2.5 mM dNTP, 0.5 µL of Taq DNA polymerase, and water in a final volume of 100 µL of. PCR was performed under the following conditions: 25 cycles of (i) 15 seconds at 94° C., (ii) 30 seconds at 56° C., and (iii) 2 minutes at 72° C., followed by final extension for 10 minutes at 72° C. The PCR products comprising a single chain variable region fragment having a length of about 700 bp were loaded onto a 1.5% agarose gel and after electrophoresis, QIAGEN II Gel Extraction Kit (QIAGEN) was used to purify the nucleotide fragment. The purified PCR product was quantified by reading at OD 260 nm. (1 unit OD=50/ml).

The scFv fragment of the PCR product and vector pComb3X-SS (The Scripps Research Institute, CA, USA) were digested with a Sfi I restriction enzyme. 10 µg of the purified overlapping PCT product was mixed with 360 units of Sif I, (µg DNA per 16 units, Roche Molecular Systems, Pleasanton, CA, USA), 20 µL of a 10× reaction buffer, and water to the final volume with 200 µL. 20 µg of the pComb3X-SS vector was mixed with 120 units of Sfi I (µg DNA per 6 units), 20 µL of a 10× reaction buffer solution, and water to the final volume to 200 µL. The mixture was digested at 50° C. for 8 hours. Afterwards, the digested product comprising the scFv fragment (about 700 bp) and the vector (about 3400 bp) was loaded onto a 1% agarose gel and purified using a Gel Extraction Kit II QIAGEN (QIAGEN, Valencia, CA, USA). 1400 ng of the Sfi I-restricted pComb3X vector and 700 ng of the digested scFv fragments were mixed with 5× a ligase buffer, 10 µL of T4 DNA ligase (Invitrogen, Carlsbad, CA, USA), and water to a final volume of 200 µL. The mixture was incubated at 16° C. for 16 hours to perform the ligation.

After precipitation with ethanol, the DNA pellet was dissolved in 15 µL of water. To produce a library, the ligation sample was transformed into E. coli strain ER2738 (New England Biolabs Inc, Hitchin, Hertfordshine, SG4 0TY, England, UK) via electroporation using the vibrator gene (Gene pulser: Bio-Rad Laboratories, Hercules, CA, USA). Cells were mixed in a 5 ml Super Broth (SB) medium and incubated while stirring at 250 rpm for one hour at 37° C. Then, 3 µL of 100 mg/mL kanamycin was added to 10 mL of SB medium. To determine the library size, 0.1 µL, 1 µL and 10 µL of the culture sample were smeared onto Luria Broth (LB) agar plates containing 50 µg/mL of kanamycin. After stirring for 1 hour, 4.5 µL of 100 mg/mL kanamycin was added to the LB culture and further stirred for an additional 1 hour. Then, 2 ml of the VCM13 helper phage in water (>$10^{11}$ cfu/ml) was added to the LB medium, along with pre-heated LB (183 mL) containing 92.5 µL of 100 mg/mL kanamycin. This mixture was stirred at 250 rpm at 37° C. for an additional 2 hours. Next, 280 µL (50 mg/mL) of kanamycin was added to the culture and stirred overnight at 37° C. The next day, the bacteria pellet was centrifuged using a high-speed centrifuge (Beckman, JA-10 rotor) at 3,000 g, 4° C. Afterwards, the bacterial pellet was used to extract phagemid DNA, while the supernatant was transferred to sterile centrifuge bottles. Next 8 grams of polyethylene glycol-8000 (PEG-8000, Sigma) and 6 grams of sodium chloride was added (NaCl, Merck) to the supernatant, and then kept for 30 minutes in ice. Afterwards, the supernatant was centrifuged 15 minutes at 15,000 g, 4° C. The supernatant was then discarded, and the phage pellet Tris containing 1% BSA—reproduction was suspended in buffered saline (TB S).

Example 3 Library Panning (Bio-Panning) on an Immobilized Antigen

Bio-panning was performed using magnetic beads (Dynabeads M—270 Epoxy, Invitrogen). At room temperature, approximately $1\times10^7$ beads were coated with 5 µg of recombinant FAM19A5 protein by stirring, while rotating, the beads and the protein together for 20 hours at room temperature. Once the coating was done, the beads were washed 4 times with phosphate buffered saline (PBS) and blocked for one hour in PBS containing 3% BSA at room temperature. Then, the coated beads were cultured for two hours at room temperature with Phage-displayed scFv described above. To remove any phage that was not bound to the antigen coated beads, the beads were washed with 0.05% Tween20/PBS. Then the bound phages were eluted with 50 µL of 0.1M glycine/hydrogen chloride (0.1M Glycine-HCl, pH 2.2) and neutralized with 3 µL of 2M Tris with hydrogen chloride (tris-HCl, pH 9.1). This phage-containing supernatants were used to infect E. coli ER2738 cells and VCSM13 helper phage was used to amplify and rescue overnight. Also the input (input) and production (output) by phage titers from the phage-infected cultures were determined by blotting the phage-infected cultures on LB agar plates containing 50 µg/ml of kanamycin. The next day, PEG-8000 and NaCl were used to precipitate phages, which were used subsequently for bio-panning. Bio-panning was performed up to a total of five different times by repeating the above process. With each amplification, the phages were screened and selected for high affinity to the FAM19A5 protein.

Example 4 Selection of Clone by Phage ELISA

To analyze the clones selected from the bio-panning, we randomly selected individual clones from the phase-displayed scFv and confirmed using ELISA that the clones bind to the FAM19A5 recombinant protein. The FAM19A5 recombinant protein was diluted in 0.1M $NaHCO_3$ buffer, and 100 ng/well of the protein was used to coat 96-well microtiter plates at 4° C. for 16 hours. Next day, the plates were blocked with 3% BSA/PBS at 37° C. for 1 hour. Then, the phage supernatant was mixed with 6% BSA/PBS and was cultured for 2 hours at 37° C. The plates containing the supernatant were then washed with 0.05% Tween20/PBS. The HRP-conjugated M13 antibody (a-M13-HRP, Pierce Chemical Co, Rockford, IL, USA) was diluted to 1/5000. 50 µL of the diluted antibody was added to the plates and incubated for 1 hour at 37° C. After the incubation and washing, the plates were added with 0.05M citrate buffer solution, 1 µg/ml of 2,2'-azino-bis (3-ethylbenzothiazoline-6-sulphonic acid) (ABTS, Amresco, Solon, OH, USA), and 0.1% $H_2O_2$ for color development. The absorbance for each well was measured at 405 nm.

24 clones that bind to the FAM19A5 recombinant protein and show high absorbance were then analyzed, and from those 13 scFv clones having unique sequences were obtained. After further selection, clones 2-13, 1-28, and 3-2 were obtained.

Example 5 Production of Anti-FAM19A5-IgG2/4 Antibody

Anti-FAM19A5 scFv was subcloned into a mammalian expression vector In the FAM19A5 scFv gene sequence, a human Cκ gene was connected to the light chain variable domain, and human immunoglobulin isotype IgG2/4 of CH1, CH2, and CH3 genes were connected to the heavy chain variable region. The antibody having each light chain and each heavy chain was synthesized by adding restriction sites (Genscript, USA). The synthesized gene was inserted into the mammalian cell expression vector having a modified restriction site to facilitate cloning. First, the light chain gene was inserted into the vector using Hind III and Xba I (New England Biolabs, UK) restriction enzymes and then adding the heavy chain gene to the vector by using NheI and BamHI (New England Biolabs, UK) restriction enzymes.

In order to express and purify an anti-FAM19A5-IgG2/4 antibody, we used a mammalian cell transfection and overexpression injection system. We mixed 2 μg/ml of the mammalian expression vector with 4 μg of polyethyleneimine (PEI, Polysciences, Warrington, PA, USA) in 150 mM sodium chloride (NaCl, Merck) corresponding to 1/10 of the cell culture volume. The mixture was allowed to stand for 15 minutes at room temperature. The mixture was added to HEK293F cells (2×10$^6$ cells/ml, Invitrogen), which were then incubated in the FREESTYLE™ 293 expression culture medium containing 100 U/ml of penicillin and streptomycin (Invitrogen) at 7% CO$_2$ and 37° C. and in a stirring condition of 135 rpm for six days. To purify the expressed anti-FAM19A5 IgG2/4 antibodies from the cell culture supernatant, we used Protein A bead (RepliGen, Waltham, MA, USA) affinity gel chromatography. The protein A chromatography was run on 4~12% Bis-Tris gradient gel electrophoresis. The size and yield of the protein was confirmed by the Coomassie Brilliant Blue staining.

Example 6 Epitope Mapping Analysis Using FAM19A5 Epitope Fragments F1-F6

Overlapping peptide fragments (F1-F6, See FIG. 1) of the human FAM19A5 protein were synthesized and conjugated to BSA. Binding of the different anti-FAM19A5 antibodies to the BSA-conjugated peptide fragments F1-F6 was determined by ELISA assay. Briefly, FAM19A5 fragment F1-F6 (diluted to 1 μg/mL in 50 mM carbonate buffer (Biosesang) or to 20 μg/mL for high concentration analysis) were used to coat the wells of 96-well immuno plates (Thermo Scientific) (100 μL/well) overnight at 4° C. and then subsequently washed twice in 1×PBS. The plates were then blocked with the blocking buffer (100 μL/well) for 1 hour at room temperature. During the 1-hour incubation, the relevant anti-FAM19A5 antibodies were diluted to 1 μg/mL (or 20 μg/mL for high concentration analysis) in the diluent buffer. Once the plates were washed (2× using 1×PBS), the diluted anti-FAM19A5 antibodies were added to the appropriate wells, and the plates were incubated at room temperature for 1 hour. The plates were subsequently washed for a total of five times using the washing buffer. Next, the ODP substrate (prepared by dissolving one ODP tablet (O-phenylenediamine Dihydrochloride, Thermo) into 9 mL of sterilized deionized water and 1 mL of 10× stable Peroxide Stable buffer (Theromo)) was added to each of the wells, and the color change reaction was allowed to occur for 10 minutes. This reaction was stopped by adding 100 μL of 2N H2SO4 (Daejung) to the wells. The absorption value of each of the wells was detected at 492 nm using a 96-well microplate reader (Molecular Device).

As shown in FIG. 2, the anti-FAM19A5 antibody 3-2 bound strongly to epitope fragment F2 with minimal binding to the other fragments. This was also true for the anti-FAM19A5 antibody 1-28 (data not shown). In contrast, the 1-65 antibody bound strongly to epitope fragment F5 only. Interestingly, the anti-FAM19A5 antibody 2-13 did not appear to bind to any of the F1-F6 epitope fragments.

Next, to identify the specific amino acid residues within the epitope fragment F2 that the 3-2 and 1-28 antibodies bind to, different amino acid residues of the F2 fragment were replaced with alanine or valine as shown in Table 9 (below). The mutated residues are bolded and underlined. The binding affinity of the indicated anti-FAM19A5 antibodies were measured using an ELISA assay as described above.

TABLE 9

| Mutant peptide (#) | Sequences |
|---|---|
| Wild Type | TLDRDSSQPRRTIARQTARC (SEQ ID NO: 6) |
| F2-01-BSA (#1) | TADRDSSQPRRTIARQTARC (SEQ ID NO: 73) |
| F2-02-BSA (#2) | TLARDSSQPRRTIARQTARC (SEQ ID NO: 74) |
| F2-03-BSA (#3) | TLDRASSQPRRTIARQTARC (SEQ ID NO: 75) |
| F2-04-BSA (#4) | TLDRDASQPRRTIARQTARC (SEQ ID NO: 76) |
| F2-05-BSA (#5) | TLDRDSAQPRRTIARQTARC (SEQ ID NO: 77) |
| F2-06-BSA (#6) | TLDRDSSAPRRTIARQTARC (SEQ ID NO: 78) |
| F2-07-BSA (#7) | TLDRDSSQARRTIARQTARC (SEQ ID NO: 79) |
| F2-08-BSA (#8) | TLDRDSSQPARTIARQTARC (SEQ ID NO: 80) |
| F2-09-BSA (#9) | TLDRDSSQPRAIARQTARC (SEQ ID NO: 81) |
| F2-10-BSA (#10) | TLDRDSSQPRRTAARQTARC (SEQ ID NO: 82) |
| F2-11-BSA (#11) | TLDRDSSQPRRTIRRQTARC (SEQ ID NO: 83) |
| F2-12-BSA (#12) | TLDRDSSQPRRTIAAQTARC (SEQ ID NO: 84) |
| F2-13-BSA (#13) | TLDRDSSQPRRTIARQTVRC (SEQ ID NO: 85) |

Figure 3A:
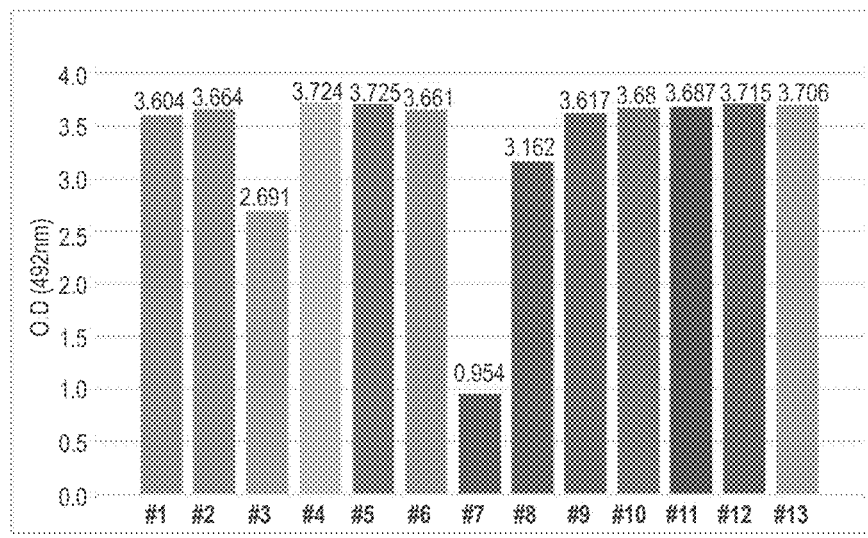
FIGS. 3A to 3C show the ELISA results for the binding of anti-FAM19A5 antibodies 3-2 and 1-28 to thirteen different FAM19A5 epitope F2 fragment mutant peptides: (i) F2-01-BSA (#1), (ii) F2-02-BSA (#2), (iii) F2-03-BSA (#3), (iv) F2-04-BSA (#4), (v) F2-05-BSA (#5), (vi) F2-06-BSA (#6), (vii) F2-07-BSA (#7), (viii) F2-08-BSA (#8), (ix) F2-09-BSA (#9), (x) F2-10-BSA (#10), (xi) F2-11-BSA (#11), (xii) F2-12-BSA (#12), and (xiii) F2-13-BSA (#13).
Figure 3B:
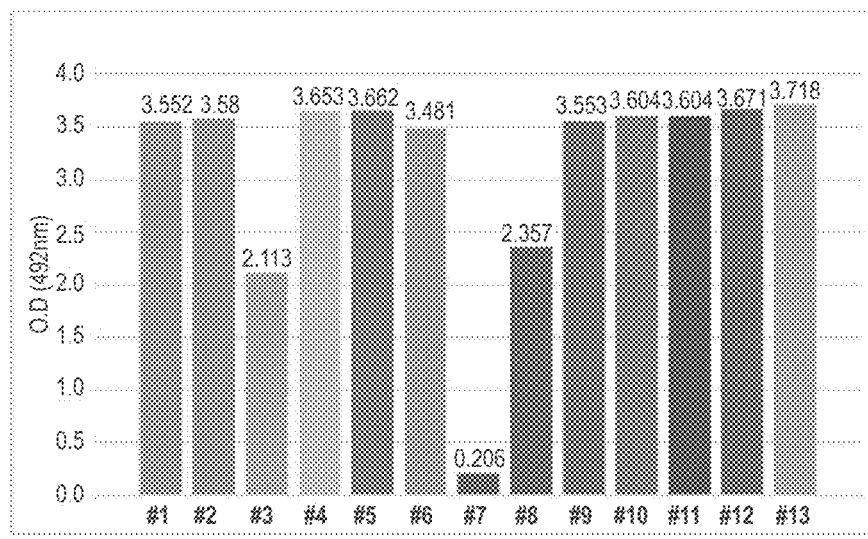

As shown in FIGS. 3A and 3B, the 3-2 antibody bound strongly to mutant F2 peptide fragments #1, 2, 4-6, and 9-13 with reduced binding to fragments #3, 7, and 8. These latter three mutant F2 peptide fragments comprise an alanine substitution at amino acid residues D5, P9, and R11 (numbering according to SEQ ID NO: 6 in Table 9, above), respectively, suggesting that the 3-2 antibody binds to FAM19A5 at primarily these amino acid residues.

Figure 3C:
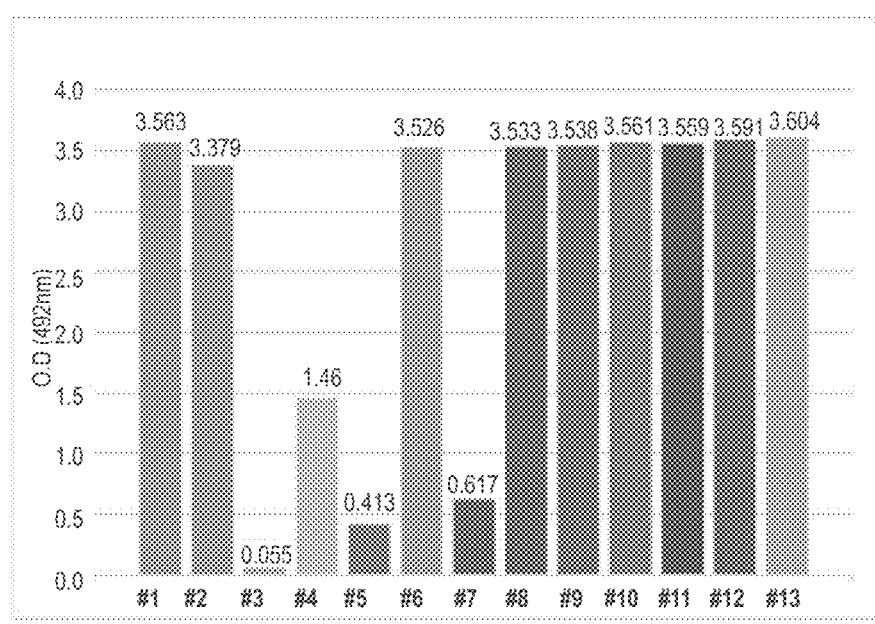

As for the 1-28 antibody, it bound strongly to mutant F2 peptide fragments #1, 2, 6, and 8-13, whereas to peptide fragments #3, 4, 5, and 7, the 1-28 antibody exhibited much reduced binding. See FIG. 3C. This data suggests that the anti-FAM19A5 antibody 1-28 binds to FAM19A5 primarily at amino acid residues D5, S6, S7, and P9 (numbering according to SEQ ID NO: 6 in Table 9, above) within the epitope F2 fragment.

Example 7 Epitope Mapping Analysis Using FAM19A5 Mutants M1-M8

Figure 4:
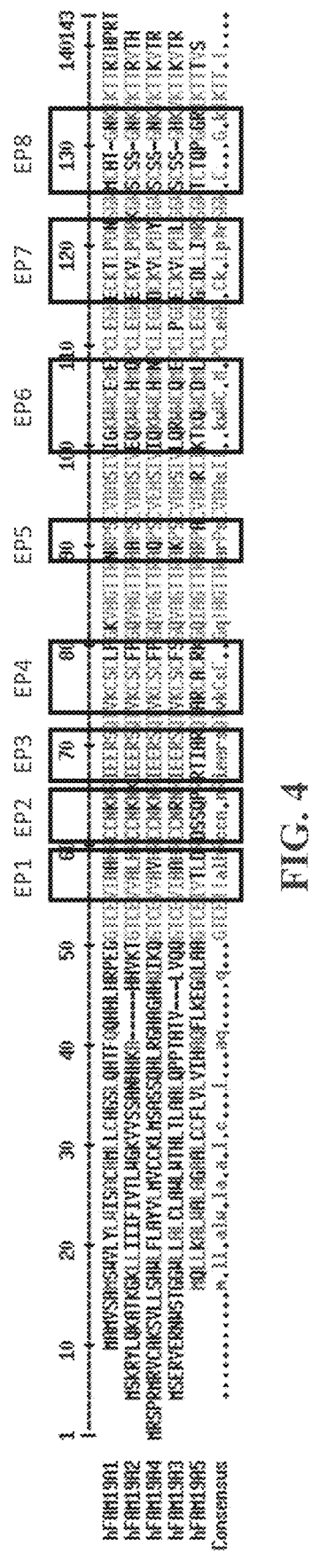

To further characterize the binding epitopes of the anti-FAM19A5 antibodies disclosed in the present disclosure, the amino acid sequences for the different FAM19 family members (i.e., FAM19A1-5) were aligned as shown in FIG. 4. Based on this alignment, eight regions where the amino acid sequences of the FAM19A5 protein differed the most significantly from the other members of the FAM19A family (i.e., FAM19A1-4) were identified (M1-M8). The amino acid sequences of these regions were replaced with the consensus sequence of the corresponding regions for the FAM19A1-4 proteins. See Table 10 (the mutated amino acid residues are bolded and underlined).

The mutant FAM19A5-expressing phages were prepared as follows. To prepare the media for phage culture, 55.6 ml of 2M Glucose(D-(+)-Glucose, Sigma), 5 mL of 1M MgCl2 (Magnesium chloride, Junsei) 1 mL of 34 mg/mL chloramphenicol (Sigma) were added to 2×YT media. Colonies obtained through mono-phage ELISA were selected and placed in 5 mL of prepared media (2×YT-GMC) to be cultured for 16 hours at 37° C. with shaking incubator (VS-8480, Vision). 100 µL of each culture was transferred to 10 mL 2×YT-GMC individually which were cultured at 37° C. in the incubator until detection value at O.D. 600 nm reached 0.5. Once detection value has reached 0.5 at O.D. 600 nm, 5 mL of each culture were obtained as samples to be infected. Following sample preparation, 50 µL of M1 helper phage was added to individual samples then incubated at 37° C. without shaking for 30 minutes and with shaking for additional 30 minutes. Individual cultures were centrifuged for 15 minutes at 3,850 rpm using Micro centrifuge (Micro12, Hanil). The supernatants of centrifuged cultures were removed to be kept separate and replaced with 5 mL of 2×YT media containing 1 mL of 1M IPTG (AG Scientific), 5 mL of 1M MgCl2.1 ml of 70 µg/µL kanamycin (Biopure) and 1 mL of Chloramphenicol. The resulting pellets were dispersed thoroughly in newly added media followed by incubation at 30° C. for 16 hours with stirring.

TABLE 10

| FAM19A5 | Sequences |
|---|---|
| Wild Type | QFLKEGQLAAGTCEIVTLDRDSSQPRRTIARQTARCA CRKGQIAGTTRARPACVDARIIKTKQWCDMLPCLEGE GCDLLINRSGWTCTQPGGRIKTTTVS (SEQ ID NO: 86) |
| M1 | QFLKEGQLAAGTCEVIAAHRDSSQPRRTIARQTARCA CRKGQIAGTTRARPACVDARIIKTKQWCDMLPCLEGE GCDLLINRSGWTCTQPGGRIKTTTVS (SEQ ID NO: 87) |

TABLE 10-continued

| FAM19A5 | Sequences |
|---|---|
| M2 | QFLKEGQLAAGTCEIVTLDRCCNKNRRTIARQTARCA CRKGQIAGTTRARPACVDARIIKTKQWCDMLPCLEGE GCDLLINRSGWTCTQPGGRIKTTTVS (SEQ ID NO: 88) |
| M3 | QFLKEGQLAAGTCEIVTLDRDSSQPRIEERSQTARCA CRKGQIAGTTRARPACVDARIIKTKQWCDMLPCLEGE GCDLLINRSGWTCTQPGGRIKTTTVS (SEQ ID NO: 51) |
| M4 | QFLKEGQLAAGTCEIVTLDRDSSQPRRTIARQTVKCS CFPGQIAGTTRARPACVDARIIKTKQWCDMLPCLEGE GCDLLINRSGWTCTQPGGRIKTTTVS (SEQ ID NO: 52) |
| M5 | QFLKEGQLAAGTCEIVTLDRDSSQPRRTIARQTARCA CRKGQIAGTTRNKPSCVDARIIKTKQWCDMLPCLEGE GCDLLINRSGWTCTQPGGRIKTTTVS (SEQ ID NO: 53) |
| M6 | QFLKEGQLAAGTCEIVTLDRDSSQPRRTIARQTARCA CRKGQIAGTTRARPACVDARIILQRWWCQMELCLEGE GCDLLINRSGWTCTQPGGRIKTTTVS (SEQ ID NO: 54) |
| M7 | QFLKEGQLAAGTCEIVTLDRDSSQPRRTIARQTARCA CRKGQIAGTTRARPACVDARIIKTKQWCDMLPCLEGE ECKTLPDNSGWTCTQPGGRIKTTTVS (SEQ ID NO: 55) |
| M8 | QFLKEGQLAAGTCEIVTLDRDSSQPRRTIARQTARCA CRKGQIAGTTRARPACVDARIIKTKQWCDMLPCLEGE GCDLLINRSGWTCSCSSGNKIKTTTVS (SEQ ID NO: 56) |

Figure 5:
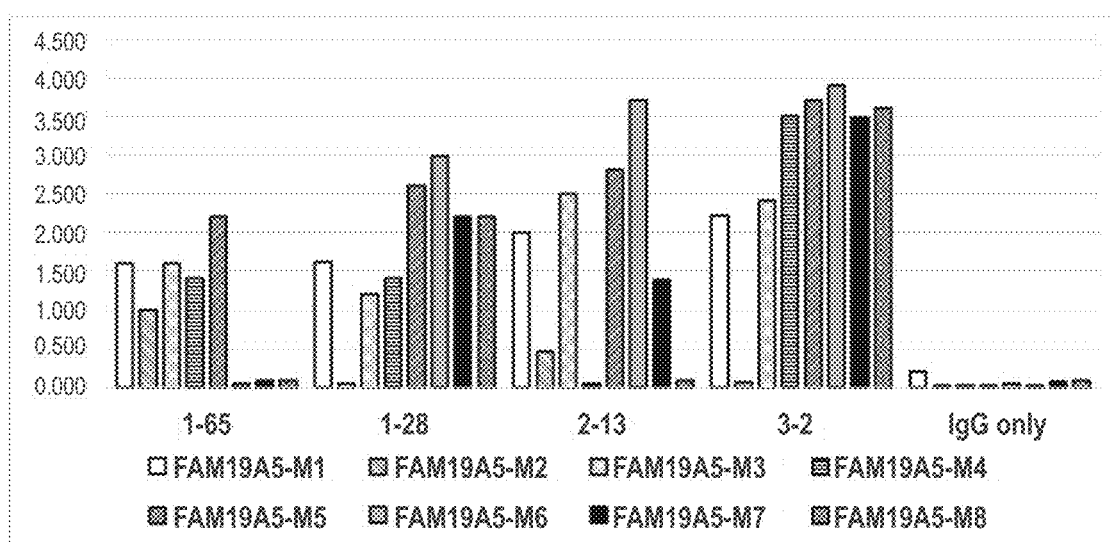
FIG. 5 shows the ELISA results for the binding of anti-FAM19A5 antibodies 1-65, 1-28, 2-13, and 3-2 to FAM19A5 mutants M1 to M8. For each of the antibodies, the eight bars correspond to mutants M1 to M8 (moving from left to right).

As shown in FIG. 5, the anti-FAM19A5 antibodies 1-28 and 3-2 failed to bind to FAM19A5 mutant M2. As shown in Table 10 (above), the M2 mutant has substitutions at amino acid residues 21-25 (i.e., epitope EP2), which correspond to a region within epitope fragment F2 of FAM19A5. This is in agreement with the earlier data from Example 7 and confirms the importance of the epitope fragment F2 for the binding of the 1-28 and 3-2 antibodies to FAM19A5.

As for the 2-13 antibody, it appeared to bind to FAM19A5 at epitopes that are completely different from the 1-28, 3-2, and 1-65 antibodies. As shown in FIG. 5, anti-FAM19A5 antibody 2-13 had moderate to high binding to FAM19A5 mutants M1-M3 and M5-M7 but failed to bind mutants M4 and M8, suggesting the importance of epitopes EP4 and EP8 in the 2-13 antibody binding to FAM19A5. Considering that the 2-13 antibody did not appear to bind to any of the FAM19A5 epitope fragments from Example 7 (see FIG. 2), this data also seems to suggest that the 2-13 antibody has a conformational epitope as opposed to a linear epitope.

Example 8 Cross-Competition Analysis

Next, a two-site sandwich ELISA was used as described below to assess whether the different anti-FAM19A5 antibodies with similar binding epitopes cross-compete with each other. See FIG. 6A.

First, the indicated anti-FAM19A5 antibodies were diluted in 1×PBS to a concentration of 10 µg/mL. The diluted anti-FAM19A5 antibodies (10 µg/mL in 1×PBS) ("capture antibody") were used to coat the 96-well plates (100 µL/well) at 37° C. for approximately 1 hour. After the incubation, the plates were washed with the washing buffer (0.01% Tween-20/PBS; also called 0.01% PBST) for a total of five washes, blocked with the blocking solution (5%

BSA/PBS; also called 5% PBSA) (250 µL/well) for one hour at 37° C., and then washed again. Next, 100 µg/mL of the FAM19A5 antigen (diluted in PBS containing 5% BSA, 0.01% Tween-20; also called 5% PBSAT; "diluent buffer") was added to each of the wells, and the 96-well plates were incubated for 2 hours at 37° C. After the incubations, the plates were washed using 0.01% PBST for a total of five washes. After the final wash, the indicated biotinylated anti-FAM19A5 antibodies ("detection antibody") (diluted to 1 µg/mL in 5% PBSAT) were added to the relevant wells (100 µL volume) and the plates were incubated for an additional 1 hour at 37° C. Afterwards, the plates were washed again with 0.01% PBST (five total washes). Next, 100 µL of the diluted (1/2000 in 5% PBSAT) Streptavidin-HRP (1 mg/mL, Sigma, USA) was added to the wells, and the plates were incubated for 30 minutes at room temperature. The plates were then washed and treated with 100 µL of the TMB substrate (3,3plates were then washed and treated with 100 µL solution, Thermo Fisher Scientific). After an additional 30-minute incubation at room temperature, the color change reaction was induced by the addition of the TMB substrate. This reaction was stopped using 50 µL of sulfuric acid (2N H2SO4), and the extent of color change was detected via absorption at 450 nm with reference wavelength at 620 nm using a 96 well microplate reader (Molecular Device).

Figures 6A, 6B:
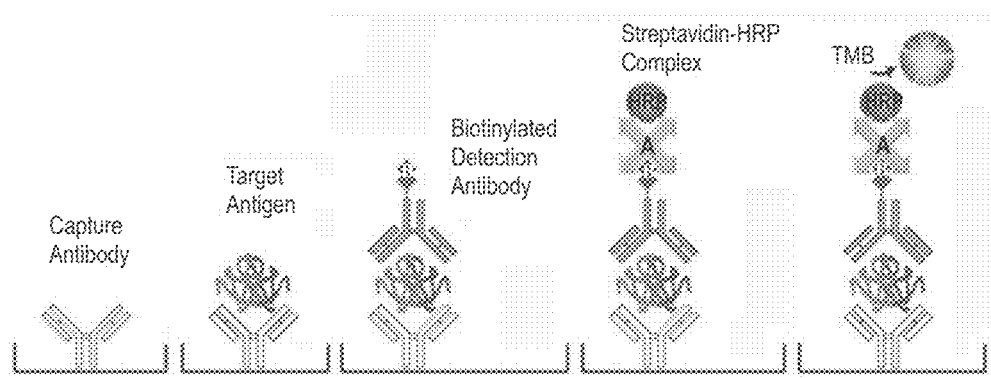
FIG. 6A shows the schematic diagram of the two-site sandwich ELISA assay used to assess cross-competition among the different anti-FAM19A5 antibodies.
FIG. 6B shows the results of the cross-competition analysis for six different anti-FAM19A5 antibodies: 1-65, P2-A03, P2-F11, 13B4, 2-13, and 3-2. The term "S/N" refers to the signal to noise ratio, which is measured as follows: [O.D. of 10 ng/mL antigen]/[O.D. of 0 ng/mL antigen]. The grey boxes shows cross-competition (i.e., S/N ratio lower than 2).

As shown in FIG. 6B, anti-FAM19A5 antibodies 1-65, P2-A03, P2-F11, and 13B4 all cross-competed with one another. Like the 1-65 antibody, the P2-A03, P2-F11, and 13B4 antibodies all bind to FAM19A5 at epitopes M6, M7, and/or M8 (i.e., within the F5 and/or F6 epitope fragments) (data not shown). In contrast, antibodies 2-13 and 3-2 did not cross-compete with the other anti-FAM19A5 antibodies, confirming the earlier epitope mapping analysis, which showed these antibodies bind primarily at the F2 epitope fragment.

Example 9 Binding Affinity Analysis

Figures 7A, 7B:
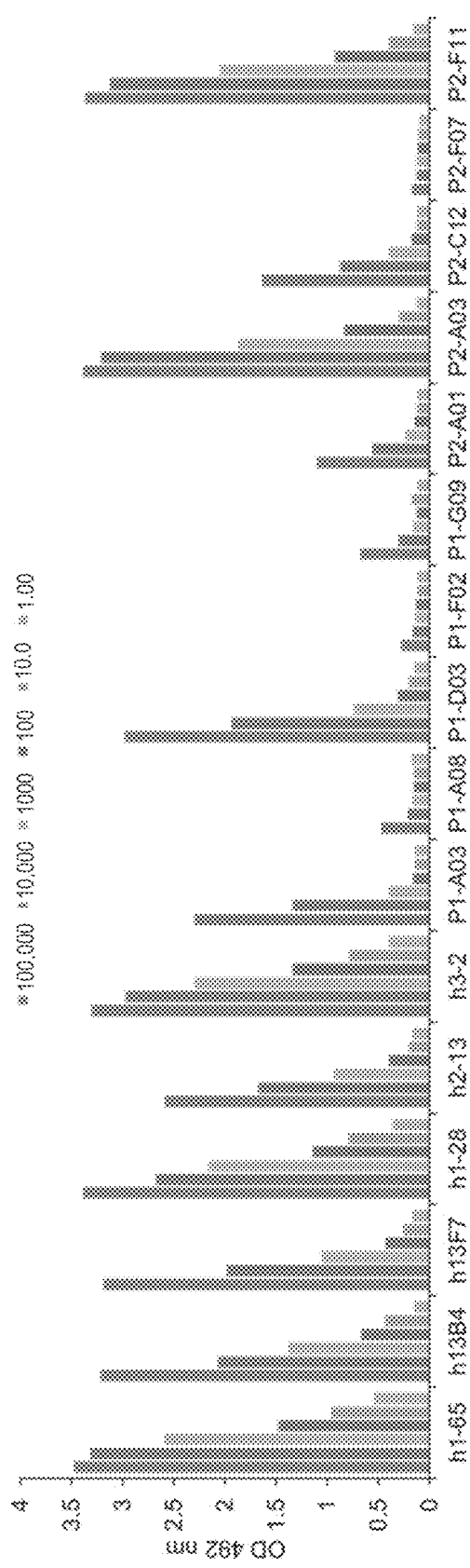
FIGS. 7A and 7B show the ELISA results for the binding of several anti-FAM19A5 antibodies to FAM19A5. The results for the following antibodies are shown: 1-65, 13B4, 13F7, 1-28, 2-13, 3-2, P1-A03, P1-A08, P1-D03, P1-F02, P1-G09, P2-A01, P2-A03, P2-C12, P2-F07, and P2-F11 (moving left to right).

To determine the binding affinity of the different anti-FAM19A5 antibodies to FAM19A5, an ELISA assay was used as described earlier (e.g., Example 6). As shown in FIGS. 7A and 7B, the 1-28, 3-2, and 1-65 antibodies bound to FAM19A5 with similar binding affinity (Kd=0.17 nM, 0.12 nM, and 0.10 nM, respectively). The 2-13 antibody bound with a Kd value of about 2.77 nM. See FIG. 7B.

Example 10 Serum Analysis in Liver Fibrosis

To begin assessing the in vivo function of the anti-FAM19A5 antibodies disclosed herein, the level of FAM19A5 protein in liver fibrosis was measured using a rat model of liver fibrosis (i.e., bile duct ligation (BLD)-induced hepatic fibrosis Sprague-Dawley (SD) rat model). See Kountouras et al., *Br J Exp Path* 65:305-311 (1984). Briefly, the animals were anesthetized with ketamine and xylazine. A 1.5-cm midline incision was made and the common bile duct was located and double ligated with 3-0 silk ligatures. Then, at 21 days post hepatic fibrosis induction, whole blood was collected from the animals and the serum was separated from the whole blood.

The level of FAM19A5 protein in the sera was measured using the FAM19A5 sandwich ELISA assay. A 96-well ELISA plate was coated overnight with 1 µg/mL of 1-65 human IgG1 anti-FAM19A5 antibody in a 100 µL volume. The plate was then washed with PBS and subsequently blocked with 1% BSA in PBS for 1 hour at room temperature. Next, the plate was again washed with PBS and approximately 100 µL of the standard and the sample were dispensed into the appropriate wells. The plate was then incubated at room temperature for 2 hours. Afterwards, the plate was washed with 0.05% PBS-Tween 20 (i.e., the wash buffer) and approximately 100 µL of the detection antibody (horse radish peroxidase (HRP) conjugated goat a-rabbit IgG antibody (Santa Cruz, Cat #SC-2030), diluted 1:5000 in 1% BSA in PBS) was added to the wells. The plate was incubated at room temperature for an additional 1 hour. After additional washes with the wash buffer, approximately 100 µL of the 0-Phenylenediamine Dihydrochloride (OPD) substrate was added to each of the wells, and the plate was allowed to develop at room temperature. After about 10 minutes, approximately 100 µL of 1N H2SO4 (sulfuric acid) was added to the wells to stop the reaction. The absorbance was immediately measured at a wavelength of 492 nM using a 96-well MicroPlate Reader (Molecular Device, Versa Max).

Figure 8:
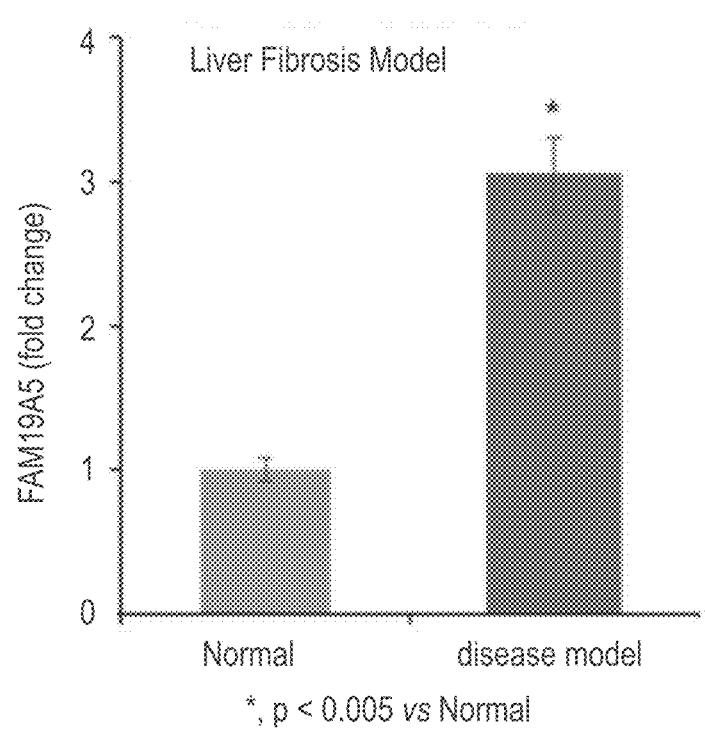
FIG. 8 shows the comparison of the level of FAM19A5 protein in the serum of rats (n=5) with liver fibrosis induced by bile duct ligation (BDL) ("disease model") against healthy rats ("normal") (n=3). The level of FAM19A5 protein is shown as fold change over the level observed in normal control animals. "*" indicates a statistically significant difference (p<0.005) compared to the normal control animals.

As shown in FIG. 8, the level of FAM19A5 protein was more than 3 times higher in the serum of the BDL-induced hepatic fibrosis SD rats ("disease model") as compared to that of the normal (i.e., non-BDL-induced) rats.

Example 11 Serum Analysis in Lung Fibrosis

Figure 9:
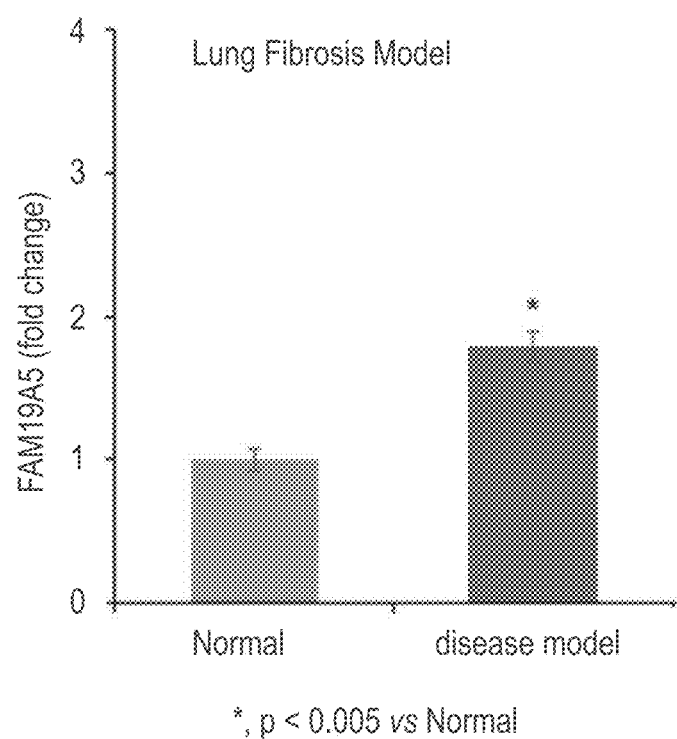
FIG. 9 shows the comparison of the level of FAM19A5 protein in the serum of rats (n=5) with idiopathic pulmonary fibrosis induced by intratracheal injection of 3 mg/kg bleomycin ("disease model") against healthy rats ("normal") (n=5). The level of FAM19A5 protein is shown as fold change over the level observed in normal control animals. "*" indicates a statistically significant difference (p<0.005) compared to the normal control animals.

In order to assess whether the level of FAM19A5 protein also increased in lung fibrosis, idiopathic pulmonary fibrosis was induced in 7-week-old male SD rats by administering 3 mg/kg of bleomycin via intratracheal injection. At 24 days post bleomycin administration, whole blood was collected from the animals and the serum was separated from the whole blood. The level of FAM19A5 protein in the sera was measured using the FAM19A5 sandwich ELISA assay as shown in Example 10 above. As shown in FIG. 9, the level of FAM19A5 protein was more than 1.5 times higher in the serum of the pulmonary fibrosis induced SD rats ("disease model") as compared to that of the normal (i.e., no idiopathic pulmonary fibrosis) rats.

Example 12 Serum Analysis of Human Liver Fibrosis Patients

AST and/or ALT levels can increase in the serum upon hepatocyte damage and such increases have often been relied on to suggest liver damage. See Gowda et al., *Pan Afr Med J* 3:17 (2009); Giannini et al., *Arch Intern Med* 163: 218-224 (2003). However, when the damage is severe (e.g., cirrhosis), the AST and ALT levels can appear normal. Therefore, to assess whether FAM19A5 expression can be a better indicator of liver damage, the level of FAM19A5 protein was measured in the serum of human patients with confirmed cirrhosis using the FAM19A5 sandwich ELISA assay.

The 2-13 anti-FAM19A5 human IgG1 antibody was reconstituted at a concentration of 1 µg/µL in 50 mM carbonate buffer (Bio-World, Cat. C2070-9.6, Lot. C70-9.616Z11C). The anti-FAM19A5 antibody was then diluted at a ratio of 1:1000 in PBS and subsequently used to coat a 96-well ELISA plate overnight. The next day, the plate was washed with PBS and subsequently blocked with 1% BSA in PBS at room temperature for about 1 hour. Afterwards, the plate was again washed with PBS and approximately 100 µL of the standard and samples were dispensed into the appropriate wells. The plate was incubated at room temperature for 2 hours. Afterwards, the plate was washed with 0.05% PBS-Tween 20 (i.e., the wash buffer). Next, the 3-2 anti- FAM19A5 mouse IgG2a antibody (reconstituted at a concentration of 1 µg/µL) was diluted at a ratio of 1:2000 in 1% BSA in PBS. Approximately 100 µL of this diluted antibody was added to each of the wells and the plate was allowed to incubate for an additional 2 hours at room temperature. After additional washes with the wash buffer, approximately 100 µL of the horse radish peroxidase (HRP) conjugated donkey α-mouse IgG antibody (Jackson Lab, Cat. 715-035-151, Lot. 122401) (diluted 1:5000 in 1% BSA in PBS) was added to the wells. The plate was subsequently incubated for 1 hour at room temperature. After the incubation, the plate was washed with the wash buffer and approximately 100 µL of the 1-STEP™ Ultra TMB-ELISA substrate solution (Pierce, Cat. 34028, Lot. QJ20436540) was added to each of the wells. After a 10-minute incubation, approximately 100 µL of 1N H2SO4 (sulfuric acid) was added to the wells to stop the reaction. The absorbance was immediately measured at a wavelength of 450 nM using a 96-well MicroPlate Reader (Molecular Device, Versa Max).

Figure 10:
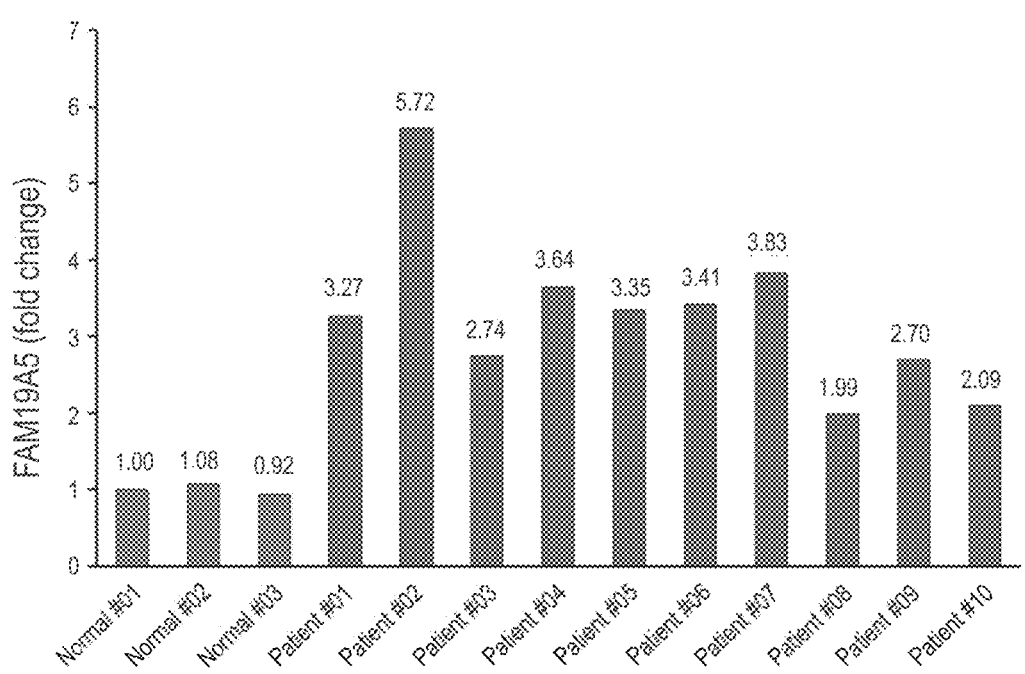
FIG. 10 shows the fold change in the level of FAM19A5 protein in the serum of both human patients with confirmed liver fibrosis, e.g., cirrhosis, (patient #1-10) and healthy individuals (normal #1-3). The specific value shown above each bar graph denotes the fold change over the average concentration of the FAM19A5 protein detected in the serum of the healthy individuals.

As shown in FIG. 10, patients with cirrhosis had FAM19A5 protein levels that were approximately 2-6 fold greater than those observed in the sera of normal healthy individuals. Such data is in agreement with the animal studies described above and indicates that the serum concentration of FAM19A5 protein can be an ideal diagnostic marker for cirrhosis.

Example 13 Analysis of Effect on Myocardial Infarction

Ischemic cell death that occurs during a myocardial infarction leads to a reparative response in which the damaged tissue is replaced with a fibrotic scar. This is followed by remodeling of the surrounding tissue (e.g., left ventricular wall thinning and chamber dilatation) and eventually leading to impaired cardiac function. See Talman et al., *Cell Tissue Res* 365(3):563-581 (2016); Firth et al., *Cardiovasc Drugs Ther* 4:1363-1374 (1990). To assess the effect of anti-FAM19A5 antibody on myocardial infarction, a mouse ischemic reperfusion model was used. Briefly, Balb/cAnN-CrljOri mice (6 weeks old, male) (Orient Bio Inc., Seoul, South Korea) were purchased and housed in specific pathogen-free (SPF) conditions for approximately 1 week. Afterwards, the mice were deeply anesthetized with Zoletil 50 (VIRBAC, France) and zylazine (ROMPUN®, Bayer AG, Germany). Once anesthetized, open thoracotomy was performed on the mice to expose the coronary artery, and myocardial infarction was induced by ligating the artery using a 7-0 suture and a PE20 tube. Forced breathing was retained in the mice by connecting the endotracheal tube to the ventilator after air intubation. The ischemic condition was maintained for 40 minutes, at which point, the blood was reperfused by removing the PE20 tube. Beginning at day 3 post myocardial infarction induction, the anti-FAM19A5 antibodies (1-65, 3-2, or 1-28 antibodies) were administered to the mice via intravenous injection at weekly intervals for a total of three injections. Naïve (i.e., healthy) and NHI mice were used as controls.

On day 21 post myocardial infarction induction, the mice were sacrificed and their hearts harvested. The heart tissues were fixed in a 10% formalin solution. Then, the fixed tissues were sliced transversely with a thickness of 2 mm around the apex and placed in paraffin blocks, which were further sliced into 5 µm sections and mounted onto glass tissue slides for analysis. Hematoxylin and eosin (H & E) staining was performed on the heart tissue samples to assess the effect of each anti-FAM19A5 antibody (i.e., 1-65, 3-2, and 1-28 antibodies) on myocardial infarction-associated tissue remodeling.

Figure 11:
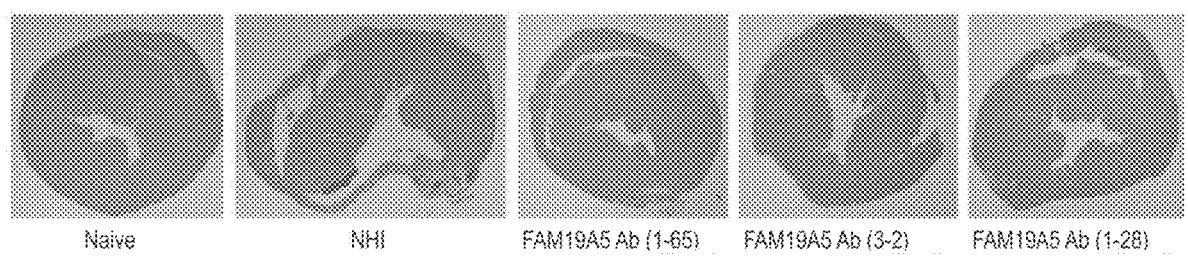
FIG. 11 shows a comparison of an H&E (hematoxylin and eosin) staining of the left ventricular tissue in myocardial infarction-induced animals treated with a control antibody ("NHI") or an anti-FAM19A5 antibody ("1-65," "3-2," and "1-28"). Healthy animals (i.e., no myocardial infarction induction, "naïve") were used as additional control.

As expected, the heart tissues from the NHI control group exhibited significant dilatation of the left ventricle and thinning of the left ventricular wall. See FIG. 11 ("NHI"). In contrast, the heart tissues from mice that received the anti-FAM19A5 antibodies resembled heart tissues from naïve ("healthy") animals (i.e., decreased left ventricular dilatation and preservation of the left ventricular wall tissues).

To help quantify this effect, Masson's trichrome, which stains for collagen, was performed on the heart tissue sections. As noted earlier, collagen is a major component of the extracellular matrix (ECM) and therefore, Masson's Trichrome staining of increased collagen accumulation in a tissue sample can be an accurate indicator of fibrosis. The stained slides were photographed using an optical microscope (Olympus BX53, Japan) and the ratio of fibrous area to the total left ventricular area was also calculated using an image analyzer.

Figure 12A:
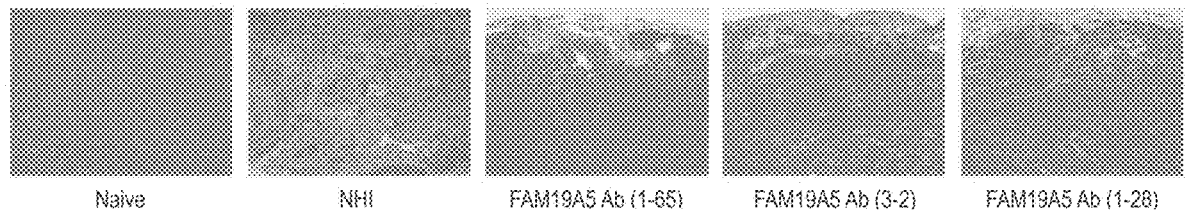
FIGS. 12A and 12B show a comparison of collagen accumulation in the left ventricular tissue of myocardial infarction-induced animals. The myocardial infarction-induced animals received either a control antibody ("NHI") or an anti-FAM19A5 antibody ("1-65," "3-2," and "1-28"). Healthy animals (i.e., no myocardial infarction induction, "naïve") were again used as additional control.
Figure 12B:
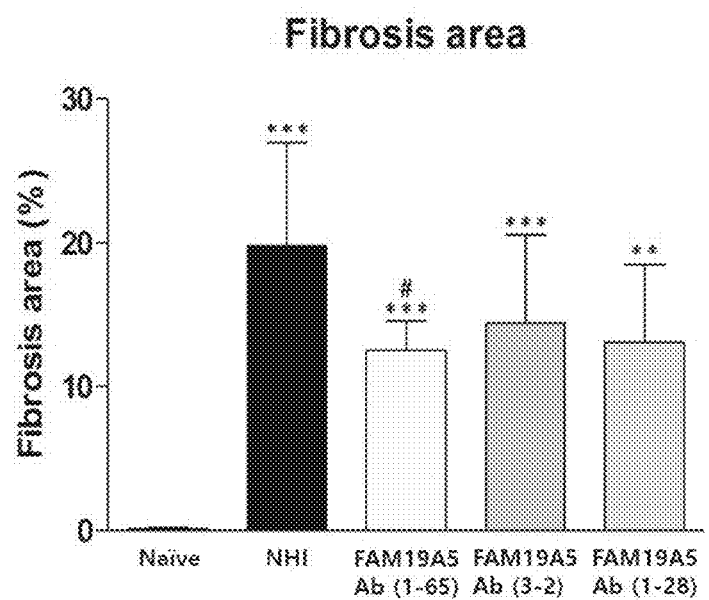

As shown in FIG. 12A, mice that received the anti-FAM19A5 antibodies (1-65, 3-2, and 1-28) had significantly less accumulation of collagen compared to the NHI control group. In the anti-FAM19A5 antibody treated groups, approximately 10-15% of the total left ventricular area was made up of fibrous tissue. See FIG. 12B. In contrast, in mice from the NHI control group, the fibrous area made up approximately 20% of the total left ventricular area. Among the different FAM19A5 antibodies, the 1-65 antibody appeared to have the greatest effect.

Collectively, the above results demonstrate that the administration of FAM19A5 antibodies soon after myocardial infarction can greatly improve tissue remodeling and fibrosis formation.

Example 14 Human Liver Cancer Patient Analysis

Liver fibrosis and cirrhosis are major risk factors for liver cancer. There is often fibrosis similar to liver cirrhosis surrounding cancerous tissues in human hepatic cancer patients. Therefore, to assess FAM19A5 expression in liver cancer, FAM19A5 protein expression was measured in human liver biopsies using immunohistochemistry. Briefly, liver samples were obtained from liver cancer patients with varying degree of fibrosis (i.e., stage #0 to stage #4). The tissue samples were immunostained with anti-FAM19A5 antibody and then counterstained with hematoxylin and eosin (H&E).

Figure 13:
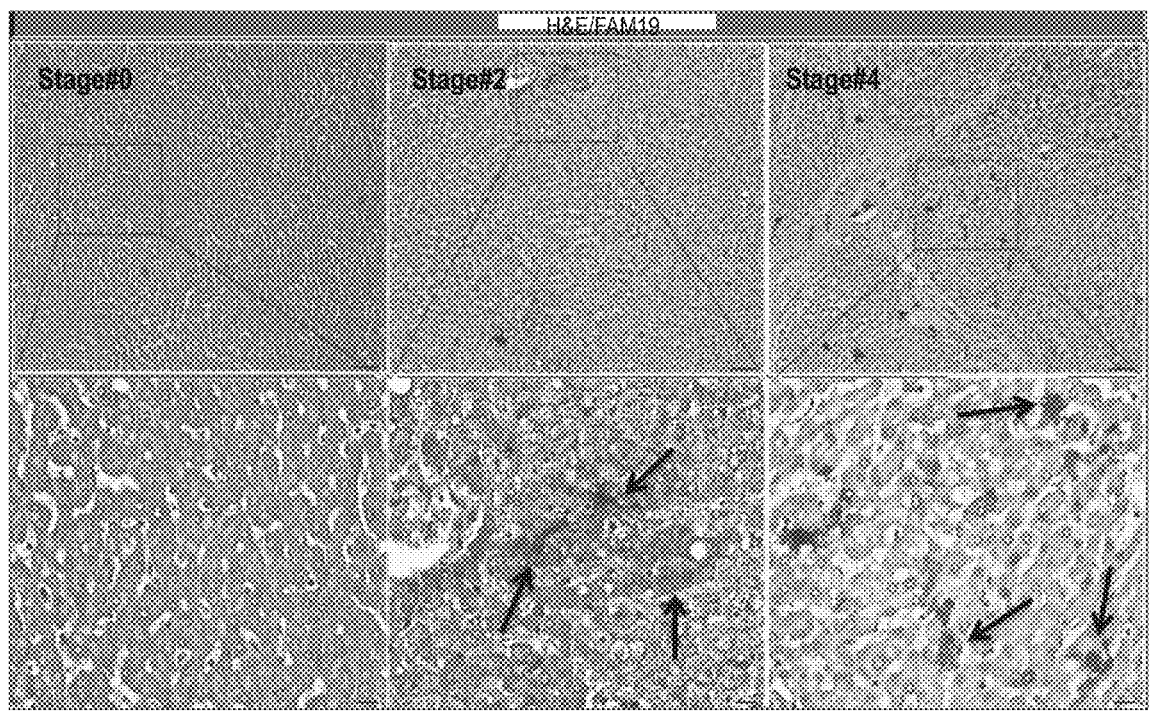
FIG. 13 shows the immunohistochemistry analysis of the FAM19A5 protein expression in liver biopsies from three different liver cancer patients. As indicated, each of the patients had varying degree of fibrosis: (i) stage #0 (left column), (ii) stage #2 (middle column), and (iii) stage #4 (right column). The bottom row shows a higher magnification of the boxed region from the top row. The arrows indicate examples of FAM19A5-positive hepatic stellate cells.

As shown in FIG. 13, there was a significant increase in FAM19A5 protein expression in the liver tissue from stage #2 and stage #4 cancer patient as compared to stage #0 patient. The increased FAM19A5 expression was centralized primarily around areas of scar formation and in the hepatic stellate cells. The increase in FAM19A5 expression also correlated with disease progression, with stage #4 liver tissue expressing much higher levels of FAM19A5 as compared to stage #2 liver tissue. Collectively, this data demonstrates that FAM19A5 also plays an important role in human liver cancer.

Example 15 Analysis of the Efficacy of Anti-FAM19A5 Antibody Administration in Liver Cancer Xenograft Model To assess the anti-tumor efficacy of anti-FAM19A5 antibodies on human liver cancer, the xenograft mouse model of liver cancer was used. Briefly, nude mice were purchased and housed in specific pathogen-free (SPF) conditions. After approximately a week of adaptation period, the animals were injected subcutaneously with Hep3B cells and/or human hepatic stellate cells (HHSteC). To do so, the cells were first treated with trypsin to prepare a single cell suspension. Next, the cells were washed and approximately $5 \times 10^6$ of Hep3B and/or $0.4 \times 10^6$ HHSteC cells were resuspended in 100 uL of DMEM media. The cells were then injected subcutaneously into the right flank of the nude mice using an insulin syringe. About 3 weeks post-injection, the animals were observed for tumor formation.

Upon tumor formation (~3 weeks after injection), the animals were injected intravenously with either normal human immunoglobulin (NHI, control) or 3-2 human IgG1 anti-FAM19A5 antibody (2.5 mg/kg). The animals received the antibodies once a week for a total of 3 weeks. Both the body weight and tumor size were assessed each week. And at 42 days post inoculation, the animals were sacrificed and the tumors were further analyzed.

Figure 14A:
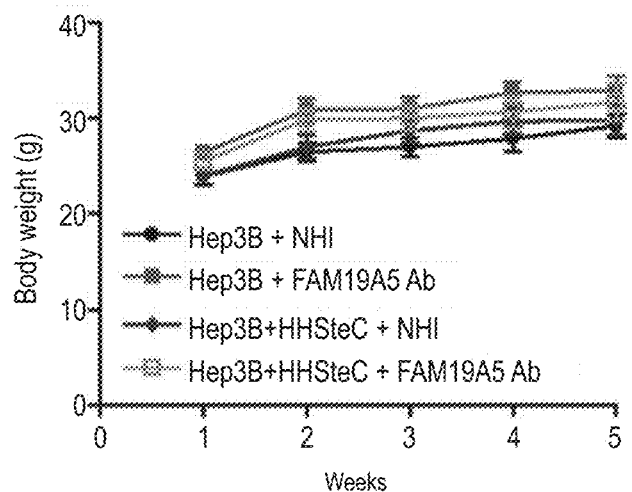
FIG. 14A shows the body weight (grams) of the animals as a function of time (weeks post inoculation). Some of the animals were inoculated with Hep3B cells alone and treated with either normal human immunoglobulin (circle, Group: "Hep3B+NHI", n=3) or anti-FAM19A5 antibody (closed box, Group: "Hep3B+FAM19A5 Ab", n=3). Other animals were inoculated with both Hep3B cells and human hepatic stellate cells (HHSteC) and treated with either normal human immunoglobulin (diamond, Group: "Hep3B+HHSteC+NHI", n=3) or anti-FAM19A5 antibody (open box, Group: "Hep3B+HHSteC+FAM19A5 Ab", n=3). Data are expressed as mean±S.D.
Figure 14B:
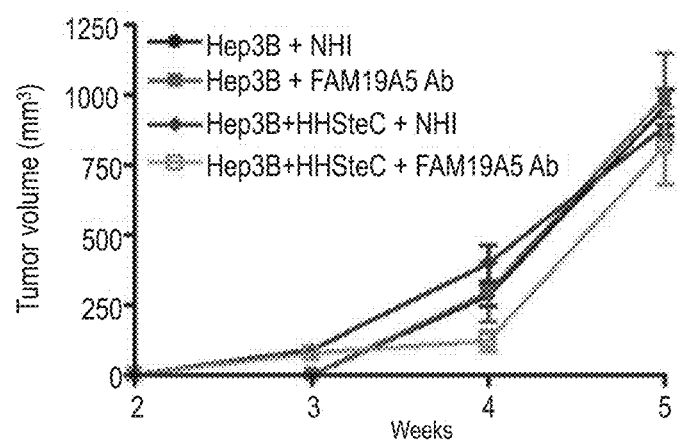
FIG. 14B shows the mean tumor volume observed in animals from the different groups as a function of time (weeks post inoculation). The groups shown are the same as those described in FIG. 14A, above. Tumor volume was calculated with the following equation: $0.5 \times \text{length} \times \text{width}^2 = \text{tumor volume (mm}^3)$. Data are expressed as mean±S.D.
Figure 14C:
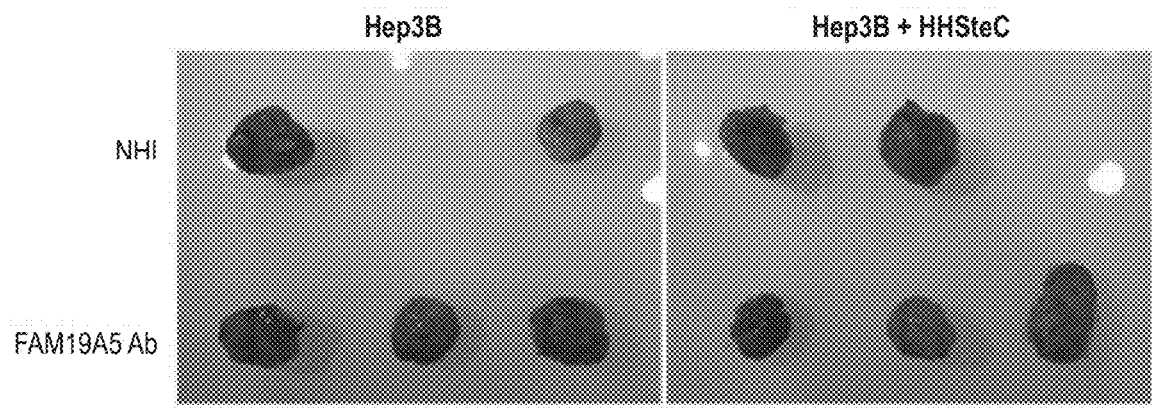
FIGS. 14C and 14D show a photographic image and the weight (grams), respectively, of the tumors isolated from the animals as described in FIG. 14A at 42 days post inoculation.
Figure 14D:
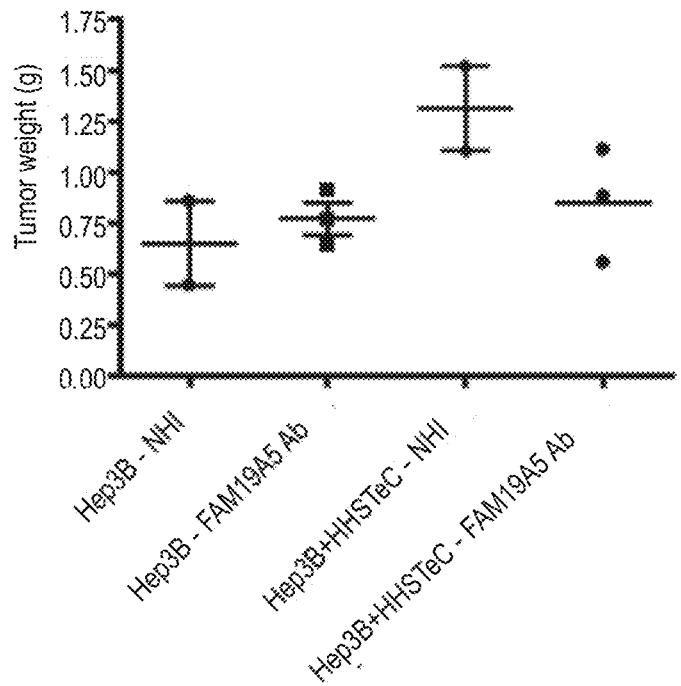

As shown in FIG. 14A, the animals from all the different groups had similar body weight throughout the duration of the experiments. And as shown in FIGS. 14B-14D, the administration of the anti-FAM19A5 antibody had minimal anti-tumor effect on animals inoculated with only Hep3B cells (i.e., "Hep3B+NHI" and "Hep3B+FAM19A5 Ab"). But in animals inoculated with both Hep3B cells and HHSteC, the administration of the anti-FAM19A5 antibody resulted in significant reduction in tumor size/weight (i.e., "Hep3B+HHSteC+NHI" v. "Hep3B+HHSteC+FAM19A5 Ab"). Such data shows that the interaction of anti-FAM19A5 antibody with the hepatocellular hepatic stellate cells in the tumor microenvironment can treat liver cancer.

Example 16 Effect of Anti-FAM19A5 Antibody Administration after Traumatic Brain Injury To assess the effect of the anti-FAM19A5 antibodies disclosed herein on traumatic brain injury, a traumatic brain injury (TBI) model was used. Briefly, C57BL/6 adult male mice (8-9 weeks of age) were deeply anesthetized with isofluorane. Cryogenic TBI was performed by placing an iron bar (prechilled using liquid nitrogen) on the calvarium for 1 minute. The mouse's skin was then sutured and housed in the same manner as normal mice. Moon et al., *Neuro Report* 22: 304-308 (2011). Approximately 1 day after TBI induction, the animals were intravenously administered with 100 µg of different anti-FAM19A5 antibodies (1-65 (2/4); 1-28; 2-13; and 3-2) diluted in phosphate-buffered saline (PBS).

On day 5 post TBI induction (TBI5D), the animals were sacrificed, perfused with 4% paraformaldehyde (PFA) in PBS, and their brain tissues harvested. The harvested brain tissues were further fixed in the 4% PFA solution for an additional 24 hours. Then, the brain tissues were cyroprotected in 30% sucrose, sectioned serially on a cryostat (40 µm), and stored in 50% glycerol/50% PBS at −20° C. until use.

To stain for the reactive astrocytes associated with gliosis (positive for nestin and GFAP expression), the brain tissue sections were blocked with 3% bovine serum albumin (BSA) and 0.1% Triton X-100 in PBS for 30 min. Primary antibodies were then incubated with the sections overnight at 4° C. Primary antibodies used in this study were mouse anti-nestin (Millipore, Billerica, MA, USA) and rabbit anti-GFAP (Dako, Carpinteria, CA, USA). After several washes with PBS, appropriate secondary antibodies were applied for 30 min. Nuclei were labeled with Hoechst 33342 (Invitrogen, Carlsbad, CA, USA). Subsequently, the sections were washed, mounted, and observed under a fluorescence or confocal microscope (Leica, Wetzlar, Germany).

To quantitate the effect, the ROI (Region of Interest) of the GFAP-negative region for each image was firstly specified and then the area (µm2, A) of the corresponding ROI was calculated with the use of the LAS AF lite software (Leica Microsystem CMS GmbH, Mannheim, Germany). The lateral length (µm, B) of the boundary line of the injury core contacting the penumbra was also measured with the same software. The result of A/B designates average distance from lesion core (A/B, µm).

Figure 15B:
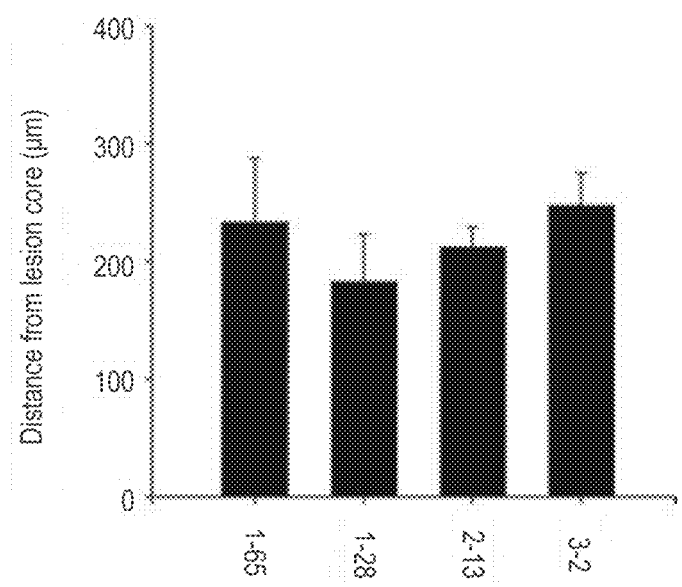

As shown in FIGS. 15A and 15B, the 1-28, 2-13, and 3-2 anti-FAM19A5 antibodies similarly reduced, reversed, and/or prevented the onset of reactive gliosis in the penumbra areas after traumatic brain injury. The overall effect was similar to that of the 1-65 anti-FAM19A5 antibody, which had previously been shown to significantly attenuate the generation of reactive astrocytes after traumatic brain injury. See U.S. Pat. No. 9,579,398. Despite binding FAM19A5 protein at a different epitope than the 1-65 antibody, the 1-28, 2-13, and 3-2 antibodies were just as effective when administered after traumatic brain injury.

Example 17 Evaluation of the Anticancer Effect of FAM19A5 Antibody in Mouse Glioblastoma Cell Line GL-261 Cancer Cells To induce the glioblastoma model, heads of 4 weeks old C57BL/6 mouse were fixed in a stereotaxic apparatus and GL-261 cells ($1 \times 10^5$ cells/5 µl) were intracranially injected (intracranial injection site: 0.2 mm anterior to the bregma, 2.2 mm lateral to the midline, 3.5 mm depth from the skull surface into the middle of the caudate-putamen) to induce gioblastoma (FIG. 16A). Human IgG (negative control) and anti-FAM19A5 antibody were each injected intravenously at seven days post GL-261 inoculation to the respective animals. Each mouse received either the human IgG control antibody or the anti-FAM19A5 antibody, at a dose of 2.5 mg/kg, once a week, three times (FIG. 16A).

Figure 17A:
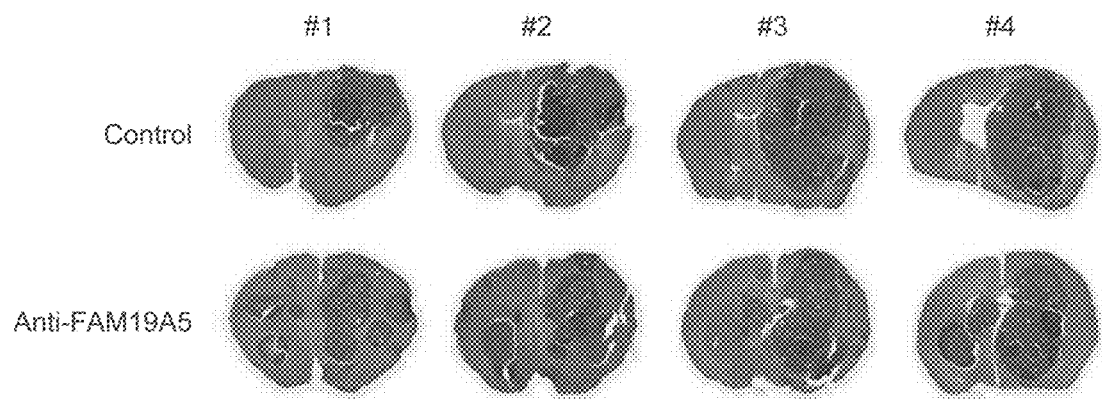
FIGS. 17A and 17B show the anticancer effect of anti-FAM19A5 antibody in the glioblastoma animal models using Hematoxylin and Eosin (H&E) staining.
Figure 17B:
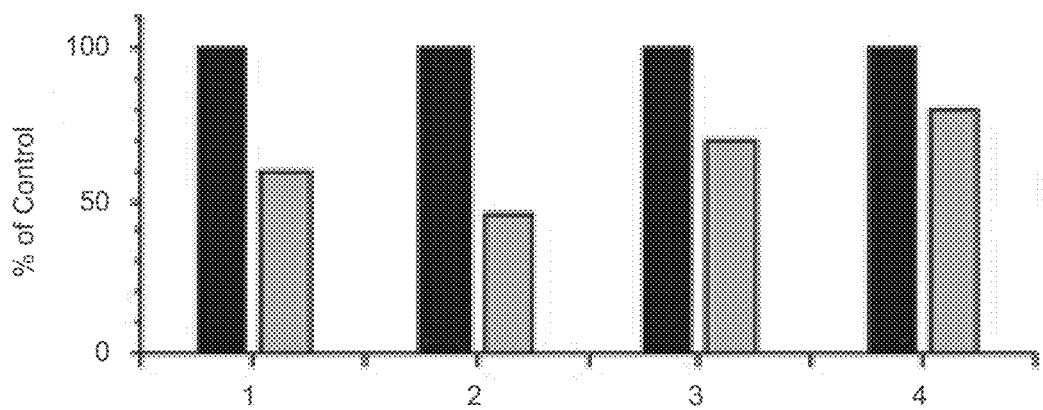
Figures 18A, 18B:
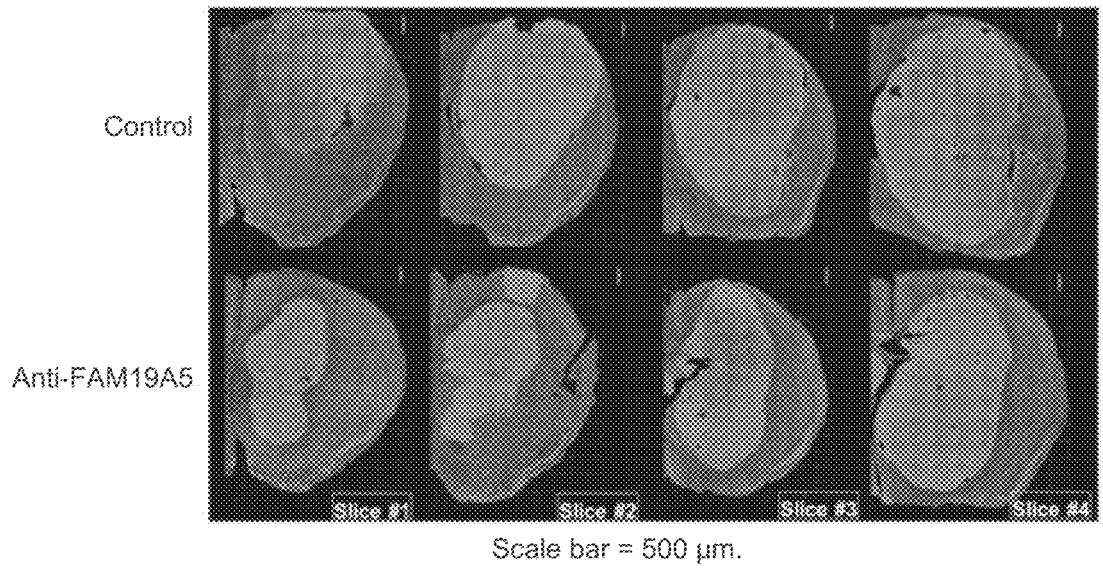
FIGS. 18A, 18B, 18C, and 18D show the anticancer effect of anti-FAM19A5 antibody in the glioblastoma animal model using Hoechst nuclear staining.
Figure 18C:
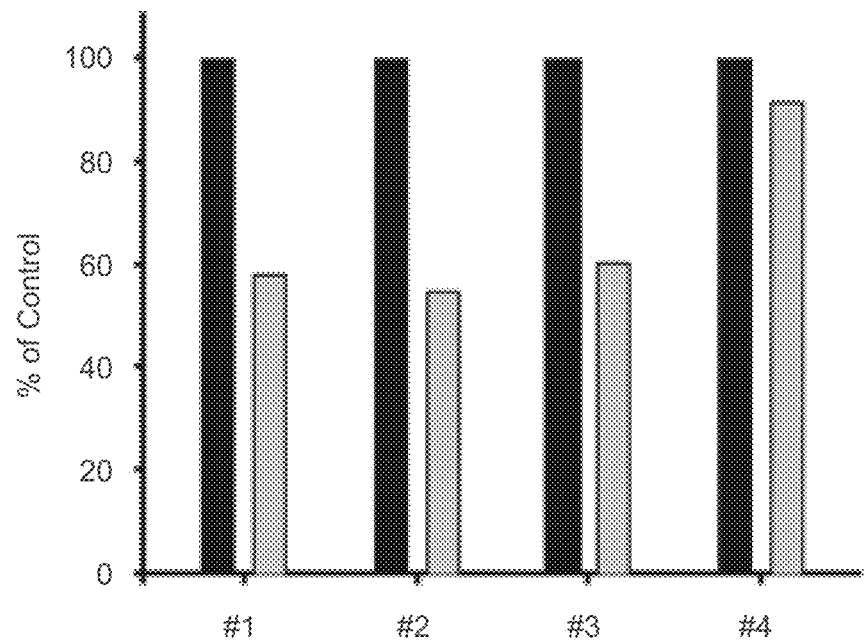
Figure 18D:
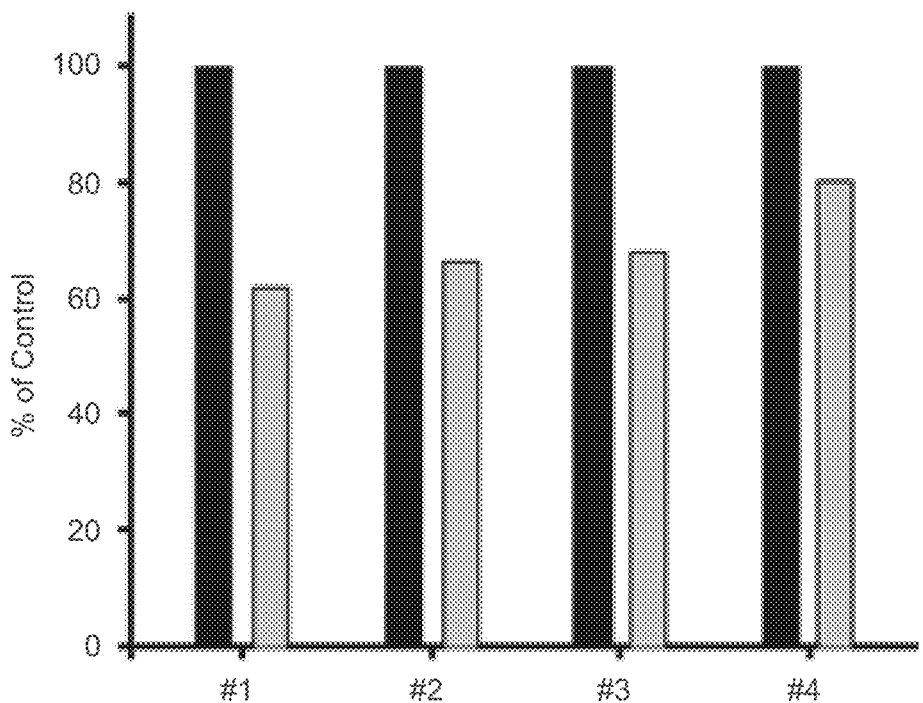

Starting at day 23 post GL-261 inoculation, death began to occur and, therefore, all surviving mice were sacrificed and the brains were removed and fixed with phosphate buffered saline containing 4% paraformaldehyde. To measure the size of the tumor in brain tissue, three analytical methods were used: 1. tissue clarification (CLARITY) (FIG. 16B), 2. Hematoxylin and Eosin (H & E) staining (FIGS. 17A and 17B), and 3. Hoechst nuclear staining (FIGS. 18A-18D).

(1) For tissue transparency, the analytical tissue was first immersed in hydrogel monomer solution (A4P0) and stored at 4° C. for one day, to ensure that the hydrogel penetrated all over the tissue. Following this, the temperature was raised to 37° C. to induce polymerization to form a net-like structure. Electrophoresis tissue clearing (ETC) was then used to remove lipids in the tissue. The prepared tissue was then placed on a lightbox. The surface of the relatively opaque tissue was considered as the surface of the tumor, and the approximate tumor mass was measured using a scale bar.

(2) Hematoxylin and Eosin Stain (H & E stain) was post-fixed with phosphate buffered saline containing 4% paraformaldehyde for 24 hours and then suspended in phosphate-buffered saline containing 30% sucrose for further 24 hours. The tissue was then placed in a mold for brain tissue, and the OCT compound containing 30% sugar solution was frozen on the dry ice, and the brain tissue was thinly cut to 30 μm using a cryostat microtome (Leica).

After the completion of H & E staining, images of the prepared specimen were obtained through a slide scanner (Carl Zeiss/AxioScanZ) and the boundary surface of the tumor was arbitrarily specified using ZEN microscope and imaging software (Zeiss) to obtain the surface area value of the tumor.

(3) Thinly cut tissue for Hoechst staining was treated with Hoechst-containing phosphate buffered saline (1:2000) for 30 minutes. The fluorescence image of the prepared specimen was obtained using a confocal microscope (Leica) and the tumor boundary was determined using IMARIS 3D software (Bitplane) to obtain the volume of the tumor and the number of cells within the tumor.

As shown in FIGS. 16B, 17A, 17B, and 18A-18D, measurement of the tumor size of each mouse revealed that the size of the glioblastoma in anti-FAM19A5 antibody-treated group decreased significantly in comparison to the human IgG-treated group, in all three experimental methods.

Example 18 Promotion of Vessel Normalization Following FAM19A5 Antibody Treatment in Glioblastoma Mouse Model Brain obtained by sacrificing glioblastoma-induced mouse models (see Example 17) were post-fixed with phosphate-buffered saline (PBS) containing 4% paraformaldehyde for 24 hours, followed by infiltration in PBS containing 30% sucrose for further 24 hours. The brain was then placed in a mold for brain tissue, and it was frozen over dry ice with OCT compound containing 30% sugar solution. The frozen brain was then thinly cut to 30 μm using a cryostat microtome. Immunohistochemistry was performed to determine the expression pattern of CD31 protein (marker for vascular endothelial cells) in the brain of the glioblastoma-induced mouse. Fluorescence images of the prepared specimen were obtained using a confocal microscope (Leica).

Figure 19A:
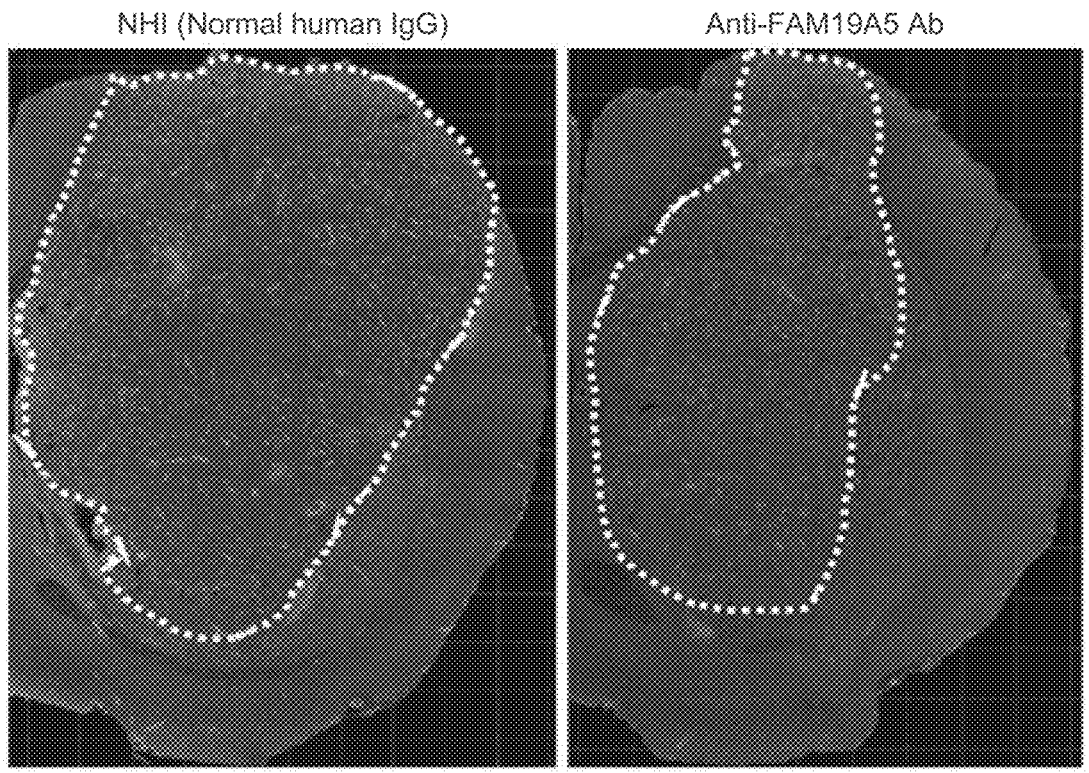
FIGS. 19A and 19B show the effect of anti-FAM19A5 antibody on blood vessel normalization in a glioblastoma mouse model.
Figure 19B:
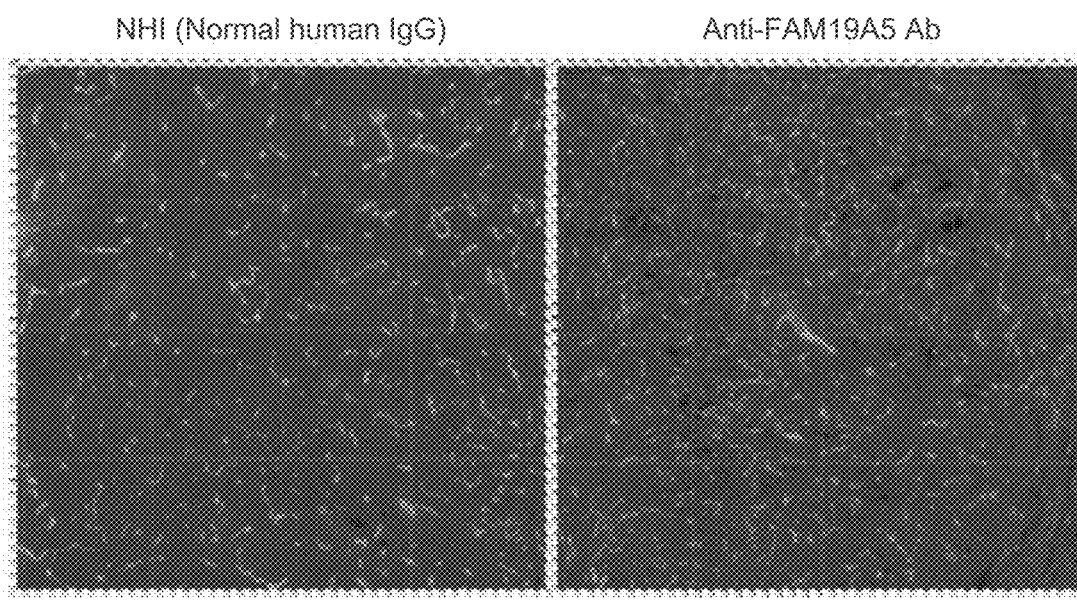

When comparable surface areas were examined (FIG. 19A, demarcated in white dots), in the control group, the number of blood vessels and its connectivity were very poor (FIG. 19A, left column), whereas in the anti-FAM19A5 antibody-treated group, the number of blood vessels and its connectivity were relatively high (FIG. 19A, right column). See FIG. 19B for higher magnification of a representative region from FIG. 19A.

The above results indicated that anti-FAM19A5 antibody treatment can promote blood vessel normalization, which can facilitate the treatment of glioblastoma.

Figure 20A:
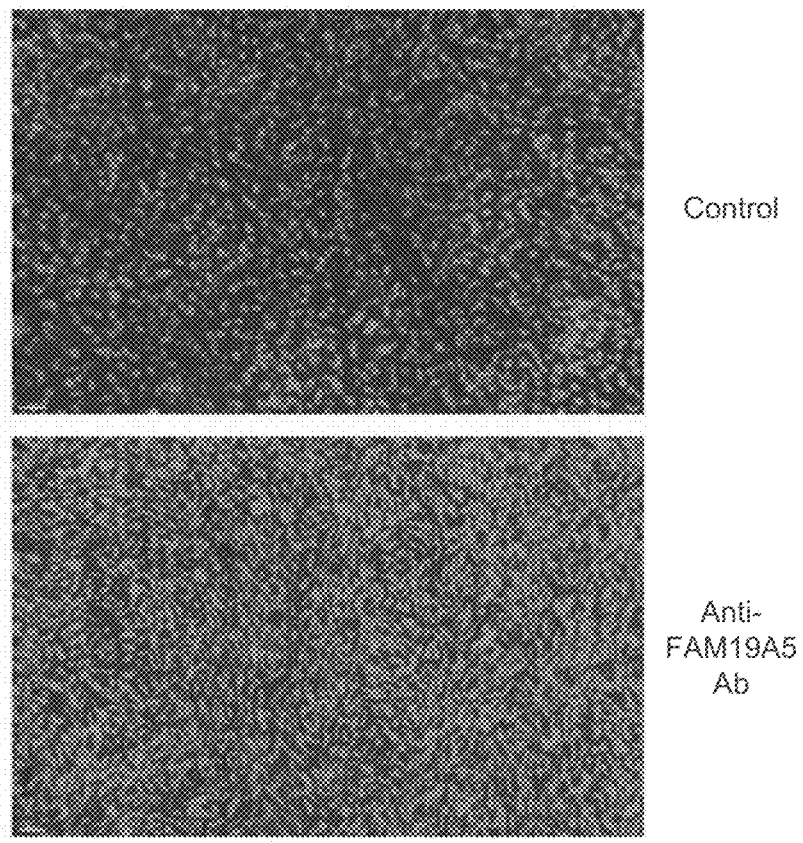
FIGS. 20A and 20B show the effect of anti-FAM19A5 antibody on the infiltration of macrophages into the tumors in a glioblastoma mouse model.
Figure 20B:
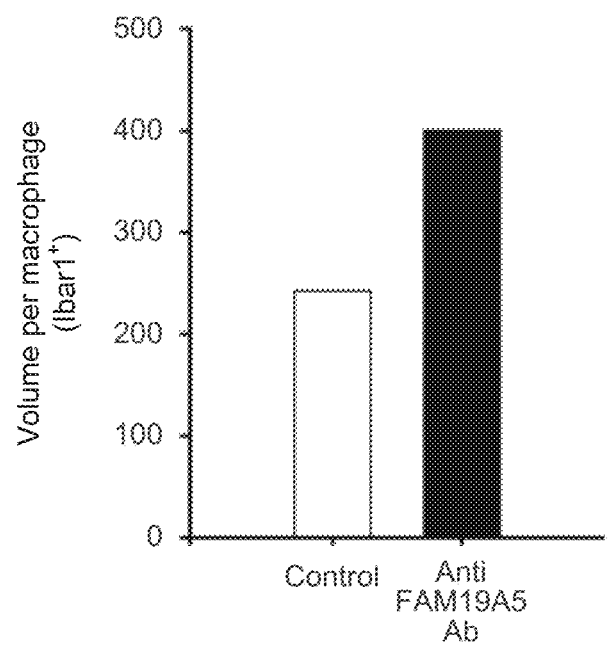

Example 19 Distributional Difference of Immune Cells Following FAM19A5 Antibody Treatment in a Mouse Model of Glioblastoma Brain isolated from glioblastoma-induced mouse models (see Example 17) were post-fixed with phosphate-buffered saline (PBS) containing 4% paraformaldehyde for 24 hours, followed by penetrating in PBS containing 30% sucrose for further 24 hours. The brain was then placed in a mold for brain tissue, and it was frozen over dry ice with OCT compound containing 30% sugar solution. The frozen brain was then thinly cut to 30 μm using a cryostat microtome. Distribution of astrocytes and macrophages in glioblastoma was observed by performing immunohistochemistry on GFAP (astrocyte marker) and Iba-1 (macrophage marker). In the control group, astrocytes were not observed in the glioblastoma, whereas in the FAM19A5 antibody-treated group, a relatively large number of astrocytes remained in the tumor. Astrocytes in the tumor are expected to have a positive effect on the peripheral neurons or on the extracellular environment of the neurons. Moreover, analysis of the macrophage infiltration level in the glioblastoma showed that macrophage infiltration increased dramatically in the anti-FAM19A5 antibody-treated group compared to the negative control human IgG-treated group (FIGS. 20A and 20B).

These results indicated that anti-FAM19A5 antibody treatment can also promote the infiltration of macrophages into the glioblastoma, which can, then, facilitate the treatment of glioblastoma.

Example 20 Evaluation of the Anticancer Efficacy of FAM19A5 Antibody in Rat Glioma Model Using C6 Tumor Cells To induce a syngeneic rat glioma model, $1.8 \times 10^5/1$ μL of C6 tumor cells were inoculated to male Wistar rat by intracranial injection using stereotaxic frame From day 7 post tumor inoculation, each rat was intravenously administered with human IgG (negative control) antibody or anti-FAM19A5 antibody, at a dose of 2.5 mg/kg, every three days for two times. Image of MM scan to analyze inoculated tumor size, location and qualitative results of each rat were taken over 2-3 day interval after day 7 post tumor cell inoculation.

Figure 21:
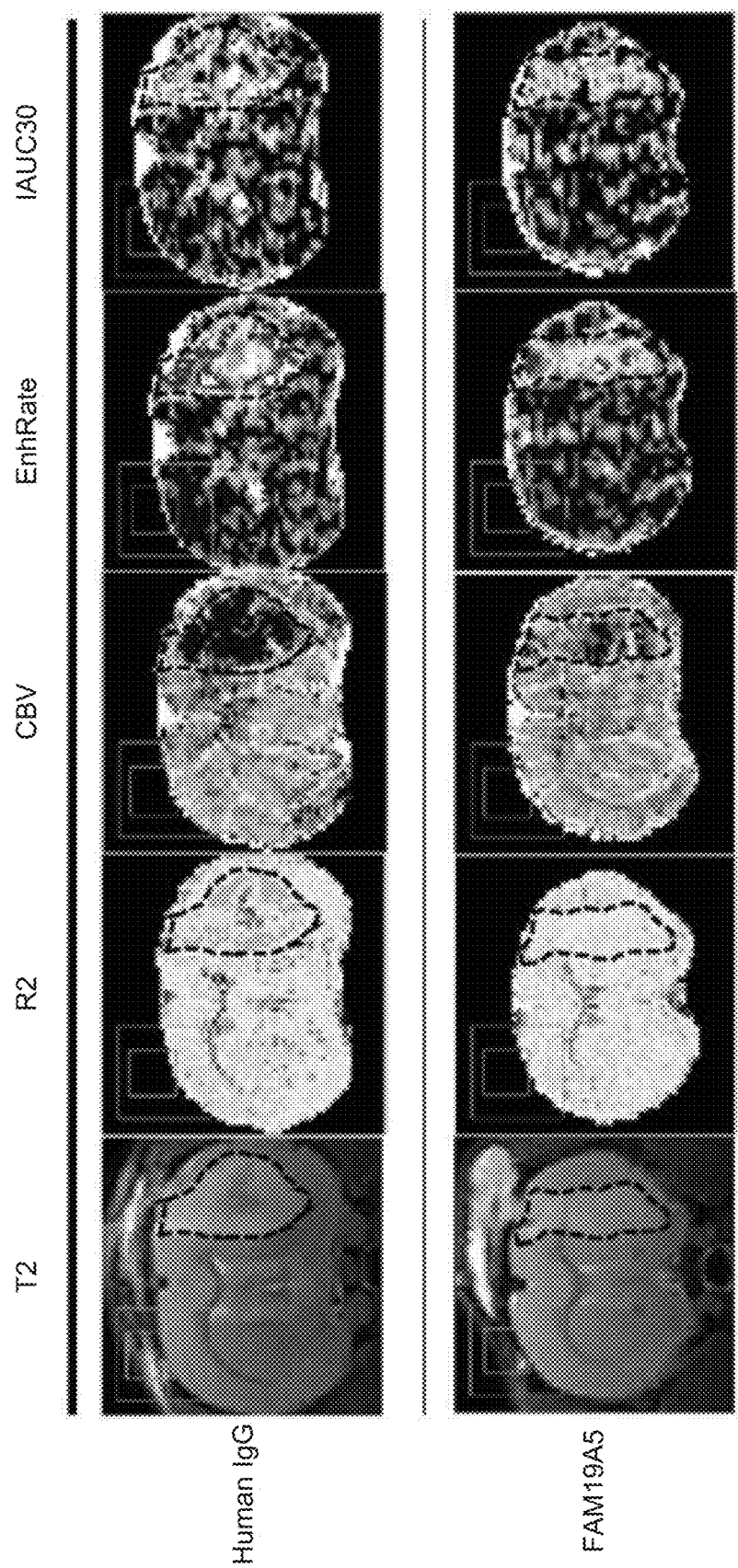
FIG. 21 shows MM scan images of the brain of rat glioma models treated with either the control human IgG antibody (top row) or the anti-FAM19A5 antibody (bottom row). The images show various properties of the tumors: (i) T2—morphological analysis; (ii) R2—fluid content; (iii) CBV—cerebral blood volume; (iv) EnhRate (enhancement rate) and IAUC30 (initial area under the curve at 30 seconds)—tissue permeability. The tumor is denoted by black dotted marks in the images.

A T2-weighted image scan is a basic morphological analysis which provides visual and qualitative evaluation of inoculated tumor's location, size, etc. R2 mapping analysis used as indication of fluid content within the tumor tissue, allows visual confirmation of edema volume within tumor. The imaging analytical method used to detect overall blood flow was used to derive change in R2* value before and after injection of high molecular weight T2 contrast agent MION (Size: 20±5 nm, dose: 5 mg/kg), which calculated CBV (cerebral blood volume) through de1R2* mapping. CBV (Cerebral blood volume) value was derived by variation of R2 and was used to visually analyze general blood volume in the brain tissue. Enhancement rate (EnhRate) and area under curve (AUC) were the representative parameters for tissue permeability detection As shown in the image scan result (FIG. 21), the T2-weighted image showed that anti-FAM19A5 antibody administration effectively suppressed tumor growth compared to human IgG antibody (negative control). R2 mapping result of anti-FAM19A5 antibody administered animals showed a decrease in necrosis area in the tumor resulting in reduced water content in the core of the tumor when compared to human IgG (negative control) treated animals. CBV analysis results showed relatively large blood volume within the tumor tissue of anti-FAM19A5 antibody administered animals compared to human IgG (negative control) treated animals, which demonstrated enhancement of blood flow rate within the tumor tissue. Lastly, evaluation of tumor tissue permeability showed reduction in permeability in anti-FAM19A5 antibody administered animals compared to the human IgG (negative control) treated animals. "IAUC30" indicates initial area under curve at 30 seconds.

These findings from rat glioma C6 tumor cell model treated with anti-FAM19A5 antibody compared to the negative control group treated with human IgG show reduction of the necrosis area leading to amelioration of edema. Effective tumor growth suppression occurred by decrease in tumor cell permeability and amelioration of blood flow rate.

Example 21 Evaluation of the Anticancer Efficacy of Anti-FAM19A5 Antibody in Mouse Brain Cancer Model Using GL261 Tumor Cells To further assess the anticancer effects of anti-FAM19A5 antibody, GL261 Red-FLuc cells were used to induce brain cancer in mice. Briefly, the GL261 Red-FLuc cells ($3\times10^5$) were injected into the brain of C57BL/6 mice (Day 0). Then, 3 days after the injection, the mice were intravenously administered with either human IgG (Sigma, cat. #14506) or anti-FAM19A5 antibody (3-2 clone, Lot #171123). The antibodies were administered at a dose of 5 mg/kg once a week for a total of four weeks. After the last antibody administration (Day 24), the mice were monitored for survival until all the animals had died.

Figure 22:
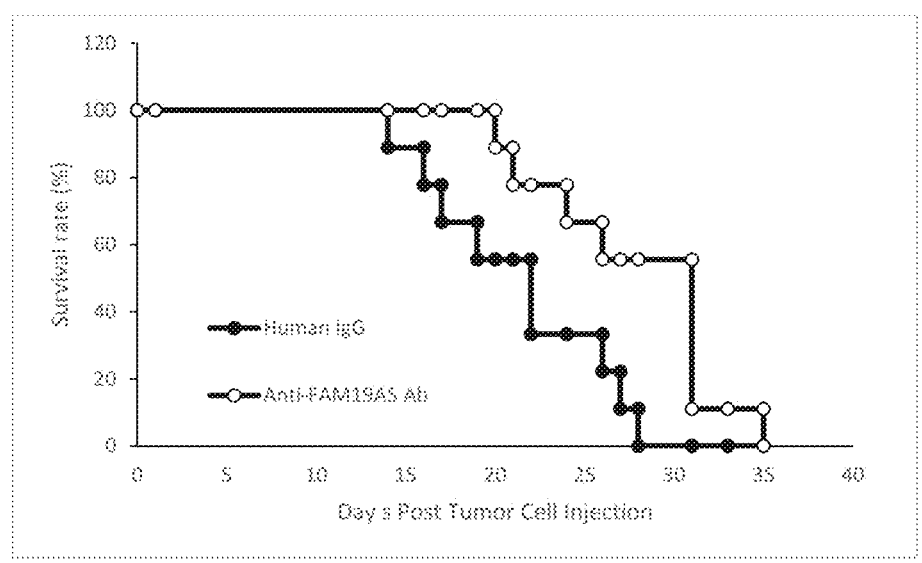
FIG. 22 shows the effect of anti-FAM19A5 antibody on survival in a mouse brain cancer model. The black circles represent animals treated with the human IgG control antibody. The white circles represent animals treated with the anti-FAM19A5 antibody.

As shown in FIG. 22, in the human IgG group, the last mouse died at day 28 post GL261 cell injection. In contrast, in animals treated with the anti-FAM19A5 antibody, the last mouse died a week later (i.e., day 35 post GL261 cell injection). This result further confirmed the anticancer efficacy of the anti-FAM19A5 antibody by demonstrating that the anti-FAM19A5 antibody can enhance survival in animals with brain cancer.

It is to be appreciated that the Detailed Description section, and not the Summary and Abstract sections, is intended to be used to interpret the claims. The Summary and Abstract sections can set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

All publications, patents, patent applications, internet sites, and accession numbers/database sequences (including both polynucleotide and polypeptide sequences) cited herein are hereby incorporated by reference in their entirety for all purposes to the same extent as if each individual publication, patent, patent application, internet site, or accession number/database sequence were specifically and individually indicated to be so incorporated by reference.

This PCT application claims the priority benefit of U.S. Provisional Application Nos. 62/525,635, filed Jun. 27, 2017, and 62/582,887, filed Nov. 7, 2017, both of which are incorporated herein by reference in their entireties.

What is claimed is:

1. A method of treating a neuropathic pain in a subject in need thereof, comprising administering to the subject a nucleic acid encoding an isolated antibody, or antigen-binding portion thereof, which specifically binds to a human family with sequence similarity 19, member A5 (FAM19A5) protein (anti-FAM19A5 antibody), wherein the anti-FAM19A5 antibody comprises a heavy chain CDR1, CDR2, and CDR3 and a light chain CDR1, CDR2, and CDR3, and wherein the heavy chain CDR1 comprises the amino acid sequence set forth in SEQ ID NO: 14, the heavy chain CDR2 comprises the amino acid sequence set forth in SEQ ID NO: 15, the heavy chain CDR3 comprises the amino acid sequence set forth in SEQ ID NO: 16, the light chain CDR1 comprises the amino acid sequence set forth in SEQ ID NO: 26, the light chain CDR2 comprises the amino acid sequence set forth in SEQ ID NO: 27, and the light chain CDR3 comprises the amino acid sequence set forth in SEQ ID NO: 28.

2. The method of claim 1, wherein the anti-FAM19A5 antibody comprises a heavy chain variable region and a light chain variable region, wherein the heavy chain variable region comprises an amino acid sequence which has at least about 80% sequence identity to the amino acid sequence set forth in SEQ ID NO: 36 and/or wherein the light chain variable region comprises an amino acid sequence which has at least about 80% sequence identity to the amino acid sequence set forth in SEQ ID NO: 40.

3. The method of claim 2, wherein the heavy chain variable region comprising the amino acid sequence set forth in SEQ ID NO: 36 and the light chain variable region comprising the amino acid sequence set forth in SEQ ID NO: 40.

4. The method of claim 1, wherein the anti-FAM19A5 antibody is a chimeric antibody or a humanized antibody.

5. The method of claim 1, wherein the anti-FAM19A5 antibody comprises a heavy chain and a light chain, wherein the (i) heavy chain comprises the amino acid sequence set forth in SEQ ID NO: 58; and (ii) the light chain comprises the amino acid sequence set forth in SEQ ID NO: 62.

6. The method of claim 1, wherein the antigen-binding portion thereof comprises a Fab, an Fab', an F (ab')2, an Fv, or a single chain Fv (scFv) formed from the antibody fragment, or combinations thereof.

7. The method of claim 1, wherein the nucleic acid is administered intravenously, orally, parenterally, intrathecally, intra-cerebroventricularly, pulmonarily, intramuscularly, subcutaneously, intraperitoneally, intravitreally, or intraventricularly.

8. The method of claim 1, wherein the subject is a human.

9. The method of claim 1, which comprises administering an additional therapeutic agent to the subject.

* * * * *